United States Patent
Nabors et al.

(10) Patent No.: US 12,435,091 B2
(45) Date of Patent: Oct. 7, 2025

(54) RNA-BINDING PROTEIN MULTIMERIZATION INHIBITORS AND METHODS OF USE THEREOF

(71) Applicants: THE UAB RESEARCH FOUNDATION, Birmingham, AL (US); SOUTHERN RESEARCH INSTITUTE, Birmingham, AL (US); THE UNITED STATES GOVERNMENT AS REPRESENTED BY THE DEPARTMENT OF VETERANS AFFAIRS, Washington, DC (US)

(72) Inventors: Louis B. Nabors, Birmingham, AL (US); Natalia Filippova, Birmingham, AL (US); Xiuhua Yang, Birmingham, AL (US); Subramaniam Ananthan, Birmingham, AL (US); Vibha Pathak, Birmingham, AL (US); Peter King, Birmingham, AL (US)

(73) Assignees: The UAB Research Foundation, Birmingham, AL (US); Southern Research Institute, Birmingham, AL (US); The United States Government as Represented by the Department of Veteran Affairs, Washington, DC (US)

( * ) Notice: Subject to any disclaimer, the term of this patent is extended or adjusted under 35 U.S.C. 154(b) by 530 days.

(21) Appl. No.: 17/996,886

(22) PCT Filed: Apr. 21, 2021

(86) PCT No.: PCT/US2021/028460
§ 371 (c)(1),
(2) Date: Oct. 21, 2022

(87) PCT Pub. No.: WO2021/216757
PCT Pub. Date: Oct. 28, 2021

(65) Prior Publication Data
US 2023/0159542 A1    May 25, 2023

Related U.S. Application Data

(60) Provisional application No. 63/013,451, filed on Apr. 21, 2020.

(51) Int. Cl.
| | |
|---|---|
| C07D 487/04 | (2006.01) |
| A61K 45/06 | (2006.01) |
| A61P 25/00 | (2006.01) |
| A61P 29/00 | (2006.01) |
| A61P 35/00 | (2006.01) |
| C07D 519/00 | (2006.01) |

(52) U.S. Cl.
CPC ............ C07D 487/04 (2013.01); A61K 45/06 (2013.01); A61P 25/00 (2018.01); A61P 29/00 (2018.01); A61P 35/00 (2018.01); C07D 519/00 (2013.01)

(58) Field of Classification Search
CPC ..... C07D 487/04; C07D 519/00; A61P 25/00; A61P 29/00; A61P 35/00; A61K 45/06
See application file for complete search history.

(56) References Cited

U.S. PATENT DOCUMENTS

2021/0214366 A1* 7/2021 Roach .................. C07D 519/00

FOREIGN PATENT DOCUMENTS

| WO | 2008030579 A2 | 3/2008 |
|---|---|---|
| WO | 2008079880 A1 | 7/2008 |
| WO | 2011101640 A1 | 8/2011 |
| WO | 2013134219 A1 | 9/2013 |

OTHER PUBLICATIONS

Abdelmohsen et al., "Post-transcriptional regulation of cancer traits by HuR", Wiley Interdisciplinary Reviews RNA, vol. 1, No. 2, 2010, pp. 214-229.
Al-Ahmadi et al., "Alternative Polyadenylation Variants of the RNA Binding Protein, HuR: Abundance, Role of AU-Rich Elements and Auto-Regulation", Nucleic Acids Research, vol. 37, No. 11, 2009, pp. 3612-3624.
Blanco et al., "Impact of HuR inhibition by the small molecule MS-444 on colorectal cancer cell tumorigenesis", Oncotarget, vol. 7, No. 45, 2016, pp. 74043-74058.
Bolognani et al., "mRNA Stability Alterations Mediated by HuR Are Necessary to Sustain the Fast Growth of Glioma Cells", Journal of Neuro-Oncology, vol. 106, Feb. 2012, pp. 531-542.
Brody et al., "Complex Hur Function in Pancreatic Cancer Cells", Wiley interdisciplinary reviews, RNA, vol. 9, No. 3, 2018, 16 pages.

(Continued)

*Primary Examiner* — Timothy R Rozof
(74) *Attorney, Agent, or Firm* — Kilpatrick Townsend & Stockton LLP

(57) ABSTRACT

This disclosure provides compounds that inhibit RNA-binding proteins, such as Human antigen R protein (HuR). The compounds described herein have a high affinity for HuR multimers and inhibit the pathological processes that promote cancer and inflammation. The compounds are highly water-soluble and have good biodistribution for both systemic and central nervous system disease processes. The compounds provide a unique therapeutic option for disease processes related to neoplastic progression or acute or chronic inflammation.

22 Claims, 28 Drawing Sheets

(56) References Cited

OTHER PUBLICATIONS

Chae et al., "Chemical inhibitors destabilize HuR binding to the AU-rich element of TNF-α mRNA", Experimental and Molecular Medicine, vol. 41, No. 11, Nov. 2009, pp. 824-831.

D'Agostino et al., "Dihydrotanshinone-I interferes with the RNA-binding activity of HuR affecting its post-transcriptional function", Scientific Reports, vol. 5, 2015, 15 pages.

Dixon et al., "Altered Expression of the Mrna Stability Factor Hur Promotes Cyclooxygenase-2 Expression in Colon Cancer Cells", The Journal of Clinical Investigation, vol. 108, No. 11, 2001, pp. 1657-1665.

Eberhardt et al., "Regulation of the mRNA-Binding Protein HuR by Posttranslational Modification: Spotlight on Phosphorylation", Current Protein & Peptide Science, vol. 13, No. 4, Jun. 2012, pp. 380-390.

Filippova et al., "Blocking PD1/PDL1 Interactions Together with MLN4924 Therapy is a Potential Strategy for Glioma Treatment", Journal of Cancer Science and Therapy, vol. 10, No. 8, 2018, pp. 190-197.

Filippova et al., "ELAVL1 Role in Cell Fusion and Tunneling Membrane Nanotube Formations with Implication to Treat Glioma Heterogeneity", Cancers (Basel), vol. 12, No. 10, Oct. 21, 2020, pp. 1-18.

Filippova et al., "Growth Factor Dependent Regulation of Centrosome Function and Genomic Instability by HuR", Biomolecules, vol. 5, No. 1, Mar. 20, 2015, pp. 263-281.

Filippova et al., "Hu Antigen R (HuR) Multimerization Contributes to Glioma Disease Progression", The journal of biological chemistry, vol. 292, No. 41, Oct. 2017, pp. 16999-17010.

Filippova et al., "Phosphoregulation of the RNA-Binding Protein Hu Antigen R (HuR) by Cdk5 Affects Centrosome Function", Journal of Biological Chemistry, vol. 287, No. 38, Sep. 14, 2012, pp. 32277-32287.

Filippova et al., "Targeting the HuR Oncogenic Role with a New Class of Cytoplasmic Dimerization Inhibitors", Cancer Research, vol. 81, No. 8, Apr. 15, 2021, pp. 2220-2233.

Filippova et al., "The RNA-binding Protein Hur Promotes Glioma Growth and Treatment Resistance", Molecular cancer research, vol. 9, No. 5, May 2011, pp. 648-659.

Grammatikakis et al., "Posttranslational Control of HuR Function", Wiley Interdisciplinary Reviews: RNA, vol. 8, No. 1, Jan. 2017, 15 pages.

Gurgis et al., "The p38-MK2-HuR Pathway Potentiates EGFRvIII-IL-1β-Driven IL-6 Secretion in Glioblastoma Cells", Oncogene, vol. 34, No. 22, May 28, 2015, pp. 2934-2942.

Han et al., "Anti-Melanoma Activities of Haspin Inhibitor CHR-6494 Deployed as a Single Agent or in a Synergistic Combination with MEK Inhibitor", Journal of Cancer, vol. 8, Issue 15, Jan. 2017, pp. 2933-2943.

Hitti et al., "Systematic Analysis of AU-Rich Element Expression in Cancer Reveals Common Functional Clusters Regulated by Key RNA-Binding Proteins", Cancer Research, vol. 76, No. 14, Jul. 15, 2016, pp. 4068-4080.

Holmes et al., "mTORC2/AKT/HSF1/HuR Constitute a Feedforward Loop Regulating Rictor Expression and Tumor Growth in Glioblastoma", Oncogene, vol. 37, No. 6, Feb. 8, 2018, pp. 732-743.

Hostetter et al., "Cytoplasmic accumulation of the RNA binding protein HuR is central to tamoxifen resistance in estrogen receptor positive breast cancer cells", Cancer Biology and Therapy, vol. 7, 2008, pp. 1496-1506.

Huertas et al., "Antitumor Activity of a Small-Molecule Inhibitor of the Histone Kinase Haspin", Oncogene, vol. 31, Issue 11, 2012, pp. 1408-1418.

Janakiraman et al., "Repression of Caspase-3 and RNA-binding protein HuR Cleavage by Cyclooxygenase-2 Promotes Drug Resistance in Oral Squamous Cell Carcinoma", Oncogene, vol. 36, No. 22, Jun. 1, 2017, pp. 3137-3148.

Kakuguchi et al., "Suramin, screened from an approved drug library, inhibits HuR functions and attenuates malignant phenotype of oral cancer cells", Cancer Medicine, vol. 7, No. 12, Dec. 2018, pp. 6269-6280.

Kaur et al., "The fungal natural product azaphilone-9 binds to HuR and inhibits HuR-RNA interaction in vitro", PLOS one, vol. 12, No. 4, Apr. 17, 2017, 18 pages.

Lal et al., "Regulation of HuR structure and function by dihydrotanshinone-l.", Nucleic Acids Research, vol. 45, No. 16, 2017, pp. 9514-9527.

Lei et al., "Long Non-Coding RNA SNHG12promotes the Proliferation and Migration of Glioma cells by binding to HuR", Journal of Oncology, vol. 53, Jul. 11, 2018, pp. 1374-1384.

Levidou et al., "Clinical Significance and Biological Role of HuR in Head and Neck Carcinomas", Disease Markers, vol. 2018, 2018, 13 pages.

Liu et al., "The Jun/miR-22/HuR regulatory axis contributes to tumourigenesis in colorectal cancer", Molecular Cancer, vol. 17, No. 1, 2018, 15 pages.

Louis et al., "The 2016 World Health Organization Classification of Tumors of the Central Nervous System: A Summary", Acta Neuropathologica, vol. 131, No. 6, Jun. 2016, pp. 803-820.

Mazroui et al., "Caspase-Mediated Cleavage of HuR in the Cytoplasm Contributes to pp32/PHAP-1 Regulation of Apoptosis", Journal of Cell Biology, vol. 180, No. 1, Jan. 14, 2008, pp. 113-127.

Mcdonald et al., "The Prognostic Influence of bcl-2 in Malignant Glioma", British Journal of Cancer, vol. 86, No. 12, Jun. 17, 2002, pp. 1899-1904.

Meisner et al., "Identification and mechanistic characterization of low-molecular-weight inhibitors for HuR", Nature Chemical Biology, vol. 3, No. 8, Aug. 2007, pp. 508-515.

Moradi et al., "Dual mechanisms of action of the RNA-binding protein human antigen R explains its regulatory effect on melanoma cell migration", Translational research: the journal of laboratory and clinical medicine, vol. 172, 2016, pp. 45-60.

Mukherjee et al., "PKM2 uses control of HuR Localization to Regulate p27 and Cell Cycle Progression in Human Glioblastoma Cells", International Journal of Cancer, vol. 139, No. 1, Jul. 1, 2016, pp. 99-111.

Muralidharan et al., "Folate Receptor-targeted Nanoparticle Delivery of HuR-RNAi Suppresses Lung Cancer Cell Proliferation and Migration", Journal of Nanobiotechnology, vol. 14, No. 1, Jun. 21, 2016, 17 pages.

Muralidharan et al., "HuR-targeted small molecule inhibitor exhibits cytotoxicity towards human lung cancer cells", Scientific Reports, vol. 7, No. 1, 2017, 11 pages.

Muralidharan et al., "Tumor-targeted nanoparticle delivery of HuR siRNA inhibits lung tumor growth in vitro and in vivo by disrupting the oncogenic activity of the RNA-binding protein HuR", Molecular cancer therapeutics, vol. 16, No. 8, Aug. 2017, pp. 1470-1486.

Nabors et al., "HuR, a RNA Stability Factor, Is Expressed in Malignant Brain Tumors and Binds to Adenine-and Uridine-rich Elements within the 3' Untranslated Regions of Cytokine and Angiogenic Factor mRNAs", Cancer Research, vol. 61, No. 5, Mar. 1, 2001, pp. 2154-2161.

Parker et al., "Molecular Heterogeneity in Glioblastoma: Potential Clinical Implications", Frontiers in Oncology, vol. 5, Article No. 55, Mar. 3, 2015, pp. 1-9.

PCT/US2021/028460, "International Preliminary Report on Patentability", Nov. 3, 2022, 8 pages.

PCT/US2021/028460, "International Search Report and Written Opinion", Jun. 28, 2021, 11 pages.

Perry Jr et al., "Radiation Plus Temozolomide in Patients with Glioblastoma", The New England Journal of Medicine, vol. 376, 2017, pp. 2195-2197.

Pullmann Jr. et al., "Analysis of Turnover and Translation Regulatory RNA-Binding Protein Expression through Binding to Cognate mRNAs", Molecular and Cellular Biology, vol. 27, No. 18, Sep. 2007, pp. 6265-6278.

Rendleman et al., "New Insights Into the Cellular Temporal Response to Proteostatic Stress", Elife, vol. 7, Oct. 12, 2018, 37 pages.

Schultz et al., "Understanding and targeting the disease-related RNA binding protein HuR", Wiley Interdisciplinary Reviews RNA, vol. 11, No. 3, May 2020, 31 pages.

(56) References Cited

OTHER PUBLICATIONS

Sherman et al., "Novel Procedure for Modeling Ligand/Receptor Induced Fit Effects", Journal of Medicinal Chemistry, vol. 49, No. 2, Jan. 26, 2006, pp. 534-553.
Si et al., "Smads as Muscle Biomarkers in Amyotrophic Lateral Sclerosis", Annals of Clinical and Translational Neurology, vol. 1, Issue 10, 2014, pp. 778-787.
Tamimi et al., "Epidemiology and Outcome of Glioblastoma", Glioblastoma, Sep. 27, 2017, pp. 143-153.
Wang et al., "Anti-Cancer Effects of the HuR inhibitor, MS-444, in Malignant Glioma Cells", Cancer Biology & Therapy, vol. 20, No. 7, 2019, pp. 979-988.
Wang et al., "Deletion of the RNA Regulator HuR in Tumor Associated Microglia and Macrophages Stimulates Antitumor Immunity and Attenuates Glioma Growth", Glia, vol. 67, No. 12, Dec. 2019, pp. 2424-2439.
Wang et al., "HuR Regulates Cyclin A and Cyclin B1 mRNA Stability during Cell Proliferation", The EMBO Journal, vol. 19, No. 10, May 15, 2000, pp. 2340-2350.
Wang et al., "Multiple functions of the RNA-binding protein HuR in cancer progression, treatment responses and prognosis", International Journal of Molecular Sciences, vol. 14, No. 5, May 2013, pp. 10015-10041.
Wheeler et al., "Modeling Chemotherapeutic Neurotoxicity with Human Induced Pluripotent Stem Cell-derived Neuronal Cells", PLoS One, vol. 10, No. 2, Feb. 17, 2015.
Yang et al., "Sex Differences in GBM Revealed by Analysis of Patient Imaging, Transcriptome, and Survival Data", Science Translational Medicine, vol. 11, No. 473, Jan. 2, 2019, 26 pages.

\* cited by examiner

A (continued)

An enrichment of cellular structures targeted by down-regulated genes

| | Name | P value | Adjusted P value | Odds ratio |
|---|---|---|---|---|
| 1 | Centrosome GO: 005813 | 3e-7 | 1e-4 | 2.1 |
| 2 | Microtubule org center GO: 005815 | 2e-6 | 3e-4 | 1.9 |
| 3 | Nuclear chrom. part GO: 0044454 | 2e-6 | 4e-4 | 2.1 |
| 4 | Microtub org. center part GO: 0044450 | 3e-4 | 2e-2 | 2.5 |
| 5 | Mitotic spindle GO: 0072686 | 3e-4 | 3e-2 | 2.9 |

B

An enrichment of up-regulated genes and related pathways and processes.

| | Name | P value | Adjusted P value | Odds ratio |
|---|---|---|---|---|
| 1 | SRP-dependent co-transl. protein targeting to membr | 1.2e-23 | 6.3e-20 | 5.1 |
| 2 | protein targeting to ER | 1.7e-22 | 2.9e-19 | 4.8 |
| 3 | Co-translation protein targeting to membrane | 1.5e-22 | 3.7e-19 | 4.9 |
| 4 | Viral gene expression | 1.4e-19 | 1.8e-16 | 4.3 |
| 5 | Nucl-transcr, mRNA catab process, nonsense decay | 3.5e-19 | 3.5e-16 | 4.1 |
| 6 | Viral transcription | 5.5e-19 | 4.7e-16 | 2.9 |
| 7 | rRNA processing | 2.6e-11 | 1.7e-8 | 2.6 |
| 8 | rRNA metabolic process | 5.6e-11 | 3.2e-8 | 2.6 |
| 9 | Peptide biosynth. process | 9.9e-11 | 5.1e-8 | 2.7 |
| 10 | Ribosome biogenesis | 2.7e-10 | 1.3e-7 | 2.4 |
| 11 | ncRNA processing | 3.2e-10 | 1.4e-7 | 2.4 |
| 12 | Viral process | 8.1e-10 | 3.2e-7 | 2.4 |
| 13 | Translation | 1.2e-7 | 4.2e-5 | 2.1 |

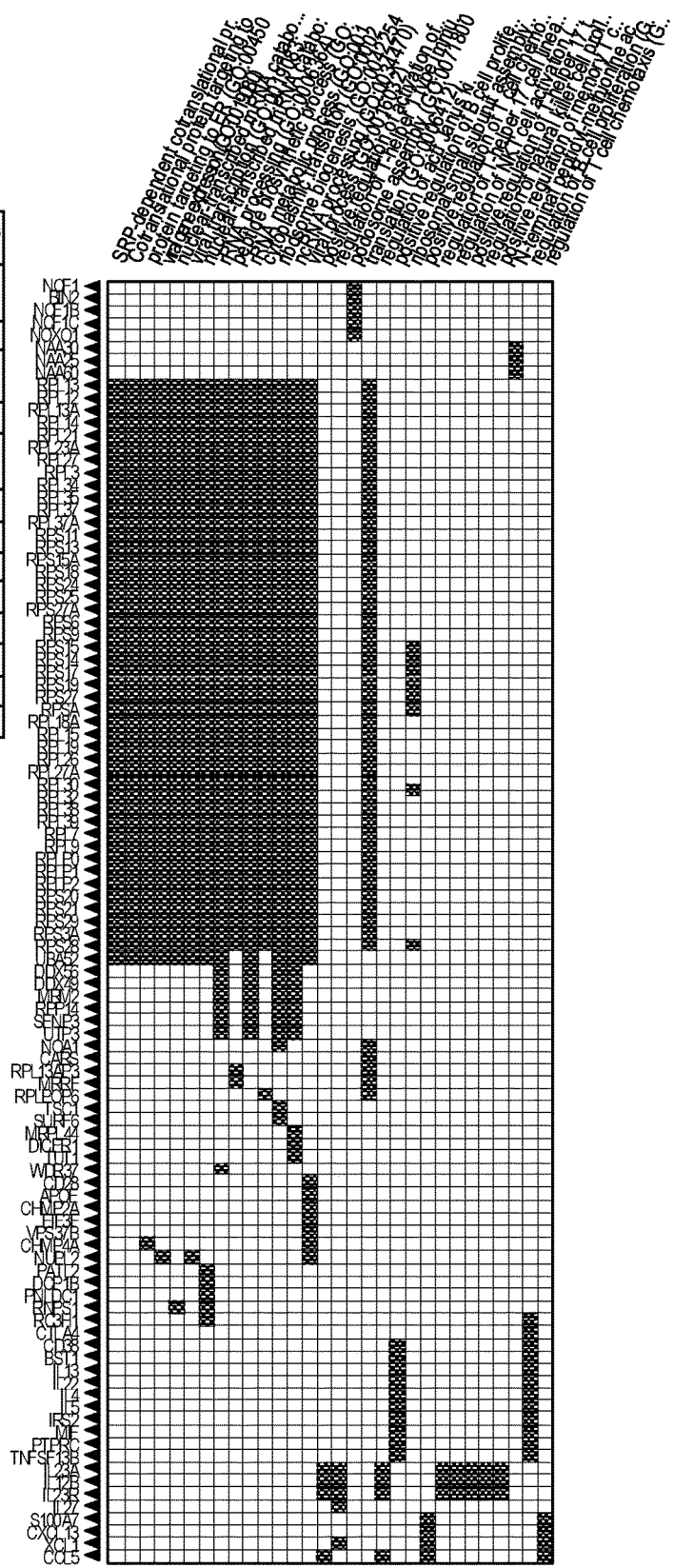

An enrichment of cellular structures targeted by up-regulated genes.

| | Name | P value | Adjusted P value | Odds ratio |
|---|---|---|---|---|
| 1 | Cyt. Ribosome GO: 0022626 | 2e-18 | 1e-15 | 3.9 |
| 2 | Cyt. large ribos. GO: 0022625 | 1e-11 | 2e-9 | 4.0 |
| 3 | Large ribos. Sub GO: 0015934 | 4e-11 | 4e-9 | 3.9 |
| 4 | Cyt. part GO: 0044445 | 2e-13 | 4e-11 | 3.0 |
| 5 | Cyt. small ribos GO: 0022627 | 4e-8 | 3e-6 | 3.9 |
| 6 | Ribosome GO: 00058540 | 2e-8 | 2e-6 | 3.3 |
| 7 | Small ribosome GO: 0015935 | 2e-7 | 1e-5 | 3.6 |
| 8 | Polysome ribos. GO: 0042788 | 4e-4 | 2e-2 | 3.4 |

A  Vehicle                SRI-42127

RNA-BINDING PROTEIN MULTIMERIZATION INHIBITORS AND METHODS OF USE THEREOF

CROSS-REFERENCE TO PRIORITY APPLICATION

This application claims priority to U.S. Provisional Application No. 63/013,451, filed Apr. 21, 2020, which is incorporated herein by reference in its entirety.

STATEMENT REGARDING FEDERALLY FUNDED RESEARCH

This invention was made with government support under Grant No. R01CA200624 awarded by the National Institutes of Health. The government has certain rights in the invention.

BACKGROUND

The development of novel therapeutics that exploit alterations in the activation state of key cellular signaling pathways due to mutations in regulators has generated the field of personalized medicine. Dramatic responses in advanced cancers have been seen but unfortunately, the majority of these responses are not durable. First-generation efforts have focused on actionable mutations identified by deep sequencing of large numbers of tumor samples. A new opportunity exists by exploiting key downstream "nodes of control" that contribute to oncogenesis and that are inappropriately activated by upstream mutations and microenvironmental influences. The RNA-binding protein Human antigen R protein (HuR) serves as such a node. HuR functionality in cancer cells is strictly dependent on HuR nuclear/cytoplasmic shuttling and dimerization.

The pathological processes driven by HuR promote cancer and inflammation. HuR belongs to the mRNA-binding proteins of the ELAV family and is a chemotherapeutic target for many types of cancer. Increases in HuR expression at the mRNA and protein levels, abnormal cytoplasmic localization, and molecule dimerization are reported for almost all cancer types and are responsible for the stabilization and abnormal regulation of thousands of transcripts involved in tumor genomic instability, cell cycle progression, immune resistance, and the suppression of apoptosis. HuR is localized in the cell's cytoplasm and forms multimers that drive numerous cellular processes that promote cancer and inflammation. There are currently no commercial or research small molecule inhibitors of the multimer formation of RNA-binding proteins such as HuR.

SUMMARY

A new class of compounds that inhibit the RNA-binding protein Human antigen R protein (HuR) and that prevent HuR multimerization are disclosed herein. The compounds have a high affinity for HuR multimers and inhibit pathological processes at micro- to nano-molar ranges. The compounds provide a highly unique and powerful therapeutic option for numerous disease processes related to neoplastic progression or acute/chronic inflammation.

In one aspect, compounds of the following formula are provided:

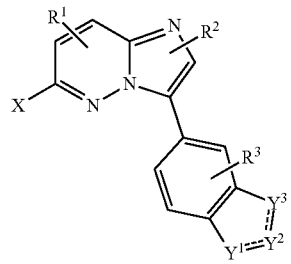

or a pharmaceutically acceptable salt or prodrug thereof, wherein $=\!=\!=$ is a single bond or a double bond; $R^1$, $R^2$, and $R^3$ are each independently selected from the group consisting of hydrogen, halogen, cyano, trifluoromethyl, alkoxy, aryloxy, substituted or unsubstituted alkyl, substituted or unsubstituted alkenyl, substituted or unsubstituted alkynyl, substituted or unsubstituted heteroalkyl, substituted or unsubstituted heteroalkenyl, substituted or unsubstituted heteroalkynyl, substituted or unsubstituted aryl, substituted or unsubstituted heteroaryl, substituted or unsubstituted cycloalkyl, and substituted or unsubstituted heterocycloalkyl; X is $NR^4R^5$ or $OR^4$, wherein $R^4$ and $R^5$ are each independently selected from the group consisting of hydrogen, substituted or unsubstituted alkyl, substituted or unsubstituted alkenyl, substituted or unsubstituted alkynyl, substituted or unsubstituted heteroalkyl, substituted or unsubstituted heteroalkenyl, substituted or unsubstituted heteroalkynyl, substituted or unsubstituted aryl, substituted or unsubstituted heteroaryl, substituted or unsubstituted cycloalkyl, and substituted or unsubstituted heterocycloalkyl; $Y^1$, $Y^2$, and $Y^3$ are each independently selected from $NR^6$ and $CR^7$, wherein $R^6$ and $R^7$ are each independently hydrogen, substituted or unsubstituted alkyl, or substituted or unsubstituted carbonyl, wherein at least two of $Y^1$, $Y^2$, and $Y^3$ are N; and wherein the compound is not

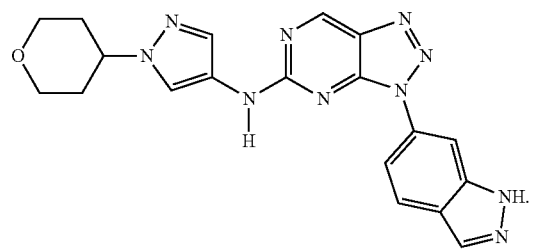 [SMILES: c1nn(C2CCOCC2)cc1Nc1ncc2nnn(-c3ccc4cn[nH]c4c3)c2n1]

Optionally, the compounds as described herein can have the following formula:

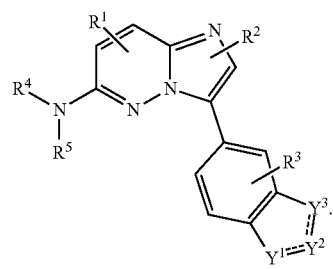

The compound can optionally be selected from the group consisting of:

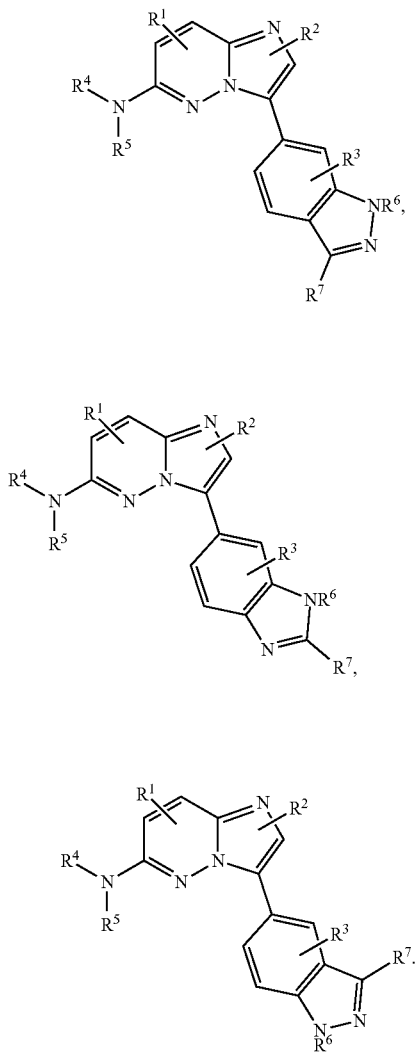

Optionally, $R^4$ is hydrogen. $R^5$ is optionally substituted or unsubstituted cycloalkyl, substituted or unsubstituted heterocycloalkyl, or substituted or unsubstituted alkyl. Optionally, $R^6$ is hydrogen or $C_1$-$C_6$ alkyl and/or $R^7$ is hydrogen, $C_1$-$C_6$ alkyl, or acetyl.

The compound can optionally have the following formula:

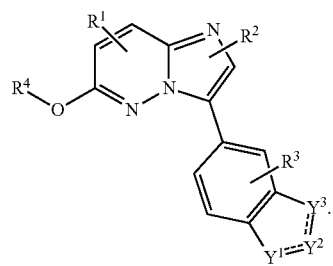

Optionally, the compound is selected from the group consisting of:

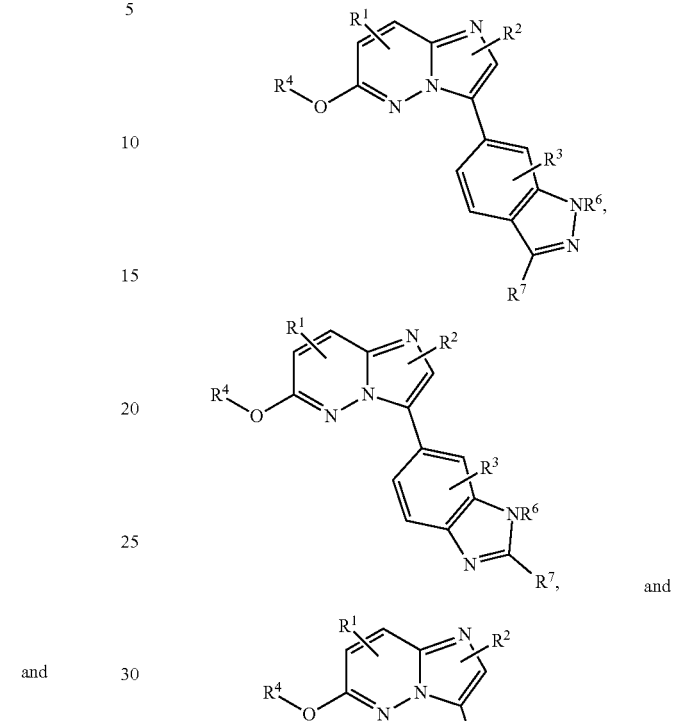

Optionally, $R^4$ is substituted or unsubstituted cycloalkyl, substituted or unsubstituted heterocycloalkyl, or substituted or unsubstituted alkyl. Optionally, $R^6$ is hydrogen or $C_1$-$C_6$ alkyl and/or $R^7$ is hydrogen, $C_1$-$C_6$ alkyl, or acetyl. Optionally, $R^1$, $R^2$ and $R^3$ are H. The compound is optionally selected from the group consisting of:

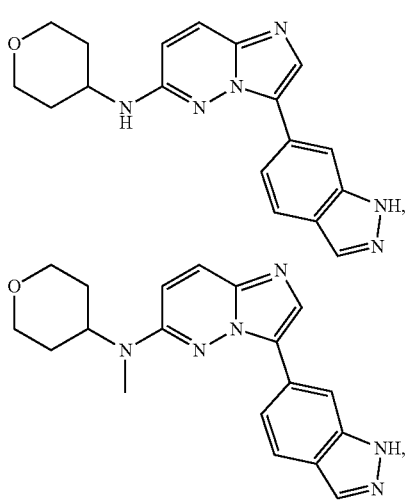

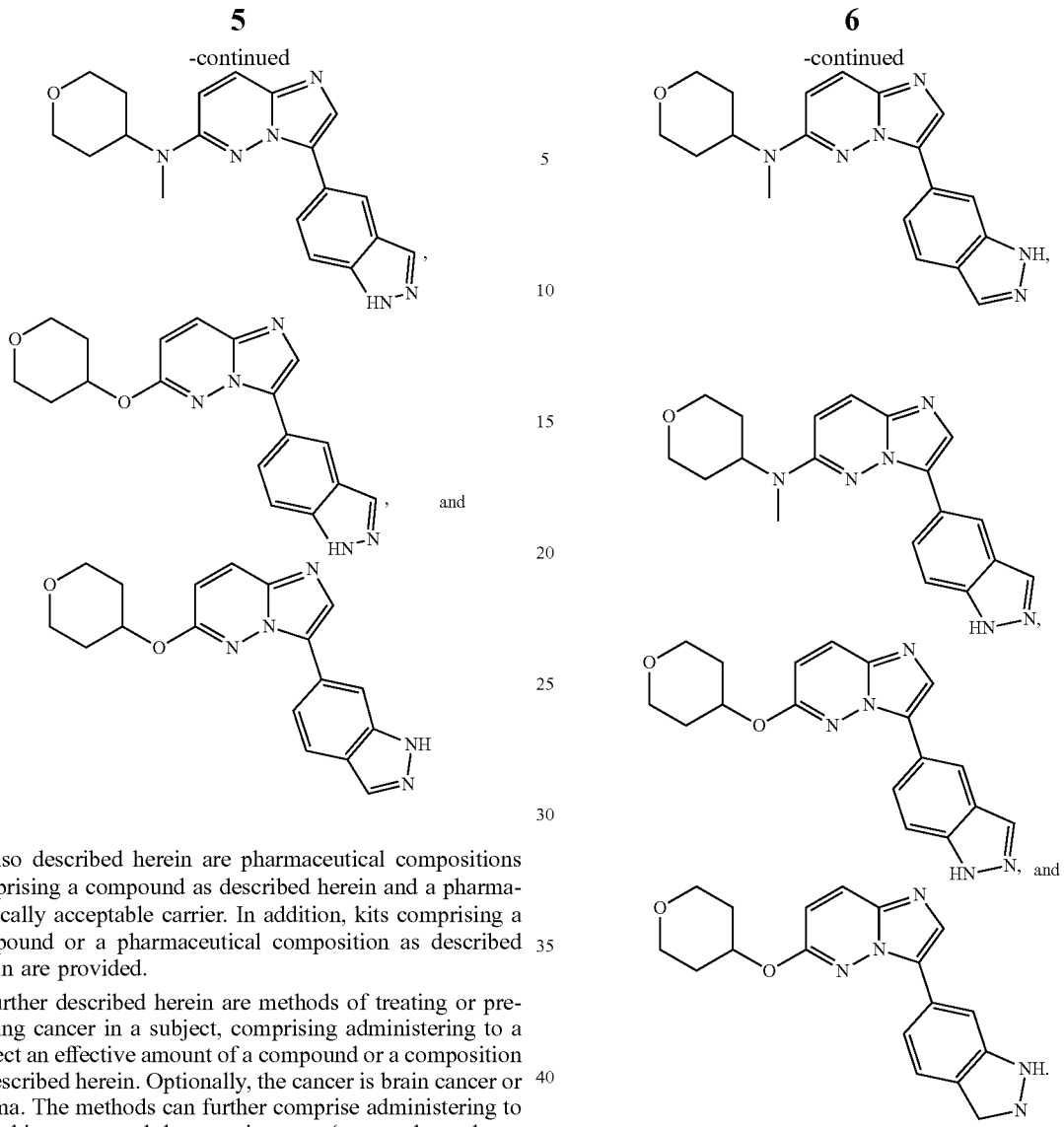

Also described herein are pharmaceutical compositions comprising a compound as described herein and a pharmaceutically acceptable carrier. In addition, kits comprising a compound or a pharmaceutical composition as described herein are provided.

Further described herein are methods of treating or preventing cancer in a subject, comprising administering to a subject an effective amount of a compound or a composition as described herein. Optionally, the cancer is brain cancer or glioma. The methods can further comprise administering to the subject a second therapeutic agent (e.g., a chemotherapeutic agent).

Also described herein are methods of inhibiting HuR multimerization in a cell, comprising contacting a cell with an effective amount of a compound or a composition as described herein. The contacting can be performed in vitro or in vivo.

Further described herein are methods of treating or preventing inflammation in a subject, comprising administering to a subject an effective amount of a compound or a composition as described herein. Optionally the inflammation is neuroinflammation. The compound is optionally selected from the group consisting of:

Also described herein are method of inhibiting HuR multimerization in a cell, comprising contacting a cell with an effective amount of a compound or composition as described herein. The contacting can be performed in vitro or in vivo.

Further described herein are methods of treating or preventing pain in a subject suffering from spinal cord injury, comprising administering to a subject an effective amount of a compound or a composition as described herein. Optionally, the pain is neuropathic pain. The compound is optionally selected from the group consisting of:

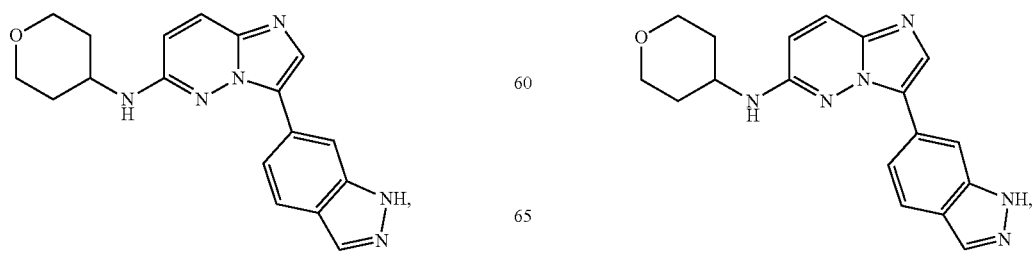

-continued

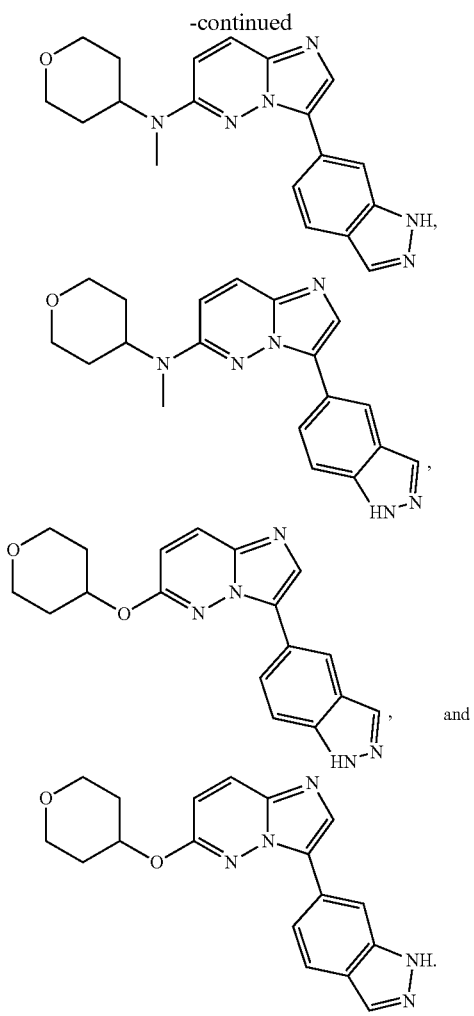

and

Also described herein are method of inhibiting HuR multimerization in a cell, comprising contacting a cell with an effective amount of a compound or composition as described herein. The contacting can be performed in vitro or in vivo.

The details of one or more embodiments are forth in the drawings and the description below. Other features, objects, and advantages will be apparent from the description and drawings, and from the claims.

DESCRIPTION OF DRAWINGS

FIG. 3, Panel B shows the structure of SRI-41664 and a dose-response graph showing the inhibition of HuR dimerization for compound SRI-41664.

FIG. 3, Panel C shows the structures of SRI-41964, SRI-42124, SRI-41664, and SRI-42127 and a graph of dose-response graph showing the inhibition of HuR dimerization for compound SRI-42127.

FIG. 6, Panel B shows no change with increasing concentrations of SRI-42127 over 6 hours (left graph) and a decrease in cell viability as a function of higher concentrations of SRI-42127 over 48 hours (right graph).

FIG. 7, Panel B depicts a representative western blot illustrating HuR multimerization in the cytoplasmic fraction of PDGx cell lines detected in non-reducing and non-denaturing conditions versus reducing and denaturing conditions.

FIG. 7, Panel C depicts a representative western blot illustrating HuR expression in the established cell lines compared to the HuR expression in the PDGx XD456 cell line.

FIG. 7, Panel D depicts representative western blots illustrating HuR nuclear/cytoplasmic distribution in the PDGx and established glioma cell lines using anti-Lamin A/C antibody to confirm nuclear fraction, and anti-αTub antibody to confirm cytoplasmic fraction.

FIG. 7, Panel E shows a graph illustrating $IC_{50S}$ of SRI-424127 in several cell lines.

FIG. 10, Panel B contain cluster charts of enrichment of up-regulated genes and targeted sub-cellular structures.

FIG. 11, Panel B is a graph illustrating microglia viability in the presence of different concentration of SRI-42127.

FIG. 11, Panel C is a set of images of microglia cells immunostained to assess the specificity of SRI-42127 for blocking HuR cytoplasmic translocation by assessing SRI-42127 effects on HMGB1 translocation. Cells were immunostained for HMGB1 and IBA1 to follow nuclear or cytoplasmic localization via immunofluorescence for unactivated (LPS−) and activated (LPS+) microglia in the presence of vehicle and SRI-42127.

FIG. 11, Panel D contains bar graphs illustrating the nuclear/cytoplastmic (N/C) ratio for HuR and HMGB1.

FIG. 15, Panel B is a bar graph illustrating the impact of SRI-42127 on induction of inflammatory cytokine mRNAs.

FIG. 17, Panel B contains two bar graphs illustrating attenuation of monocyte (top) and neutrophil (bottom) migration of cells harvested from murine bone marrow and placed in an upper chamber to conditioned media from LPS-activated astroglia placed in a lower chamber, treated with varying doses of SRI-42127 where migration across the transwell was quantitated by staining the filter with hematoxylin.

FIG. 17, Panel C contains a bar graph and images of suppression of migration of untreated microglia toward conditioned media from SRI-42127-treated microglia.

FIG. 19, Panel B is a bar graph illustrating the attenuating effects of SRI-42127 in IBA1 intensity.

FIG. 19, Panel C is a bar graph illustrating the number of cells per HPF evaluated between control and treated mice brain samples.

FIG. 20, Panel B is a plot illustrating flow cytometry results from neutrophils and monocytes using Lytic and Ly6g markers on CD11+ sorted cells.

FIG. 20, Panel C is a set of bar graphs illustrated as % CD11b+ cells showing significant attenuation of infiltrating neutrophils (left) and monocytes (right) in whole brain, front brain, middle brain, and hindbrain of treated and untreated mice.

FIG. 20, Panel D is a set of bar graphs for HuR KO mice illustrated as % CD11b+ cells showing significant attenuation of infiltrating monocytes (right), but not neutrophils (left), in whole brain, front brain, middle brain, and hindbrain of treated and untreated mice.

FIG. 21, Panel B represents a graph (top) showing serial spinal cord sections from one representative vehicle- and drug-treated mouse and a bar graph (bottom) illustrating the neuronal counts obtained by stereology at 4 weeks post SCI that showed more than a 50% increase in neurons in the drug-treated group (n=3 mice).

FIG. 21, Panel C represents a plot showing Von Frey testing at 1 week depicting a large increase in withdrawal threshold indicating reduced allodynia for mice that underwent spared nerve injury (sciatic nerve) and were then treated with SRI-42127 (10 mg/kg i.p.) every 6 hours for 4 days.

FIG. 21, Panel D is a plot showing that SRI-42127 significantly reversed allodynia at 30 and 60 min post injection. *P<0.05, P<0.01, *P<0.001) for vehicle (DMSO) treated group which received either an injection of SRI-42127 (10 mg/kg) or vehicle at 1 week.

DETAILED DESCRIPTION

Figure 1A:
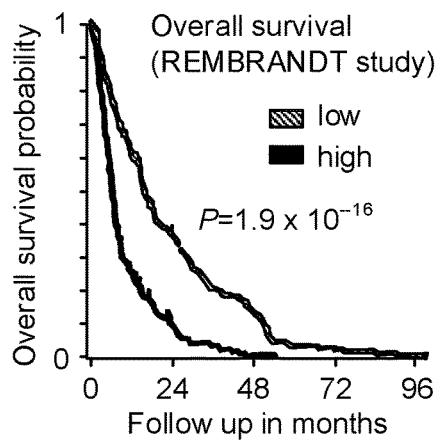
FIG. 1A is an illustration of Kaplan-Meier overall survival curves demonstrating statistically significant differences between "high ELAVL1 expression" (indicated as "high") versus "low ELAVL1 expression" (indicated as "low") for grouping of all brain tumors.

The compounds disclosed herein are small molecule inhibitors of the post-transcriptional regulator HuR, which is a critical control point for genes related to proliferation, angiogenesis, invasion, cell death, immune evasion and inflammation, genomic instability, and cell immortality. HuR moves into the cytoplasm and form multimers, which ensures a disease promoting genotype. The small molecules described herein inhibit the multimerization step, thus reversing a pathological state in a subject.

I. Compounds

A class of compounds described herein includes Formula I:

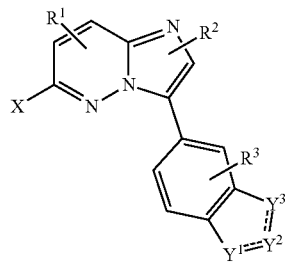

and pharmaceutically acceptable salts or prodrugs thereof.

In Formula I, ⚌ is a single bond or a double bond.

Also in Formula I, $R^1$, $R^2$, and $R^3$ are each independently selected from the group consisting of hydrogen, halogen, cyano, trifluoromethyl, alkoxy, aryloxy, substituted or unsubstituted alkyl, substituted or unsubstituted alkenyl, substituted or unsubstituted alkynyl, substituted or unsubstituted heteroalkyl, substituted or unsubstituted heteroalkenyl, substituted or unsubstituted heteroalkynyl, substituted or unsubstituted aryl, substituted or unsubstituted heteroaryl, substituted or unsubstituted cycloalkyl, and substituted or unsubstituted heterocycloalkyl.

Additionally in Formula I, X is $NR^4R^5$ or $OR^4$. $R^4$ and $R^5$ are each independently selected from the group consisting of hydrogen, substituted or unsubstituted alkyl, substituted or unsubstituted alkenyl, substituted or unsubstituted alkynyl, substituted or unsubstituted heteroalkyl, substituted or unsubstituted heteroalkenyl, substituted or unsubstituted heteroalkynyl, substituted or unsubstituted aryl, substituted or unsubstituted heteroaryl, substituted or unsubstituted cycloalkyl, and substituted or unsubstituted heterocycloalkyl. Optionally, $R^4$ is hydrogen. Optionally, $R^5$ is substituted or unsubstituted cycloalkyl, substituted or unsubstituted heterocycloalkyl, or substituted or unsubstituted alkyl.

Also in Formula I, $Y^1$, $Y^2$, and $Y^3$ are each independently selected from $NR^6$ and $CR^7$. $R^6$ and $R^7$ are each independently hydrogen, substituted or unsubstituted alkyl, or substituted or unsubstituted carbonyl. In Formula I, at least two of $Y^1$, $Y^2$, and $Y^3$ are $NR^6$. Optionally, $R^6$ is hydrogen or $C_1$-$C_6$ alkyl and/or $R^7$ is hydrogen, $C_1$-$C_6$ alkyl, or acetyl.

In some cases, the compound is not A-92 (also called SRI-41964), which has the following structure:

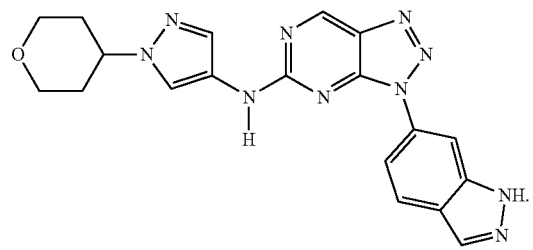 [SMILES: c1nn(C2CCOCC2)cc1Nc1ncc2nnn(-c3ccc4cn[nH]c4c3)c2n1]

In some cases, the compounds according to Formula I are represented by Structure I-A:

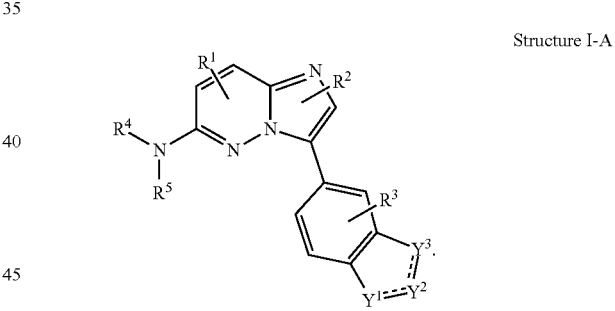

Structure I-A

In Structure I-A, ⚌, $R^1$, $R^2$, $R^3$, $R^4$, $R^5$, $Y^1$, $Y^2$, and $Y^3$ are as defined above for Formula I.

Optionally, the compounds according to Structure I-A are selected from the following:

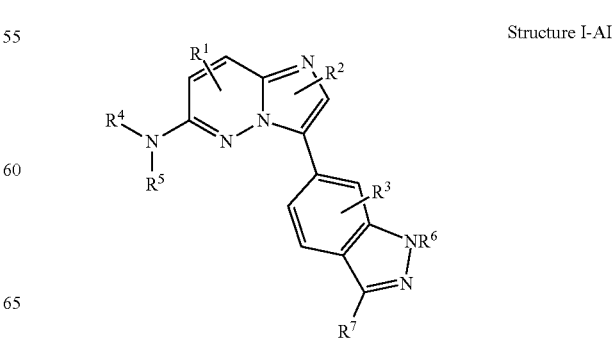

Structure I-AI

Structure I-A2

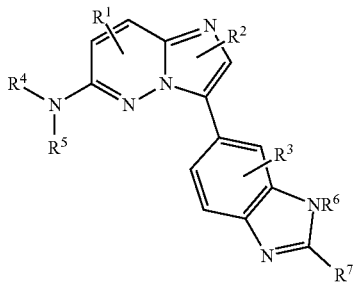

Structure I-A3

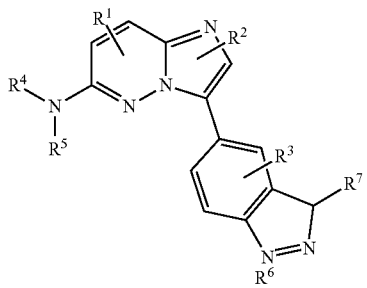

In Structure I-A1, Structure I-A2, and Structure I-A3, $R^1$, $R^2$, $R^3$, $R^4$, $R^5$, $R^6$, and $R^7$ are as defined above for Formula I. Optionally, $R^4$ is hydrogen. Optionally, $R^5$ is substituted or unsubstituted cycloalkyl, substituted or unsubstituted heterocycloalkyl, or substituted or unsubstituted alkyl. $R^6$ is optionally hydrogen or $C_1$-$C_6$ alkyl and/or $R^7$ is optionally hydrogen, $C_1$-$C_6$ alkyl, or acetyl.

Examples of Structure I-A include the following compounds:

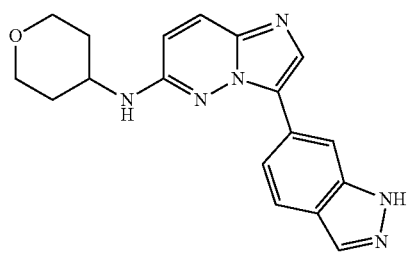

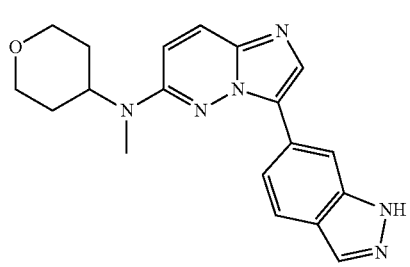

-continued

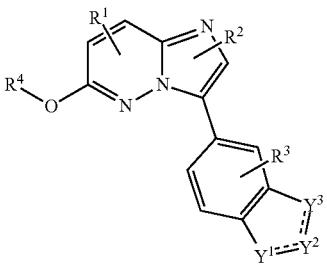

In some cases, the compounds according to Formula I are represented by Structure I-B:

Structure I-B

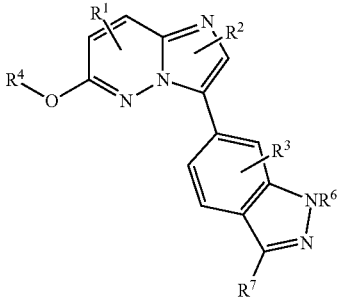

In Structure I-B, ═══, $R^1$, $R^2$, $R^3$, $R^4$, $Y^1$, $Y^2$, and $Y^3$ are as defined above for Formula I.

Optionally, the compounds according to Structure I-B are selected from the following:

Structure I-B1

Structure I-B2

Structure I-B3

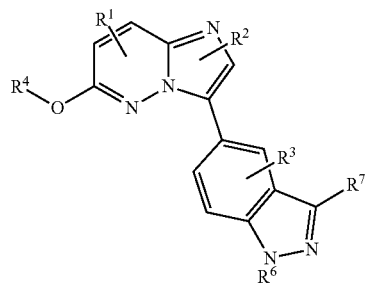

In Structure I-B1, Structure I-B2, and Structure I-B3, $R^1$, $R^2$, $R^3$, $R^4$, $R^6$, and $R^7$ are as defined above for Formula I. Optionally, $R^4$ is substituted or unsubstituted cycloalkyl, substituted or unsubstituted heterocycloalkyl, or substituted or unsubstituted alkyl. Optionally, $R^6$ is hydrogen or $C_1$-$C_6$ alkyl and/or $R^7$ is hydrogen, $C_1$-$C_6$ alkyl, or acetyl. In any of the examples above, optionally any of $R^1$, $R^2$ and $R^3$ are H. In any of the examples above, optionally each of $R^1$, $R^2$ and $R^3$ is H.

Examples of Structure I-B include the following compounds:

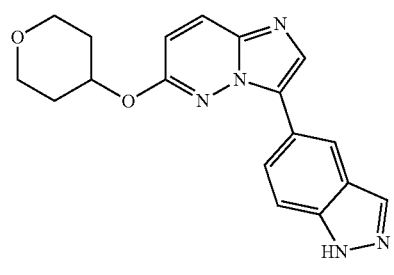

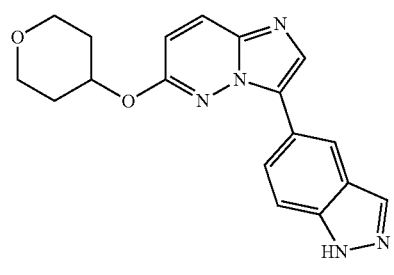

Specific examples of compounds of this disclosure include:

Compound 2

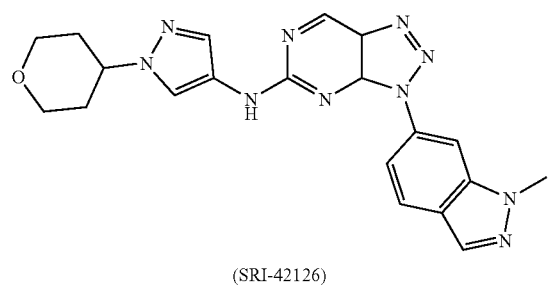

(SRI-42126)

Compound 3

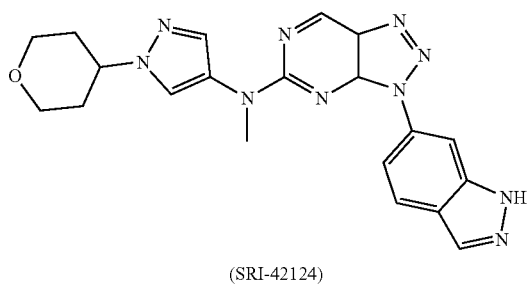

(SRI-42124)

Compound 4

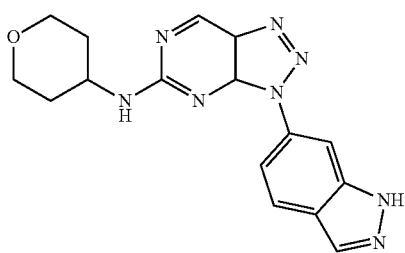

(SRI-42125)

Compound 13

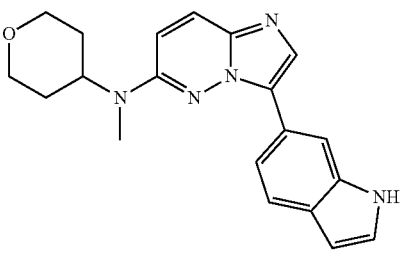

(SRI-42916)

Compound 14

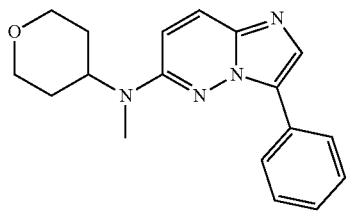

(SRI-42917)

Compound 16

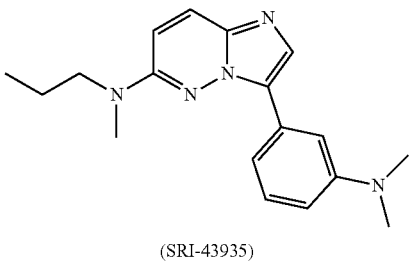

(SRI-43935)

Compound 17
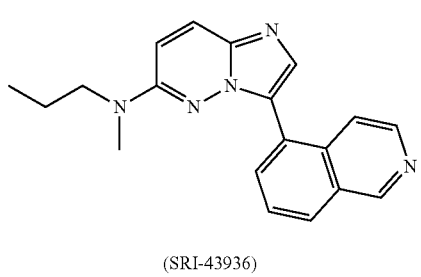
(SRI-43936)
Compouund 18
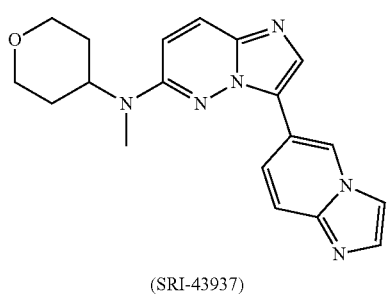
(SRI-43937)
Compound 19
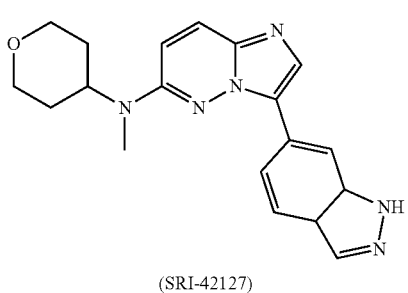
(SRI-42127)
Compound 20
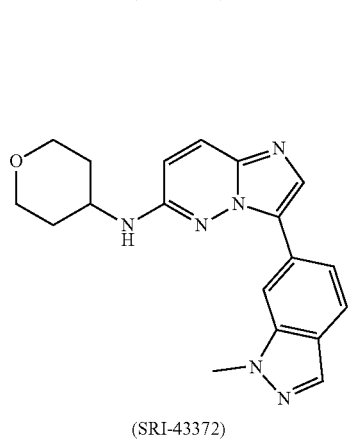
(SRI-43372)
Compound 21
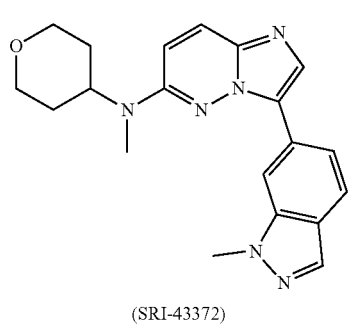
(SRI-43372)
Compound 22
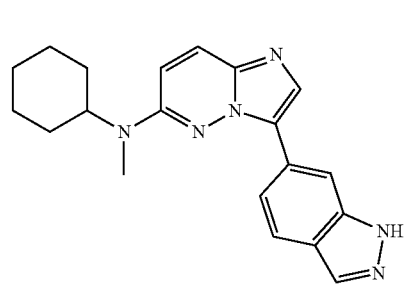
(SRI-42719)
Compound 23
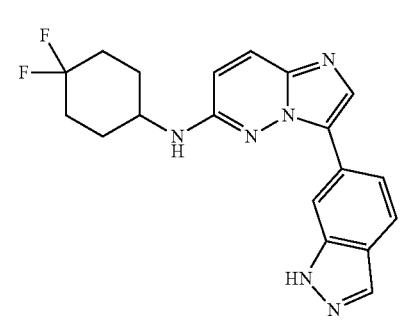
(SRI-43413)
Compound 24
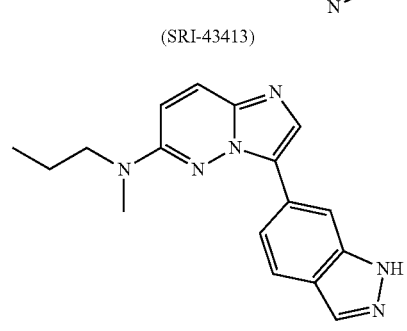
(SRI-43175)
Compound 25
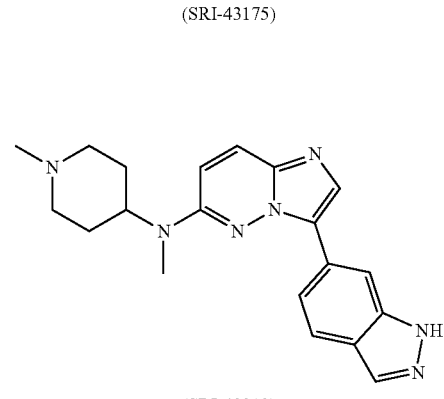
(SRI-42918)
Compound 26
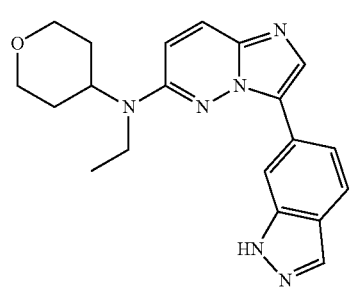
(SRI-43566)

Compound 27 (SRI-43499)

Compound 28 (SRI-43568)

Compound 29 (SRI-43753)

Compound 30 (SRI-43411)

Compound 31 (SRI-43371)

Compound 32 (SRI-43264)

Compound 33 (SRI-43263)

Compound 34 (SRI-43496)

Compound 35
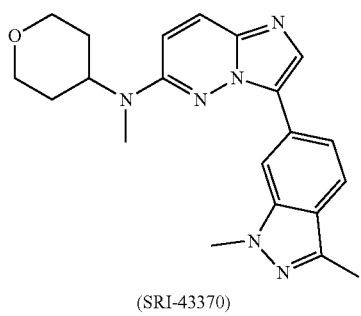
(SRI-43370)
Compound 36
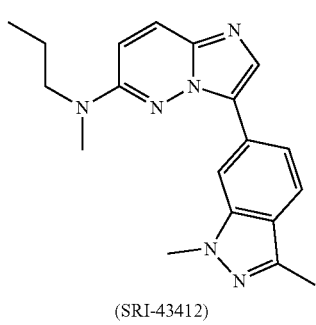
(SRI-43412)
Compound 37
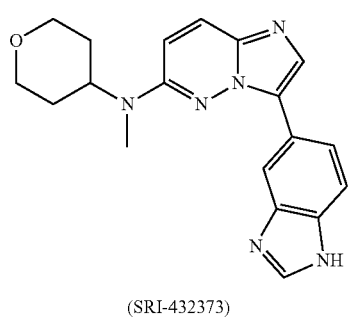
(SRI-432373)
Compound 38
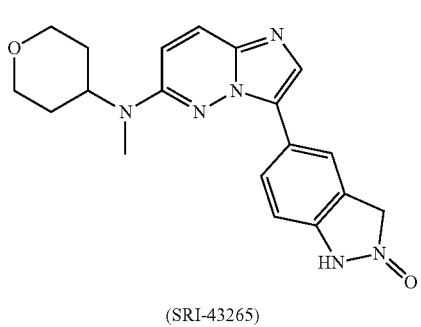
(SRI-43265)
Compound 39
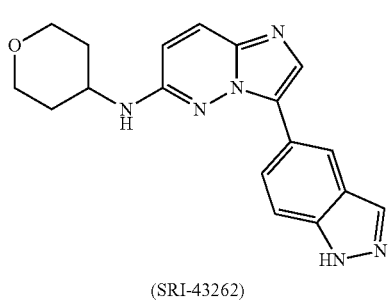
(SRI-43262)
Compound 40
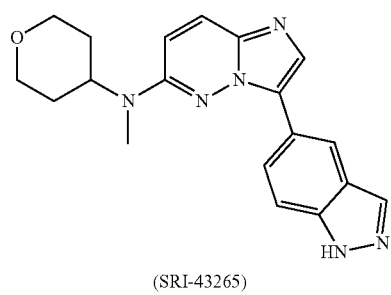
(SRI-43265)
Compound 41
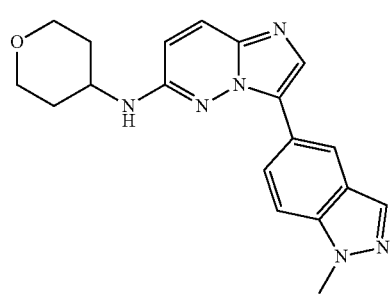
(SRI-43497)
Compound 42
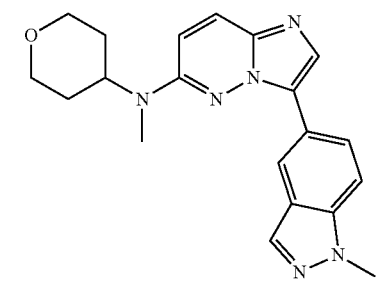
(SRI-43494)
Compound 42
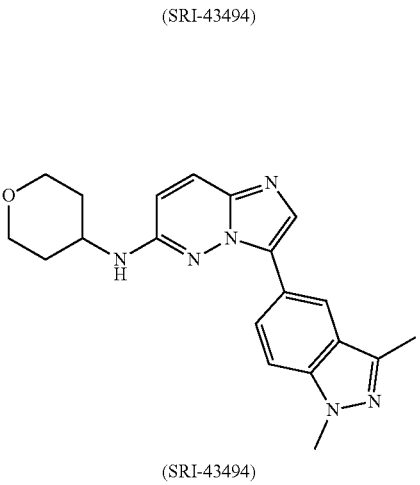
(SRI-43494)

Compound 43
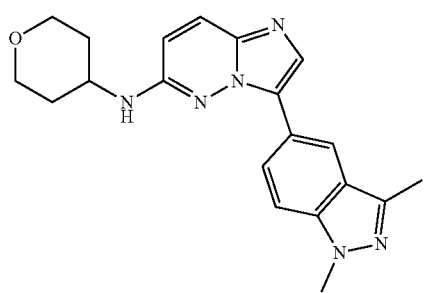
(SRI-43498)
Compound 44
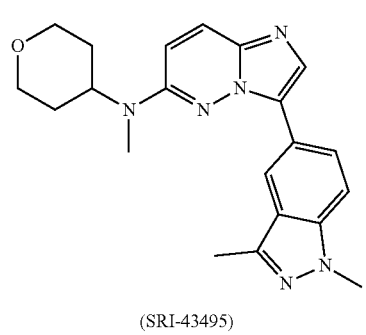
(SRI-43495)
Compound 45
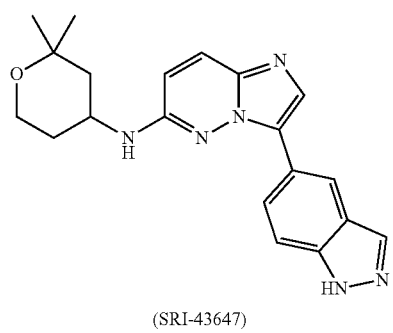
(SRI-43647)
Compound 46
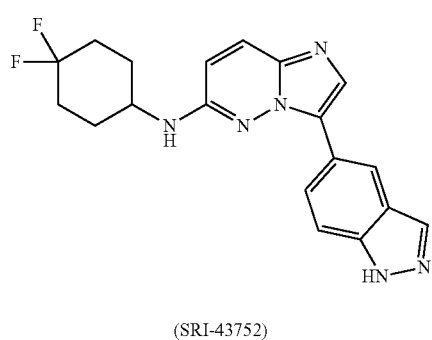
(SRI-43752)
Compound 47
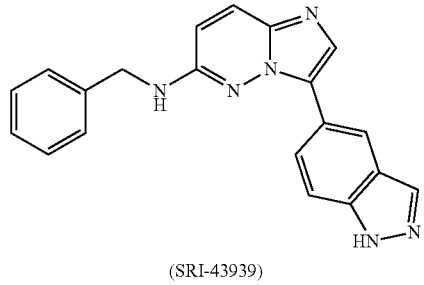
(SRI-43939)
Compound 49
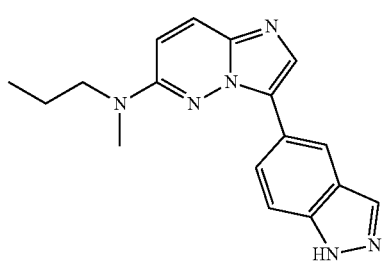
(SRI-43184)
Compound 50
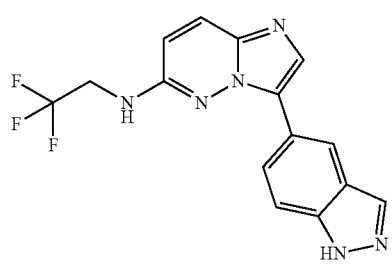
(SRI-43751)
Compound 51
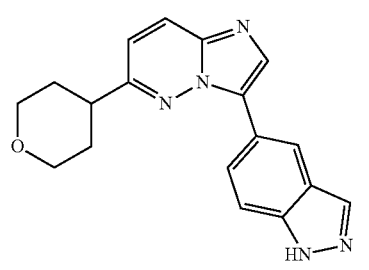
(SRI-43648)
Compound 52
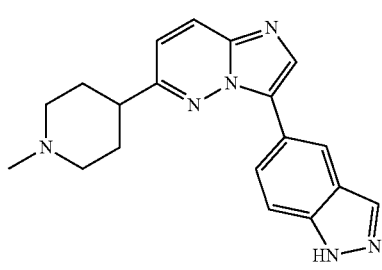
(SRI-43752)

Compound 53
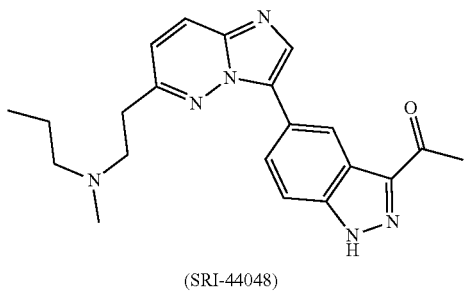
(SRI-44048)
Compound 54
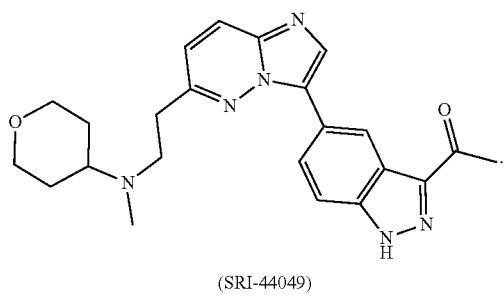
(SRI-44049)
Compound 55
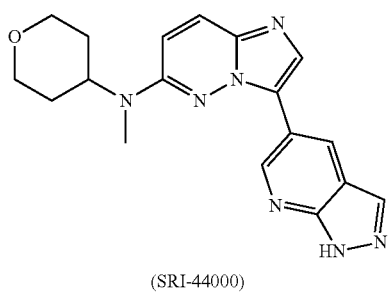
(SRI-44000)
Compound 56
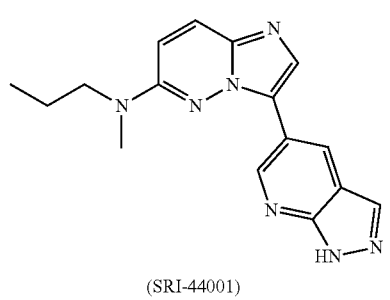
(SRI-44001)
Compound 57
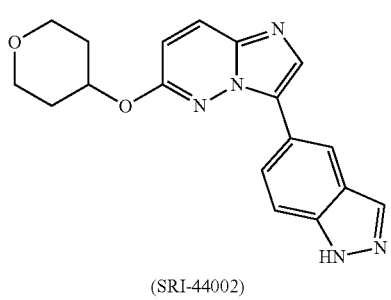
(SRI-44002)
Compound 58
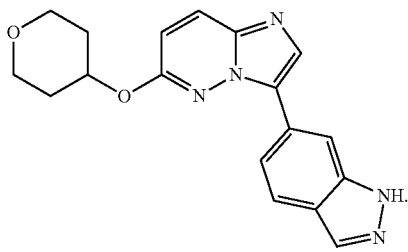
(SRI-43266)
In some examples, the compound is not:
Compound A-92
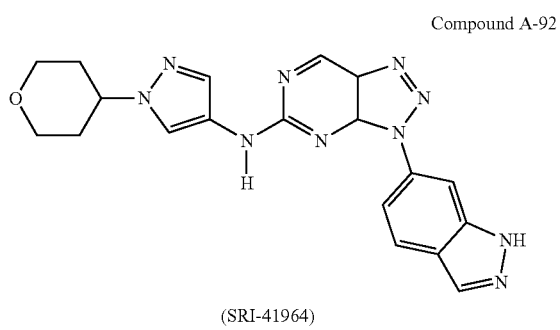
(SRI-41964)
Compound 26
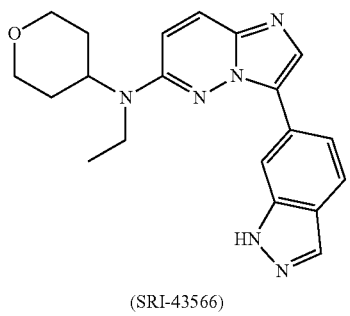
(SRI-43566)
Compound 27
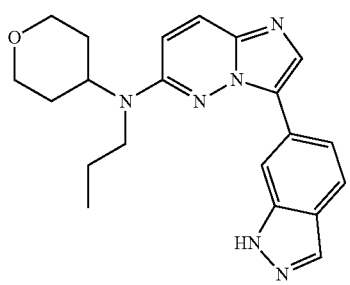
(SRI-43499)

Compound 31
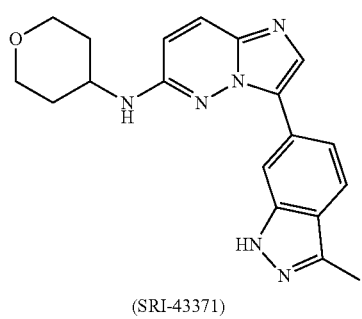
(SRI-43371)
Compound 32
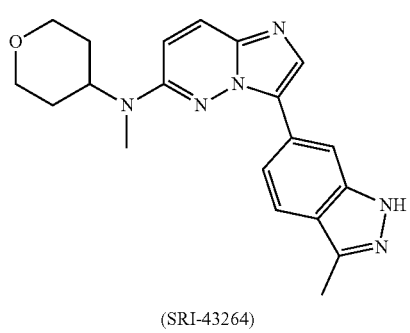
(SRI-43264)
Compound 41
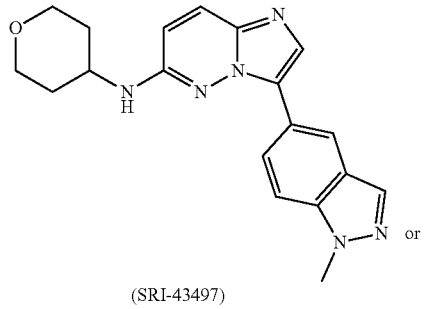
or
(SRI-43497)
Compound 42
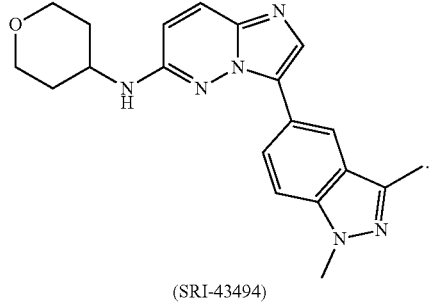
(SRI-43494)
Optionally, the compounds are selected from the following:
Compound 59
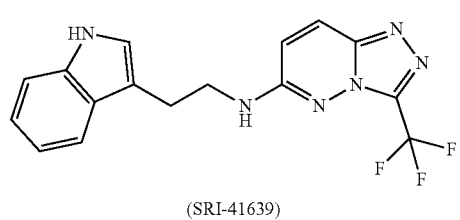
(SRI-41639)
Compound 60
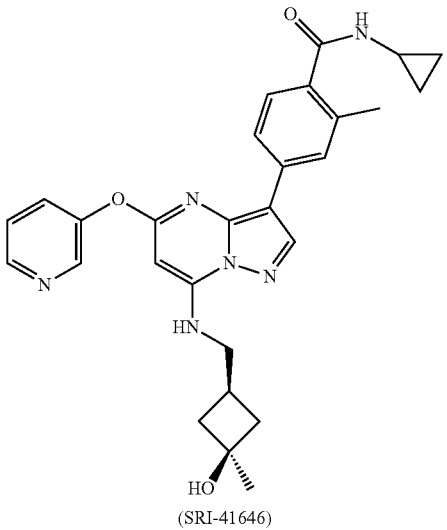
(SRI-41646)
Compound 61
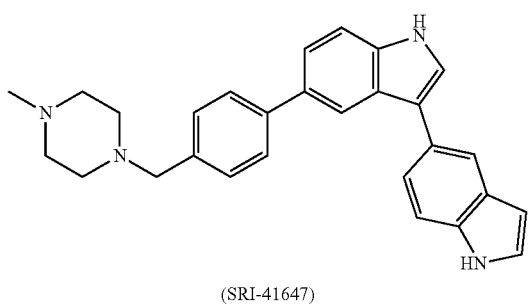
(SRI-41647)
Compound 62
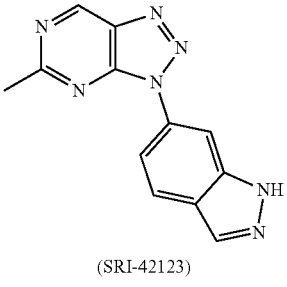
(SRI-42123)
Compound 63
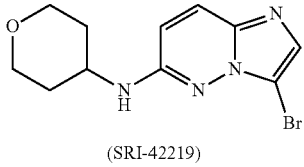
(SRI-42219)
Compound 64
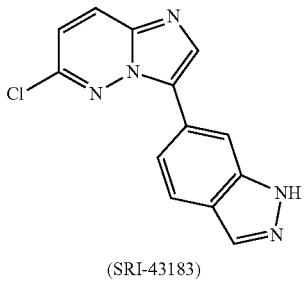
(SRI-43183)

Compound 65

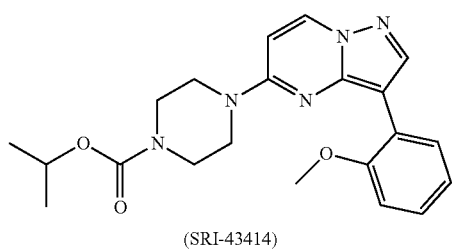

(SRI-43414)

Compound 66

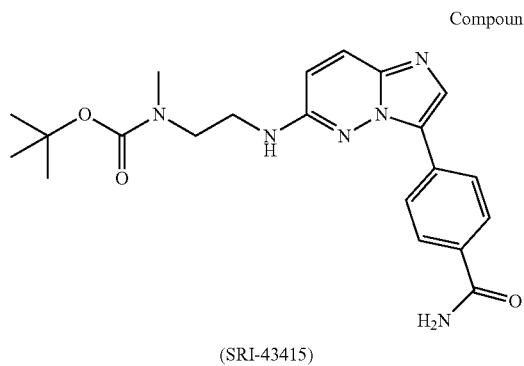

(SRI-43415)

Compound 67

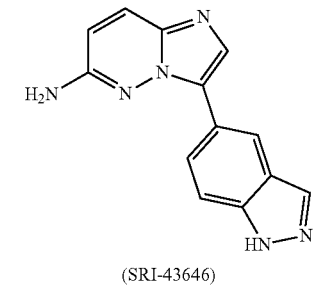

(SRI-43646)

Compound 68

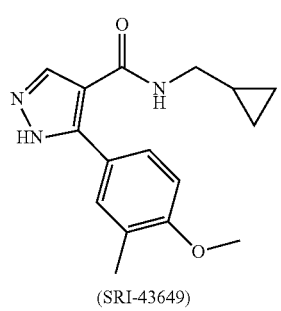

(SRI-43649)

Compound 69

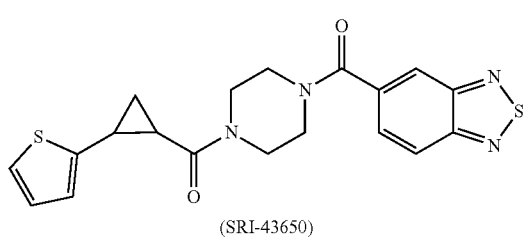

(SRI-43650)

Compound 70

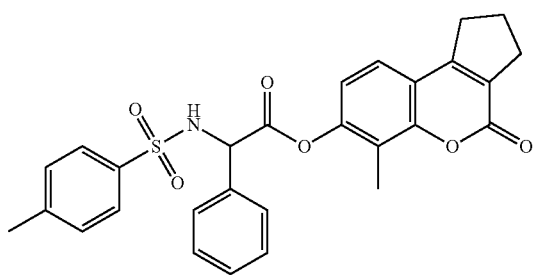

(SRI-43651)

Compound 71

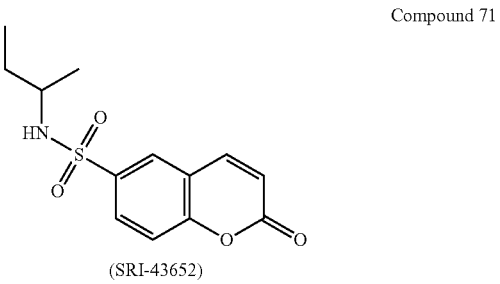

(SRI-43652)

Compound 72

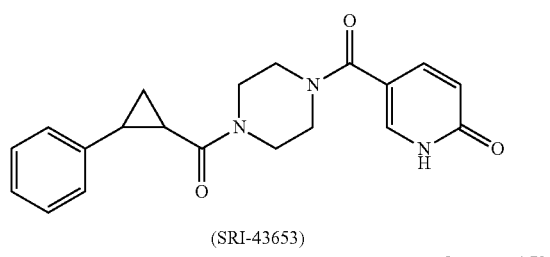

(SRI-43653)

Compound 73

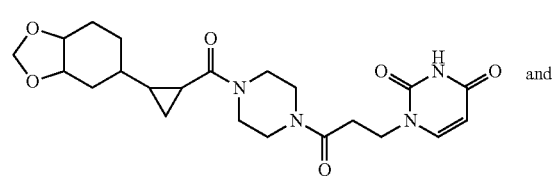

and (SRI-43654)

Compound 74

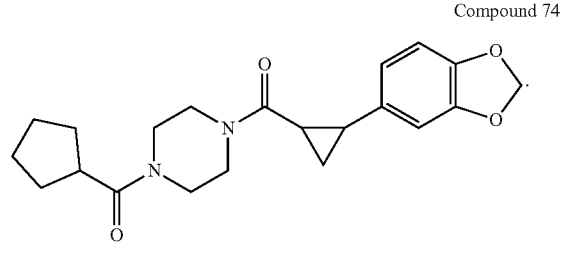

(SRI-43655)

As used herein, the terms alkyl, alkenyl, and alkynyl include straight- and branched-chain monovalent substituents. Examples include methyl, ethyl, isobutyl, 3-butynyl, and the like. Ranges of these groups useful with the compounds and methods described herein include $C_1$-$C_{20}$ alkyl, $C_2$-$C_{20}$ alkenyl, and $C_2$-$C_{20}$ alkynyl. Additional ranges of these groups useful with the compounds and methods described herein include $C_1$-$C_{12}$ alkyl, $C_2$-$C_{12}$ alkenyl, $C_2$-$C_{12}$ alkynyl, $C_1$-$C_6$ alkyl, $C_2$-$C_6$ alkenyl, $C_2$-$C_6$ alkynyl, $C_1$-$C_4$ alkyl, $C_2$-$C_4$ alkenyl, and $C_2$-$C_4$ alkynyl.

Heteroalkyl, heteroalkenyl, and heteroalkynyl are defined similarly as alkyl, alkenyl, and alkynyl, but can contain O, S, or N heteroatoms or combinations thereof within the backbone. Ranges of these groups useful with the compounds and methods described herein include $C_1$-$C_{20}$ heteroalkyl, $C_2$-$C_{20}$ heteroalkenyl, and $C_2$-$C_{20}$ heteroalkynyl. Additional ranges of these groups useful with the compounds and methods described herein include $C_1$-$C_{12}$ heteroalkyl, $C_2$-$C_{12}$ heteroalkenyl, $C_2$-$C_{12}$ heteroalkynyl, $C_1$-$C_6$ heteroalkyl, $C_2$-$C_6$ heteroalkenyl, $C_2$-$C_6$ heteroalkynyl, $C_1$-$C_4$ heteroalkyl, $C_2$-$C_4$ heteroalkenyl, and $C_2$-$C_4$ heteroalkynyl.

The terms cycloalkyl, cycloalkenyl, and cycloalkynyl include cyclic alkyl groups having a single cyclic ring or multiple condensed rings. Examples include cyclohexyl, cyclopentylethyl, and adamantanyl. Ranges of these groups useful with the compounds and methods described herein include $C_3$-$C_{20}$ cycloalkyl, $C_3$-$C_{20}$ cycloalkenyl, and $C_3$-$C_{20}$ cycloalkynyl. Additional ranges of these groups useful with the compounds and methods described herein include $C_5$-$C_{12}$ cycloalkyl, $C_5$-$C_{12}$ cycloalkenyl, $C_5$-$C_{12}$ cycloalkynyl, $C_5$-$C_6$ cycloalkyl, $C_5$-$C_6$ cycloalkenyl, and $C_5$-$C_6$ cycloalkynyl.

The terms heterocycloalkyl, heterocycloalkenyl, and heterocycloalkynyl are defined similarly as cycloalkyl, cycloalkenyl, and cycloalkynyl, but can contain O, S, or N heteroatoms or combinations thereof within the cyclic backbone. Ranges of these groups useful with the compounds and methods described herein include $C_3$-$C_{20}$ heterocycloalkyl, $C_3$-$C_{20}$ heterocycloalkenyl, and $C_3$-$C_{20}$ heterocycloalkynyl. Additional ranges of these groups useful with the compounds and methods described herein include $C_5$-$C_{12}$ heterocycloalkyl, $C_5$-$C_{12}$ heterocycloalkenyl, $C_5$-$C_{12}$ heterocycloalkynyl, $C_5$-$C_6$ heterocycloalkyl, $C_5$-$C_6$ heterocycloalkenyl, and $C_5$-$C_6$ heterocycloalkynyl.

Aryl molecules include, for example, cyclic hydrocarbons that incorporate one or more planar sets of, typically, six carbon atoms that are connected by delocalized electrons numbering the same as if they consisted of alternating single and double covalent bonds. An example of an aryl molecule is benzene. Heteroaryl molecules include substitutions along their main cyclic chain of atoms such as O, N, or S. When heteroatoms are introduced, a set of five atoms, e.g., four carbon and a heteroatom, can create an aromatic system. Examples of heteroaryl molecules include furan, pyrrole, thiophene, imadazole, oxazole, pyridine, and pyrazine. Aryl and heteroaryl molecules can also include additional fused rings, for example, benzofuran, indole, benzothiophene, naphthalene, anthracene, and quinoline. The aryl and heteroaryl molecules can be attached at any position on the ring, unless otherwise noted.

The term alkoxy as used herein is an alkyl group bound through a single, terminal ether linkage. The term aryloxy as used herein is an aryl group bound through a single, terminal ether linkage. Likewise, the terms alkenyloxy, alkynyloxy, heteroalkyloxy, heteroalkenyloxy, heteroalkynyloxy, heteroaryloxy, cycloalkyloxy, and heterocycloalkyloxy as used herein are an alkenyloxy, alkynyloxy, heteroalkyloxy, heteroalkenyloxy, heteroalkynyloxy, heteroaryloxy, cycloalkyloxy, and heterocycloalkyloxy group, respectively, bound through a single, terminal ether linkage.

The term hydroxy as used herein is represented by the formula —OH.

The terms amine or amino as used herein are represented by the formula —$NZ^1Z^2$, where $Z^1$ and $Z^2$ can each be a substitution group as described herein, such as hydrogen, an alkyl, halogenated alkyl, alkenyl, alkynyl, aryl, heteroaryl, cycloalkyl, cycloalkenyl, heterocycloalkyl, or heterocycloalkenyl group described above.

The alkoxy, aryloxy, amino, alkyl, alkenyl, alkynyl, aryl, heteroalkyl, heteroalkenyl, heteroalkynyl, heteroaryl, cycloalkyl, or heterocycloalkyl molecules used herein can be substituted or unsubstituted. As used herein, the term substituted includes the addition of an alkoxy, aryloxy, amino, alkyl, alkenyl, alkynyl, aryl, heteroalkyl, heteroalkenyl, heteroalkynyl, heteroaryl, cycloalkyl, or heterocycloalkyl group to a position attached to the main chain of the alkoxy, aryloxy, amino, alkyl, alkenyl, alkynyl, aryl, heteroalkyl, heteroalkenyl, heteroalkynyl, heteroaryl, cycloalkyl, or heterocycloalkyl, e.g., the replacement of a hydrogen by one of these molecules. Examples of substitution groups include, but are not limited to, hydroxy, halogen (e.g., F, Br, Cl, or I), and carboxyl groups. Conversely, as used herein, the term unsubstituted indicates the alkoxy, aryloxy, amino, alkyl, alkenyl, alkynyl, aryl, heteroalkyl, heteroalkenyl, heteroalkynyl, heteroaryl, cycloalkyl, or heterocycloalkyl has a full complement of hydrogens, i.e., commensurate with its saturation level, with no substitutions, e.g., linear decane (—$(CH_2)_9$—$CH_3$).

II. Methods of Making the Compounds

The compounds described herein can be prepared in a variety of ways. The compounds can be synthesized using various synthetic methods. At least some of these methods are known in the art of synthetic organic chemistry. The compounds described herein can be prepared from readily available starting materials. Optimum reaction conditions may vary with the particular reactants or solvents used, but such conditions can be determined by one skilled in the art.

Variations on Formula I and the compounds described herein include the addition, subtraction, or movement of the various constituents as described for each compound. Similarly, when one or more chiral centers are present in a molecule, all possible chiral variants are included. Additionally, compound synthesis can involve the protection and deprotection of various chemical groups. The use of protection and deprotection, and the selection of appropriate protecting groups can be determined by one skilled in the art. The chemistry of protecting groups can be found, for example, in Wuts, Greene's Protective Groups in Organic Synthesis, 5th. Ed., Wiley & Sons, 2014, which is incorporated herein by reference in its entirety.

Reactions to produce the compounds described herein can be carried out in solvents, which can be selected by one of ordinary skill in the art of organic synthesis. Solvents can be substantially nonreactive with the starting materials (reactants), the intermediates, or products under the conditions at which the reactions are carried out, i.e., temperature and pressure. Reactions can be carried out in one solvent or a mixture of more than one solvent. Product or intermediate formation can be monitored according to any suitable method known in the art. For example, product formation can be monitored by spectroscopic means, such as nuclear magnetic resonance spectroscopy (e.g., $^1$H-NMR or $^{13}$C-NMR), infrared spectroscopy (IR), spectrophotometry (e.g., UV-visible), mass spectrometry (MS), or high-resolution mass spectrometry (HRMS), or by chromatography such as high performance liquid chromatography (HPLC) or thin layer chromatography (TLC).

III. Pharmaceutical Compositions

Pharmaceutical compositions comprising any compound described above and a pharmaceutically acceptable carrier are provided herein. In some examples, more than one compound described above is present in the pharmaceutical compositions.

The compounds described herein or derivatives thereof can be provided in a pharmaceutical composition. Depending on the intended mode of administration, the pharmaceutical composition can be in the form of solid, semi-solid or liquid dosage forms, such as, for example, tablets, suppositories, pills, capsules, powders, liquids, or suspensions, preferably in unit dosage form suitable for single administration of a precise dosage. The compositions will include a therapeutically effective amount of the compound described herein or derivatives thereof in combination with a pharmaceutically acceptable carrier and, in addition, may include other medicinal agents, pharmaceutical agents, carriers, or diluents. By pharmaceutically acceptable is meant a material that is not biologically or otherwise undesirable, which can be administered to an individual along with the selected compound without causing unacceptable biological effects or interacting in a deleterious manner with the other components of the pharmaceutical composition in which it is contained.

The compositions can include one or more of the compounds described herein and a pharmaceutically acceptable carrier. As used herein, the term carrier encompasses any excipient, diluent, filler, salt, buffer, stabilizer, solubilizer, lipid, stabilizer, or other material well known in the art for use in pharmaceutical formulations. The choice of a carrier for use in a composition will depend upon the intended route of administration for the composition. The preparation of pharmaceutically acceptable carriers and formulations containing these materials is described in, e.g., Remington: The Science and Practice of Pharmacy, 22d Edition, Loyd et al. eds., Pharmaceutical Press and Philadelphia College of Pharmacy at University of the Sciences (2012). Examples of physiologically acceptable carriers include buffers, such as phosphate buffers, citrate buffer, and buffers with other organic acids; antioxidants including ascorbic acid; low molecular weight (less than about 10 residues) polypeptides; proteins, such as serum albumin, gelatin, or immunoglobulins; hydrophilic polymers, such as polyvinylpyrrolidone; amino acids such as glycine, glutamine, asparagine, arginine or lysine; monosaccharides, disaccharides, and other carbohydrates, including glucose, mannose, or dextrins; chelating agents, such as EDTA; sugar alcohols, such as mannitol or sorbitol; salt-forming counterions, such as sodium; and/or nonionic surfactants, such as TWEEN® (ICI, Inc.; Bridgewater, New Jersey), polyethylene glycol (PEG), and PLURONICS™ (BASF; Florham Park, NJ).

Compositions containing the compound described herein or derivatives thereof suitable for parenteral injection may comprise physiologically acceptable sterile aqueous or nonaqueous solutions, dispersions, suspensions or emulsions, and sterile powders for reconstitution into sterile injectable solutions or dispersions. Examples of suitable aqueous and nonaqueous carriers, diluents, solvents or vehicles include water, ethanol, polyols (propyleneglycol, polyethyleneglycol, glycerol, and the like), suitable mixtures thereof, vegetable oils (such as olive oil) and injectable organic esters such as ethyl oleate. Proper fluidity can be maintained, for example, by the use of a coating such as lecithin, by the maintenance of the required particle size in the case of dispersions and by the use of surfactants.

These compositions may also contain adjuvants, such as preserving, wetting, emulsifying, and dispensing agents. Prevention of the action of microorganisms can be promoted by various antibacterial and antifungal agents, for example, parabens, chlorobutanol, phenol, sorbic acid, and the like. Isotonic agents, for example, sugars, sodium chloride, and the like may also be included. Prolonged absorption of the injectable pharmaceutical form can be brought about by the use of agents delaying absorption, for example, aluminum monostearate and gelatin.

Solid dosage forms for oral administration of the compounds described herein or derivatives thereof include capsules, tablets, pills, powders, and granules. In such solid dosage forms, the compounds described herein or derivatives thereof is admixed with at least one inert customary excipient (or carrier), such as sodium citrate or dicalcium phosphate, or (a) fillers or extenders, as for example, starches, lactose, sucrose, glucose, mannitol, and silicic acid, (b) binders, as for example, carboxymethylcellulose, alignates, gelatin, polyvinylpyrrolidone, sucrose, and acacia, (c) humectants, as for example, glycerol, (d) disintegrating agents, as for example, agar-agar, calcium carbonate, potato or tapioca starch, alginic acid, certain complex silicates, and sodium carbonate, (e) solution retarders, as for example, paraffin, (f) absorption accelerators, as for example, quaternary ammonium compounds, (g) wetting agents, as for example, cetyl alcohol, and glycerol monostearate, (h) adsorbents, as for example, kaolin and bentonite, and (i) lubricants, as for example, talc, calcium stearate, magnesium stearate, solid polyethylene glycols, sodium lauryl sulfate, or mixtures thereof. In the case of capsules, tablets, and pills, the dosage forms may also comprise buffering agents.

Solid compositions of a similar type may also be employed as fillers in soft and hard-filled gelatin capsules using such excipients as lactose or milk sugar as well as high molecular weight polyethyleneglycols, and the like.

Solid dosage forms such as tablets, dragees, capsules, pills, and granules can be prepared with coatings and shells, such as enteric coatings and others known in the art. They may contain opacifying agents and can also be of such composition that they release the active compound or compounds in a certain part of the intestinal tract in a delayed manner. Examples of embedding compositions that can be used are polymeric substances and waxes. The active compounds can also be in micro-encapsulated form, if appropriate, with one or more of the above-mentioned excipients.

Liquid dosage forms for oral administration of the compounds described herein or derivatives thereof include pharmaceutically acceptable emulsions, solutions, suspensions, syrups, and elixirs. In addition to the active compounds, the liquid dosage forms may contain inert diluents commonly used in the art, such as water or other solvents, solubilizing agents, and emulsifiers, as for example, ethyl alcohol, isopropyl alcohol, ethyl carbonate, ethyl acetate, benzyl alcohol, benzyl benzoate, propyleneglycol, 1,3-butyleneglycol, dimethylformamide, oils, in particular, cottonseed oil, groundnut oil, corn germ oil, olive oil, castor oil, sesame oil, glycerol, tetrahydrofurfuryl alcohol, polyethyleneglycols, and fatty acid esters of sorbitan, or mixtures of these substances, and the like.

Besides such inert diluents, the composition can also include additional agents, such as wetting, emulsifying, suspending, sweetening, flavoring, or perfuming agents.

Suspensions, in addition to the active compounds, may contain additional agents, as for example, ethoxylated isostearyl alcohols, polyoxyethylene sorbitol and sorbitan esters, microcrystalline cellulose, aluminum metahydroxide, bentonite, agar-agar and tragacanth, or mixtures of these substances, and the like.

Compositions of the compounds described herein or derivatives thereof for rectal administrations are optionally suppositories, which can be prepared by mixing the compounds with suitable non-irritating excipients or carriers, such as cocoa butter, polyethyleneglycol or a suppository wax, which are solid at ordinary temperatures but liquid at body temperature and, therefore, melt in the rectum or vaginal cavity and release the active component.

Dosage forms for topical administration of the compounds described herein or derivatives thereof include ointments, powders, sprays, inhalants, and skin patches. The compounds described herein or derivatives thereof are admixed under sterile conditions with a physiologically acceptable carrier and any preservatives, buffers, or propellants as may be required. Ophthalmic formulations, ointments, powders, and solutions are also contemplated as being within the scope of the compositions.

As noted above, the compositions can include one or more of the compounds described herein or pharmaceutically acceptable salts thereof. As used herein, the term pharmaceutically acceptable salt refers to those salts of the compound described herein or derivatives thereof that are, within the scope of sound medical judgment, suitable for use in contact with the tissues of subjects without undue toxicity, irritation, allergic response, and the like, commensurate with a reasonable benefit/risk ratio, and effective for their intended use, as well as the zwitterionic forms, where possible, of the compounds described herein. The term salts refers to the relatively non-toxic, inorganic and organic acid addition salts of the compounds described herein. These salts can be prepared in situ during the isolation and purification of the compounds or by separately reacting the purified compound in its free base form with a suitable organic or inorganic acid and isolating the salt thus formed. Representative salts include the hydrobromide, hydrochloride, sulfate, bisulfate, nitrate, acetate, oxalate, valerate, oleate, palmitate, stearate, laurate, borate, benzoate, lactate, phosphate, tosylate, citrate, maleate, fumarate, succinate, tartrate, naphthylate mesylate, glucoheptonate, lactobionate, methane sulphonate, and laurylsulphonate salts, and the like. These may include cations based on the alkali and alkaline earth metals, such as sodium, lithium, potassium, calcium, magnesium, and the like, as well as non-toxic ammonium, quaternary ammonium, and amine cations including, but not limited to ammonium, tetramethylammonium, tetraethylammonium, methylamine, dimethylamine, trimethylamine, triethylamine, ethylamine, and the like. (See S. M. Barge et al., J. Pharm. Sci. (1977) 66, 1, which is incorporated herein by reference in its entirety, at least, for compositions taught therein.)

Administration of the compounds and compositions described herein or pharmaceutically acceptable salts thereof can be carried out using therapeutically effective amounts of the compounds and compositions described herein or pharmaceutically acceptable salts thereof as described herein for periods of time effective to treat a disorder. The effective amount of the compounds and compositions described herein or pharmaceutically acceptable salts thereof as described herein may be determined by one of ordinary skill in the art and includes exemplary dosage amounts for a mammal of from about 0.0001 to about 200 mg/kg of body weight of active compound per day, which may be administered in a single dose or in the form of individual divided doses, such as from 1 to 4 times per day. Alternatively, the dosage amount can be from about 0.01 to about 150 mg/kg of body weight of active compound per day, about 0.1 to 100 mg/kg of body weight of active compound per day, about 0.5 to about 75 mg/kg of body weight of active compound per day, about 0.5 to about 50 mg/kg of body weight of active compound per day, about 0.01 to about 50 mg/kg of body weight of active compound per day, about 0.05 to about 25 mg/kg of body weight of active compound per day, about 0.1 to about 25 mg/kg of body weight of active compound per day, about 0.5 to about 25 mg/kg of body weight of active compound per day, about 1 to about 20 mg/kg of body weight of active compound per day, about 1 to about 10 mg/kg of body weight of active compound per day, about 20 mg/kg of body weight of active compound per day, about 10 mg/kg of body weight of active compound per day, about 5 mg/kg of body weight of active compound per day, about 2.5 mg/kg of body weight of active compound per day, about 1.0 mg/kg of body weight of active compound per day, or about 0.5 mg/kg of body weight of active compound per day, or any range derivable therein. Optionally, the dosage amounts are from about 0.01 mg/kg to about 10 mg/kg of body weight of active compound per day. Optionally, the dosage amount is from about 0.01 mg/kg to about 5 mg/kg. Optionally, the dosage amount is from about 0.01 mg/kg to about 2.5 mg/kg.

Those of skill in the art will understand that the specific dose level and frequency of dosage for any particular subject may be varied and will depend upon a variety of factors, including the activity of the specific compound employed, the metabolic stability and length of action of that compound, the species, age, body weight, general health, sex and diet of the subject, the mode and time of administration, rate of excretion, drug combination, and severity of the particular condition.

The precise dose to be employed in the formulation will also depend on the route of administration, and the seriousness of the disease or disorder, and should be decided according to the judgment of the practitioner and each subject's circumstances. Effective doses can be extrapolated from dose-response curves derived from in vitro or animal model test systems. Further, depending on the route of administration, one of skill in the art would know how to determine doses that result in a plasma concentration for a desired level of response in the cells, tissues and/or organs of a subject.

IV. Methods of Use

Provided herein are methods of treating or preventing cancer in a subject. The methods include administering to a subject an effective amount of any compound disclosed herein or an effective amount of any composition disclosed herein. The expression "effective amount," when used to describe an amount of compound in a method, refers to the amount of a compound that achieves the desired pharmacological effect or other effect, for example, an amount that results in tumor growth rate reduction. Additional steps can be included in the method described herein. For example, the methods can further include the steps of selecting a subject with cancer, and administering to the subject one or more of the compounds as described herein.

Optionally, the cancer is bladder cancer, brain cancer, breast cancer, colorectal cancer, cervical cancer, gastrointestinal cancer, genitourinary cancer, glioma, head and neck cancer, lung cancer, ovarian cancer, pancreatic cancer, prostate cancer, renal cancer, skin cancer, or testicular cancer.

In some examples, the methods comprise administering to the subject a second therapeutic agent. Additional therapeutic agents include, but are not limited to, chemotherapeutic agents, anti-depressants, anxiolytics, antibodies, antivirals, steroidal and non-steroidal anti-inflammatories, conventional immunotherapeutic agents, cytokines, chemokines, and/or growth factors.

Anti-inflammatory agents that may be administered with the provided compounds or compositions include, but are not limited to, glucocorticoids and the nonsteroidal anti-inflammatories, aminoarylcarboxylic acid derivatives, arylacetic acid derivatives, arylbutyric acid derivatives, arylcarboxylic acids, arylpropionic acid derivatives, pyrazoles, pyrazolones, salicyclic acid derivatives, thiazinecarboxamides, e-acetamidocaproic acid, S-adenosylmethionine, 3-amino-4-hydroxybutyric acid, amixetrine, bendazac, benzydamine, bucolome, difenpiramide, ditazol, emorfazone, guaiazulene, nabumetone, ninesulide, orgotein, oxaceprol, paranyline, perisoxal, pifoxime, proquazone, proxazole, and tenidap.

A chemotherapeutic agent is a compound or composition effective in inhibiting or arresting the growth of an abnormally growing cell. Thus, such an agent may be used therapeutically to treat cancer as well as other diseases marked by abnormal cell growth. Illustrative examples of chemotherapeutic compounds include, but are not limited to, bexarotene, gefitinib, erlotinib, gemcitabine, paclitaxel, docetaxel, topotecan, irinotecan, temozolomide, carmustine, vinorelbine, capecitabine, leucovorin, oxaliplatin, bevacizumab, cetuximab, panitumumab, bortezomib, oblimersen, hexamethylmelamine, ifosfamide, CPT-11, deflunomide, cycloheximide, dicarbazine, asparaginase, mitotant, vinblastine sulfate, carboplatin, colchicine, etoposide, melphalan, 6-mercaptopurine, teniposide, vinblastine, antibiotic derivatives (e.g. anthracyclines such as doxorubicin, liposomal doxorubicin, and diethylstilbestrol doxorubicin, bleomycin, daunorubicin, and dactinomycin); antiestrogens (e.g., tamoxifen); antimetabolites (e.g., fluorouracil (FU), 5-FU, methotrexate, floxuridine, interferon alpha-2B, glutamic acid, plicamycin, mercaptopurine, and 6-thioguanine); cytotoxic agents (e.g., carmustine, BCNU, lomustine, CCNU, cytosine arabinoside, cyclophosphamide, estramustine, hydroxyurea, procarbazine, mitomycin, busulfan, cisplatin, vincristine and vincristine sulfate); hormones (e.g., medroxyprogesterone, estramustine phosphate sodium, ethinyl estradiol, estradiol, megestrol acetate, methyltestosterone, diethylstilbestrol diphosphate, chlorotrianisene, and testolactone); nitrogen mustard derivatives (e.g., mephalen, chlorambucil, mechlorethamine (nitrogen mustard) and thiotepa); and steroids (e.g., bethamethasone sodium phosphate).

Any of the aforementioned therapeutic agents can be used in any combination with the compositions described herein. Combinations are administered either concomitantly (e.g., as an admixture), separately but simultaneously (e.g., via separate intravenous lines into the same subject), or sequentially (e.g., one of the compounds or agents is given first followed by the second) Thus, the term combination is used to refer to concomitant, simultaneous, or sequential administration of two or more agents.

Optionally, a compound or therapeutic agent as described herein may be administered in combination with a radiation therapy, an immunotherapy, a gene therapy, or a surgery.

Also described herein are method of treating inflammation in a subject. The methods include administering to a subject an effective amount of any compound disclosed herein or an effective amount of any composition disclosed herein. Additional steps can be included in the method described herein. For example, the methods can further include the steps of selecting a subject with inflammation, and administering to the subject one or more of the compounds as described herein.

Optionally, the inflammation can be the result of diseases related to inflammation including but not limited to heart attack, cystic fibrosis (CF), chronic bronchitis, emphysema, bronchiolitis obiterans syndrome (BOS), interstitial pneumonia, Alzheimer's Disease, congestive heart failure, stroke, arthritis, aortic valve stenosis, rheumatoid arthritis, kidney failure, lupus, asthma, psoriasis, pancreatitis, allergies, fibrosis, surgical complications, anemia, fibromyalgia, chronic obstructive pulmonary disease (COPD), bacterial infection and viral infection and other inflammatory diseases including, but not limited to neuroinflammation.

Also described herein are method of treating pain in a subject. The methods include administering to a subject an effective amount of any compound disclosed herein or an effective amount of any composition disclosed herein. Additional steps can be included in the method described herein. For example, the methods can further include the steps of selecting a subject with pain or at risk of developing pain (e.g., due to an injury that has occurred, etc.), and administering to the subject one or more of the compounds as described herein. Optionally, the pain can be neuropathic pain. Optionally, the pain can be the result of a spinal cord injury. Optionally, the pain can be the result of chronic nerve injury.

The methods and compounds described herein are also useful in inhibiting HuR multimerization in a cell. The methods of inhibiting HuR multimerization in a cell include contacting a cell with a compound as described herein. Optionally, the method is performed in vitro. Optionally, the method is performed in vivo.

As used herein the terms treatment, treat, or treating refers to a method of reducing the effects of a disease or condition or symptom of the disease or condition. Thus in the disclosed method, treatment can refer to a 10%, 20%, 30%, 40%, 50%, 60%, 70%, 80%, 90%, or 100% reduction in the severity of an established disease or condition or one or more symptoms of the disease or condition. For example, a method for treating a disease is considered to be a treatment if there is a 10% reduction in one or more symptoms or signs (e.g., size of the tumor or rate of tumor growth) of the disease in a subject as compared to a control. Thus the reduction can be a 10%, 20%, 30%, 40%, 50%, 60%, 70%, 80%, 90%, 100%, or any percent reduction in between 10% and 100% as compared to native or control levels. It is understood that treatment does not necessarily refer to a cure or complete ablation of the disease, condition, or symptoms of the disease or condition.

As used herein, the terms prevent, preventing, and prevention of a disease or disorder refers to an action, for example, administration of a composition or therapeutic agent, that occurs before or at about the same time a subject begins to show one or more symptoms of the disease or disorder, which inhibits or delays onset or severity of one or more symptoms of the disease or disorder.

As used herein, references to decreasing, reducing, or inhibiting include a change of 10%, 20%, 30%, 40%, 50%, 60%, 70%, 80%, 90% or greater as compared to a control level. Such terms can include, but do not necessarily include, complete elimination.

As used herein, subject means both mammals and non mammals. Mammals include, for example, humans; non human primates, e.g., apes and monkeys; cattle; horses; sheep; rats; mice; pigs; and goats. Non mammals include, for example, fish and birds.

V. Kits

Also provided herein are kits for treating or preventing cancer in a subject. A kit can include any of the compounds or compositions described herein. For example, a kit can include one or more compounds of Formula I. A kit can further include one or more additional agents, such as one or more chemotherapeutic agents. A kit can include an oral formulation of any of the compounds or compositions described herein. A kit can include an intravenous formulation of any of the compounds or compositions described herein. A kit can additionally include directions for use of the kit (e.g., instructions for treating a subject), a container, a means for administering the compounds or compositions (e.g., a syringe), and/or a carrier.

Throughout this application, various publications are referenced. The disclosures of these publications in their entireties are hereby incorporated by reference into this application.

The examples below are intended to further illustrate certain aspects of the methods and compositions described herein, and are not intended to limit the scope of the claims.

EXAMPLES

Provided herein is a new class of inhibitors targeting HuR protein dimerization. By focusing on the key attributes of HuR contributing to cancer progression, namely cytoplasmic localization and multimerization, a highly effective inhibitor was developed. The inhibitors of HuR multimer formation as described herein are soluble, have micromolar activity, and penetrate the blood-brain-barrier (BBB). Molecules developed were evaluated in a robust cell-based assay of HuR dimerization for activity validation and specificity. The inhibitor SRI 42127 demonstrates robust activity in vitro across numerous primary patient-derived glioblastoma (PDGx) xenolines with arrest of proliferation, induction of apoptosis, and inhibition of colony formation with a specific inhibition of HuR multimer formation. It has favorable attributes with central nervous system penetration and demonstrates a growth inhibitor benefit in mouse glioma models. Quantitative RNA and protein analysis following exposure of a panel of PDGx xenolines across glioblastoma molecular subtypes confirms inhibition of HuR targets and their corresponding signaling pathways. This work provides direct evidence of the anti-cancer effects of HuR inhibition and generates a molecule for further development exploiting a novel oncogenesis dependent interaction.

In addition, the new class of inhibitor compounds has proven to be a powerful RNA-binding protein multimerization inhibitor in the treatment of inflammatory diseases. For example, the inhibitor SRI-42127 demonstrates a significant dose-dependent decrease in cells with high cytoplasmic HuR without toxicity to the cells within the tested range. Results show that SRI-42127 blocks HuR cytoplasmic translocation in activated microglia and suppresses production of pro-inflammatory mediators in activated microglia. Further, SRI-42127 suppresses production of pro-inflammatory mediators in activated astroglia and suppresses chemoattraction of monocytes and neutrophils to microglial and astrogial secreted signals. Finally, systemic administration of SRI-42127 also suppresses HuR translocation in microglia in vivo and neuroinflammatory responses to lipopolysaccharide (LPS). Thus, this work also provides direct evidence of the anti-inflammatory effects of HuR inhibition as it relates to neuroinflammation and presents SIR-42127 as a molecule for further development in the treatment of neuroinflammation in particular, as well as secondary tissue injury related to trauma.

In addition, this work also provides direct evidence that SRI-42127 exerts a neuroprotective effect in spinal cord injury and an anti-neuropathic pain effect in chronic nerve injury.

Example 1: Synthesis of Compounds

All reactions were carried out in an oven- or flame-dried glassware under argon atmosphere using gas-tight syringe, cannula, and septa. The reaction temperatures were measured externally. All reactions were performed using anhydrous solvents (dimethylformamide (DMF), tetrahydrofuran (THF), dichloromethane ($CH_2C_2$), 1,4-dioxane, 1-butanol, chloroform ($CHCl_3$), dimethyl ether (DME)), which were purchased from Sigma-Aldrich (St. Louis, MO). Microwave reactions were carried out using CEM discover Labmate System with Intelligent Technology for Focused Microwave Synthesizer (Explorer 48). All commercially purchased reagents were used without purification. The reactions were monitored by thin-layer chromatography (TLC) on pre-coated silica gel (60 F254) glass plates from EMD Millipore and visualized using UV light (254 nm). Purification of the compounds was performed on a Teledyne-ISCO Combiflash Rf 200 purification system using Redisep Rf® normal phase 230-400 mesh silica gel columns or a Teledyne-ISCO ACCQPrep HP125 preparative HPLC purification system using either a RediSep Prep C18 (5 μm, 20×150 mm) column or a Phenomenex Gemini NX-C18 (5 μm, 30×250 mm) column. Proton NMR spectra were recorded on a Varian 400-MR NMR spectrometer operating at 400 MHz calibrated to the solvent peak and TMS peak. High-resolution mass spectra were recorded using an Agilent 6210 time-of-flight mass spectrometer. The purity of the final compounds was checked by analytical HPLC using an Agilent 1100 LC system equipped with Phenomenex Kinetex C18 (5 μm, 4.6×150 mm) column and a diode array detector (DAD) monitoring at multiple wavelengths, using the solvent system A: H2O, B: $CH_3CN$, linear gradient from 5-95% B over 20 min at a flow rate 1.0 mL/min.

3-(1-Methyl-1H-indazol-6-yl)-N-(1-(tetrahydro-2H-pyran-4-yl)-1H-pyrazol-4-yl)-3H-[1,2,3]triazolo[4,5-d]pyrimidin-5-amine (2, SRI-42126)

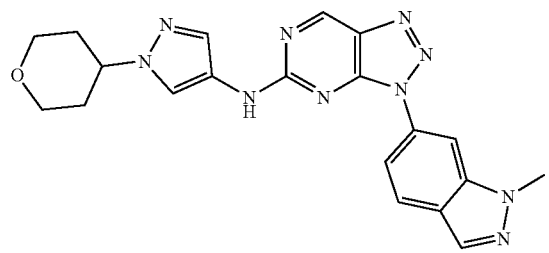 [SMILES: Cn1ncc2ccc(-n3nnc4cnc(Nc5cnn(C6CCOCC6)c5)nc43)cc21]

To a solution of 3-(1H-indazol-6-yl)-N-(1-tetrahydropyran-4-ylpyrazol-4-yl)triazolo[4,5-d]pyrimidin-5-amine (100 mg, 0.25 mmol) in DMF (10 mL) was added iodomethane (2.0 M solution in tert-butylmethyl ether, 0.15 mL, 0.3 mmol) and the mixture was stirred at room temperature for 2 hours. The mixture was then concentrated under reduced pressure, and the residue obtained was purified by flash chromatography over silica using 0-10% methanol in dichloromethane to obtain the desired compound as pale yellow solid. Yield 19%. TLC $R_f$=0.40 ($CHCl_3$-MeOH, 9:1). $^1$H NMR (400 MHz, DMSO-$d_6$) δ 10.41 (s, 1H), 9.39 (s, 1H), 8.41 (s, 1H), 8.21 (s, 1H), 8.04 (d, J=9.3 Hz, 2H), 7.93 (dd, J=8.6, 1.7 Hz, 1H), 7.76 (s, 1H), 4.40-4.28 (m, 1H), 4.14 (s, 3H), 3.92 (d, J=11.6 Hz, 2H), 3.44 (td, J=11.6, 2.2 Hz, 2H), 2.00-1.90 (m, 2H), 1.89-1.76 (m, 2H). HRMS m/z calcd for $C_{20}H_{20}N_{10}O$ [M+H]$^+$: 417.1894, found: 417.1888. HPLC: 97% ($t_R$=11.3 min).

3-(1H-Indazol-6-yl)-N-methyl-N-(1-(tetrahydro-2H-pyran-4-yl)-1H-pyrazol-4-yl)-3H-[1,2,3]triazolo[4,5-d]pyrimidin-5-amine (3, SM-42124)

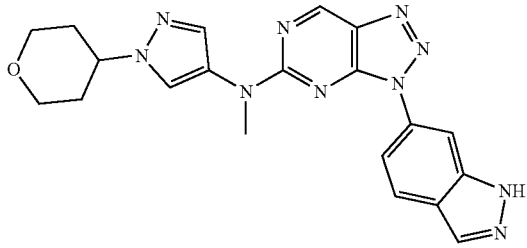 [SMILES: CN(c1cnn(C2CCOCC2)c1)c1ncc2nnn(-c3ccc4cn[nH]c4c3)c2n1]

Step 1. N-(2-Chloro-5-nitropyrimidin-4-yl)-1H-indazol-6-amine. A solution of 2,4-dichloro-5-nitro-pyrimidine (100 mg, 5.16 mmol) and N,N-diisopropylethylamine (100 mg, 7.73 mmol) in DMF (10 mL) was cooled to −60° C. A solution of 1H-indazol-6-amine (68.6 mg, 5.16 mmol) in DMF (2 mL) was added dropwise. The reaction mixture was stirred at −60° C. for 1 hour and then at room temperature for 4 hours. The mixture was poured into ice water (10 mL). The precipitate formed was collected by filtration, washed with cold ethanol and dried under vacuum. The crude product thus obtained was used in the next step without further purification. ESI-MS (m/z)=291 (M+H)$^+$.

Step 2. 2-Chloro-N$^4$-(1H-indazol-6-yl) pyrimidine-4,5-diamine. To a solution of the above intermediate (15 g, 0.25 mmol) in glacial acetic acid (300 mL) was added iron powder (14.4 g, 26 mmol) and the mixture was stirred for 30 minutes. The mixture was then filtered through Celite, and the filtrate was neutralized with saturated aqueous sodium bicarbonate (100 mL). The mixture was extracted with ethyl acetate (EtOAc; 200 mL), the organic phase was washed with brine (100 mL), dried and concentrated under reduced pressure. The residue obtained was purified by flash chromatography over silica using CHCl$_3$/MeOH (9:1) containing ammonium hydroxide (NH$_4$OH; 1%) to obtain the desired intermediate. Yield 28%. TLC R$_f$=0.30 (CHCl$_3$-MeOH, 9:1). $^1$H NMR (400 MHz, DMSO-d$_6$) δ 12.94 (s, 1H), 8.70 (s, 1H), 8.18 (dt, J=1.8, 0.8 Hz, 1H), 7.96 (s, 1H), 7.69 (d, J=0.7 Hz, 1H), 7.67 (d, J=1.1 Hz, 1H), 7.22 (dd, J=8.7, 1.8 Hz, 1H), 5.36 (s, 2H).

Step 3. 5-Chloro-3-(1H-indazol-6-yl)triazolo[4,5-d]pyrimidine. A solution of the above intermediate (5 g, 19.18 mmol) in 37% aqueous hydrochloric acid (237 mL) was treated with sodium nitrite (2.65 g, 38.3 mmol) at 0° C. The mixture was stirred for 16 hours at room temperature and then neutralized with aqueous sodium hydroxide solution (250 mL). The mixture was then extracted with dichloromethane (500 mL), the organic layer was washed with brine (100 mL), dried over anhydrous sodium sulfate and concentrated. The crude product was purified by preparative HPLC (H$_2$O:CH$_3$CN 5-95% gradient over 40 min) to obtain the desired product as a white fluffy solid. Yield 28%. $^1$H NMR (400 MHz, DMSO-d$_6$) δ 13.48 (s, 1H), 9.85 (s, 1H), 8.32-8.20 (m, 2H), 8.08 (dd, J=8.6, 0.7 Hz, 1H), 7.82 (dd, J=8.7, 1.8 Hz, 1H).

Step 4. N,N-Diisopropylethylamine (334 mg, 1.84 mmol) was added to a solution of the above intermediate (500 mg, 1.84 mmol) and N-methyl-1-tetrahydropyran-4-yl-pyrazol-4-amine (357 mg, 2.76 mmol) in 1,4-dioxane (5 mL). The mixture was stirred at 50° C. for 12 hours. The reaction mixture was concentrated and the residue obtained was purified by flash chromatography over silica using 0-10% methanol in dichloromethane and further purified using preparative HPLC (H$_2$O:CH$_3$CN 5-95%) to obtain the desired compound as pale yellow solid. Yield 3%. TLC R$_f$=0.30 (CHCl$_3$-MeOH, 9:1). $^1$H NMR (400 MHz, DMSO-d$_6$) δ 13.42 (s, 1H), 9.45 (s, 1H), 8.36-8.09 (m, 3H), 8.02 (d, J=8.6 Hz, 1H), 7.87 (s, 1H), 7.78 (s, 1H), 4.34 (td, J=11.0, 5.5 Hz, 1H), 3.96-3.83 (m, 2H), 3.64 (s, 3H), 3.43 (td, J=11.7, 2.3 Hz, 2H), 2.00-1.79 (m, 4H). HRMS m/z calcd for C$_{20}$H$_{20}$N$_{10}$O [M+H]$^+$: 417.1894, found: 417.1883. HPLC: 97% (t$_R$=11.8 min).

3-(1H-Indazol-6-yl)-N-(tetrahydro-2H-pyran-4-yl)-3H-[1,2,3]triazolo[4,5-d]pyrimidin-5-amine (4, SRI-42125)

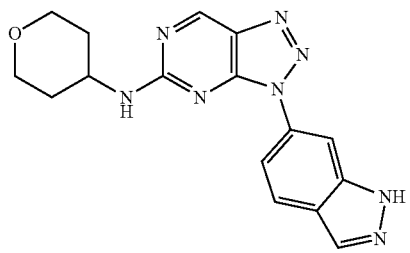 [SMILES: c1cc2cn[nH]c2cc1-n1nnc2cnc(NC3CCOCC3)nc21]

N,N-Diisopropylethylamine (143 mg, 1.10 mmol) was added to a solution of tetrahydro-pyran-4-ylamine (75 mg, 0.74 mmol) and 5-chloro-3-(1H-indazol-6-yl)triazolo[4,5-d]pyrimidine (200 mg, 0.74 mmol) in 1,4-dioxane (2 mL). The reaction mixture was stirred at 50° C. for 12 hours. The mixture was concentrated under reduced pressure and the residue obtained was purified by flash chromatography over silica using 0-10% methanol in dichloromethane and was further purified by preparative HPLC (H$_2$O:CH$_3$CN 5-95%) to obtain the desired compound as pale yellow solid. Yield 40%. TLC R$_f$=0.30 (CHCl$_3$-MeOH, 9:1). $^1$H NMR (400 MHz, DMSO-d$_6$) δ 13.44 (s, 1H), 9.27 (s, 1H), 8.39 (s, 1H), 8.29-8.15 (m, 2H), 8.05-7.81 (m, 2H), 4.01 (d, J=8.7 Hz, 1H), 3.89 (d, J=11.6 Hz, 2H), 3.53-3.33 (m, 2H), 1.97-1.74 (m, 2H), 1.58 (dd, J=13.6, 9.4 Hz, 2H). HRMS m/z calcd for C$_{16}$H$_{16}$N$_8$O [M+H]$^+$: 337.1520, found: 337.1523. HPLC: 98% (t$_R$=10.5 min).

3-(1H-Indol-6-yl)-N-methyl-N-(tetrahydro-2H-pyran-4-yl)imidazo[1,2-b]pyridazin amine (13, SRI-42916)

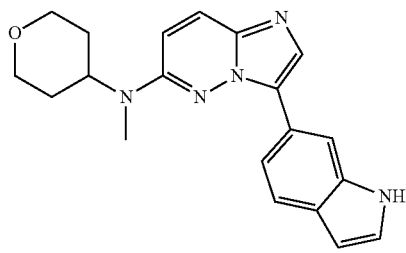 [SMILES: CN(c1ccc2ncc(-c3ccc4cc[nH]c4c3)n2n1)C1CCOCC1]

This compound was prepared by the following general procedure (Method A) for Suzuki Coupling. To a high pressure vessel was added 3-bromo-N-methyl-N-(tetrahydro-2H-pyran-4-yl)imidazo[1,2-b]pyridazin-6-amine (20 mg, 0.71 mmol), the boronic ester 6-(4,4,5,5-tetramethyl-1,3,2-dioxaborolan-2-yl)-1H-indole (171.88 mg, 0.71 mmol), sodium carbonate (449.6 mg, 4.24 mmol), followed by a 2:1 mixture of 1,4-dioxane:water (2 mL:2 mL). The mixture was degassed with argon for 10 minutes and then PdCl$_2$ (dppf)·CH$_2$Cl$_2$ adduct (173 mg, 0.21 mmol) was added. The reaction mixture was heated at 90° C. (oil bath temp) in a sealed screw capped reactor for 18 hours. The reaction mixture was diluted with EtOAc (100 mL) and then stirred at 20° C. for 30 minutes. The mixture was filtered through Celite and the Celite pad was rinsed with EtOAc (20 mL). The combined filtrate was washed with saturated sodium bicarbonate (NaHCO$_3$; 2×50 mL), saturated NH$_4$Cl (50 mL), followed by brine (100 mL). The organic layer was separated, dried (Na$_2$SO$_4$), filtered, and the filtrate was evaporated under reduced pressure. The residue obtained was purified by flash chromatography over silica using 0-20% methanol in dichloromethane to obtain the desired product. Yield 64%. TLC R$_f$=0.40 (CHCl$_3$-MeOH, 9:1). $^1$H NMR (400 MHz, DMSO-d$_6$) δ 11.19 (s, 1H), 8.33 (dt, J=1.6, 0.8 Hz, 1H), 7.91-7.82 (m, 2H), 7.70-7.58 (m, 2H), 7.38 (dd, J=3.1, 2.4 Hz, 1H), 7.14 (d, J=10.0 Hz, 1H), 6.44 (ddd, J=2.9, 1.9, 0.9 Hz, 1H), 4.35 (tt, J=11.7, 3.9 Hz, 1H), 3.96 (dd, J=11.3, 4.4 Hz, 2H), 3.49 (td, J=11.8, 1.9 Hz, 2H), 2.99 (s, 3H), 1.84 (qd, J=12.1, 4.5 Hz, 2H), 1.69-1.62 (m, 2H). HRMS m/z calcd for C$_{20}$H$_{21}$N$_5$O [M+H]$^+$: 348.1819, found: 348.1826. HPLC: 98% (t$_R$=12.8 min).

N-Methyl-3-phenyl-N-(tetrahydro-2H-pyran-4-yl)imidazo[1,2-b]pyridazin-6-amine (14, SRI-42917)

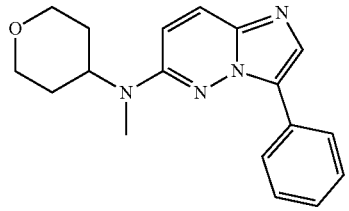 [SMILES: CN(c1ccc2ncc(-c3ccccc3)n2n1)C1CCOCC1]

This compound was prepared by reacting 3-bromo-N-methyl-N-(tetrahydro-2H-pyran-4-yl)imidazo[1,2-b]pyridazin-6-amine with phenylboronic acid using Method A. Yield 70%. TLC R$_f$=0.45 (CHCl$_3$-MeOH, 9:1). $^1$H NMR (400 MHz, DMSO-d$_6$) δ 8.20-8.15 (m, 2H), 7.96 (s, 1H), 7.88 (dd, J=10.0, 0.6 Hz, 1H), 7.49-7.44 (m, 2H), 7.33-7.28 (m, 1H), 7.16 (d, J=10.0 Hz, 1H), 4.35 (tt, J=11.7, 3.9 Hz, 1H), 4.00-3.94 (m, 2H), 3.45 (td, J=11.8, 2.0 Hz, 2H), 1.82 (qd, J=12.1, 4.5 Hz, 2H), 1.65 (ddd, J=12.0, 4.0, 1.7 Hz, 2H). HRMS m/z calcd for C$_{18}$H$_{20}$N$_4$O [M+H]$^+$: 309.1710, found: 309.1716. HPLC: 100% (t$_R$=12.4 min).

3-(3-(Dimethylamino)phenyl)-N-methyl-N-propylimidazo[1,2-b]pyridazin-6-amine (16, SRI-43935)

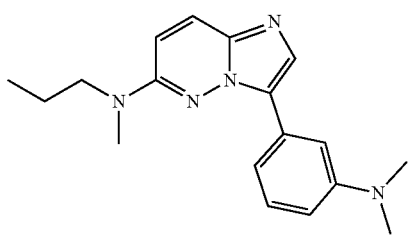 [SMILES: CCCN(C)c1ccc2ncc(-c3cccc(N(C)C)c3)n2n1]

This compound was prepared by the following general procedure (Method B) for Suzuki coupling. To a stirred solution of 3-bromo-N-methyl-N-propylimidazo[1,2-b]pyridazin-6-amine (60 mg, 0.20 mmol) in 1,4-dioxane:water (6 mL:1 mL) was added [3-(dimethylamino)phenyl]boronic acid (55.2 mg, 0.33 mmol) and potassium carbonate (46.22 mg, 0.33 mmol). The reaction mixture was purged with argon and stirred for 10 minutes at room temperature. Tetrakis(triphenylphosphine)palladium (25.8 mg, 0.02 mmol) was added to the reaction mixture and the mixture was heated under reflux for 15 hours. The reaction mixture was then cooled to room temperature, diluted with water (5 mL), and extracted with ethyl acetate (2×10 mL). The organic layer was separated, dried over anhydrous sodium sulfate, and concentrated under reduced pressure. The residue obtained was purified by flash chromatography over silica using 0-20% methanol in dichloromethane to obtain the desired product. Yield 24%. TLC R$_f$=0.40 (CHCl$_3$-MeOH, 9:1). $^1$H NMR (400 MHz, DMSO-d$_6$) δ 7.82 (s, 1H), 7.74-7.60 (m, 5H), 7.36-7.25 (m, 1H), 6.77-6.69 (m, 2H), 3.49-3.40 (m, 2H), 3.13 (s, 3H), 3.01 (s, 6H), 1.74-1.60 (m, 2H), 0.95 (t, J=7.4 Hz, 3H). HRMS m/z calcd for C$_{18}$H$_{23}$N$_5$ [M+H]$^+$: 310.2026, found: 310.2032. HPLC: 98% (t$_R$=14.4 min).

3-(Isoquinolin-5-yl)-N-methyl-N-propylimidazo[1,2-b]pyridazin-6-amine (17, SRI-43936)

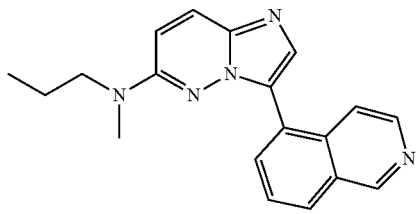 [SMILES: CCCN(C)c1ccc2ncc(-c3cccc4cnccc34)n2n1]

This compound was prepared from 3-bromo-N-methyl-N-propylimidazo[1,2-b]pyridazin-6-amine and 5-isoquinolylboronic acid using Method B. Yield 69%. TLC R$_f$=0.40 (CHCl$_3$-MeOH, 9:1). $^1$H NMR (400 MHz, DMSO-d$_6$) δ 9.38 (d, J=1.0 Hz, 1H), 8.46 (d, J=6.0 Hz, 1H), 8.19 (dt, J=8.2, 1.1 Hz, 1H), 8.05 (dd, J=7.2, 1.2 Hz, 1H), 7.91 (d, J=10.0 Hz, 1H), 7.81-7.74 (m, 2H), 7.60 (dt, J=6.0, 1.0 Hz, 1H), 7.10 (d, J=10.0 Hz, 1H), 3.28-3.21 (m, 3H), 2.84 (s, 3H), 1.47-1.37 (m, 2H), 0.66 (t, J=7.4 Hz, 3H). HRMS m/z calcd for C$_{19}$H$_{19}$N$_5$ [M+H]$^+$: 318.1713, found: 318.1719. HPLC: 97% (t$_R$=5.7 min).

3-(Imidazo[1,2-a]pyridin-6-yl)-N-methyl-N-(tetrahydro-2H-pyran-4-yl)imidazo[1,2-b]pyridazin-6-amine (18, SRI-43937)

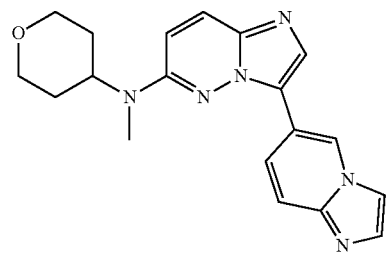 [SMILES: CN(c1ccc2ncc(-c3ccc4nccn4c3)n2n1)C1CCOCC1]

This compound was prepared by reacting 3-bromo-N-methyl-N-(tetrahydro-2H-pyran-4-yl)imidazo[1,2-b]pyridazin-6-amine with imidazo[1,2-a]pyridin-6-ylboronic acid using Method B. Yield 10%. TLC $R_f$=0.40 (CHCl$_3$-MeOH, 9:1). $^1$H NMR (400 MHz, DMSO-d$_6$) δ 9.30 (t, J=1.3 Hz, 1H), 7.88 (s, 1H), 7.82-7.77 (m, 1H), 7.67-7.61 (m, 2H), 7.53 (dd, J=7.2, 5.4 Hz, 1H), 7.33 (t, J=7.4 Hz, 1H), 6.86 (d, J=9.9 Hz, 1H), 4.37 (tt, J=11.9, 4.0 Hz, 1H), 4.16 (dd, J=11.6, 4.7 Hz, 2H), 3.55 (td, J=11.8, 1.9 Hz, 2H), 3.05 (d, J=0.7 Hz, 3H), 2.00 (d, J=7.7 Hz, 2H), 1.80-1.76 (m, 2H). HRMS m/z calcd for C$_{19}$H$_{20}$N$_6$O [M+H]$^+$: 349.1771, found: 349.1768. HPLC: 95% (t$_R$=8.7 min).

3-(1H-Indazol-6-yl)-N-methyl-N-(tetrahydro-2H-pyran-4-yl)imidazo[1,2-b]pyridazin amine (19, SRI-42127)

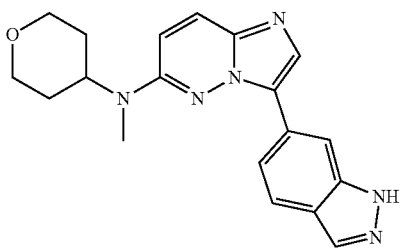 [SMILES: CN(c1ccc2ncc(-c3ccc4cn[nH]c4c3)n2n1)C1CCOCC1]

Step 1: 3-Bromo-N-methyl-N-(tetrahydro-2H-pyran-4-yl)imidazo[1,2-b]pyridazin-6-amine. This intermediate was prepared using the following general procedure (Method C) for displacement of chloro with amine. 3-Bromo-6-chloro-imidazo[1,2-b]pyridazine (2 g, 8.6 mmol), and N-methyl-tetrahydro-2H-pyran-4-amine (1.9 g, 17.2 mmol) and cesium carbonate (3.4 g, 10.3 mmol) in DMF (4 mL) were placed in a Biotage 20 mL-microwave vial equipped with a stirrer. The mixture was heated in the microwave reactor for 4 hours at 180° C. The reaction mixture was then absorbed onto silica gel and purified by flash chromatography over silica using up to 3% methanol in dichloromethane to obtain the desired product. Yield 22%. TLC $R_f$=0.40 (CHCl$_3$-MeOH, 9:1). $^1$H NMR (400 MHz, DMSO-d$_6$) δ 7.65 (d, J=10.0 Hz, 1H), 7.50 (s, 1H), 6.78 (d, J=10.0 Hz, 1H), 4.44 (tt, J=11.8, 4.1 Hz, 1H), 4.14-4.04 (m, 2H), 3.55 (td, J=11.9, 2.0 Hz, 2H), 2.99 (s, 3H), 1.91 (dtd, J=12.8, 11.8, 4.6 Hz, 2H), 1.75 (ddt, J=8.2, 6.2, 1.8 Hz, 2H). ESI-MS (m/z)=312 (M+H)$^+$.

Step 2: The above intermediate was reacted with (1H-indazol-5-yl)boronic acid using Method B to obtain the desired product. Yield 22%. TLC $R_f$=0.40 (CHCl$_3$-MeOH, 9:1). $^1$H NMR (400 MHz, DMSO-d$_6$) δ 13.19 (s, 1H), 8.54 (q, J=1.1 Hz, 1H), 8.05 (d, J=13.6 Hz, 2H), 7.90 (d, J=10.0 Hz, 1H), 7.83-7.72 (m, 2H), 7.21 (d, J=10.1 Hz, 1H), 4.35 (ddt, J=11.8, 8.7, 4.0 Hz, 1H), 3.95 (dd, J=11.3, 4.3 Hz, 2H), 3.56-3.46 (m, 2H), 3.00 (s, 3H), 1.85 (qd, J=12.2, 4.6 Hz, 2H), 1.66 (dd, J=12.4, 3.5 Hz, 2H). HRMS m/z calcd for C$_{19}$H$_{20}$N$_6$O [M+H]$^+$: 349.1771, found: 349.1776. HPLC: 97% (t$_R$=11.6 min).

3-(1-Methyl-1H-indazol-6-yl)-N-(tetrahydro-2H-pyran-4-yl)imidazo[1,2-b]pyridazin amine (20, SRI-43372)

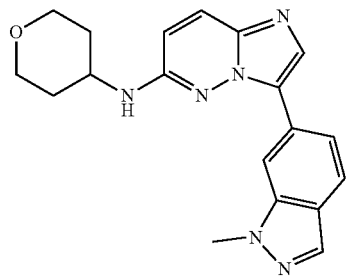 [SMILES: Cn1ncc2ccc(-c3cnc4ccc(NC5CCOCC5)nn34)cc21]

This compound was prepared by the reacting 3-bromo-N-(tetrahydro-2H-pyran-4-yl)imidazo[1,2-b]pyridazin-6-amine with (1-methylindazol-6-yl)boronic acid using Method B. Yield 76%. TLC $R_f$=0.40 (CHCl$_3$-MeOH, 9:1). $^1$H NMR (400 MHz, DMSO-d$_6$) δ 8.55 (d, J=1.2 Hz, 1H), 8.06-7.93 (m, 2H), 7.82-7.71 (m, 3H), 7.09 (d, J=6.9 Hz, 1H), 6.72 (d, J=9.7 Hz, 1H), 4.08 (s, 3H), 4.06-3.94 (m, 1H), 3.92-3.82 (m, 2H), 3.45 (td, J=11.3, 2.3 Hz, 2H), 2.10-1.99 (m, 2H), 1.62-1.44 (m, 2H). HRMS m/z calcd for C$_{19}$H$_{20}$N$_6$O [M+H]$^+$: 349.1771, found: 349.1773. HPLC: 97% (t$_R$=7.6 min).

N-Methyl-3-(1-methyl-1H-indazol-6-yl)-N-(tetrahydro-2H-pyran-4-yl)imidazo[1,2-b]pyridazin-6-amine (21, SRI-43369)

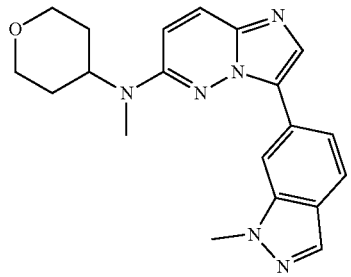 [SMILES: CN(c1ccc2ncc(-c3ccc4cnn(C)c4c3)n2n1)C1CCOCC1]

This compound was prepared from 3-bromo-N-methyl-N-(tetrahydro-2H-pyran-4-yl)imidazo[1,2-b]pyridazin-6-amine and (1-methylindazol-6-yl)boronic acid using Method B. Yield 62%. TLC $R_f$=0.45 (CHCl$_3$-MeOH, 9:1). $^1$H NMR (400 MHz, DMSO-d$_6$) δ 8.60 (q, J=1.0 Hz, 1H), 8.09-8.02 (m, 2H), 7.93-7.78 (m, 3H), 7.24 (d, J=10.1 Hz, 1H), 4.37 (tt, J=11.5, 3.8 Hz, 1H), 4.08 (s, 3H), 3.95 (dd, J=11.3, 4.4 Hz, 2H), 3.50-3.42 (m, 2H), 3.03 (s, 3H), 1.85 (qd, J=12.1, 4.6 Hz, 2H), 1.65 (dd, J=12.4, 3.6 Hz, 2H). HRMS m/z calcd for C$_{20}$H$_{22}$N$_6$O [M+H]$^+$: 363.1928, found: 363.1929. HPLC: 99% (t$_R$=11.2 min).

N-Cyclohexyl-3-(1H-indazol-6-yl)-N-methylimidazo[1,2-b]pyridazin-6-amine (22, SRI-42719)

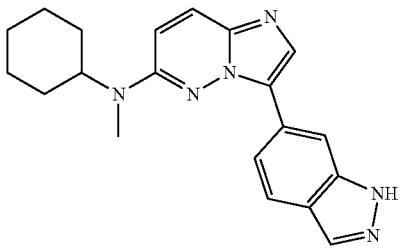 [SMILES: CN(c1ccc2ncc(-c3ccc4cn[nH]c4c3)n2n1)C1CCCCC1]

Step 1: 3-Bromo-N-cyclohexyl-N-methylimidazo[1,2-b]pyridazin-6-amine. This intermediate was prepared from 3-bromo-6-chloroimidazo[1,2-b]pyridazine and N-methylcyclohexylamine using Method C. Yield 5%. TLC $R_f$=0.40 (CHCl$_3$-MeOH, 9:1). $^1$H NMR (400 MHz, DMSO-d$_6$) δ 7.70 (d, J=10.0 Hz, 1H), 7.50 (s, 1H), 6.83 (d, J=10.0 Hz, 1H), 4.00 (tt, J=11.6, 3.6 Hz, 1H), 3.00 (s, 3H), 1.93-1.68 (m, 4H), 1.63-1.34 (m, 5H), 1.17 (qt, J=12.9, 3.7 Hz, 1H). ESI-MS (m/z)=310 (M+H)$^+$.

Step 2: Reaction of the above intermediate with (1H-indazol-6-yl)boronic acid using Method B afforded the desired target compound 22. Yield 31%. TLC $R_f$=0.40 (CHCl$_3$-MeOH, 9:1). $^1$H NMR (400 MHz, CDCl$_3$) δ 8.52 (q, J=1.1 Hz, 1H), 8.10 (d, J=1.2 Hz, 1H), 7.94 (s, 1H), 7.82 (t, J=1.1 Hz, 2H), 7.75 (d, J=9.9 Hz, 1H), 6.81 (d, J=10.0 Hz, 1H), 4.06 (tt, J=11.6, 3.5 Hz, 1H), 2.99 (s, 3H), 2.02-1.80 (m, 4H), 1.75 (d, J=13.5 Hz, 1H), 1.62-1.33 (m, 4H), 1.19 (dddd, J=22.2, 12.9, 9.1, 4.4 Hz, 1H). HRMS m/z calcd for C$_{20}$H$_{22}$N$_6$ [M+H]$^+$: 347.1979, found: 347.1980. HPLC: 99% (t$_R$=13.7 min).

N-(4,4-Difluorocyclohexyl)-3-(1H-indazol-6-yl)imidazo[1,2-b]pyridazin-6-amine (23, SM-43413)

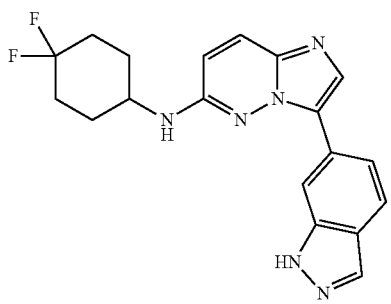 [SMILES: FC1(F)CCC(Nc2ccc3ncc(-c4ccc5cn[nH]c5c4)n3n2)CC1]

Step 1: 3-Bromo-N-(4,4-difluorocyclohexyl)imidazo[1,2-b]pyridazin-6-amine. This intermediate was prepared using the following general procedure (Method D). To a solution of 3-bromo-6-chloroimidazo[1,2-b]pyridazine (250 mg, 1.02 mmol) in N-methyl pyrrolidone (NMP; 5 mL) was treated with 4,4-difluorocyclohexan-1-amine (145.4 mg, 1.07 mmol). The reaction mixture was stirred with microwave heating at 180° C. for 30 minutes. The mixture was then diluted with EtOAc (20 mL) and washed with water (2×20 mL). The organic layer was dried and concentrated under reduced pressure. The residue obtained was purified via flash chromatography over silica using 0-20% methanol in dichloromethane to obtain the desired compound. Yield 38%. TLC $R_f$=0.35 (CHCl$_3$-MeOH, 9:1). $^1$H NMR (400 MHz, CDCl$_3$) δ 7.57 (d, J=9.6 Hz, 1H), 7.47 (s, 1H), 6.43 (d, J=9.6 Hz, 1H), 4.61-4.55 (m, 1H), 4.02-3.91 (m, 1H), 2.26-2.10 (m, 4H), 1.81-1.62 (m, 4H). ESI-MS (m/z)=332 (M+H)$^+$.

Step 2: Reaction of the above intermediate with (1H-indazol-6-yl)boronic acid using Method B afforded the target compound 23. Yield 31%. TLC $R_f$=0.35 (CHCl$_3$-MeOH, 9:1). $^1$H NMR (400 MHz, DMSO-d$_6$) δ 13.22 (s, 1H), 8.65 (d, J=1.2 Hz, 1H), 8.06 (d, J=1.1 Hz, 1H), 7.97 (s, 1H), 7.80-7.70 (m, 3H), 7.10 (d, J=6.7 Hz, 1H), 6.70 (d, J=9.7 Hz, 1H), 3.91 (d, J=11.3 Hz, 1H), 2.17-2.03 (m, 6H), 1.68-1.56 (m, 2H). HRMS m/z calcd for C$_{19}$H$_{18}$F$_2$N$_6$ [M+H]$^+$: 369.1634, found: 369.1641. HPLC: 95% (t$_R$=9.2 min).

3-(1H-Indazol-6-yl)-N-methyl-N-propylimidazo[1,2-b]pyridazin-6-amine (24, SRI-43175)

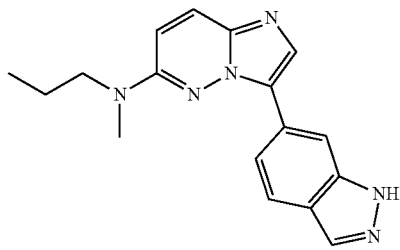 [SMILES: CCCN(C)c1ccc2ncc(-c3ccc4cn[nH]c4c3)n2n1]

Step 1: 6-Chloro-3-(1H-indazol-6-yl)imidazo[1,2-b]pyridazine. This intermediate was prepared from using chloroimidazo[1,2-b]pyridazine and (1H-indazol-6-yl)boronic acid using Method A.

Step 2. The above intermediate was converted to the desired compound using the following general procedure (Method E) for the displacement reaction. To a solution of 6-chloro-3-(1H-indazol-6-yl)imidazo[1,2-b]pyridazine (100 mg, 0.37 mmol) in anhydrous ethanol (3.0 mL) was added N-methylpropan-1-amine (136 mg, 0.19 mmol) followed by DIEA (71.9 mg, 0.55 mmol). The reaction mixture was irradiated with microwave for 6 hours at 150° C. The reaction mixture was concentrated under reduced pressure to give the crude product as a dark brown solid. This crude product was purified by flash chromatography over silica using 0-5% methanol in dichloromethane to obtain the title compound. Yield 37%. TLC $R_f$=0.40 (CHCl$_3$-MeOH, 9:1). $^1$H NMR (400 MHz, DMSO-d$_6$) δ 13.20 (s, 1H), 8.68 (q, J=1.1 Hz, 1H), 8.08 (d, J=7.1 Hz, 2H), 7.91 (d, J=10.0 Hz, 1H), 7.86-7.76 (m, 2H), 7.13 (d, J=10.0 Hz, 1H), 3.68-3.48 (m, 2H), 3.19 (s, 3H), 1.73-1.57 (m, 2H), 0.94 (t, J=7.4 Hz, 3H). HRMS m/z calcd for C$_{17}$H$_{18}$N$_6$ [M+H]$^+$: 307.1665, found: 307.1664. HPLC: 98% (t$_R$=9.3 min).

3-(1H-Indazol-6-yl)-N-methyl-N-(1-methylpiperidin-4-yl)imidazo[1,2-b]pyridazin-6-amine (25, SRI-42918)

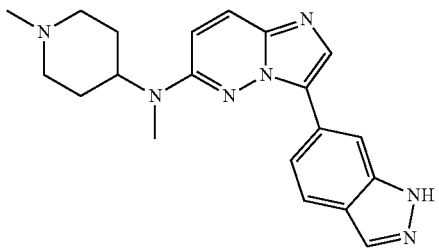 [SMILES: CN1CCC(N(C)c2ccc3ncc(-c4ccc5cn[nH]c5c4)n3n2)CC1]

Step 1: 3-Bromo-N-methyl-N-(1-methylpiperidin-4-yl)imidazo[1,2-b]pyridazin-6-amine. This intermediate was prepared from 3-bromo-6-chloroimidazo[1,2-b]pyridazine and N,1-dimethylpiperidin-4-amine using Method C. Yield 15%. TLC $R_f$=0.40 (CHCl$_3$-MeOH, 9:1). $^1$H NMR (400 MHz, DMSO-d$_6$) δ 7.64 (dd, J=9.9, 0.4 Hz, 1H), 7.49 (s, 1H), 6.77 (d, J=9.9 Hz, 1H), 4.21 (tt, J=11.8, 4.0 Hz, 1H), 3.09-2.97 (m, 6H), 2.46-2.34 (m, 1H), 2.21 (td, J=12.0, 2.5 Hz, 3H), 1.98 (qd, J=12.3, 3.9 Hz, 2H), 1.80 (ddt, J=12.0, 4.4, 2.2 Hz, 2H), 1.24 (s, 1H). ESI-MS (m/z)=325 (M+H)$^+$.

Step 2: The above intermediate was reacted with (1H-indazol-6-yl)boronic acid using Method B to obtain the target compound 25. Yield 13%. TLC $R_f$=0.40 (CHCl$_3$-MeOH, 9:1). $^1$H NMR (400 MHz, DMSO-d$_6$) δ 8.48-8.43 (m, 1H), 8.06 (d, J=1.0 Hz, 1H), 7.88 (s, 1H), 7.84-7.70 (m, 3H), 7.11 (d, J=10.1 Hz, 1H), 4.14 (tt, J=11.7, 4.1 Hz, 1H), 3.04 (s, 3H), 3.02-2.96 (m, 2H), 2.32 (s, 3H), 2.20 (td, J=12.1, 2.5 Hz, 2H), 1.93 (qd, J=12.2, 3.7 Hz, 2H), 1.84-1.73 (m, 2H). HRMS m/z calcd for C$_{20}$H$_{23}$N$_7$ [M+H]$^+$: 362.2087, found: 362.2078. HPLC: 95% ($t_R$=9.6 min).

N-Ethyl-3-(1H-indazol-6-yl)-N-(tetrahydro-2H-pyran-4-yl)imidazo[1,2-b]pyridazin amine (26, SRI-43566)

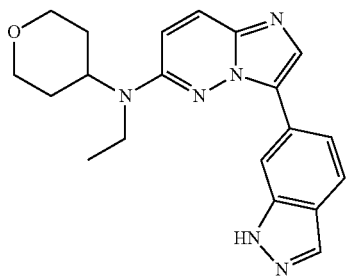 [SMILES: CCN(c1ccc2ncc(-c3ccc4cn[nH]c4c3)n2n1)C1CCOCC1]

Step 1: 3-Bromo-N-(tetrahydro-2H-pyran-4-yl)imidazo[1,2-b]pyridazin-6-amine. This intermediate was prepared from 3-bromo-6-chloroimidazo[1,2-b]pyridazine and tetrahydro-2H-pyran-4-amine using Method D.

Step 2: 3-Bromo-N-ethyl-N-(tetrahydro-2H-pyran-4-yl)imidazo[1,2-b]pyridazin-6-amine. This intermediate was prepared by the following general procedure (Method F) for N-alkylation. The 3-bromo-N-tetrahydropyran-4-yl-imidazo[1,2-b]pyridazin-6-amine (100 mg, 0.34 mmol) obtained in Step 1 was dissolved in DMF (3 mL) and iodoethane (78.7 mg, 0.50 mmol) and anhydrous potassium carbonate (71.8 mg, 0.50 mmol) were added. The reaction mixture was heated in a microwave reactor for 0.5 hours at 100° C. It was then diluted with EtOAc (20 mL) and washed with water (2×20 mL). The organic layer was dried and concentrated under reduced pressure. The residue obtained was purified via flash chromatography over silica using 0-20% methanol in dichloromethane to obtain the desired compound. Yield 85%. TLC $R_f$=0.30 (CHCl$_3$-MeOH, 9:1). $^1$H NMR (400 MHz, DMSO-d$_6$) δ 8.47 (s, 1H), 8.31 (d, J=10.0 Hz, 1H), 7.24 (d, J=9.9 Hz, 1H), 4.35 (q, J=7.3 Hz, 2H), 3.89 (dq, J=12.9, 4.8, 4.3 Hz, 3H), 3.49-3.37 (m, 2H), 2.00 (d, J=12.0 Hz, 2H), 1.59-1.45 (m, 2H), 1.41 (t, J=7.3 Hz, 3H). ESI-MS (m/z)=326 (M+H)$^+$.

Step 3: The above intermediate was reacted with (1H-indazol-6-yl)boronic acid using Method B. Yield 33%. TLC $R_f$=0.35 (CHCl$_3$-MeOH, 9:1). $^1$H NMR (400 MHz, DMSO-d$_6$) δ 13.43 (s, 1H), 8.74 (s, 1H), 8.46 (s, 1H), 8.39 (d, J=10.0 Hz, 1H), 8.17 (s, 1H), 8.04-7.86 (m, 1H), 7.68 (dd, J=8.5, 1.5 Hz, 1H), 7.27 (d, J=10.0 Hz, 1H), 4.48-4.31 (m, 2H), 3.92-3.84 (m, 3H), 3.51 (td, J=11.4, 2.3 Hz, 2H), 2.02 (d, J=13.0 Hz, 2H), 1.59-1.36 (m, 5H). HRMS m/z calcd for C$_{20}$H$_{22}$N$_6$O [M+H]$^+$: 363.1928, found: 363.1932. HPLC: 96% ($t_R$=8.7 min).

3-(1H-Indazol-6-yl)-N-propyl-N-(tetrahydro-2H-pyran-4-yl)imidazo[1,2-b]pyridazin amine (27, SRI-43499)

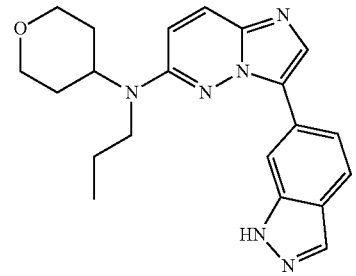 [SMILES: CCCN(c1ccc2ncc(-c3ccc4cn[nH]c4c3)n2n1)C1CCOCC1]

Step 1: 3-Bromo-N-(tetrahydro-2H-pyran-4-yl)imidazo[1,2-b]pyridazin-6-amine. This intermediate was prepared from 3-bromo-6-chloroimidazo[1,2-b]pyridazine and tetrahydro-2H-pyran-4-amine using Method D.

Step 2: 3-Bromo-N-propyl-N-(tetrahydro-2H-pyran-4-yl)imidazo[1,2-b]pyridazin-6-amine. This intermediate was prepared by reacting the product obtained in Step 1 with 1-iodopropane using Method F. Yield 88%. TLC $R_f$=0.30 (CHCl$_3$-MeOH, 9:1). $^1$H NMR (400 MHz, DMSO-d$_6$) δ 8.46 (s, 1H), 8.33 (d, J=10.0 Hz, 1H), 7.27 (d, J=10.0 Hz, 1H), 4.29 (t, J=7.1 Hz, 2H), 3.89 (dt, J=11.6, 3.6 Hz, 3H), 3.43 (td, J=11.4, 2.3 Hz, 2H), 2.00 (d, J=11.6 Hz, 2H), 1.81 (h, J=7.3 Hz, 2H), 1.59-1.44 (m, 2H), 0.86 (t, J=7.4 Hz, 3H). ESI-MS (m/z)=340 (M+H)$^+$.

Step 3: The above intermediate was reacted with (1H-indazol-6-yl)boronic acid using Method B. Yield 38%. TLC $R_f$=0.35 (CHCl$_3$-MeOH, 9:1). $^1$H NMR (400 MHz, DMSO-d$_6$) δ 13.44 (s, 1H), 8.72 (s, 1H), 8.48-8.37 (m, 2H), 8.17 (s, 1H), 7.99-7.86 (m, 1H), 7.67 (dd, J=8.5, 1.4 Hz, 1H), 7.27 (d, J=10.0 Hz, 1H), 4.36 (t, J=7.1 Hz, 2H), 3.92-3.83 (m, 2H), 3.51 (td, J=11.4, 2.3 Hz, 2H), 2.96 (s, 1H), 2.03 (d, J=12.5 Hz, 2H), 1.91 (h, J=7.2 Hz, 2H), 1.71-1.44 (m, 2H), 0.90 (dt, J=16.7, 7.3 Hz, 3H). HRMS m/z calcd for C$_{21}$H$_{24}$N$_6$O [M+H]$^+$: 377.2084, found: 377.2090. HPLC: 96% ($t_R$=9.26 min).

N-(Cyclopropylmethyl)-3-(1H-indazol-6-yl)-N-(tetrahydro-2H-pyran-4-yl)imidazo[1,2-b]pyridazin-6-amine (28, SRI-43568)

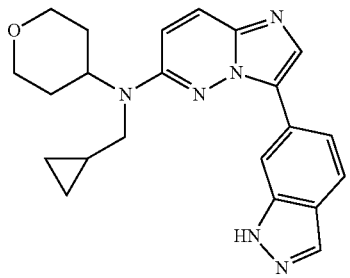 [SMILES: c1cc2cn[nH]c2cc1-c1cnc2ccc(N(CC3CC3)C3CCOCC3)nn12]

Step 1: 3-Bromo-N-(tetrahydro-2H-pyran-4-yl)imidazo[1,2-b]pyridazin-6-amine. This intermediate was prepared from 3-bromo-6-chloroimidazo[1,2-b]pyridazine and tetrahydro-2H-pyran-4-amine using Method D.

Step 2: 3-Bromo-N-(cyclopropylmethyl)-N-(tetrahydro-2H-pyran-4-yl)imidazo[1,2-b]pyridazin-6-amine. This intermediate was obtained by reacting the product obtained in Step 1 with (iodomethyl)cyclopropane using Method F. The crude product was directly used in next step after work up.

Step 3: Target compound 28 was prepared by the reaction of the above intermediate with (1H-indazol-6-yl)boronic acid using Method B. Yield 22%. TLC $R_f$=0.35 (CHCl$_3$-MeOH, 9:1). $^1$H NMR (400 MHz, DMSO-d$_6$) δ 13.44 (s, 1H), 8.75 (d, J=16.0 Hz, 1H), 8.48-8.41 (m, 2H), 8.17 (s, 1H), 8.02-7.92 (m, 2H), 7.72-7.63 (m, 1H), 7.30 (d, J=10.0 Hz, 1H), 4.49 (s, 1H), 4.30 (d, J=7.4 Hz, 1H), 3.88 (d, J=11.4 Hz, 3H), 3.51 (t, J=10.8 Hz, 2H), 2.67 (d, J=7.5 Hz, 1H), 2.02 (d, J=13.0 Hz, 2H), 1.57-1.45 (m, 2H), 0.66-0.50 (m, 3H). HRMS m/z calcd for C$_{22}$H$_{24}$N$_6$O [M+H]$^+$: 389.2084, found: 389.2090. HPLC: 95% ($t_R$=9.6 min).

N-(4,4-Difluorocyclohexyl)-3-(1H-indazol-6-yl)-N-methylimidazo[1,2-b]pyridazin amine (29, SRI-43753)

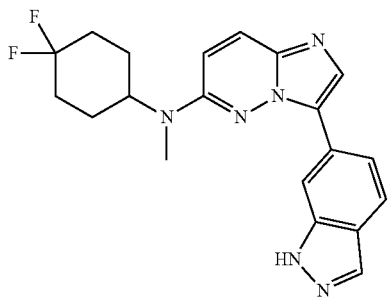 [SMILES: CN(c1ccc2ncc(-c3ccc4cn[nH]c4c3)n2n1)C1CCC(F)(F)CC1]

Step 1: 3-Bromo-N-(4,4-difluorocyclohexyl)-N-methylimidazo[1,2-b]pyridazin-6-amine. This intermediate was prepared from 3-bromo-6-chloroimidazo[1,2-b]pyridazine and 4,4-difluoro-N-methylcyclohexan-1-amine using the general Method D. Yield 38%. TLC $R_f$=0.35 (CHCl$_3$-MeOH, 9:1). $^1$H NMR (400 MHz, CDCl$_3$) δ 7.60 (d, J=9.6 Hz, 1H), 7.38 (s, 1H), 6.45 (d, J=9.6 Hz, 1H), 3.05 (s, 3H), 4.55-4.45 (m, 1H), 4.08-3.90 (m, 1H), 2.30-2.10 (m, 4H), 1.82-1.60 (m, 4H). ESI-MS (m/z)=346 (M+H)$^+$.

Step 2: Reaction of the above intermediate with (1H-indazol-6-yl)boronic acid using Method B afforded the target compound 29. Yield 77%. TLC $R_f$=0.35 (CHCl$_3$-MeOH, 9:1). $^1$H NMR (400 MHz, DMSO-d$_6$) δ 8.63 (s, 1H), 8.31 (d, J=9.9 Hz, 1H), 8.09 (s, 1H), 7.98 (s, 1H), 7.88 (d, J=8.5 Hz, 1H), 7.58 (d, J=8.4 Hz, 1H), 7.29 (d, J=9.9 Hz, 1H), 4.02 (s, 3H), 3.95 (s, 1H), 2.07 (d, J=20.6 Hz, 7H), 1.67-1.49 (m, 2H). HRMS m/z calcd for C$_{20}$H$_{20}$F$_2$N$_6$ [M+H]$^+$: 383.1790, found: 383.1788. HPLC: 97% ($t_R$=10.3 min).

N-Methyl-3-(1-methyl-1H-indazol-6-yl)-N-propylimidazo[1,2-b]pyridazin-6-amine (30, SRI-43411)

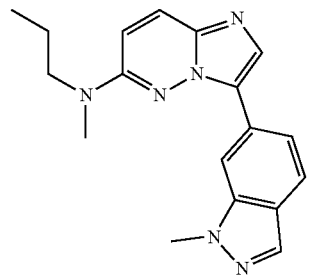 [SMILES: CCCN(C)c1ccc2ncc(-c3ccc4cnn(C)c4c3)n2n1]

Step 1: 3-Bromo-N-methyl-N-propylimidazo[1,2-b]pyridazin-6-amine. This intermediate was prepared from 3-bromo-6-chloroimidazo[1,2-b]pyridazine and N-methylpropan-1-amine using Method D. Yield 48%. TLC $R_f$=0.40 (CHCl$_3$-MeOH, 9:1). $^1$H NMR (400 MHz, DMSO-d$_6$) δ 7.82 (dd, J=10.0, 0.9 Hz, 1H), 7.54 (d, J=0.8 Hz, 1H), 7.19 (d, J=10.1 Hz, 1H), 3.50-3.46 (m, 2H), 3.16 (s, 3H), 2.50 (q, J=2.0 Hz, 3H), 1.58 (p, J=7.4 Hz, 2H). ESI-MS (m/z)=270 (M+H)$^+$.

Step 2: Reaction of the above intermediate with (1-methylindazol-6-yl)boronic acid using Method B afforded target compound 30. Yield 57%. TLC $R_f$=0.40 (CHCl$_3$-MeOH, 9:1). $^1$H NMR (400 MHz, DMSO-d$_6$) δ 8.71 (q, J=1.1 Hz, 1H), 8.08 (s, 1H), 8.04-8.01 (m, 1H), 7.88 (dd, J=10.0, 0.4 Hz, 1H), 7.84-7.77 (m, 2H), 7.10 (d, J=10.0 Hz, 1H), 4.05 (d, J=0.4 Hz, 3H), 3.57-3.51 (m, 2H), 3.16 (d, J=0.5 Hz, 3H), 1.63 (q, J=7.4 Hz, 2H), 0.90 (t, J=7.4 Hz, 3H). HRMS m/z calcd for C$_{18}$H$_{20}$N$_6$ [M+H]$^+$: 321.1822, found: 321.1824. HPLC: 99% ($t_R$=15 min).

3-(3-Methyl-1H-indazol-6-yl)-N-(tetrahydro-2H-pyran-4-yl)imidazo[1,2-b]pyridazin-6-amine (31, SRI-43371)

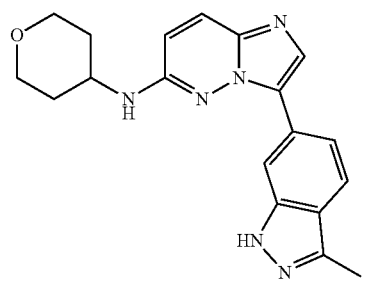 [SMILES: Cc1n[nH]c2cc(-c3cnc4ccc(NC5CCOCC5)nn34)ccc12]

Step 1: 3-Bromo-N-(tetrahydro-2H-pyran-4-yl)imidazo[1,2-b]pyridazin-6-amine. This intermediate was prepared from 3-bromo-6-chloroimidazo[1,2-b]pyridazine and tetrahydro-2H-pyran-4-amine using Method C. Yield 21%. TLC $R_f$=0.40 (CHCl$_3$-MeOH, 9:1). $^1$H NMR (400 MHz, DMSO-d$_6$) δ 7.61 (d, J=9.6 Hz, 1H), 7.48 (s, 1H), 6.43 (d, J=9.6 Hz, 1H), 4.34 (d, J=7.2 Hz, 1H), 4.09-3.96 (m, 3H), 3.58 (td, J=11.7, 2.2 Hz, 2H), 2.17 (dq, J=12.5, 2.1 Hz, 2H), 1.63-1.48 (m, 2H). ESI-MS (m/z)=298 (M+H)$^+$.

Step 2: Reaction of the above intermediate with (3-methyl-1H-indazol-6-yl)boronic acid using Method B afforded target compound 31. Yield 41%. TLC $R_f$=0.40 (CHCl$_3$-MeOH, 9:1). $^1$H NMR (400 MHz, DMSO-d$_6$) δ 12.75 (s, 1H), 8.47 (s, 1H), 7.94 (d, J=0.4 Hz, 1H), 7.77-7.70 (m, 3H), 7.07 (d, J=6.7 Hz, 1H), 6.70 (d, J=9.7 Hz, 1H), 4.07 (q, J=5.2 Hz, 1H), 3.88 (dt, J=11.3, 3.7 Hz, 3H), 3.57 (td, J=11.3, 2.3 Hz, 2H), 3.15 (d, J=5.0 Hz, 2H), 2.06 (d, J=10.9 Hz, 2H), 1.55-1.43 (m, 2H). HRMS m/z calcd for C$_{19}$H$_{20}$N$_6$O [M+H]$^+$: 349.1771, found: 349.1773. HPLC: 97% (t$_R$=7.3 min).

N-Methyl-3-(3-methyl-1H-indazol-6-yl)-N-(tetrahydro-2H-pyran-4-yl)imidazo[1,2-b]pyridazin-6-amine (32, SRI-43264)

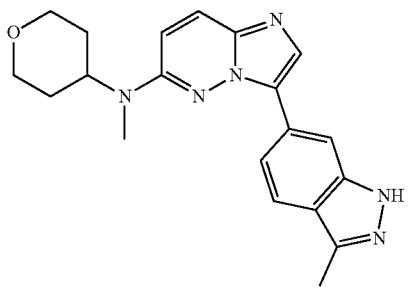 [SMILES: Cc1n[nH]c2cc(-c3cnc4ccc(N(C)C5CCOCC5)nn34)ccc12]

This compound was prepared by reacting 3-bromo-N-methyl-N-(tetrahydro-2H-pyran-4-yl)imidazo[1,2-b]pyridazin-6-amine with (3-methyl-1H-indazol-6-yl)boronic acid using Method B. Yield 30%. TLC $R_f$=0.40 (CHCl$_3$-MeOH, 9:1). $^1$H NMR (400 MHz, DMSO-d$_6$) δ 12.73 (s, 1H), 8.44 (s, 1H), 8.02 (s, 1H), 7.89 (d, J=10.0 Hz, 1H), 7.74 (s, 2H), 7.20 (d, J=10.0 Hz, 1H), 4.35 (t, J=12.0 Hz, 1H), 3.95 (dd, J=11.3, 4.4 Hz, 2H), 3.57-3.46 (m, 2H), 3.00 (s, 3H), 2.49 (d, J=2.6 Hz, 3H), 1.84 (tt, J=11.9, 6.2 Hz, 2H), 1.66 (d, J=12.1 Hz, 2H). HRMS m/z calcd for C$_{20}$H$_{22}$N$_6$O [M+H]$^+$: 363.1928, found: 363.1933. HPLC: 95% (t$_R$=8.3 min).

N-Methyl-3-(3-methyl-1H-indazol-6-yl)-N-propylimidazo[1,2-b]pyridazin-6-amine (33, SRI-43263)

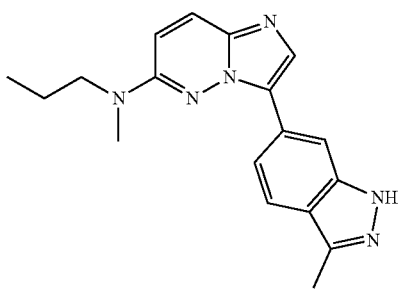 [SMILES: CCCN(C)c1ccc2ncc(-c3ccc4c(C)n[nH]c4c3)n2n1]

Step 1: 6-Chloro-3-(1H-indazol-5-yl)imidazo[1,2-b]pyridazine. This intermediate was prepared from 3-bromo-6-chloroimidazo[1,2-b]pyridazine and (3-methyl-1H-indazol-6-yl)boronic acid using Method B. Yield 66%. TLC $R_f$=0.40 (CHCl$_3$-MeOH, 9:1). $^1$H NMR (400 MHz, DMSO-d$_6$) δ 12.84 (s, 1H), 8.43-8.35 (m, 2H), 8.31 (d, J=9.4 Hz, 1H), 7.82 (dd, J=8.5, 0.8 Hz, 1H), 7.70 (dd, J=8.5, 1.4 Hz, 1H), 7.43 (d, J=9.5 Hz, 1H), 2.53-2.46 (m, 3H). ESI-MS (m/z)=284 (M+H)$^+$.

Step 2: Reaction of the above intermediate with N-methylpropan-1-amine using Method D afforded the desired target compound 33. Yield 28%. TLC $R_f$=0.40 (CHCl$_3$-MeOH, 9:1). $^1$H NMR (400 MHz, DMSO-d$_6$) δ 12.75-12.69 (m, 1H), 8.55 (t, J=1.1 Hz, 1H), 8.02 (s, 1H), 7.86 (d, J=9.9 Hz, 1H), 7.73 (t, J=1.0 Hz, 2H), 7.08 (d, J=10.0 Hz, 1H), 3.56-3.48 (m, 2H), 3.14 (s, 3H), 2.48 (q, J=2.0 Hz, 3H), 1.61 (p, J=7.4 Hz, 2H), 0.90 (t, J=7.4 Hz, 3H). HRMS m/z calcd for C$_{18}$H$_{20}$N$_6$ [M+H]$^+$: 321.1822, found: 321.1824. HPLC: 98% (t$_R$=7.6 min).

3-(1,3-Dimethyl-1H-indazol-6-yl)-N-(tetrahydro-2H-pyran-4-yl)imidazo[1,2-b]pyridazin-6-amine (34, SRI-43496)

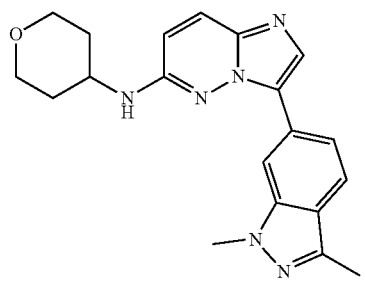 [SMILES: Cc1nn(C)c2cc(-c3cnc4ccc(NC5CCOCC5)nn34)ccc12]

This compound was prepared from 3-bromo-N-(tetrahydro-2H-pyran-4-yl)imidazo[1,2-b]pyridazin-6-amine and (1,3-dimethylindazol-6-yl)boronic acid using Method B. Yield 45%. TLC $R_f$=0.40 (CHCl$_3$-MeOH, 9:1). $^1$H NMR (400 MHz, DMSO-d$_6$) δ 8.47 (t, J=1.1 Hz, 1H), 7.97 (s, 1H), 7.81-7.69 (m, 3H), 7.08 (d, J=6.9 Hz, 1H), 6.71 (d, J=9.7 Hz, 1H), 4.02-3.87 (m, 6H), 3.88 (d, J=3.9 Hz, 1H), 3.45 (td, J=11.3, 2.3 Hz, 2H), 2.06 (d, J=10.9 Hz, 2H), 1.61-1.45 (m, 2H). HRMS m/z calcd for C$_{20}$H$_{22}$N$_6$O [M+H]$^+$: 363.1928, found: 363.1931. HPLC: 96% (t$_R$=4.9 min).

3-(1,3-Dimethyl-1H-indazol-6-yl)-N-methyl-N-(tetrahydro-2H-pyran-4-yl)imidazo[1,2-b]pyridazin-6-amine (35, SRI-43370)

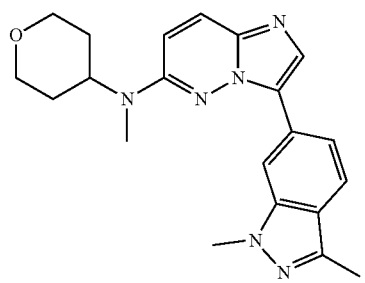 [SMILES: Cc1nn(C)c2cc(-c3cnc4ccc(N(C)C5CCOCC5)nn34)ccc12]

This compound was prepared by reacting 3-bromo-N-methyl-N-(tetrahydro-2H-pyran-4-yl)imidazo[1,2-b]pyridazin-6-amine with (1,3-dimethylindazol-6-yl)boronic acid using Method B. Yield 26%. TLC $R_f$=0.45 (CHCl$_3$-MeOH, 9:1). $^1$H NMR (400 MHz, DMSO-d$_6$) δ 8.51 (t, J=1.1 Hz, 1H), 8.07 (s, 1H), 7.90 (d, J=10.0 Hz, 1H), 7.82 (dd, J=8.6, 1.3 Hz, 1H), 7.75 (dd, J=8.5, 0.8 Hz, 1H), 7.22 (d, J=10.0 Hz, 1H), 4.37 (tt, J=11.6, 3.9 Hz, 1H), 3.98 (s, 5H), 3.46 (td, J=11.7, 1.9 Hz, 2H), 3.38 (s, 3H), 3.02 (s, 3H), 1.85 (qd, J=12.1, 4.5 Hz, 2H), 1.68-1.60 (m, 2H). HRMS m/z calcd for C$_{21}$H$_{24}$N$_6$O [M+H]$^+$: 377.2084, found: 377.2086. HPLC: 96% ($t_R$=8.5 min).

3-(1,3-Dimethyl-1H-indazol-6-yl)-N-methyl-N-propylimidazo[1,2-b]pyridazin-6-amine (36, SRI-43412)

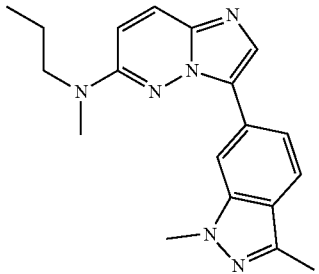 [SMILES: CCCN(C)c1ccc2ncc(-c3ccc4c(C)nn(C)c4c3)n2n1]

This compound was prepared from 3-bromo-N-methyl-N-propylimidazo[1,2-b]pyridazin-6-amine and (1,3-dimethylindazol-6-yl)boronic acid using Method B. Yield 20%. TLC $R_f$=0.40 (CHCl$_3$-MeOH, 9:1). $^1$H NMR (400 MHz, DMSO-d$_6$) δ 8.47 (t, J=1.1 Hz, 1H), 7.94 (s, 1H), 7.76-7.69 (m, 2H), 7.26 (d, J=0.4 Hz, 1H), 6.78 (d, J=9.9 Hz, 1H), 4.04 (s, 3H), 3.52-3.46 (m, 2H), 3.19 (s, 3H), 2.59 (s, 3H), 1.71-1.66 (m, 2H), 0.98 (t, J=7.4 Hz, 3H). HRMS m/z calcd for C$_{19}$H$_{22}$N$_6$ [M+H]$^+$: 335.1979, found: 335.1983. HPLC: 97% ($t_R$=9.3 min).

3-(1H-Benzo[d]imidazol-5-yl)-N-methyl-N-(tetrahydro-2H-pyran-4-yl)imidazo[1,2-b]pyridazin-6-amine (37, SRI-43373)

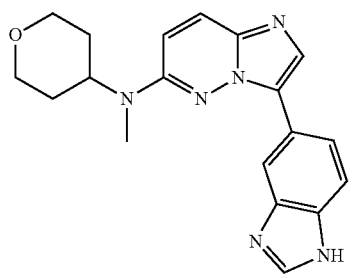 [SMILES: CN(c1ccc2ncc(-c3ccc4[nH]cnc4c3)n2n1)C1CCOCC1]

This compound was prepared by reacting 3-bromo-N-methyl-N-(tetrahydro-2H-pyran-4-yl)imidazo[1,2-b]pyridazin-6-amine with (1H-benzo[d]imidazol-5-yl)boronic acid using Method B. Yield 29%. TLC $R_f$=0.40 (CHCl$_3$-MeOH, 9:1). $^1$H NMR (400 MHz, DMSO-d$_6$) δ 12.53 (s, 1H), 8.53 (s, 1H), 8.24 (s, 1H), 7.94 (s, 1H), 7.88 (dd, J=9.2, 5.5 Hz, 2H), 7.65 (s, 1H), 7.15 (d, J=10.0 Hz, 1H), 4.40 (s, 1H), 3.97 (dd, J=11.2, 4.3 Hz, 2H), 3.51 (t, J=11.5 Hz, 2H), 2.98 (s, 3H), 1.84 (qd, J=12.2, 4.5 Hz, 2H), 1.67 (d, J=11.6 Hz, 2H). HRMS m/z calcd for C$_{19}$H$_{20}$N$_6$O [M+H]$^+$: 349.1771, found: 349.1771. HPLC: 99% ($t_R$=10.5 min).

5-(6-(Methyl(tetrahydro-2H-pyran-4-yl)amino)imidazo[1,2-b]pyridazin-3-yl)-1,3-dihydro-2H-benzo[d]imidazol-2-one (38, SRI-43938)

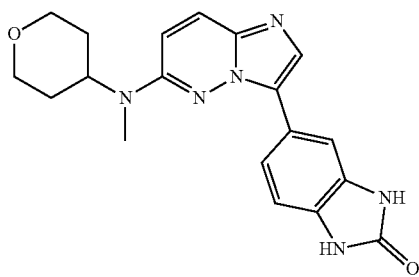 [SMILES: CN(c1ccc2ncc(-c3ccc4[nH]c(=O)[nH]c4c3)n2n1)C1CCOCC1]

This compound was prepared from 3-bromo-N-methyl-N-(tetrahydro-2H-pyran-4-yl)imidazo[1,2-b]pyridazin-6-amine and (2-oxo-1,3-dihydrobenzimidazol-5-yl)boronic acid using Method B. Yield 6%. TLC $R_f$=0.30 (CHCl$_3$-MeOH, 9:1). $^1$H NMR (400 MHz, DMSO-d$_6$) δ 10.77 (s, 1H), 10.69 (s, 1H), 7.89-7.79 (m, 2H), 7.78 (d, J=1.6 Hz, 1H), 7.67 (dd, J=8.2, 1.6 Hz, 1H), 7.13 (d, J=10.0 Hz, 1H), 7.00 (d, J=8.2 Hz, 1H), 3.95 (dd, J=11.3, 4.4 Hz, 2H), 3.54-3.43 (m, 2H), 3.16 (s, 1H), 2.96 (s, 3H), 1.82 (qd, J=12.1, 4.5 Hz, 2H), 1.68-1.59 (m, 2H). HRMS m/z calcd for C$_{19}$H$_{20}$N$_6$O$_2$ [M+H]$^+$: 365.1720, found: 365.1717. HPLC: 100% ($t_R$=7.2 min).

3-(1H-Indazol-5-yl)-N-(tetrahydro-2H-pyran-4-yl)imidazo[1,2-b]pyridazin-6-amine (39, SRI-43262)

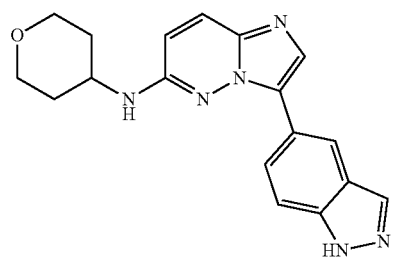 [SMILES: c1cc2[nH]ncc2cc1-c1cnc2ccc(NC3CCOCC3)nn12]

Step 1: 6-Chloro-3-(1H-indazol-5-yl)imidazo[1,2-b]pyridazine: This intermediate was prepared from 3-bromo-6-chloroimidazo[1,2-b]pyridazine and (1H-indazol-5-yl)boronic acid using Method B. Yield 41%. TLC $R_f$=0.40 (CHCl$_3$-MeOH, 9:1). $^1$H NMR (400 MHz, DMSO-d$_6$) δ 13.26 (s, 1H), 8.57 (dd, J=1.6, 0.8 Hz, 1H), 8.37-8.29 (m, 2H), 8.27-8.22 (m, 1H), 8.01 (dd, J=8.7, 1.6 Hz, 1H), 7.73 (dt, J=8.8, 1.0 Hz, 1H), 7.43 (d, J=9.5 Hz, 1H). ESI-MS (m/z)=270 (M+H)$^+$.

Step 2: The above intermediate was reacted with tetrahydro-2H-pyran-4-amine using Method D to obtain the target compound 39. Yield 26%. TLC $R_f$=0.45 (CHCl$_3$-MeOH, 9:1). $^1$H NMR (400 MHz, DMSO-d$_6$) δ 13.12 (s, 1H), 8.72 (t, J=1.2 Hz, 1H), 8.08 (s, 1H), 7.99 (dd, J=8.8, 1.6 Hz, 1H), 7.86 (s, 1H), 7.74 (d, J=9.6 Hz, 1H), 7.59 (dt, J=9.0, 0.9 Hz, 1H), 6.67 (d, J=9.6 Hz, 1H), 4.07 (d, J=5.2 Hz, 1H), 3.98-3.80 (m, 2H), 3.49 (td, J=11.4, 2.1 Hz, 2H), 3.15 (d, J=5.1 Hz, 1H), 2.08 (d, J=12.6 Hz, 2H), 1.58-1.43 (m, 2H). HRMS m/z calcd for $C_{18}H_{18}N_6O$ [M+H]$^+$: 335.1615, found: 335.1614. HPLC: 95% ($t_R$=7.8 min).

3-(1H-Indazol-5-yl)-N-methyl-N-(tetrahydro-2H-pyran-4-yl)imidazo[1,2-b]pyridazin-6-amine (40, SRI-43265)

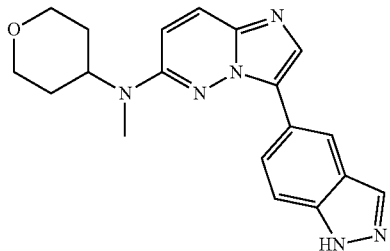 [SMILES: CN(c1ccc2ncc(-c3ccc4[nH]ncc4c3)n2n1)C1CCOCC1]

This compound was prepared by the reaction of 3-bromo-N-methyl-N-(tetrahydro-2H-pyran-4-yl)imidazo[1,2-b]pyridazin-6-amine and (1H-indazol-5-yl)boronic acid using Method B. Yield 41%. TLC $R_f$=0.40 (CHCl$_3$-MeOH, 9:1). $^1$H NMR (400 MHz, DMSO-d$_6$) δ 13.14 (s, 1H), 8.69 (dd, J=1.6, 0.8 Hz, 1H), 8.10 (d, J=1.0 Hz, 1H), 8.02 (dd, J=8.8, 1.6 Hz, 1H), 7.93 (s, 1H), 7.88 (d, J=10.0 Hz, 1H), 7.62 (dt, J=8.8, 1.0 Hz, 1H), 7.14 (d, J=10.0 Hz, 1H), 4.40 (tt, J=11.7, 3.9 Hz, 1H), 3.99 (dd, J=11.3, 4.4 Hz, 2H), 3.53-3.42 (m, 2H), 2.98 (s, 3H), 1.85 (qd, J=12.1, 4.5 Hz, 2H), 1.68 (dd, J=12.7, 3.3 Hz, 2H). HRMS m/z calcd for $C_{19}H_{20}N_6O$ [M+H]$^+$: 349.1771, found: 349.1775. HPLC: 100% ($t_R$=8.9 min).

3-(1-Methyl-1H-indazol-5-yl)-N-(tetrahydro-2H-pyran-4-yl)imidazo[1,2-b]pyridazin-6-amine (41, SRI-43497)

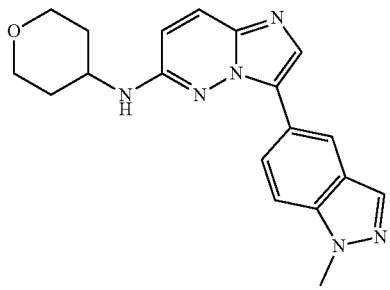 [SMILES: Cn1ncc2cc(-c3cnc4ccc(NC5CCOCC5)nn34)ccc21]

This compound was prepared by the reaction of 3-bromo-N-(tetrahydro-2H-pyran-4-yl)imidazo[1,2-b]pyridazin-6-amine and 1-methylindazole-5-boronic acid using Method B. Yield 41%. TLC $R_f$=0.40 (CHCl$_3$-MeOH, 9:1). $^1$H NMR (400 MHz, DMSO-d$_6$) δ 8.71 (dd, J=1.6, 0.8 Hz, 1H), 8.06 (td, J=4.8, 1.6 Hz, 2H), 7.89 (s, 1H), 7.79-7.60 (m, 2H), 7.06 (d, J=6.5 Hz, 1H), 6.67 (d, J=9.7 Hz, 1H), 4.07 (q, J=5.2 Hz, 1H), 4.06 (s, 2H), 3.98-3.80 (m, 3H), 3.50 (td, J=11.4, 2.2 Hz, 2H), 3.15 (d, J=5.2 Hz, 1H), 2.08 (dd, J=13.1, 3.4 Hz, 2H), 1.58-1.36 (m, 2H). HRMS m/z calcd for $C_{19}H_{20}N_6O$ [M+H]$^+$: 349.1771, found: 349.1772. HPLC: 97% ($t_R$=11.4 min).

N-Methyl-3-(1-methyl-1H-indazol-5-yl)-N-(tetrahydro-2H-pyran-4-yl)imidazo[1,2-b]pyridazin-6-amine (42, SRI-43494)

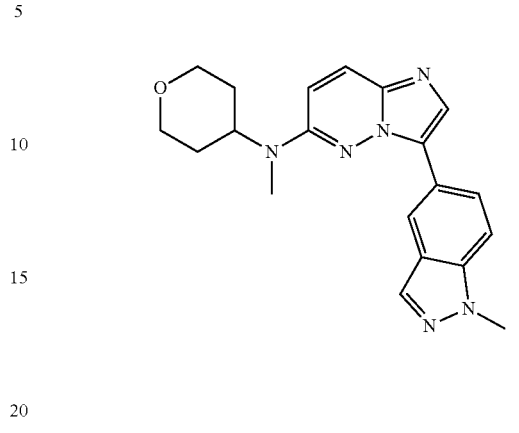

This compound was prepared by the reaction of 3-bromo-N-methyl-N-(tetrahydro-2H-pyran-4-yl)imidazo[1,2-b]pyridazin-6-amine and 1-methylindazole-5-boronic acid using Method B. Yield 41%. TLC $R_f$=0.40 (CHCl$_3$-MeOH, 9:1). $^1$H NMR (400 MHz, DMSO-d$_6$) δ 8.61 (dd, J=1.6, 0.8 Hz, 1H), 8.06-7.98 (m, 2H), 7.87 (s, 1H), 7.78 (d, J=9.9 Hz, 1H), 7.47 (dt, J=8.8, 0.9 Hz, 1H), 6.81 (d, J=9.9 Hz, 1H), 4.48 (tt, J=11.7, 4.0 Hz, 1H), 4.13 (s, 5H), 3.57 (td, J=11.8, 2.0 Hz, 2H), 3.03 (s, 3H), 2.07-1.86 (m, 2H), 1.88-1.74 (m, 2H). HRMS m/z calcd for $C_{20}H_{22}N_6O$ [M+H]$^+$: 363.1928, found: 363.1933. HPLC: 96% ($t_R$=7.9 min).

3-(1,3-Dimethyl-1H-indazol-5-yl)-N-(tetrahydro-2H-pyran-4-yl)imidazo[1,2-b]pyridazin-6-amine (43, SRI-43498)

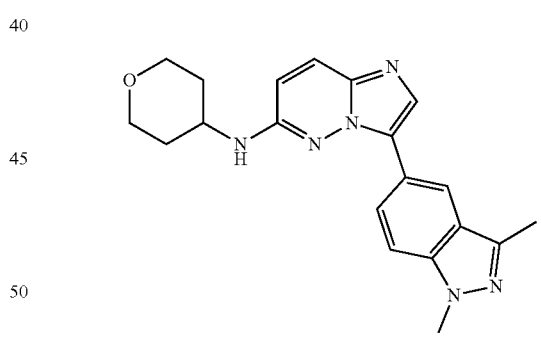

This compound was prepared by the reaction of 3-bromo-N-(tetrahydro-2H-pyran-4-yl)imidazo[1,2-b]pyridazin-6-amine with (1,3-dimethylindazol-5-yl)boronic acid using Method B. Yield 30%. TLC $R_f$=0.40 (CHCl$_3$-MeOH, 9:1). $^1$H NMR (400 MHz, DMSO-d$_6$) δ 8.66-8.60 (m, 1H), 8.00 (dd, J=8.8, 1.5 Hz, 1H), 7.88 (s, 1H), 7.74 (d, J=9.7 Hz, 1H), 7.62 (d, J=8.9 Hz, 1H), 7.03 (d, J=6.9 Hz, 1H), 6.67 (d, J=9.6 Hz, 1H), 4.00-3.87 (m, 6H), 3.45 (td, J=11.4, 2.2 Hz, 2H), 2.51 (s, 3H), 2.05 (d, J=12.9 Hz, 2H), 1.60-1.44 (m, 2H). HRMS m/z calcd for $C_{20}H_{22}N_6O$ [M+H]$^+$: 363.1928, found: 363.1927. HPLC: 97% ($t_R$=11.5 min).

3-(1,3-Dimethyl-1H-indazol-5-yl)-N-methyl-N-(tetrahydro-2H-pyran-4-yl)imidazo[1,2-b]pyridazin-6-amine (44, SRI-43495)

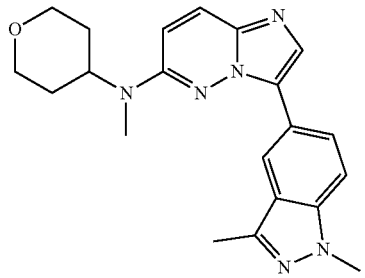 [SMILES: Cc1nn(C)c2ccc(-c3cnc4ccc(N(C)C5CCOCC5)nn34)cc12]

This compound was prepared by reacting 3-bromo-N-methyl-N-(tetrahydro-2H-pyran-4-yl)imidazo[1,2-b]pyridazin-6-amine and (1,3-dimethylindazol-5-yl)boronic acid using Method B. Yield 38%. TLC $R_f$=0.40 (CHCl$_3$-MeOH, 9:1). $^1$H NMR (400 MHz, DMSO-d$_6$) δ 8.02 (ddd, J=8.8, 1.6, 0.6 Hz, 1H), 7.85 (d, J=0.6 Hz, 1H), 7.78 (dd, J=9.9, 0.6 Hz, 1H), 7.40 (dt, J=8.8, 0.7 Hz, 1H), 7.26 (s, 1H), 6.81 (d, J=9.8 Hz, 1H), 4.42 (tt, J=11.7, 4.0 Hz, 1H), 4.16-3.99 (m, 5H), 3.53 (td, J=11.8, 2.0 Hz, 2H), 3.03 (d, J=0.6 Hz, 3H), 2.62 (s, 3H), 1.94 (qd, J=12.3, 4.6 Hz, 2H), 1.76 (dd, J=12.5, 3.3 Hz, 2H). HRMS m/z calcd for C$_{21}$H$_{24}$N$_6$O [M+H]$^+$: 377.2084, found: 377.2091. HPLC: 96% ($t_R$=12.2 min).

N-(2,2-Dimethyltetrahydro-2H-pyran-4-yl)-3-(1H-indazol-5-yl)imidazo[1,2-b]pyridazin-6-amine (45, SRI-43647)

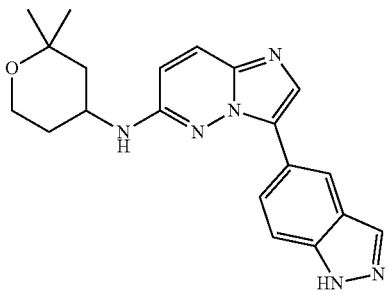 [SMILES: CC1(C)CC(Nc2ccc3ncc(-c4ccc5[nH]ncc5c4)n3n2)CCO1]

Step 1: 3-Bromo-N-(2,2-dimethyltetrahydro-2H-pyran-4-yl)-N-methylimidazo[1,2-b]pyridazin-6-amine. This intermediate was prepared from 3-bromo-6-chloroimidazo[1,2-b]pyridazine and 2,2-dimethyltetrahydro-2H-pyran-4-amine using Method D. TLC $R_f$=0.35 (CHCl$_3$-MeOH, 9:1). ESI-MS (m/z)=326 (M+H)$^+$. Crude product was used as such in the next step.

Step 2: Reaction of the above intermediate with (1H-indazol-5-yl)boronic acid using Method B afforded the target compound 45. Yield 34%. TLC $R_f$=0.35 (CHCl$_3$-MeOH, 9:1). $^1$H NMR (400 MHz, DMSO-d$_6$) δ 13.10 (s, 1H), 8.69 (d, J=1.3 Hz, 1H), 8.08-8.00 (m, 1H), 8.01 (s, 2H), 7.91 (s, 1H), 7.85 (s, 1H), 7.73 (d, J=9.6 Hz, 1H), 7.57 (d, J=8.8 Hz, 1H), 6.68-6.52 (m, 1H), 4.19-4.01 (m, 1H), 3.77-3.69 (m, 1H), 3.15 (d, J=5.2 Hz, 1H), 2.14-2.04 (m, 1H), 1.99-1.88 (m, 1H), 1.40 (ddd, J=21.4, 12.2, 8.8 Hz, 1H), 1.30 (s, 3H), 1.17 (d, J=26.3 Hz, 3H). HRMS m/z calcd for C$_{20}$H$_{22}$N$_6$O [M+H]$^+$: 363.1928, found: 363.1929. HPLC: 95% ($t_R$=8.4 min).

N-(4,4-Difluorocyclohexyl)-3-(1H-indazol-5-yl)imidazo[1,2-b]pyridazin-6-amine (46, SRI-43752)

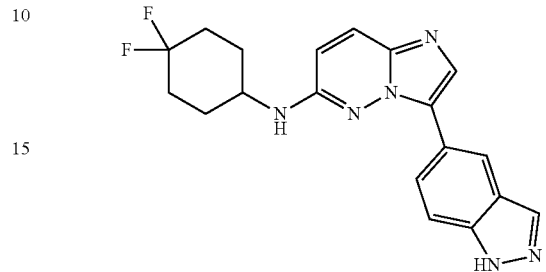

This compound was prepared from 3-bromo-N-(4,4-difluorocyclohexyl)imidazo[1,2-b]pyridazin-6-amine and (1H-indazol-5-yl)boronic acid using Method B. Yield 37%. TLC $R_f$=0.35 (CHCl$_3$-MeOH, 9:1). $^1$H NMR (400 MHz, DMSO-d$_6$) δ 8.69 (dd, J=1.6, 0.8 Hz, 1H), 8.14-8.04 (m, 2H), 7.99 (ddd, J=5.1, 3.9, 1.6 Hz, 2H), 7.85 (s, 1H), 7.80-7.58 (m, 4H), 7.05 (d, J=6.4 Hz, 1H), 6.67 (d, J=9.7 Hz, 1H), 3.85 (s, 1H), 2.21-1.85 (m, 4H), 1.70-1.50 (m, 1H). HRMS m/z calcd for C$_{19}$H$_{18}$F$_2$N$_6$ [M+H]$^+$: 369.1634, found: 369.1628. HPLC: 99% ($t_R$=12.6 min).

N-Benzyl-3-(1H-indazol-5-yl)imidazo[1,2-b]pyridazin-6-amine (47, SRI-43939)

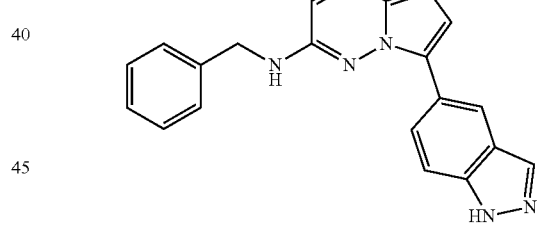

Step 1: N-Benzyl-3-bromoimidazo[1,2-b]pyridazin-6-amine. This intermediate was prepared from 3-bromo-6-chloroimidazo[1,2-b]pyridazine and phenylmethanamine using Method D. Yield 54%. TLC $R_f$=0.45 (CHCl$_3$-MeOH, 9:1). $^1$H NMR (400 MHz, DMSO-d$_6$) δ 7.59 (d, J=9.6 Hz, 1H), 7.52-7.40 (m, 3H), 7.42-7.21 (m, 3H), 7.24-7.17 (m, 1H), 6.45 (d, J=9.6 Hz, 1H), 4.75 (d, J=6.3 Hz, 1H), 4.61 (d, J=5.5 Hz, 2H). ESI-MS (m/z)=304 (M+H)$^+$.

Step 2: Reaction of the above intermediate with (1H-indazol-5-yl)boronic acid using Method B gave the desired target compound 47. Yield 27%. TLC $R_f$=0.40 (CHCl$_3$-MeOH, 9:1). $^1$H NMR (400 MHz, DMSO-d$_6$) δ 13.08 (s, 1H), 8.48 (d, J=1.2 Hz, 1H), 8.03 (s, 1H), 7.87-7.81 (m, 2H), 7.77 (d, J=9.6 Hz, 1H), 7.68 (t, J=5.8 Hz, 1H), 7.51 (dt, J=8.9, 0.9 Hz, 1H), 7.46-7.42 (m, 2H), 7.37-7.32 (m, 2H), 7.25-7.20 (m, 1H), 6.78 (d, J=9.6 Hz, 1H), 4.52 (d, J=5.7 Hz, 2H). HRMS m/z calcd for C$_{20}$H$_{16}$N$_6$ [M+H]$^+$: 341.1506, found: 341.1506. HPLC: 98% ($t_R$=11.2 min).

3-(1H-Indazol-5-yl)-N-methyl-N-propylimidazo[1,2-b]pyridazin-6-amine (49, SRI-43184)

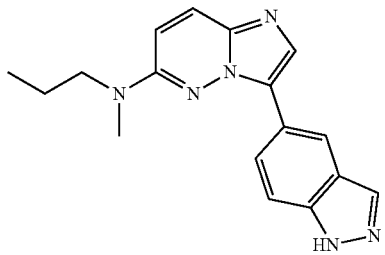 [SMILES: CCCN(C)c1ccc2ncc(-c3ccc4[nH]ncc4c3)n2n1]

Step 1: 6-Chloro-3-(1H-indazol-5-yl)imidazo[1,2-b]pyridazine. This intermediate was prepared from 3-bromo-6-chloroimidazo[1,2-b]pyridazine and (1H-indazol-5-yl)boronic acid using Method A.

Step 2: Reaction of the above intermediate with N-methylpropan-1-amine using Method E gave the target compound 49. Yield 33%. TLC $R_f$=0.40 (CHCl$_3$-MeOH, 9:1). $^1$H NMR (400 MHz, DMSO-d$_6$) δ 13.15 (s, 1H), 8.74 (dd, J=1.6, 0.9 Hz, 1H), 8.12 (d, J=1.1 Hz, 1H), 8.07 (dd, J=8.8, 1.6 Hz, 1H), 7.96 (s, 1H), 7.88 (d, J=9.9 Hz, 1H), 7.64 (dt, J=8.8, 1.0 Hz, 1H), 7.08 (d, J=10.0 Hz, 1H), 3.60-3.44 (m, 2H), 3.15 (s, 3H), 1.75-1.56 (m, 2H), 0.96 (t, J=7.4 Hz, 3H). HRMS m/z calcd for C$_{17}$H$_{18}$N$_6$ [M+H]$^+$: 307.1666, found: 307.1668. HPLC: 97% (t$_R$=9.1 min).

3-(1H-Indazol-5-yl)-N-(2,2,2-trifluoroethyl)imidazo[1,2-b]pyridazin-6-amine (50, SRI-43751)

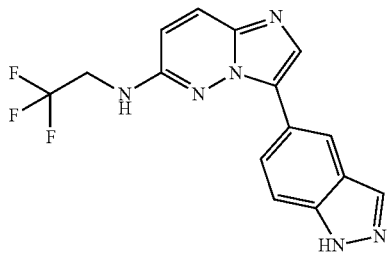 [SMILES: FC(F)(F)CNc1ccc2ncc(-c3ccc4[nH]ncc4c3)n2n1]

Step 1: 3-Bromo-N-(2,2,2-trifluoroethyl)imidazo[1,2-b]pyridazin-6-amine. This intermediate was prepared from 3-bromo-6-chloroimidazo[1,2-b]pyridazine and 2,2,2-trifluoroethan-1-amine using Method D. TLC $R_f$=0.35 (CHCl$_3$-MeOH, 9:1). ESI-MS (m/z)=296 (M+H)$^+$. The crude product obtained was used as such in the next step.

Step 2: Reaction of the above intermediate with (1H-indazol-5-yl)boronic acid using Method B afforded the target compound 50. Yield 15%. TLC $R_f$=0.35 (CHCl$_3$-MeOH, 9:1). $^1$H NMR (400 MHz, DMSO-d$_6$) δ 13.14 (s, 1H), 8.61 (t, J=1.2 Hz, 1H), 8.05 (d, J=1.2 Hz, 1H), 7.98 (dd, J=8.8, 1.6 Hz, 1H), 7.92-7.79 (m, 2H), 7.70-7.55 (m, 2H), 6.79 (d, J=9.6 Hz, 1H), 4.19 (qd, J=9.8, 6.4 Hz, 2H). HRMS m/z calcd for C$_{15}$H$_{11}$F$_3$N$_6$ [M+H]$^+$: 333.1070, found: 333.1075. HPLC: 97% (t$_R$=7.3 min).

4-(3-(1H-Indazol-5-yl)imidazo[1,2-b]pyridazin-6-yl)morpholine (51, SRI-43648)

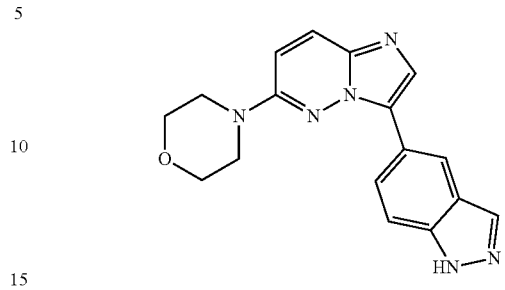

This compound was prepared by the reaction of 4-(3-bromoimidazo[1,2-b]pyridazin-6-yl)morpholine with (1H-indazol-5-yl)boronic acid using Method B. Yield 19%. TLC $R_f$=0.30 (CHCl$_3$-MeOH, 9:1). $^1$H NMR (400 MHz, DMSO-d$_6$) δ 12.55 (s, 1H), 8.48 (s, 1H), 8.23 (s, 1H), 8.00-7.90 (m, 2H), 7.66 (s, 1H), 7.20 (d, J=9.9 Hz, 1H), 3.77 (t, J=4.9 Hz, 4H), 3.51 (t, J=4.9 Hz, 4H), 3.15 (d, J=4.7 Hz, 1H). HRMS m/z calcd for C$_{17}$H$_{16}$N$_6$O [M+H]$^+$: 321.1458, found: 321.1455. HPLC: 95% (t$_R$=11.6 min).

3-(1H-Indazol-5-yl)-6-(4-methylpiperazin-1-yl)imidazo[1,2-b]pyridazine (52, SRI-43940)

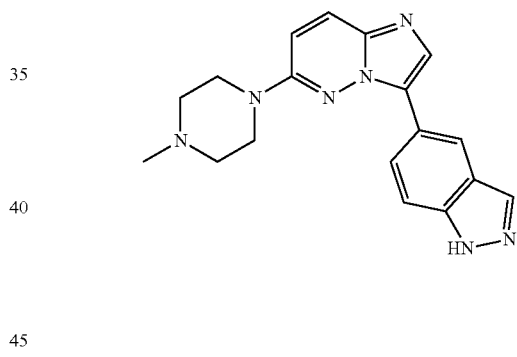

Step 1: 3-Bromo-6-(4-methylpiperazin-1-yl)imidazo[1,2-b]pyridazine. A solution of 3-bromo-6-chloroimidazo[1,2-b]pyridazine (200 mg, 0.86 mmol) and 1-methylpiperazine (172 mg, 1.72 mmol) in tert-butanol (3 mL) was refluxed at 150° C. for 12 hours. The reaction mixture was evaporated under reduced pressure and the residue obtained was purified by flash chromatography over silica using 0-5% methanol in dichloromethane to obtain the desired compound. Yield 54%. TLC $R_f$=0.30 (CHCl$_3$-MeOH, 9:1). $^1$H NMR (400 MHz, DMSO-d$_6$) δ 7.85 (d, J=10.0 Hz, 1H), 7.58 (s, 1H), 7.23 (d, J=10.0 Hz, 1H), 3.54-3.49 (m, 6H), 2.45-2.40 (m, 6H), 2.21 (s, 3H). ESI-MS (m/z)=297 (M+H)$^+$.

Step 2: Reaction of the above intermediate with (1H-indazol-5-yl)boronic acid using Method B gave the desired target compound 52. Yield 48%. TLC $R_f$=0.30 (CHCl$_3$-MeOH, 9:1). $^1$H NMR (400 MHz, DMSO-d$_6$) δ 13.13 (s, 1H), 8.60 (s, 1H), 8.14 (s, 1H), 8.01 (dd, J=8.6, 1.6 Hz, 1H), 7.98-7.87 (m, 2H), 7.62 (d, J=8.8 Hz, 1H), 7.21 (d, J=9.9 Hz, 1H), 3.53 (t, J=5.1 Hz, 5H), 2.47 (d, J=4.4 Hz, 4H), 2.23 (s, 3H). HRMS m/z calcd for C$_{15}$H$_{19}$N$_7$ [M+H]$^+$: 334.1774, found: 334.1769. HPLC: 100% (t$_R$=5.4 min).

1-(5-(6-(Methyl(propyl)amino)imidazo[1,2-b]
pyridazin-3-yl)-1H-indazol-3-yl)ethan-1-one (53,
SRI-44048)

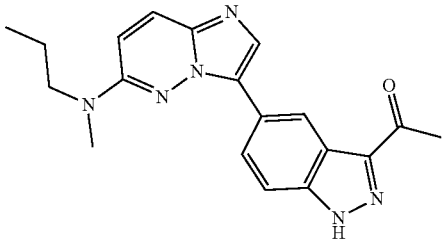 [SMILES: CCCN(C)c1ccc2ncc(-c3ccc4[nH]nc(C(C)=O)c4c3)n2n1]

Step 1. tert-Butyl 3-acetyl-5-(4,4,5,5-tetramethyl-1,3,2-dioxaborolan yl)indazole-1-carboxylate. 1-(5-Bromo-1H-indazol-3-yl)ethan-1-one (500 mg, 2.25 mmol) was dissolved in acetonitrile (10 mL) and di-tert-butyl dicarbonate (982.9 mg, 4.5 mmol), 4-dimethylaminopyridine (DMAP; 413 mg, 3.37 mmol) and triethylamine (342 mg, 3.37 mmol) were added. The reaction mixture was stirred overnight at room temperature and concentrated. The desired product precipitated out as a white solid upon adding methanol (1 mL). Yield 65%. TLC $R_f$=0.40 (hexanes-EtOAc, 5:1). $^1$H NMR (400 MHz, DMSO-d$_6$) δ 8.55 (dd, J=1.9, 0.6 Hz, 1H), 8.01 (dd, J=9.0, 0.7 Hz, 1H), 7.64 (dd, J=8.9, 2.0 Hz, 1H), 2.77 (s, 3H), 1.75 (s, 9H). ESI-MS (m/z)=340 (M+H)$^+$. This intermediate (200 mg, 0.6 mmol), bis(pinacolato)diboron (180 mg, 0.71 mmol), potassium acetate (116 mg, 1.18 mmol), and 1,1'-bis(diphenylphosphino)ferrocenepalladium (II) dichloride dichloromethane complex (50.5 mg, 0.06 mmol) in 1,4-dioxane (8 mL) was heated at 85° C. for 3 hours. The reaction mixture was poured into ethyl acetate (100 mL) and washed with water (3×50 mL) and saturated aqueous sodium chloride (1×50 mL). The organic fraction was dried over sodium sulfate, filtered, concentrated, and the crude product was used as such in the next step.

Step 2. The above intermediate was reacted with 3-bromo-N-methyl-N-propylimidazo[1,2-b]pyridazin-6-amine using Method B. Yield 19%. TLC $R_f$=0.35 (CHCl$_3$-MeOH, 9:1). $^1$H NMR (400 MHz, DMSO-d$_6$) δ 9.45 (dd, J=1.7, 0.8 Hz, 1H), 8.06-7.99 (m, 2H), 7.86 (d, J=10.0 Hz, 1H), 7.71 (dd, J=8.9, 0.8 Hz, 1H), 7.09 (d, J=10.0 Hz, 1H), 3.59-3.53 (m, 2H), 3.20 (s, 3H), 2.64 (s, 3H), 1.62 (h, J=7.4 Hz, 2H), 0.88 (t, J=7.4 Hz, 3H). HRMS m/z calcd for C$_{19}$H$_{20}$N$_6$O [M+H]$^+$: 349.1771, found: 349.1777. HPLC: 95% (t$_R$=8.3 min).

1-(5-(6-(Methyl(tetrahydro-2H-pyran-4-yl)amino)
imidazo[1,2-b]pyridazin-3-yl)-1H-indazol-3-yl)
ethan-1-one (54, SRI-44049)

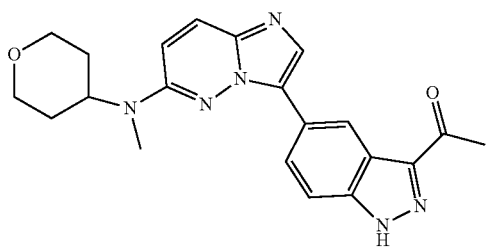 [SMILES: CC(=O)c1n[nH]c2ccc(-c3cnc4ccc(N(C)C5CCOCC5)nn34)cc12]

This compound was prepared from tert-butyl 3-acetyl-5-(4,4,5,5-tetramethyl-1,3,2-dioxaborolan-2-yl)indazole-1-carboxylate (prepared as described in the synthesis of compound 53) with 3-bromo-N-methyl-N-(tetrahydro-2H-pyran-4-yl)imidazo[1,2-b]pyridazin-6-amine using Method B. Yield 12%. TLC $R_f$=0.35 (CHCl$_3$-MeOH, 9:1). $^1$H NMR (400 MHz, DMSO-d$_6$) δ 9.32-9.29 (m, 1H), 8.03-7.97 (m, 2H), 7.89 (d, J=10.0 Hz, 1H), 7.73 (dd, J=8.8, 0.8 Hz, 1H), 7.20 (d, J=10.1 Hz, 1H), 3.90 (dd, J=11.1, 4.5 Hz, 2H), 4.40 (m, 1H), 3.48 (dd, J=12.1, 10.2 Hz, 2H), 3.05 (s, 3H), 2.65 (s, 3H), 1.84 (qd, J=12.0, 4.5 Hz, 2H), 1.69-1.61 (m, 2H). HRMS m/z calcd for C$_{21}$H$_{22}$N$_6$O$_2$ [M+H]$^+$: 391.1877, found: 391.1875. HPLC: 98% (t$_R$=11.9 min).

N-Methyl-3-(1H-pyrazolo[3,4-b]pyridin-5-yl)-N-
(tetrahydro-2H-pyran-4-yl)imidazo[1,2-b]pyridazin-
6-amine (55, SRI-44000)

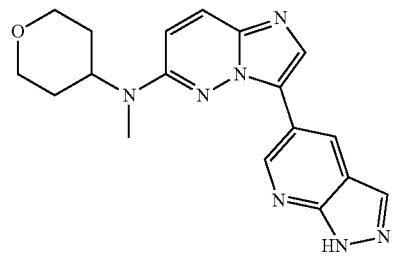

This compound was prepared by the reaction of 3-bromo-N-methyl-N-(tetrahydro-2H-pyran-4-yl)imidazo[1,2-b]pyridazin-6-amine with (1H-pyrazolo[3,4-b]pyridin-5-yl)boronic acid using Method B. Yield 57%. TLC $R_f$=0.25 (CHCl$_3$-MeOH, 9:1). $^1$H NMR (400 MHz, DMSO-d$_6$) δ 9.19 (dd, J=2.1, 0.5 Hz, 1H), 9.02 (dd, J=2.1, 0.5 Hz, 1H), 8.20 (d, J=0.5 Hz, 1H), 8.06 (d, J=0.5 Hz, 1H), 7.91 (dd, J=10.0, 0.5 Hz, 1H), 7.19 (d, J=10.0 Hz, 1H), 4.37 (ddt, J=11.6, 7.7, 3.9 Hz, 1H), 3.98 (dd, J=11.2, 4.3 Hz, 2H), 3.47 (t, J=11.2 Hz, 2H), 2.98 (d, J=0.6 Hz, 3H), 1.84 (qd, J=12.1, 4.5 Hz, 2H), 1.70-1.63 (m, 2H). HRMS m/z calcd for C$_{18}$H$_{19}$N$_{70}$ [M+H]$^+$: 350.1724, found: 350.1725. HPLC: 99% (t$_R$=10.3 min).

N-Methyl-N-propyl-3-(1H-pyrazolo[3,4-b]pyridin-5-
yl)imidazo[1,2-b]pyridazin-6-amine (56, SRI-
44001)

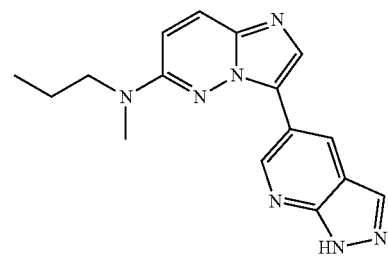 [SMILES: CCCN(C)c1ccc2ncc(-c3cnc4[nH]ncc4c3)n2n1]

This compound was prepared by reacting 3-bromo-N-methyl-N-propylimidazo[1,2-b]pyridazin-6-amine with (1H-pyrazolo[3,4-b]pyridin-5-yl)boronic acid using Method B. Yield 18%. TLC $R_f$=0.30 (CHCl$_3$-MeOH, 9:1). $^1$H NMR (400 MHz, DMSO-d$_6$) δ 13.72 (s, 1H), 9.23-9.16 (m, 1H), 9.05-8.99 (m, 1H), 8.18 (d, J=9.9 Hz, 1H), 8.03 (d, J=9.5 Hz, 1H), 7.87 (t, J=10.0 Hz, 1H), 7.08 (t, J=9.9 Hz, 1H), 3.51-3.45 (m, 2H), 3.10 (d, J=9.8 Hz, 3H), 1.68-1.56 (m, 2H), 0.95-0.86 (m, 3H). HRMS m/z calcd for $C_{16}H_{17}N_7$ [M+H]$^+$: 308.1618, found: 308.1618. HPLC: 99% ($t_R$=8.3 min).

3-(1H-Indazol-5-yl)-6-((tetrahydro-2H-pyran-4-yl)oxy)imidazo[1,2-b]pyridazine (57, SRI-44002)

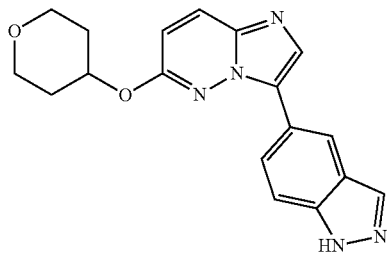 [SMILES: c1cc2[nH]ncc2cc1-c1cnc2ccc(OC3CCOCC3)nn12]

Step 1: 6-Chloro-3-(1H-indazol-5-yl)imidazo[1,2-b]pyridazine. This intermediate was prepared from 3-bromo-6-chloroimidazo[1,2-b]pyridazine and (1H-indazol-5-yl)boronic acid using Method B.

Step 2: The above intermediate (60 mg, 0.22 mmol) was dissolved in DMF (4 mL) and sodium hydride (10.7 mg, 60% dispersion in mineral oil, 0.27 mmol) was added. To the resulting solution was added tetrahydro-2H-pyran-4-ol (34 mg, 0.33 mmol) at 0° C. The reaction mixture was stirred at room temperature overnight, diluted with EtOAc (20 mL), and washed with water (10 mL). The organic layer was dried and concentrated under reduced pressure. The residue obtained was purified via flash chromatography over silica using 0-10% methanol in dichloromethane to obtain the desired compound. Yield 59%. TLC $R_f$=0.35 (CHCl$_3$-MeOH, 9:1). $^1$H NMR (400 MHz, DMSO-d$_6$) δ 13.19 (s, 1H), 8.61 (dd, J=1.7, 0.9 Hz, 1H), 8.15 (d, J=1.0 Hz, 1H), 8.07 (dd, J=6.1, 3.5 Hz, 2H), 8.09-7.94 (m, 1H), 7.65 (dt, J=8.9, 1.0 Hz, 1H), 6.90 (d, J=9.6 Hz, 1H), 4.13-4.01 (m, 1H), 3.93 (dt, J=11.7, 4.2 Hz, 2H), 3.62-3.50 (m, 2H), 2.25-2.13 (m, 2H), 1.82-1.67 (m, 2H). HRMS m/z calcd for $C_{18}H_{17}N_5O_2$ [M+H]$^+$: 336.1455, found: 336.1457. HPLC: 99% ($t_R$=12.2 min).

3-(1H-Indazol-6-yl)-6-((tetrahydro-2H-pyran-4-yDoxy)imidazo[1,2-b]pyridazine 58, SRI-43266)

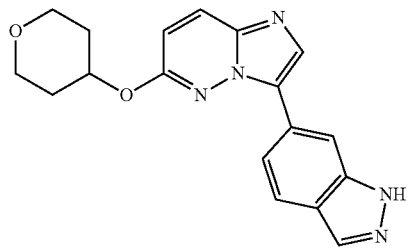 [SMILES: c1cc2cn[nH]c2cc1-c1cnc2ccc(OC3CCOCC3)nn12]

Step 1: 6-Chloro-3-(1H-indazol-6-yl)imidazo[1,2-b]pyridazine. This intermediate was prepared from 3-bromo-6-chloroimidazo[1,2-b]pyridazine and (1H-indazol-6-yl)boronic acid using Method B.

Step 2: The above intermediate was reacted with tetrahydro-2H-pyran-4-ol as described for the preparation of compound 57. Yield 58%. TLC $R_f$=0.35 (CHCl$_3$-MeOH, 9:1). $^1$H NMR (400 MHz, DMSO-d$_6$) δ 13.25 (s, 1H), 8.48-8.45 (m, 1H), 8.18 (s, 1H), 8.11-8.07 (m, 2H), 7.84 (dd, J=8.6, 0.8 Hz, 1H), 7.73 (dd, J=8.5, 1.4 Hz, 1H), 6.94 (d, J=9.6 Hz, 1H), 5.21 (tt, J=8.6, 4.1 Hz, 1H), 3.89 (dt, J=11.7, 4.4 Hz, 2H), 3.62 (ddd, J=11.9, 9.4, 2.8 Hz, 2H), 2.17 (dd, J=12.8, 3.4 Hz, 2H), 1.76 (dtd, J=13.1, 9.1, 4.1 Hz, 2H). HRMS m/z calcd for $C_{15}H_{17}N_5O_2$ [M+H]$^+$: 336.1455, found: 336.1458. HPLC: 95% ($t_R$=6.9 min).

Example 2: HuR Expression is Associated with Poor Prognosis for Glioma Patients

Figure 1B:
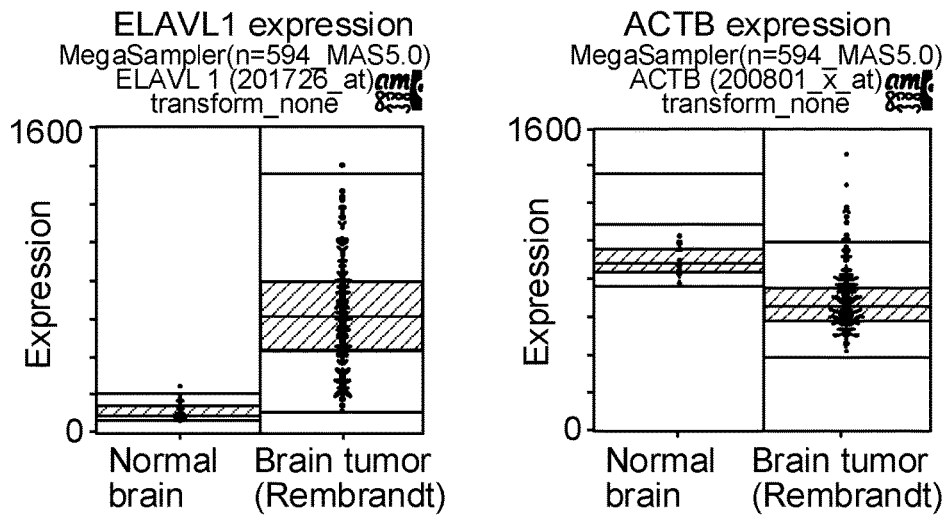
FIG. 1B is an illustration of ELAVL1 (left graph) and ACTB (as a control; right graph) mRNA expression in the brain tumor samples versus normal samples.
Figure 1C:
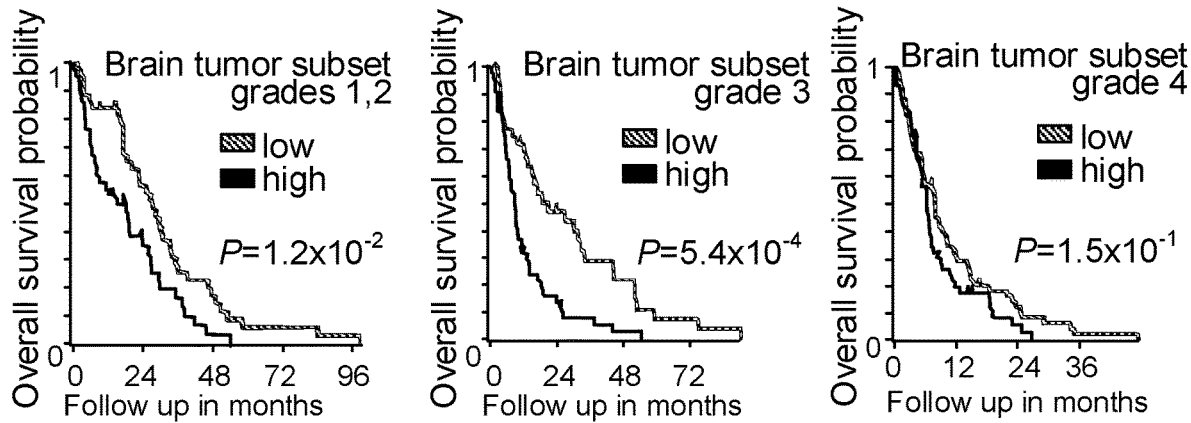
FIG. 1C is an illustration of Kaplan-Meier overall survival curves according to the tracks "high ELAVL1 expression" (indicated as "high") versus "low ELAVL1 expression" (indicated as "low") for tumor subsets of grades 1-2 (left graph), grade 3 (middle graph) and grade 4 (right graph).
Figure 1D:
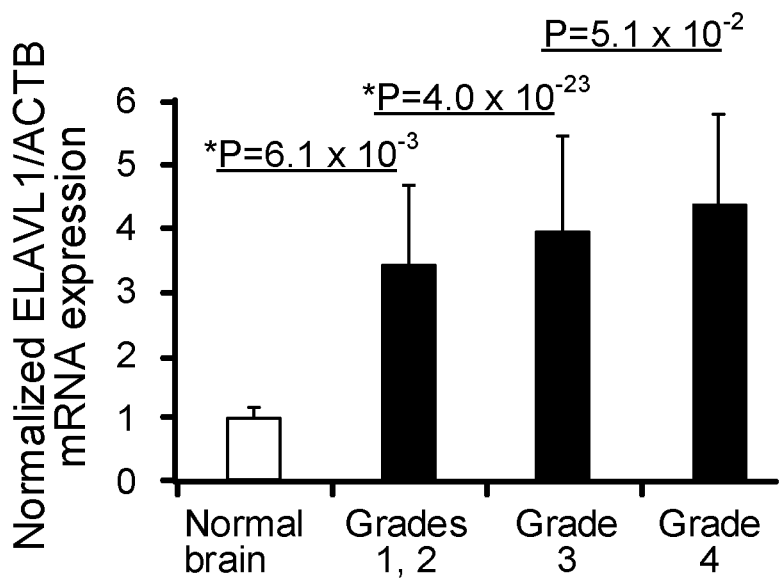
FIG. 1D is an illustration of the enhancement of ELAVL1/ACTB mRNA ratios with the increase of the brain tumor grade with results shown as mean±SD.
Figure 1E:
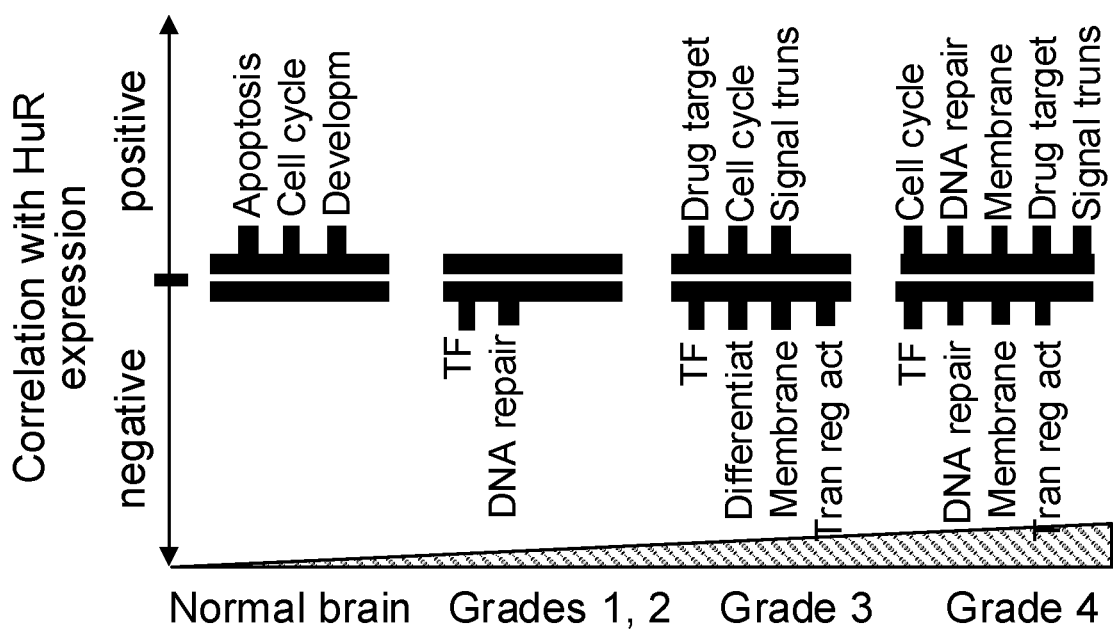
FIG. 1E is an illustration of the gene tests exhibiting significant positive or negative correlations with the ELAVL1 expression for normal brain and grades 1-4 tumors.

The clinical outcomes of glioma patients harboring low or high expression of ELAVL1 (HuR) was analyzed by utilizing R2: Genomics Analysis and Visualization Platform (Jan Koster, Department of Oncogenomics, Academic Medical Center (AMC) Amsterdam, Netherlands). Low expression levels of ELAVL1 were associated with favorable prognosis (REMBRANDT Madhavan—550 MAS.5.0-u133p2 study) as shown in FIG. 1A; the expression levels of the ELAVL1 and ACTB (actin) as a control in the glioma samples (REMBRANDT Madhavan—550 MAS.5.0-u133p2 study) compared to the normal brain samples (N Brain 44 Harris study) are illustrated in FIG. 1B. There was significant ELAVL1 overexpression in the glioma group as compared to the normal brain group. Next, the influence of the ELAVL1 expression on the outcome of patients with different glioma grades was analyzed. ELAVL1 expression significantly impacted the prognoses of patients harboring World Health Organization (WHO) grades I, II, and III tumors and did not significantly affect the outcome of patients with WHO grade IV as illustrated in FIG. 1C. The ELAVL1 expression normalized to the ACTB expression in the tumors of different grades compared to the normal brain is shown in FIG. 1D. There was an increase in average ELAVL1 expression with higher tumor grade. Next, a mini ontology analysis of gene sets was performed, which exhibited significant positive or negative correlations with the ELAVL1 expression, for normal brain and for each tumor grade based on R2: platform data, see FIG. 1D. It was found that the low grade (I and II) and the high grade (III and IV) tumors harbored different ELAVL1-dependent gene sets and exhibited a different degree of ELAVL1 dependence. The increase in tumor grade was associated with an enhancement in the number of ELAVL1-dependent cell signaling pathways as shown in FIG. 1E. The expression of the gene set, which determines cell cycle progression, was not significantly correlated with ELAVL1 expression in low-grade tumors; however, it exhibited a strong positive correlation with ELAVL1 expression in grades III and IV.

Thus, data analysis verifies that ELAVL1 overexpression favors glioma progression, and its action is grade-dependent. Consequently, ELAVL1 targeting in high-grade gliomas offers a favorable benefit/risk ratio with identifiable gene sets for monitoring its activity.

Example 3: In Vitro Testing of Inhibitors Targeting HuR Protein for Oncogenic Disease Treatment The oncogenic activity of HuR is driven by subcellular localization into the cytoplasm and formation of multimers of HuR. To develop cell based assays to characterize the ability of small molecules to disrupt this process, a split luciferase assay detecting the formation of HuR dimers was developed. The assays were performed in 96 well plates with clear bottom (Corning Inc., Corning, NY). Cells with designed constructs (30,000-50,000 in number) were plated per well; the constructs were induced by doxycycline (0.75 ug/ml) for 48 hours. The evaluated compounds at different concentrations and the corresponding vehicle as the control were administered for 6 hours. The luminescence signals were detected by using InfinitiM200 plate reader (TECAN, Morrisville, NC) in the presence of the luciferase substrate luciferin (D-Luciferin, potassium salt), which was purchased from GoldBio (St Louis, MO). A multichannel pipette (XL 3000I™, Denville Scientific, South Plainfield, NJ) was used in all procedures to ensure the experiment quality.

Experimental Details

Computational Docking Study

Computational docking study was performed to investigate the binding mode of SRI-42127 compound at HuR (see details in the Table 9). SRI-42127 was docked to HuR via the induced-fit docking protocol.

Cell Cycle Analysis

Cell cycle distribution was evaluated using a standard staining procedure with propidium iodide (PI) (Sigma-Aldrich; St. Louis, MO) followed by flow cytometry. For cell cycle analysis, cells were plated at low density and synchronized by starvation in serum-free media for 48 hours, then treated with drug or vehicle (control) for 18 hours in normal media with 10% serum. Next, cells were collected, washed, and resuspended in ice-cold phosphate buffered saline (PBS). Cells were fixed under gentle vortexing by dropwise addition of a 10×volume of ice-cold 80% ethanol (−20° C.) on ice. Subsequently, samples were stored at −20° C. for at least 18 hours until data acquisition. Before cell cycle analysis, cells were washed in PBS and treated with RNase A (200 μg/mL, in PBS) and PI (20 μg/mL) for 45 minutes at 23° C. Acquisition of at least 10000 events per sample was performed in UAB Flow Cytometry Facility. Data were analyzed by FlowJo v10 software (Becton, Dickinson and Company; Franklin Lakes, NJ).

Cell Viability Assay

PrestoBlue cell viability reagent (ThermoFisher Scientific; Waltham, MA) was used for cell viability assays. The inhibitory dose-response data were normalized to the control (treatment with vehicle); the inhibitory dose-response curves, which were fitted by using Boltzmann equation, and the corresponding $IC_{50}$s were generated by using OriginPro software (OriginLab Corporation, CA).

Immunohistochemistry

At the end of experiments, neurons and astrocytes were rinsed briefly with PBS and fixed by using 4% paraformaldehyde, pH 7.4 for 13 minutes at room temperature. Triton X-100 (0.3%) in PBST buffer (i.e., PBS with 0.1% Tween 20) was used for cell permeabilization for 30 minutes at room temperature. Cells were rinsed with PBST buffer 3 times for 10 minutes after fixation. Blocking buffer (3% BSA, 22.52 mg/ml glycine in PBST) was used to block unspecific antibody binding for 30 minutes at room temperature. Primary cleaved caspase 3 antibody (Cell Signaling Technology; Danvers, MA) at 1:200 dilution in PBST buffer with 1% BSA was utilized overnight at 4° C. for cleaved caspase 3 staining. The next day, cells were rinsed four times for 10 minutes with PBST buffer and then were incubated with secondary antibody (Alexa Fluor 594, goat anti-rabbit IgG, Invitrogen (Carlsbad, CA), 1:2000/5000 dilution) in PBST buffer with 1% BSA for 1 hour at room temperature in the dark. Next, cells were rinsed with PBST buffer 4 times for 10 minutes in the dark. Cell nucleus were stained with DAPI (4',6-diamidino-2-phenylindole). Cell images were obtained with EVOS Fl (Life Technologies; Eugene, OR) imaging system.

The immunostaining on the brain tissue (fixed in paraformaldehyde, 4%) was performed. Briefly, tissue was permeabilized with 0.5% Triton X-100 in PBST buffer for 30 minutes, followed by three times wash with PBST and blocking with the Universal blocking buffer for 30 minutes. Then BEAT" Blocker kit purchased from Zymed Laboratories (Carlsbad, CA) was utilized to block unspecific antibody binding to endogenous mouse IgG. The primary antibodies anti-HuR from Santa Cruz Biotechnology (1:100; Santa Cruz, CA), anti-Bcl2 from Santa Cruz Biotechnology (1:50), and anti-Mcl1 (1:100) from Cell Signaling Technology were utilized overnight at 4° C. in PBS (1% BSA) buffer. After washing the primary antibodies three times, the corresponding secondary antibodies Alexa Fluor 594 Goat anti-rabbit IgG (1:1000) from Invitrogen or Alexa Fluor 594 Donkey anti-mouse IgG (1:1500) from Life Technologies (Eugene, OR) were utilized in PBS (3% BSA) buffer for 1 hour at room temperature, followed by washing with PBST buffer four times. DAPI was utilized for nuclear staining. The fluorescence signal was calibrated based on the secondary-only and primary-only control staining.

Western Blotting, Antibodies, Nuclear and Cytoplasmic Protein Fractionations

Western blotting was performed. Nuclear and cytoplasmic protein fractionations were performed using NE-PER Nuclear and Cytoplasmic extraction reagents (ThermoFisher Scientific). Anti-lamin A/C and anti-Tubulin alpha antibodies were utilized to verify nuclear and cytoplasmic fractions, respectively. Antibodies against lamin A/C, cleaved PARP, cleaved caspase 3, SOX2, and Mcl1 were purchased from Cell Signaling Technology (Danvers, MA). Anti-Tubulin alpha antibody was purchased from Sigma-Aldrich. Antibodies against HuR, actin, and Bcl2 were purchased from Santa Cruz Biotechnology (Santa Cruz, CA). Polyclonal anti-HuR antibody for HuR/mRNA co-immunoprecipitation was purchased from MBL International (Woburn, MA).

HuR/mRNA Co-Immunoprecipitation Assay and Taqman Data

The HuR-mRNA co-immunoprecipitation (IP) was performed by utilizing RiboCluster Profiler RIP-assay Kit (MBL International). The quantifications of Bcl2, and 18S transcripts were performed using Taqman technique with the following gene-specific probes: Hs00153350_m1, Hs03003631_g1, and Hs00766187_m1 (ThermoFisher Scientific) for Bcl2, 18S, and Mcl1, respectively.

mRNA Isolation from Adherent Cell Culture mRNA isolation and purification from adherent cells were performed using RNeasy Mini Kit and QIAshredder columns (Qiagen, Valencia, CA).

Colony Formation Assays

The soft agar colony formation assay was performed by using 0.9% and 0.45% agarose for the bottom and the top layers, respectively; cells were incorporated in the top layer. Seaplaque low-melting temperature agarose was purchased from Lonza (Rockland, ME). Five hundred cells per well were utilized in both, the soft agar and the attached colony formation assays, which were performed in 6 well plates; cells were treated with vehicle as the control or with the desired drugs, which were administered twice per week for three weeks. The Crystal violet solution (0.1%) was utilized for colony staining in both assays. The colonies were counted after three weeks of treatment; the plate images were obtained by using Amersham Imager-600 reader (Piscataway, NJ).

Illumina Global RNA-Sequencing Data

Illumina global RNA-sequencing data were generated by utilizing PDGx neurospheres, which have been treated with a compound as described herein (e.g., SRI-42127, 3 uM) for 12 hours or with vehicle as the control. RNA was isolated by using TRIzol reagent (Invitrogen; Carlsbad, CA). The RNA samples were processed.

Proteomic Data

The cell pellets from PDGx neurospheres, which have been treated with a compound as described herein (e.g., SRI-42127, 3 uM) for 18 hours or with vehicle as the control, were processed in the UAB CCC Mass Spectrometry/Proteomics shared facility. The proteomic data were generated by using standard procedures.

Kinase Profiling Assays

The kinase inhibitory potentials of compounds as described herein (e.g., SRI-42127 and SRI-41664) were evaluated by ThermoFisher Scientific's SelectScreen™ Kinase Profiling Service. The following kinase inhibitory assays were utilized: ZLYTE (Madison, WI) for NTRK1, PIM1, and cMET kinases; LanthaScreen Binding (Madison, WI) for AAK1 kinase; and Adapta (Madison, WI) for IRAK1 kinase.

In Vivo Mouse Glioma Model

The athymic nude mice and PDGx XD456 tumor cells transduced with the firefly luciferase and EGFP constructs were utilized for the in vivo mouse glioma model.

Pharmacokinetic (PK) Assessment

The in vivo PK study for SRI-42127 was performed by Pharmaron (Beijing, China); pharmacokinetics were evaluated in the C57Bl/6 mice.

Statistical Analysis

Statistical interpretations of cell cycle data, immunohistochemistry data, HuR/mRNA co-immunoprecipitation data, mRNA gene-specific quantitative data, western blotting data, colony formation data, cell viability data, results from in vivo experiments, transcript-specific data utilized in the enrichment analysis and the direct HuR mRNA target analysis were achieved by using a Student's t test (when only two groups of data were analyzed) and one-way ANOVA with Turkey's post hoc test (when multiple data groups were analyzed). Correlation analysis was performed using Pearson's correlation. The results are shown as the mean±SD; P values less than 0.05 were considered to be statistically significant.

Assays

Figure 2A:
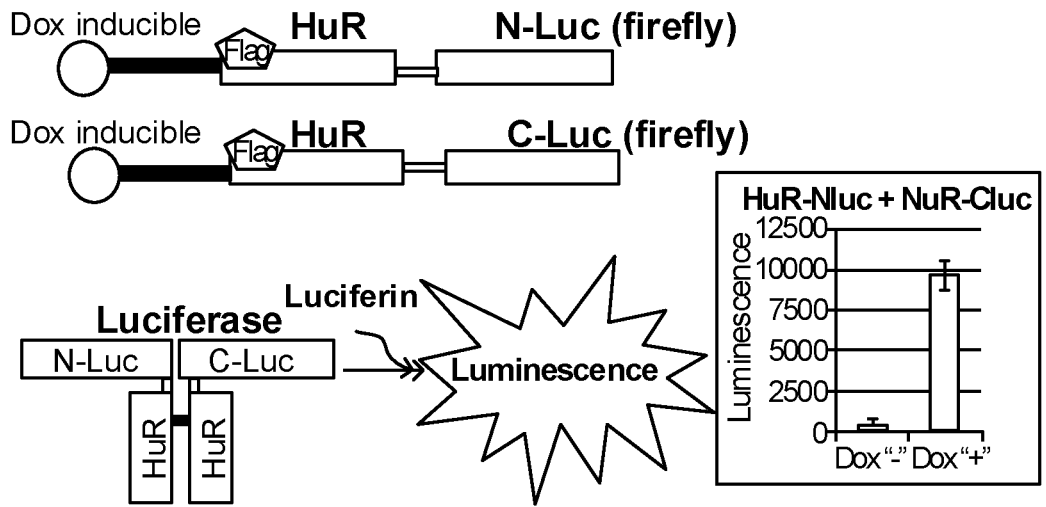
FIG. 2A is an illustration of a cell-based assay used herein.
Figure 2B:
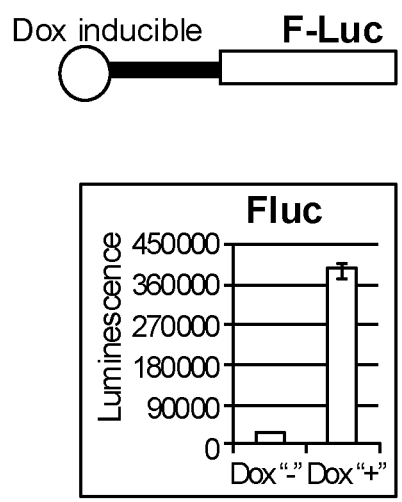
FIG. 2B is an illustration of the control portion of a cell-based assay used herein.

The assay used the coding sequence of HuR in frame with the N-terminus of firefly luciferase or the C-terminus as depicted in FIG. 2A. When HuR forms dimers in this case, luciferase is generated and with luciferin present, luminescence is generated. A control is demonstrated in FIG. 2B.

The assay was used to determine the HuR $IC_{50}$ (µM) of the compounds, as reported in the tables below, along with solubility at pH 7.4, Log D at pH 7.4, Mouse liver microsomal stability in vitro, and Human liver microsomal stability in vitro.

TABLE 1

Imidazo[1,2-b]pyridazines possessing various aryl substituents at the 3-position

| Compd # | SRI # | $R_1$ | $R_2$ | Ar | HuR $IC_{50}$ (µM) | Sol @ pH 7.4 (µM) | Log D (pH 7.4) | MLM $t_{1/2}$ (min)$^a$ | HLM $t_{1/2}$ (min)$^b$ |
|---|---|---|---|---|---|---|---|---|---|
| 6 | 41659 | tetrahydropyran | H | 4-(methylsulfonyl)phenyl | >30 | —$^c$ | — | — | — |
| 7 | 41660 | tetrahydropyran | H | 2-(hydroxymethyl)phenyl | >100 | — | — | — | — |
| 8 | 41662 | tetrahydropyran | H | pyridinyl | >30 | — | — | — | — |
| 9 | 41663 | tetrahydropyran | H | 3-acetamidophenyl | >30 | — | — | — | — |

TABLE 1-continued

Imidazo[1,2-b]pyridazines possessing various aryl substituents at the 3-position

| Compd # | SRI # | R₁ | R₂ | Ar | HuR IC$_{50}$ (μM) | Sol @ pH 7.4 (μM) | Log D (pH 7.4) | MLM t$_{1/2}$ (min)[a] | HLM t$_{1/2}$ (min)[b] |
|---|---|---|---|---|---|---|---|---|---|
| 10 | 41665 | tetrahydropyran | H | benzofuran-5-yl | >30 | — | — | — | — |
| 11 | 42220 | tetrahydropyran | H | phenyl | 18 | — | — | — | — |
| 12 | 42986 | tetrahydropyran | H | quinoxalin-6-yl | 12 | — | — | — | — |
| 13 | 42916 | tetrahydropyran | CH₃ | 1H-indol-6-yl | 28 | 12.8 | 2.2 | 5.6 | 6.8 |
| 14 | 42917 | tetrahydropyran | CH₃ | phenyl | 23 | 45.8 | 2.4 | 5.1 | 10 |
| 15 | 41661 | cyclohexyl | H | 4-methoxyphenyl | >30 | — | — | — | — |
| 16 | 43935 | propyl | CH₃ | 4-(dimethylamino)pyridin-2-yl | >50 | — | — | — | — |
| 17 | 43936 | propyl | CH₃ | isoquinolin-5-yl | >50 | — | — | — | — |
| 18 | 43937 | tetrahydropyran | CH₃ | imidazo[1,2-a]pyridin-6-yl | 3 | — | — | — | — |

[a]Mouse liver microsomal stability in vitro. [b]Human liver microsomal stability in vitro. [c]A — symbol denotes that the compound was not tested.

TABLE 2

Imidazo[1,2-b]pyridazines possessing 6-indazolyl and related substituents[a]

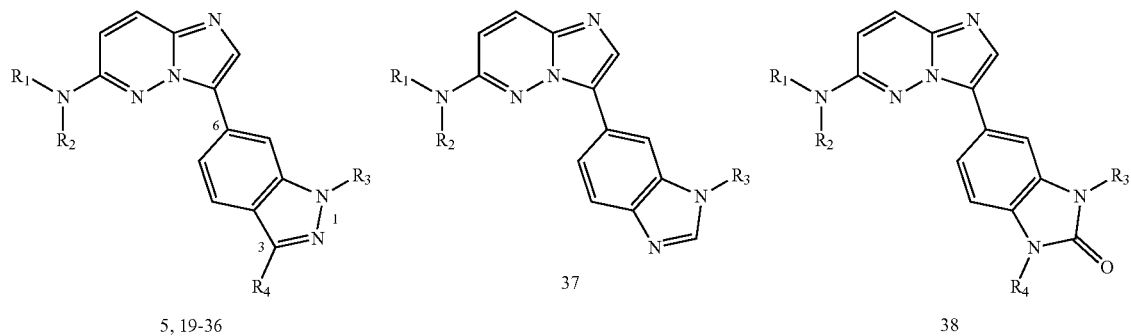

5, 19-36

37

38

| Compd # | SRI # | R$_1$ | R$_2$ | R$_3$ | R$_4$ | HuR IC$_{50}$ (μM) | Sol @ pH 7.4 (μM) | Log D (pH 7.4) | MLM t$_{1/2}$ (min) | HLM t$_{1/2}$ (min) |
|---|---|---|---|---|---|---|---|---|---|---|
| 5 | 41664 | tetrahydropyran-4-yl | H | H | H | 2.4 | 12.4 | 3.0 | 3.7 | 15.7 |
| 19 | 42127 | tetrahydropyran-4-yl | CH$_3$ | H | H | 1.5 | 2.4 | 3.1 | 3.3 | 8.6 |
| 20 | 43372 | tetrahydropyran-4-yl | H | CH$_3$ | H | 1.2 | 79.6 | 2.9 | 8.1 | 11.6 |
| 21 | 43369 | tetrahydropyran-4-yl | CH$_3$ | CH$_3$ | H | 3.4 | — | — | — | — |
| 22 | 42719 | cyclohexyl | CH$_3$ | H | H | 9 | 0.1 | 4.7 | 13.8 | 16.2 |
| 23 | 43413 | 4,4-difluorocyclohexyl | H | H | H | 2.8 | 2.1 | >4.23 | 3.9 | 27.3 |
| 24 | 43175 | sec-butyl | CH$_3$ | H | H | 2.2 | 10.9 | >4.18 | 3.1 | 9.7 |
| 25 | 42918 | 1-methylpiperidin-4-yl | CH$_3$ | H | H | >50 | 73.3 | 1.8 | 6.2 | 22.6 |
| 26 | 43566 | tetrahydropyran-4-yl | sec-butyl | H | H | >50 | — | — | — | — |
| 27 | 43499 | tetrahydropyran-4-yl | sec-butyl | H | H | >50 | 65.3 | 0.4 | 9.8 | >300 |

TABLE 2-continued

Imidazo[1,2-b]pyridazines possessing 6-indazolyl and related substituents[a]

| Compd # | SRI # | R₁ | R₂ | R₃ | R₄ | HuR IC$_{50}$ (μM) | Sol @ pH 7.4 (μM) | Log D (pH 7.4) | MLM t$_{1/2}$ (min) | HLM t$_{1/2}$ (min) |
|---|---|---|---|---|---|---|---|---|---|---|
| 28 | 43568 | tetrahydropyran-4-yl | cyclopropylmethyl | H | H | >50 | 62.3 | 0.6 | 9.1 | 96.4 |
| 29 | 43753 | 4,4-difluorocyclohexyl | CH₃ | H | H | Insoluble[b] | 77.3 | 0.9 | 15.3 | 82.8 |
| 30 | 43411 | sec-butyl | CH₃ | CH₃ | H | 2.2 | 2.5 | >4.55 | 1.3 | 7.9 |
| 31 | 43371 | tetrahydropyran-4-yl | H | H | CH₃ | >50 | — | — | — | — |
| 32 | 43264 | tetrahydropyran-4-yl | CH₃ | H | CH₃ | >50 | <1 | >4.35 | 7.3 | 9.0 |
| 33 | 43263 | sec-butyl | CH₃ | H | CH₃ | 25 | — | — | — | — |
| 34 | 43496 | tetrahydropyran-4-yl | H | CH₃ | CH₃ | 40 | — | — | — | — |
| 35 | 43370 | tetrahydropyran-4-yl | CH₃ | CH₃ | CH₃ | >50 | — | — | — | — |
| 36 | 43412 | sec-butyl | CH₃ | CH₃ | CH₃ | >50 | — | — | — | — |
| 37 | 43373 | tetrahydropyran-4-yl | CH₃ | H | — | 8 | 58.4 | 2.1 | 2.5 | 18.8 |

TABLE 2-continued

Imidazo[1,2-b]pyridazines possessing 6-indazolyl and related substituents[a]

Structures: 5, 19-36 ; 37 ; 38

| Compd # | SRI # | R₁ | R₂ | R₃ | R₄ | HuR IC$_{50}$ (μM) | Sol @ pH 7.4 (μM) | Log D (pH 7.4) | MLM t$_{1/2}$ (min) | HLM t$_{1/2}$ (min) |
|---|---|---|---|---|---|---|---|---|---|---|
| 38 | 43938 | tetrahydropyran-4-yl | CH₃ | H | H | 50 | 7.1 | 2.5 | 21.4 | 41 |

[a]See footnotes to Table 1. [b]Compound did not provide a clear solution in the assay medium.

TABLE 3

Imidazo[1,2-b]pyridazines possessing 5-indazolyl and related substituents[a]

Structures: 39-50, 53, 54 ; 51, 52, 57 ; 55, 56

| Compd # | SRI # | R₁ | R₂ | R₃ | R₄ | HuR IC$_{50}$ (μM) | Sol @ pH 7.4 (μM) | Log D (pH 7.4) | MLM t$_{1/2}$ (min) | HLM t$_{1/2}$ (min) |
|---|---|---|---|---|---|---|---|---|---|---|
| 39 | 43262 | tetrahydropyran-4-yl | H | H | H | 0.3 | 37.6 | 3.0 | 3.7 | 6.4 |
| 40 | 43265 | tetrahydropyran-4-yl | CH₃ | H | H | 0.3 | 4.7 | 2.9 | 1.8 | 6.6 |
| 41 | 43497 | tetrahydropyran-4-yl | H | CH₃ | H | 50 | — | — | — | — |
| 42 | 43494 | tetrahydropyran-4-yl | CH₃ | CH₃ | H | 50 | — | — | — | — |

TABLE 3-continued

Imidazo[1,2-b]pyridazines possessing 5-indazolyl and related substituents[a]

39-50, 53, 54

51, 52, 57

55, 56

| Compd # | SRI # | R₁ | R₂ | R₃ | R₄ | HuR IC₅₀ (μM) | Sol @ pH 7.4 (μM) | Log D (pH 7.4) | MLM t₁/₂ (min) | HLM t₁/₂ (min) |
|---|---|---|---|---|---|---|---|---|---|---|
| 43 | 43498 | tetrahydropyran-4-yl | H | CH₃ | CH₃ | Insoluble | — | — | — | — |
| 44 | 43495 | tetrahydropyran-4-yl | CH₃ | CH₃ | CH₃ | Insoluble | — | — | — | — |
| 45 | 43647 | 2,2-dimethyltetrahydropyran-4-yl | H | H | H | 1.1 | 3.4 | >4.06 | 8.7 | 7.2 |
| 46 | 43752 | 4,4-difluorocyclohexyl | H | H | H | 2.1 | 1.0 | >4.16 | 4.4 | 11.5 |
| 47 | 43939 | benzyl (CH₂Ph) | H | H | H | 3.0 | — | — | — | — |
| 48 | 42987 | n-propyl | H | H | H | 0.7 | 3.2 | 3.5 | 2.2 | 6.1 |
| 49 | 43184 | n-propyl | CH₃ | H | H | 0.6 | 8.8 | 3.6 | 2.5 | 6.3 |
| 50 | 43751 | 3,3,3-trifluoropropyl | H | H | H | 0.19 | 2.6 | >4.15 | 2.6 | 12.1 |
| 51 | 43648 | morpholinyl | — | H | H | 7.0 | 51.5 | 2.0 | 7.8 | 13.3 |

TABLE 3-continued

Imidazo[1,2-b]pyridazines possessing 5-indazolyl and related substituents[a]

Structures: 39-50, 53, 54; 51, 52, 57; 55, 56

| Compd # | SRI # | R₁ | R₂ | R₃ | R₄ | HuR IC$_{50}$ (µM) | Sol @ pH 7.4 (µM) | Log D (pH 7.4) | MLM t$_{1/2}$ (min) | HLM t$_{1/2}$ (min) |
|---|---|---|---|---|---|---|---|---|---|---|
| 52 | 43940 | piperazinyl | — | H | H | 8.0 | 84.4 | 2.2 | 2.1 | 8.9 |
| 53 | 44048 | propyl | CH₃ | H | COCH₃ | 6.0 | <1 | >4.48 | 1.3 | 6.3 |
| 54 | 44049 | tetrahydropyranyl | CH₃ | H | COCH₃ | >50 | <1 | 3.5 | 2.5 | 5.9 |
| 55 | 44000 | tetrahydropyranyl | CH₃ | H | H | 1.2 | 71 | 2.6 | 3.2 | 15.8 |
| 56 | 44001 | propyl | CH₃ | H | H | 0.8 | 4 | 3.5 | 1.4 | 3.5 |
| 57 | 44002 | O-tetrahydropyranyl | — | H | H | 2 | 3.3 | 3.1 | 1.9 | 10.6 |

[a] See footnotes to Tables 1 and 2.

Compounds 39 and 40 are 5-indazolyl analogues of the 6-indazolyl compounds 5 and 19, respectively. These two 5-indazolyl analogues displayed IC$_{50}$ values of 0.3 µM and are 5-8-fold more potent than the 6-indazolyl isomers. Among matched pairs, the 5-indazolyl isomers in general were more potent than the 6-indazolyl isomers. In the 6-indazolyl series, a methyl group at the 3-position (compounds 31 and 32) is not tolerated. Thus, in some cases, the compound is not an imidazo[1,2-b]pyridazine with a methyl group at the 3-position. In some examples, the compound is not compound 31 or compound 32. Not wishing to be bound by theory, it is likely that the placement of a methyl group at the 1-position of the 5-indazolyl system (compounds 41 and 42) is similarly not tolerated indicating a similar binding mode and steric encumbrance at the target site. Thus, in some examples, the compound is not compound 41 or compound 42. In the 5-indazoly series, compounds that displayed potent activity include 45, 48-50 possessing dimethylpyranylamino-, propylamino-, N-methylpropylamino- and trifluoroethylamino substituent at the 6-position of the imazopyridazine moiety. The 4,4-difluorocyclohexylamino substituent appears to be tolerated in both 6-indazolyl (compound 23, Table 2) and 5-indazolyl (compound 46, Table 3) series. Cyclic amine substituents such as morpholino (compound 51) or 4-methylpiperazino (52) led to reduction in HuR inhibition potency. Introduction of nitrogen on the 5-indazolyl unit at the 7-position is tolerated, as indicated by the activity of the compounds 55 and 56 (Table 3). A non-amino ether substituent such as the pyranyloxy substituent in both 5-indazolyl (57, Table 3) and 6-indazolyl systems (58) are tolerated yielding compounds with inhibition potencies of 2 µM and 3 µM, respectively.

Compounds that were identified as HuR inhibitors with IC$_{50}$ of less than 10 micromolar (uM) are listed in Table 4 and Table 5.

TABLE 4

| | | | | HuR N/C Imax % Inh | Fluc Imax % Inh | HuR IC$_{50}$ (uM) |
|---|---|---|---|---|---|---|
| Structure | SRI ID | MW | Concn | | | |
| | SRI-41664 | 334.4 | 50 uM | 93% | 38% | 2.4 |
| | SRI-41964 | 402.4 | 50 uM | 93% | 32% | 4.5 |
| | SRI-42125 | 336.4 | 50 uM | 85% | 36% | 5 |
| | SRI-42127 | 348.4 | 50 uM | 90% | 26% | 1.2 |
| | SRI-42719 | 346.4 | 50 uM | 93% | 32% | 9 |

TABLE 4-continued

| HuR inhibitors with IC$_{50}$ < 10 uM | | | | | | |
|---|---|---|---|---|---|---|
| Structure | SRI ID | MW | Concn | HuR N/C Imax % Inh | Fluc Imax % Inh | HuR IC$_{50}$ (uM) |
| | SRI-42987 | 292.3 | 50 uM | 90% | 29% | 0.7 |
| | SRI-43175 | 306.4 | 100 uM | 93% | 10% | 2.2 |
| | SRI-43184 | 306.4 | 100 uM | 89% | 12% | 0.6 |
| | SRI-43262 | 334.4 | 25 uM | 94% | 28% | 0.3 |
| | SRI-43265 | 348.4 | 25 uM | 90% | 23% | 0.3 |

TABLE 4-continued
HuR inhibitors with IC$_{50}$ < 10 uM
| Structure | SRI ID | MW | Concn | HuR N/C Imax % Inh | Fluc Imax % Inh | HuR IC$_{50}$ (uM) |
|---|---|---|---|---|---|---|
| 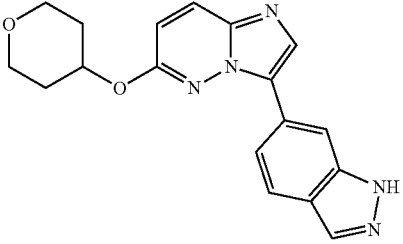 [SMILES: c1cc2cn[nH]c2cc1-c1cnc2ccc(OC3CCOCC3)nn12] | SRI-43266 | 335.4 | 50 uM | 82% | 23% | 3 |
| 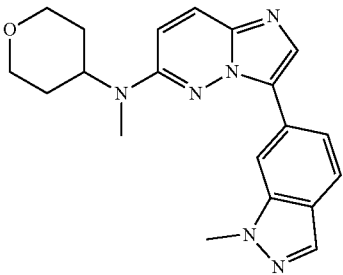 [SMILES: CN(c1ccc2ncc(-c3ccc4cnn(C)c4c3)n2n1)C1CCOCC1] | SRI-43369 | 362.4 | 50 uM | 71% | 28% | 3.4 |
| 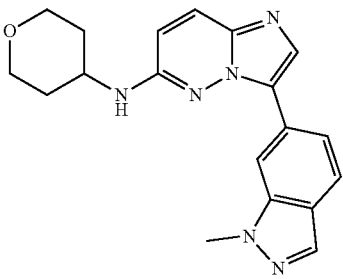 [SMILES: Cn1ncc2ccc(-c3cnc4ccc(NC5CCOCC5)nn34)cc21] | SRI-43372 | 348.4 | 50 uM | 93% | 35% | 1.2 |
| 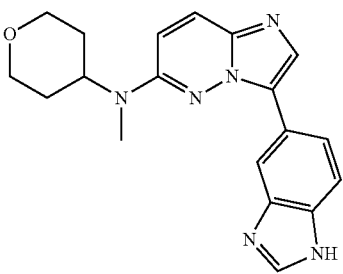 [SMILES: CN(c1ccc2ncc(-c3ccc4[nH]cnc4c3)n2n1)C1CCOCC1] | SRI-43373 | 348.4 | 50 uM | 87% | 14% | 8 |
| 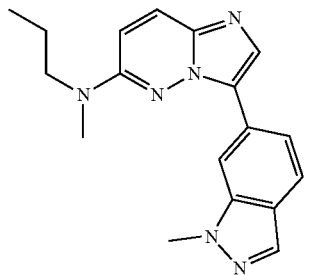 [SMILES: CCCN(C)c1ccc2ncc(-c3ccc4cnn(C)c4c3)n2n1] | SRI-43411 | 320.4 | 50 uM | 91% | 36% | 2.2 |

TABLE 4-continued
HuR inhibitors with IC$_{50}$ < 10 uM
| Structure | SRI ID | MW | Concn | HuR N/C Imax % Inh | Fluc Imax % Inh | HuR IC$_{50}$ (uM) |
|---|---|---|---|---|---|---|
| 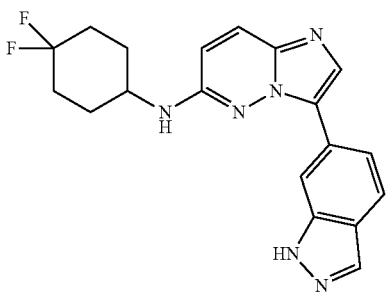 [SMILES: FC1(F)CCC(Nc2ccc3ncc(-c4ccc5cn[nH]c5c4)n3n2)CC1] | SR1-43413 | 368.4 | 50 uM | 92% | 39% | 2.8 |
| 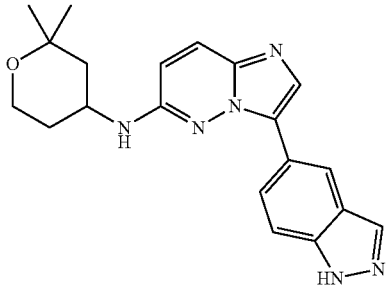 [SMILES: CC1(C)CC(Nc2ccc3ncc(-c4ccc5[nH]ncc5c4)n3n2)CCO1] | SRI-43647 | 362.4 | 50 uM | 92% | 25% | 1.1 |
| 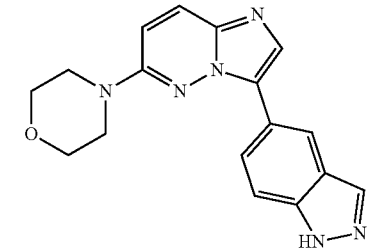 [SMILES: c1cc2[nH]ncc2cc1-c1cnc2ccc(N3CCOCC3)nn12] | SRI-43648 | 320.4 | 50 uM | 87% | 27% | 7 |
| 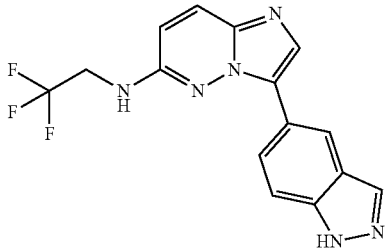 [SMILES: FC(F)(F)CNc1ccc2ncc(-c3ccc4[nH]ncc4c3)n2n1] | SRI-43751 | 332.3 | 50 uM | 93% | 26% | 0.19 |
| 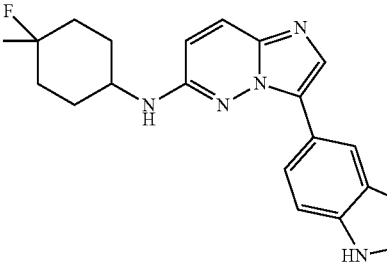 | SRI-43752 | 368.4 | 50 uM | 91% | 17% | 2.1 |

TABLE 4-continued
HuR inhibitors with IC$_{50}$ < 10 uM
| Structure | SRI ID | MW | Concn | HuR N/C Imax % Inh | Fluc Imax % Inh | HuR IC$_{50}$ (uM) |
|---|---|---|---|---|---|---|
| 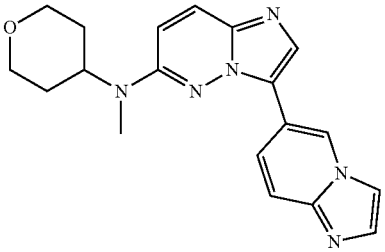 [SMILES: CN(c1ccc2ncc(-c3ccc4nccn4c3)n2n1)C1CCOCC1] | SRI-43937 | 348.4 | 50 uM | 89% | 6% | 3 |
| 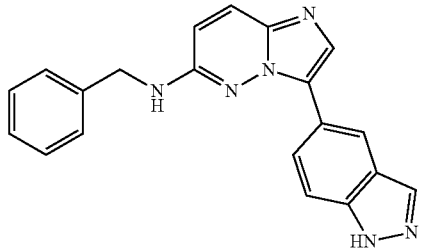 [SMILES: c1ccc(CNc2ccc3ncc(-c4ccc5[nH]ncc5c4)n3n2)cc1] | SRI-43939 | 340.4 | 50 uM | 93% | 24% | 3 |
| 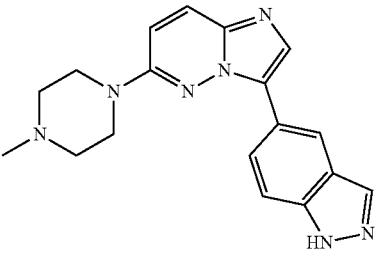 [SMILES: CN1CCN(c2ccc3ncc(-c4ccc5[nH]ncc5c4)n3n2)CC1] | SRI-43940 | 333.4 | 50 uM | 90% | 13% | 8 |
| 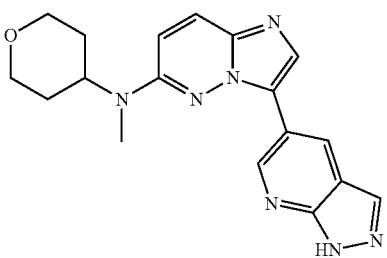 [SMILES: CN(c1ccc2ncc(-c3cnc4[nH]ncc4c3)n2n1)C1CCOCC1] | SRI-44000 | 349.4 | 50 uM | 90% | 10% | 1.2 |
| 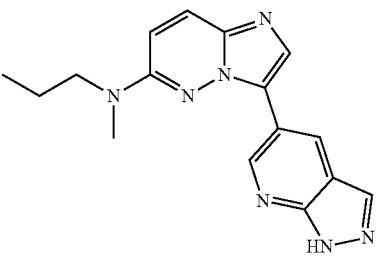 [SMILES: CCCN(C)c1ccc2ncc(-c3cnc4[nH]ncc4c3)n2n1] | SRI-44001 | 307.4 | 50 uM | 910/6 | 5% | 0.8 |

TABLE 4-continued
HuR inhibitors with IC$_{50}$ < 10 uM
| Structure | SRI ID | MW | Concn | HuR N/C Imax % Inh | Fluc Imax % Inh | HuR IC$_{50}$ (uM) |
|---|---|---|---|---|---|---|
| 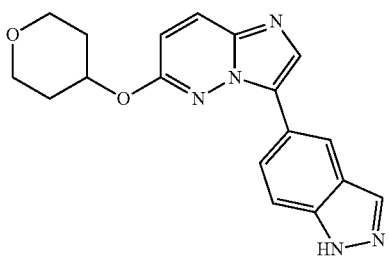 [SMILES: c1cc2[nH]ncc2cc1-c1cnc2ccc(OC3CCOCC3)nn12] | SRI-44002 | 335.4 | 50 uM | 89% | 12% | 2 |
| 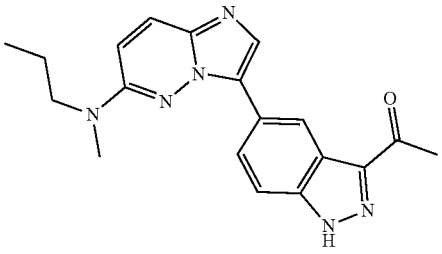 [SMILES: CCCN(C)c1ccc2ncc(-c3ccc4[nH]nc(C(C)=O)c4c3)n2n1] | SRI-44048 | 348.4 | 50 uM | 72% | 10% | 6 |
TABLE 5
HuR inhibitors with IC$_{50}$ > 10 uM
| Structure | SRI ID | MW | Concn (uM) | HuR N/C Imax % Inh | Fluc Imax % Inh | IC$_{50}$ (uM) |
|---|---|---|---|---|---|---|
| 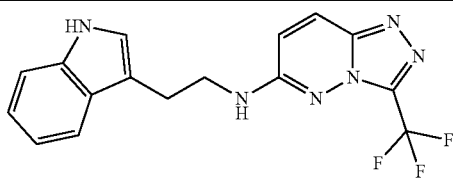 | 41639 | 346.3 | 100 | 49 | 17 | >100 |
| 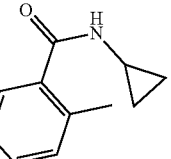 | 41646 | 498.6 | 100 | 3 | 15 | >100 |

TABLE 5-continued

HuR inhibitors with IC$_{50}$ > 10 uM

| Structure | SRI ID | MW | Concn (uM) | HuR N/C Imax % Inh | Fluc Imax % Inh | IC$_{50}$ (uM) |
|---|---|---|---|---|---|---|
| | 41647 | 421.5 | 50 | 89 | 4 | >25 |
| | 42123 | 271.7 | 50 | 0 | 0 | — |
| | 42124 | 416.4 | Insol | ND | ND | ND |
| | 42126 | 416.4 | Insol | ND | ND | ND |
| | 42219 | 297.2 | 50 | 82 | 32 | 20-22 |
| | 43183 | 269.7 | 100 | 76 | 20 | 25 |

TABLE 5-continued
HuR inhibitors with IC$_{50}$ > 10 uM
| Structure | SRI ID | MW | Concn (uM) | HuR N/C Imax % Inh | Fluc Imax % Inh | IC$_{50}$ (uM) |
|---|---|---|---|---|---|---|
| 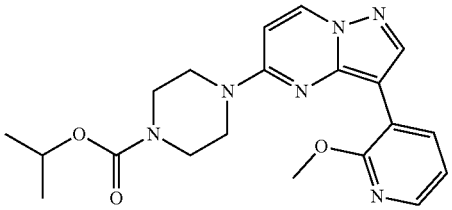 [SMILES: COc1ncccc1-c1cnn2ccc(N3CCN(C(=O)OC(C)C)CC3)nc12] | 43414 | 396.5 | 50 | 45 | 28 | >50 |
| 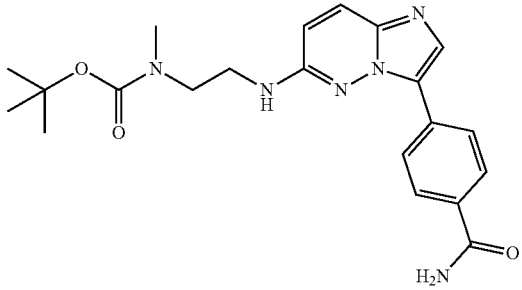 [SMILES: CN(CCNc1ccc2ncc(-c3ccc(C(N)=O)cc3)n2n1)C(=O)OC(C)(C)C] | 43415 | 410.5 | 50 | 57 | 9 | 40 |
| 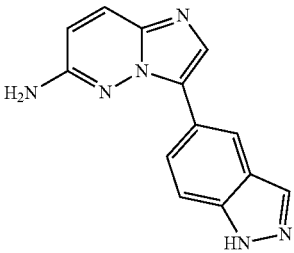 [SMILES: Nc1ccc2ncc(-c3ccc4[nH]ncc4c3)n2n1] | 43646 | 250.3 | Insol | — | — | — |
| 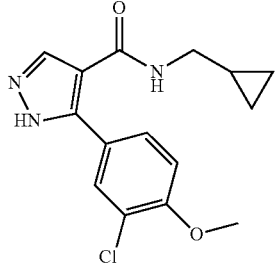 [SMILES: COc1ccc(-c2[nH]ncc2C(=O)NCC2CC2)cc1Cl] | 43649 | 305.8 | 50 | 0 | 0 | — |
| 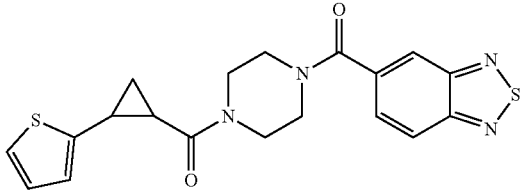 [SMILES: O=C(c1ccc2nsnc2c1)N1CCN(C(=O)C2CC2c2cccs2)CC1] | 43650 | 398.5 | 50 | 0 | 0 | — |

TABLE 5-continued

HuR inhibitors with IC$_{50}$ > 10 uM

| Structure | SRI ID | MW | Concn (uM) | HuR N/C Imax % Inh | Fluc Imax % Inh | IC$_{50}$ (uM) |
|---|---|---|---|---|---|---|
| | 43651 | 503.6 | 50 | 0 | 0 | — |
| | 43652 | 281.3 | 50 | 0 | 0 | — |
| | 43653 | 351.4 | 50 | 0 | 0 | — |
| | 43654 | 440.5 | 50 | 0 | 0 | — |
| | 43655 | 370.4 | 50 | 28 | 10 | >50 |

Figure 3:
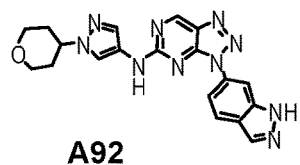
FIG. 3, Panel A shows the structure of compound A92 and a dose-response graph showing the inhibition of HuR dimerization for compound SRI-41964 (A-92).
Figure 3:
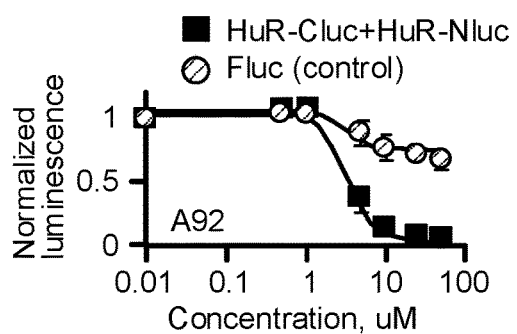
Figure 3:
Figure 3:
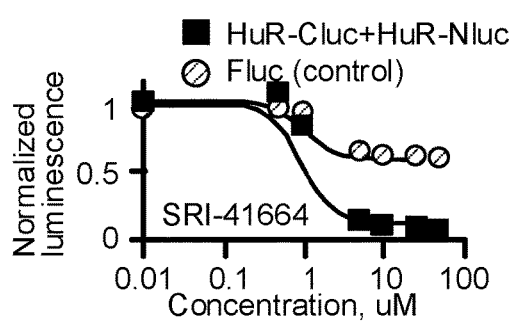
Figure 3:
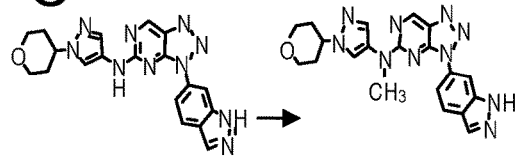
Figure 3:
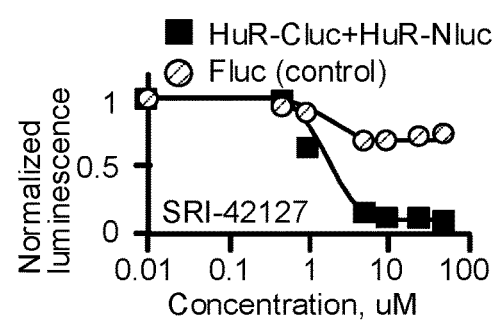

Some examples of the new class of inhibitors of HuR dimerization that prevent HuR oligomerization in cell-based split firefly luciferase—HuR assay are presented in FIG. 3. FIG. 3, Panel A represents dose-response of inhibition of HuR dimerization for Compound A-92 (SRI-41964), IC$_{50}$=4.5+0.5 uM (n=8), in a split firefly luciferease-HuR assay. Squares represent luminescence signal from reporter representing HuR dimers (U251 cells co-expressing HuR-Nluc and HuR-Cluc constructs); circles represent luminescence signal from control reporter (U251 cells expressing Fluc construct). Results are shown as mean+SD.

Specific and robust inhibition of the HuR dimerization (HuR-Cluc+HuR-Nluc) compared to the control (Fluc-full length luciferase) occurred following cell treatment for 6 hours with Compound A-92, IC$_{50}$=4.5±0.5 uM (n=8). The maximum inhibition of HuR dimerization was 93±2% (n=8) after 6 hours of cell treatment. The luminescence signal from cells overexpressing the control Fluc construct decreased by 32±7% (n=8) following treatment with Compound A-92; this value represents the cytotoxic effect of Compound A-92 over a period of 6 hours.

Next, optimization of A-92 was performed. First, the A-92 compound was resynthesized and renamed as SRI-41964. SRI-41964 exhibited identical chemical and HuR inhibitory properties ($IC_{50}$=4.5 uM) as the original compound A-92. Medicinal chemistry was employed and the cell-based split firefly luciferase—HuR assay for compound optimization resulting in the generation SRI-41664 as illustrated in FIG. 3, Panel B. SRI-41664 exhibited improved HuR inhibition potency as well as improved aqueous solubility compared to the compound SRI-41964 due to the following structural modifications: i) the excision of a pyrazole ring from SRI-41964 yielding SRI-42125 with improved aqueous solubility but HuR inhibition potency similar to that of the original compound, ii) a scaffold hop of the triazolopyrimidine template of SRI-42125 to an equivalent 5-6-fused imidazopyridazine template. SRI-41664 inhibited HuR oligomerization with an $IC_{50}$=2.4±0.2 uM (n=6) in cell-based assay after 6 hours of treatment as illustrated in FIG. 3, Panel B. The maximum inhibition of HuR dimerization was 93±1% (n=6) after 6 hours of cell treatment with the SRI-41664 compound. The luminescence signal from cells overexpressing the control Fluc construct decreased by 38±5% (n=6) after cell treatment with SRI-41664 for 6 hours.

Figure 4:
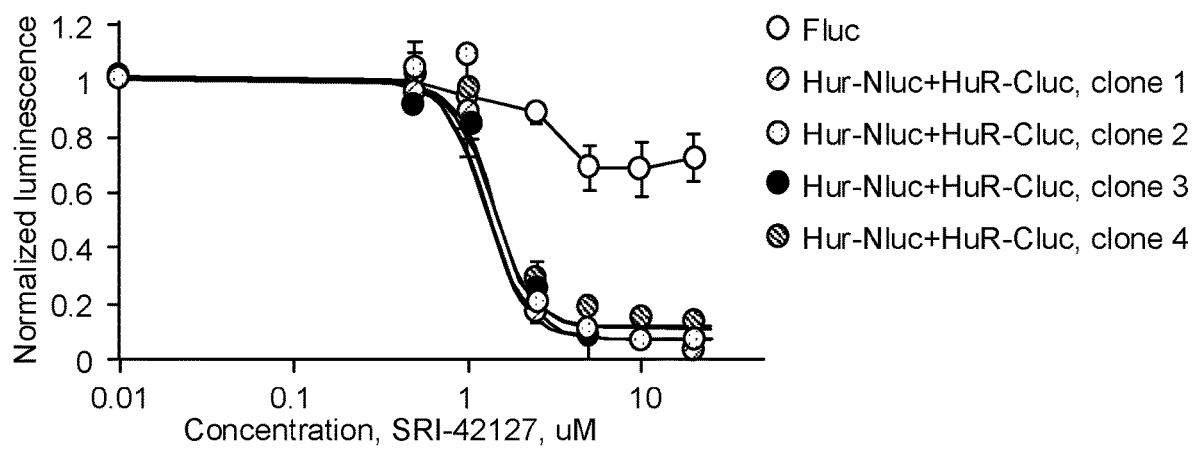
FIG. 4 is a graph of dose-response curves showing the inhibition of HuR dimerization for SRI-42127 in four independent cell clones.

In the next optimization steps for compounds SRI-41964 and SRI-41664, a reduction of kinase inhibition potential was performed. This was achieved by the introduction of a methyl group on the pyrazolylamino and a pyranylamino NH resulting in compounds SRI-42124 and SRI-42127, respectively as shown in FIG. 3, Panel C. Compound SRI-42124 had poor aqueous solubility that precluded compound evaluation in the cell-based assay. Compound SRI-42127 inhibited HuR dimerization in the cell-based assay with $IC_{50}$=1.2±0.2 uM (n=6), 6 hours of treatment, the maximum inhibition of the HuR dimerization was 90±1% (n=6) as shown in FIG. 3, Panel C. The similar results were achieved in the four independent reporter cell clones overexpressing HuR-Cluc+HuR-Nluc constructs as shown in FIG. 4. The luminescence signal from cells overexpressing the control Fluc construct decreased by 26±9% (n=6) after cell treatment with SRI-42127 for 6 hours. Compound SRI-42127 had reduced kinase inhibition potential compared to the parent SRI-41664 compound as shown in Table 4. Ultimately, compound SRI-42127 was established. Structural changes that led to compounds with HuR inhibition $IC_{50}$ values below 10 uM are presented in Table 4. In contrast, structural changes that led to compounds with HuR inhibition $IC_{50}$ values above 10 uM are presented in Table 5.

Example 4: ADME Evaluations of Compounds

Selected compounds were assessed for their aqueous solubility, Log D and mouse and human liver microsomal stability. While favorable solubility and Log D could be achieved in several compounds, significant improvement in in vitro microsomal stability, particularly in mouse liver microsome, could not be achieved. From the group of compounds that showed potent HuR inhibition activity, a preliminary pharmacokinetic study in mice by ip administration was performed (in this case, for SRI-42127 (also referred to herein as "Compound 19")). The data indicated that the brain penetration capacity of Compound 19 was modest with brain/plasma ratio of ~0.4. Plasma protein binding for Compound 19 was 96.44%. However, the compound displayed 99.13% brain tissue binding with relatively low recovery (69.6%) due to instability or high nonspecific binding. The compound was used as a probe molecule for an initial in vivo assessment of the effect of HuR inhibition on glioma. Two active Compounds 5 and 19, and two inactive Compounds 26 and 27 were evaluated against a set of selected kinases.

The pharmacokinetic data are presented in Table 6. Although Compound 19 displayed kinase inhibitory activity against four of the five tested kinases, further studies with this compound demonstrated that the anti-glioma effect of Compound 19 is mediated via HuR inhibition and not by kinase inhibition.

TABLE 6

In Vivo Pharmacokinetic Profile of Compound 19 (SRI-42127) in mouse at 10 mg/kg ip[a]

| PK Parameter | Plasma | Brain |
|---|---|---|
| $T_{1/2}$ (h) | 0.160 | 0.160 |
| $T_{max}$ (h) | 0.167 | 0.167 |
| $C_{max}$ (ng/mL) | 3457 | 1372 |
| $AUC_{last}$ (h*ng/mL) | 1316 | 541 |
| $AUC_{inf}$ (h*ng/mL) | 1338 | 550 |
| $AUC_{Extrap\_obs}$ (%) | 1.65 | 1.63 |
| MRTInf_obs (h) | 0.306 | 0.313 |
| $AUC_{last}$/D (h*mg/mL) | 132 | 54.1 |

[a]Pharmacokinetic studies were conducted at Pharmaron Inc. using male C57 bl/6 mice. Data were collected at three time points (3 animals/time point) over a 1 hour period.

TABLE 7

Mean Brain and Plasma Concentrations of Compound 19 (SRI-42127) in mouse at 10 mg/kg ip[a]

| Route | Time (h) | Animal ID | Brain (ng/g)[b] | Plasma (ng/mL) | Ratio (Brain/Plasma) | Mean |
|---|---|---|---|---|---|---|
| IP | 0.167 | 1 | 1220 | 2910 | 0.419 | 0.399 |
|  |  | 2 | 1375 | 3450 | 0.399 |  |
|  |  | 3 | 1520 | 4010 | 0.379 |  |
|  | 0.5 | 4 | 420 | 782 | 0.536 | 0.455 |
|  |  | 5 | 545 | 1430 | 0.381 |  |
|  |  | 6 | 391 | 870 | 0.449 |  |
|  | 1 | 7 | 53.0 | 130 | 0.408 | 0.398 |
|  |  | 8 | 43.9 | 104 | 0.422 |  |
|  |  | 9 | 19.7 | 53.9 | 0.365 |  |

[a]These studies were conducted using male C57 bl/6 mice. Data were collected at three time points over a 1 hour period.
[b]Values calculated assuming the density of brain homogenate as 1.0 g/mL.

TABLE 8

Kinase inhibition profile of selected compounds

| Kinase | Compound 5 (SRI-41664) $IC_{50}$ (μM) | Compound 19 (SRI-42127) $IC_{50}$ (μM) | Compound 26 (SRI-43566) $IC_{50}$ (μM) | Compound 27 (SRI-43499) $IC_{50}$ (μM) |
|---|---|---|---|---|
| TRKA | 0.099 | 0.117 | >30 | >30 |
| AAK1 | 0.030 | 0.120 | 15.7 | 13 |
| IRAK1 | 0.300 | 0.319 | >30 | >30 |
| PIM1 | 0.829 | 0.668 | >30 | >30 |
| cMET | 5.980 | >10 | >30 | >30 |

Example 5: Testing Compounds with Cell-Based Assays

Figure 5A:
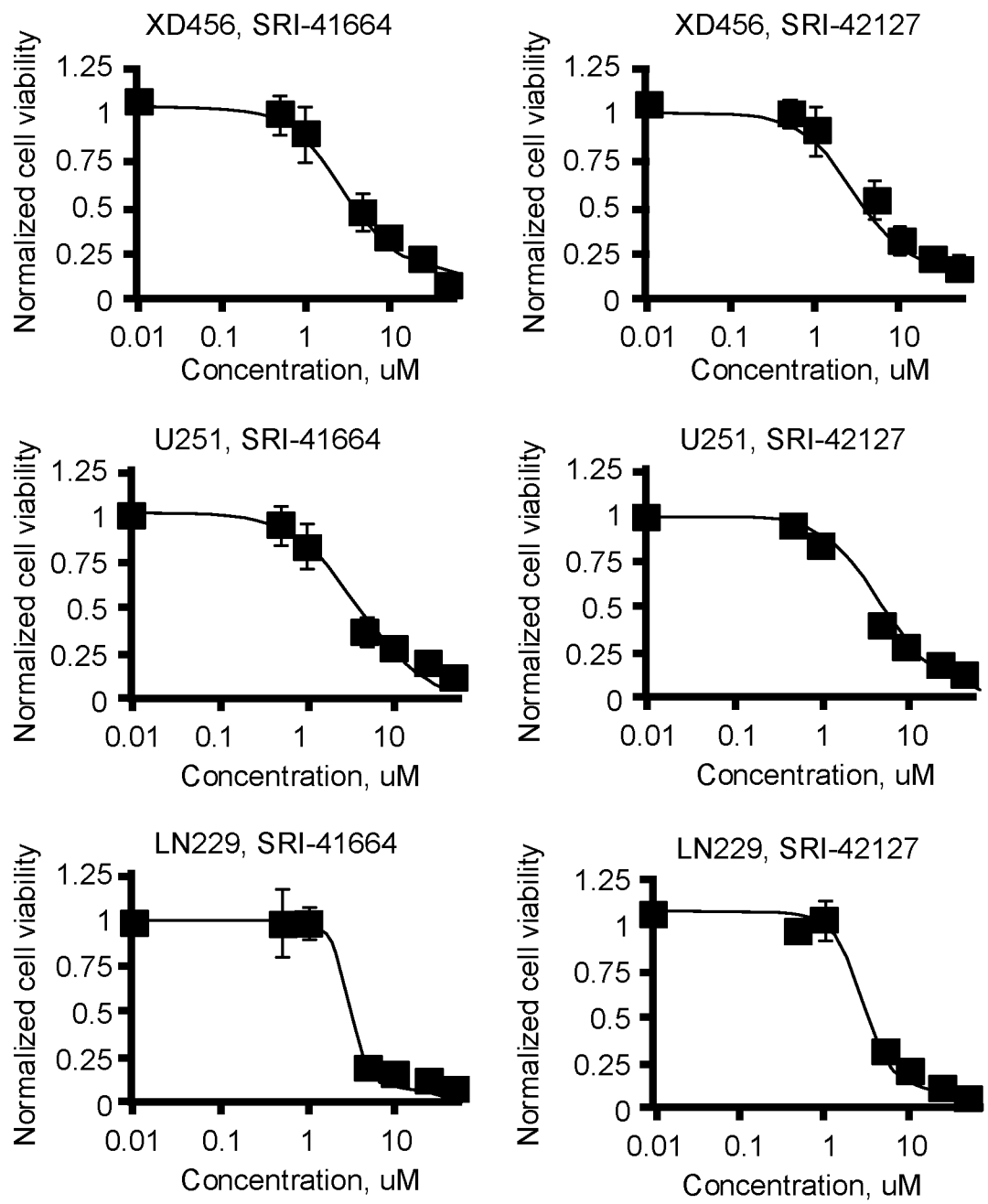
FIG. 5A contains graphs illustrating cell-viability dose responses for compounds of this disclosure.
Figure 6:
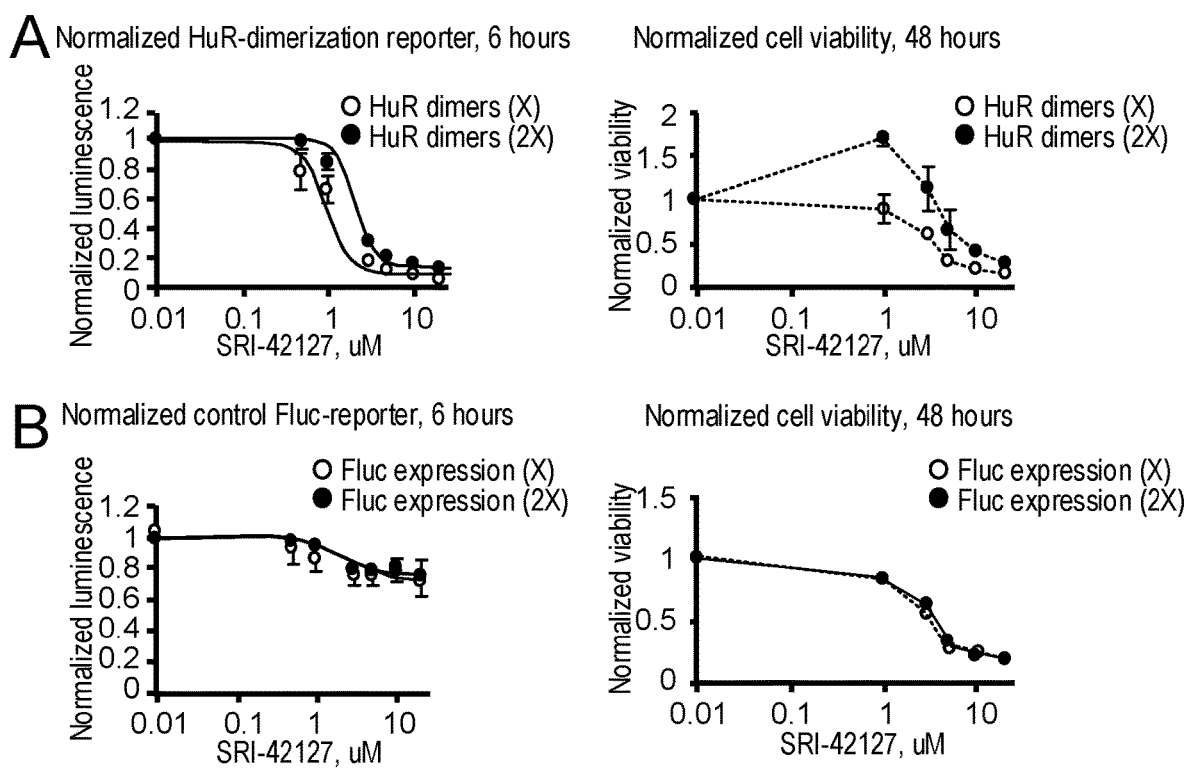
FIG. 6, Panel A is an illustration of U251 glioma cells with dox-inducible HuR-dimerization reporters and dox-inducible overexpression of the control Fluc reporter. Panel A shows a decrease in HuR-dimerization as a function of higher concentrations of SRI-42127 over 6 hours (left graph) and a decrease in cell viability as a function of higher concentrations of SRI-42127 over 48 hours (right graph).
Figure 7:
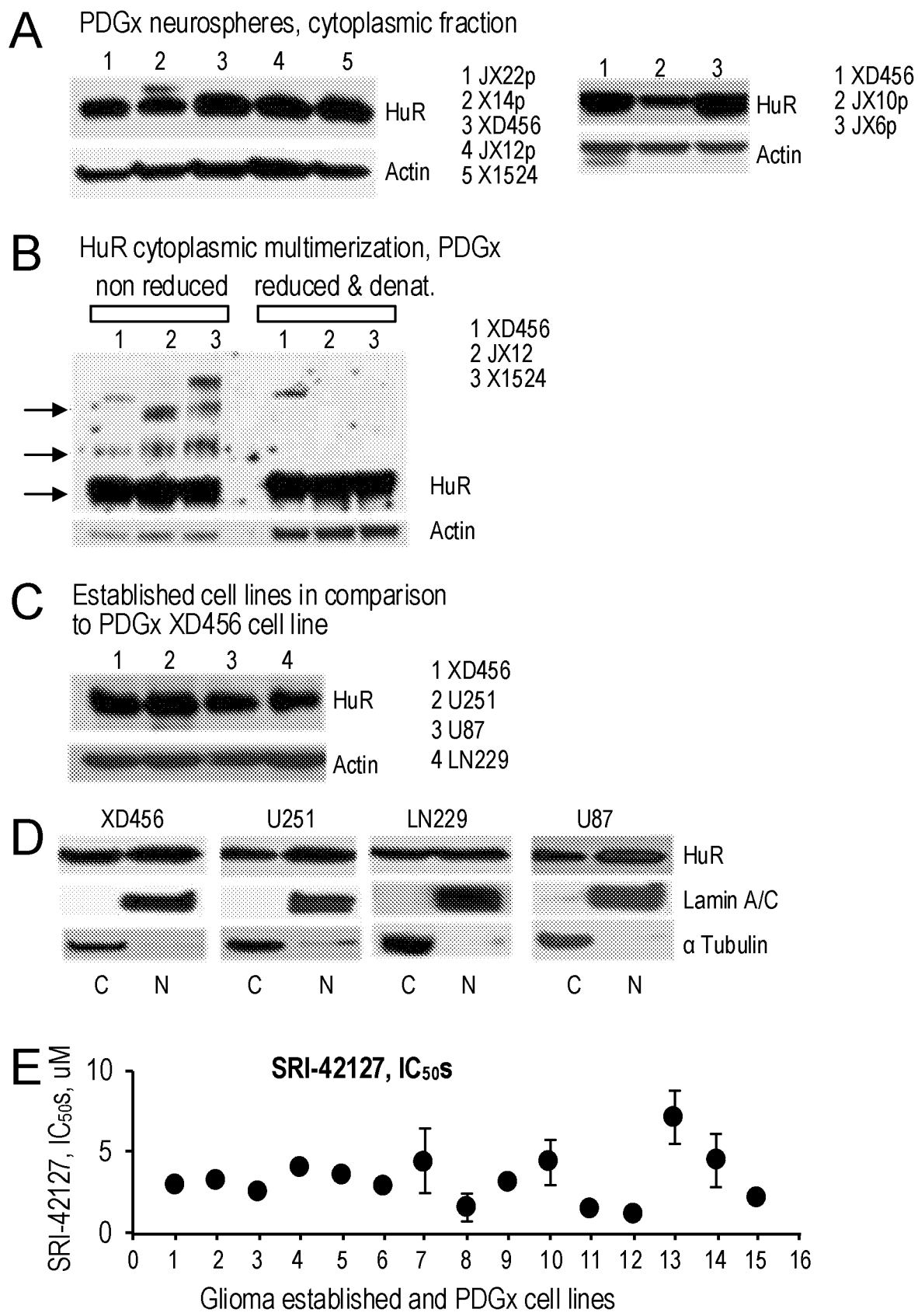
FIG. 7, Panel A depicts representative western blots illustrating HuR expression in the cytoplasmic fraction of PDGx cell lines.

The glioma suppressive potentials of the new class of HuR multimerization inhibitors were evaluated by utilizing SRI-41664 and SRI-42127 compounds in several cell-based assays. First, it was confirmed that the SRI-41664 and SRI-42127 compounds are cytotoxic for established and PDGx cell lines. FIG. 5A illustrates the inhibitory dose responses of SRI-41664 and SRI-42127 compounds in the established U251, LN229, and the PDGx XD456 glioma cell lines. The $IC_{50}$s for the SRI-41664 compound were 3.4±0.5 uM (n=5), 3.8±0.5 uM (n=5), and 4.8±1.1 uM (n=5); the $IC_{50}$s for compound SRI-42127 were 2.8±0.6 uM (n=5), 3.2±0.6 uM (n=5), and 4.0±0.6 uM (n=5) for U251, LN229, and XD456 cell lines, respectively, after 48 hours of treatment. An HuR-overexpression approach was employed to confirm SRI-42127 inhibitory potency against HuR dimerization. In the U251 glioma cells with dox-inducible HuR-dimerization reporters, an increase in HuR dimerization by two fold led to a significant increase in the SRI-42127 $IC_{50}$ for inhibition of HuR dimerization from 1.2±0.1 uM (n=4) to 1.9±0.1 uM (n=4), 6 hours of treatment (P<0.05, Student t-test); the $IC_{50}$ of SRI-42127 for inhibition of cell viability, 48 hours after cell treatment with SRI-42127, increased from 2.8±0.4 uM (n=4) to 8.0±0.8 uM (n=4) (P<0.05, Student t-test) after the enhancement of HuR-dimer formation by two fold (FIG. 6, Panel A). The overexpression of the control reporter Fluc construct by two-fold did not significantly alter $IC_{50}$s of SRI-42127 as shown in FIG. 6, Panel B. Similar results have been achieved in XD456 cells; the enhancement of HuR-dimer formation approximately by two-fold, increased an $IC_{50}$ of SRI-42127 for inhibition of cell viability, after 48 hours of treatment, by 1.9±0.2 (n=4) fold (P<0.05, Student t-test). FIG. 7, Panels A-E illustrates HuR expression in established and PDGx glioma cell lines and the $IC_{50}$s of SRI-42127 compound to inhibit cell viability after 48 hours of treatment (data also include parental TMZ-resistant and stem cell lines).

Figure 5B:
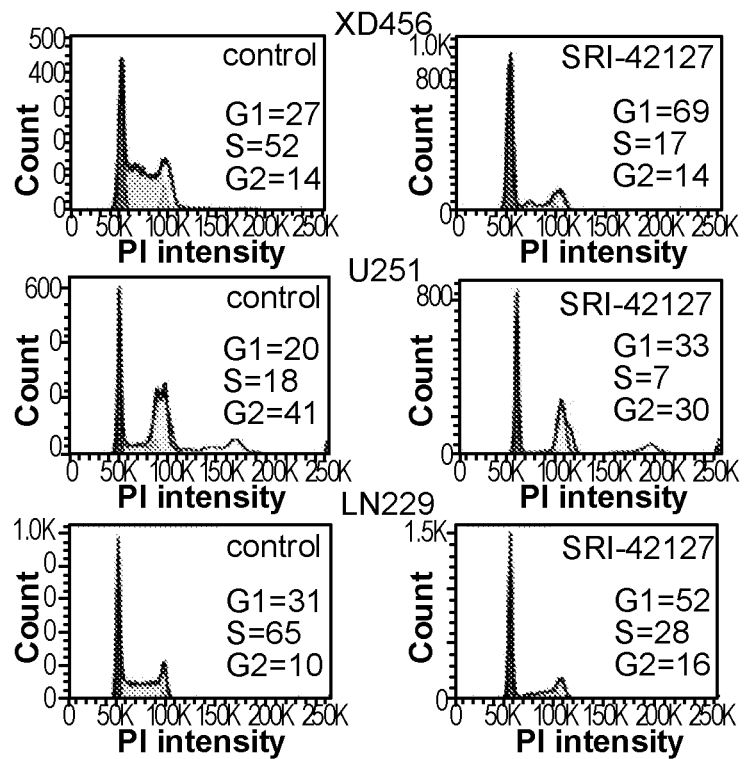
FIG. 5B contains low cytometry plots illustrating cell cycle distribution in cell lines as well as a bar graph representing the average number of cells (mean±SD, %) in each phase of the cell cycle after treatment with SRI-424127 compound normalized to the corresponding control values (vehicle treatment).
Figure 5B:
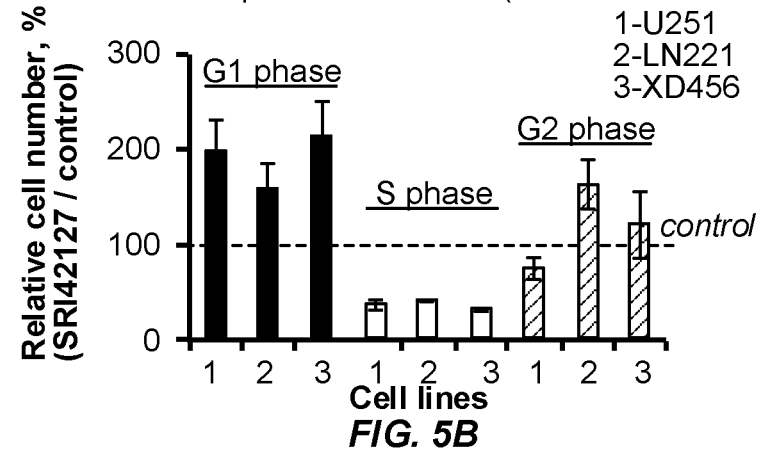

HuR is one of the key regulators of cell cycle progression in cancer cells, particularly high-grade glioma; therefore, the arrest of cell cycle progression by the newly identified compounds supports HuR-targeted inhibition. FIG. 5B illustrates representative histograms of cell cycle progression in the established U251, LN229, and the PDGx XD456 glioma cell lines in the control (treatment with vehicles) and after treatment with SRI-42127. The bar graph represents the average numbers of cells in each phase of the cell cycle after treatment with the SRI-42127 normalized to the corresponding control values (vehicle treatment). There was a significant accumulation of cells in the G1 phase and a reduction of cells in the S phase after treatment with SRI-42127, 10 uM for 18 hours. The average accumulations of cells in the G1 phase increased by 97±33% (n=3), 56±28% (n=3), and 210±40% (n=3) in U251, LN229, and XD456 cell lines, respectively, after treatment with SRI-42127 compared to the control. The average reductions of cells in the S phase were 65±4% (n=3), 60±3% (n=3), and 70±3% (n=3) in U251, LN229, and XD456 cell lines, respectively, after treatment with SRI-42127 compared to the control.

Figure 5C:
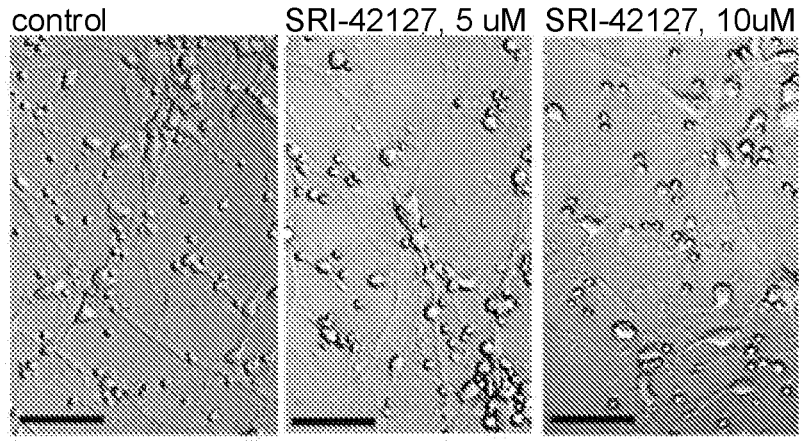
FIG. 5C contains phase-contrast images illustrating primary human neurons after treatment with SRI-42127 (48 hours) versus control (vehicle treatment). Scale bar, 100 um.
Figure 5D:
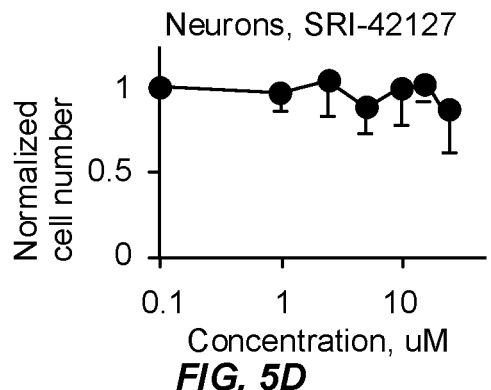
FIG. 5D is a graph illustrating that neuron numbers were not affected by treatment with SRI-42127.
Figure 5E:
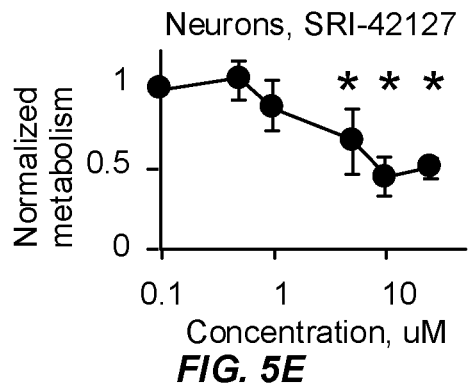
FIG. 5E is a graph illustrating the metabolic alterations in primary human neurons after treatment with SRI-42127.
Figure 5F:
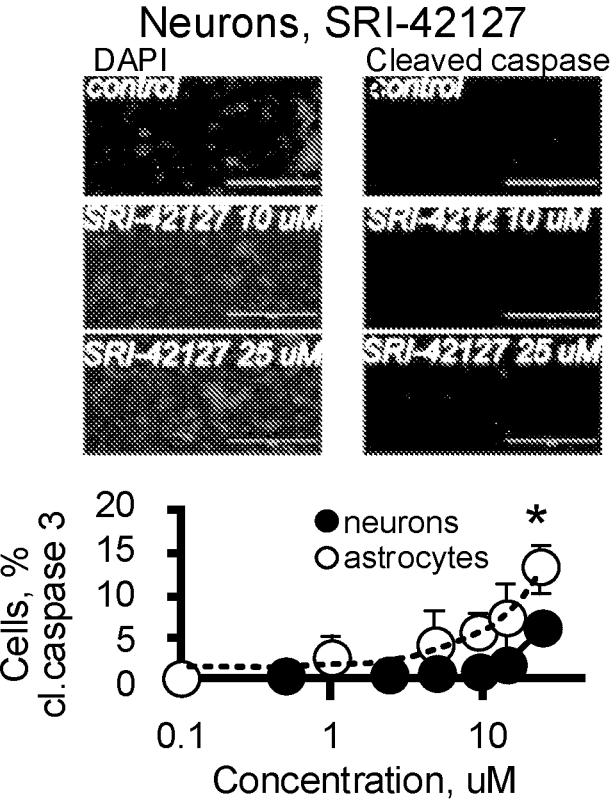
FIG. 5F is a graph illustrating the metabolic alterations in primary human neurons and astrocytes after treatment with SRI-42127 for 48 hours along with representative images of cleaved caspase-3 immunostaining after SRI-42127 treatment versus control (vehicle) for neurons where DAPI marks the cell nucleus.

Primary human neuronal cells were evaluated as the control and exhibited no morphological changes after treatment with SRI-42127 at up to 15 uM for 48 hours compared to the control (vehicle treatment); the cell numbers and cell sprouting remained unchanged as illustrated by FIGS. 5C and 5D. The cellular metabolism declined by about 44% after treatment with SRI-42127, 25 uM for 48 hours as shown by FIG. 5E. There were no significant alterations in patterns of cleaved caspase-3 immunostaining after 48 hours of treatment with SRI-42127 at concentrations up to 15 uM compared to the vehicle control as showin in FIG. 5F. Similar results were obtained in primary human astrocytes; significant alterations in cleaved caspase-3 activation were not observed after treatment with SRI-42127 up to 15 uM as shown in FIG. 5F. Therefore, compound SRI-42127 inhibited glioma cell growth and had low neuronal and astrocyte cytotoxicity at concentrations below 15 uM.

Figure 8A:
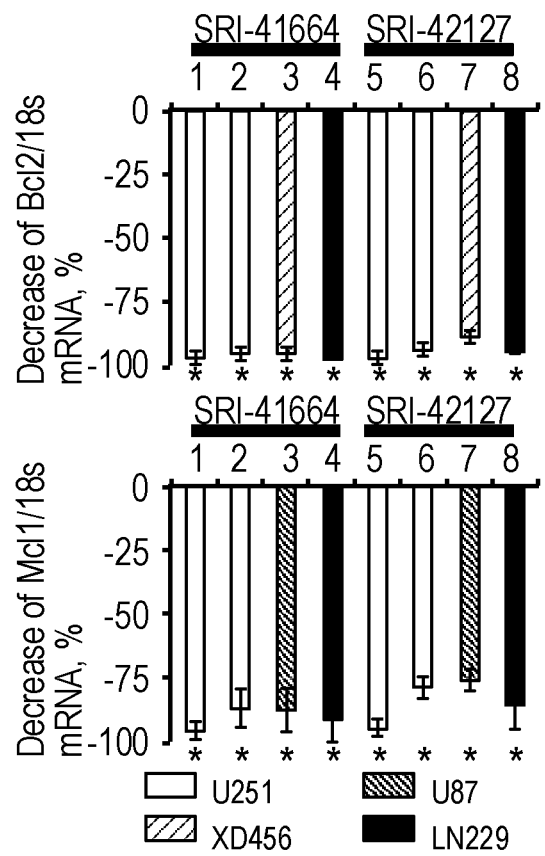
FIG. 8A is a bar graph illustrating the decrease of Bcl2/18S and Mcl1/18S mRNAs after treatment with compounds of this disclosure.

Induction of apoptosis and reduction of tumorigenicity of established and PDGx glioma cell lines after treatment with compounds as described herein is illustrated in FIG. 8A-D. In FIG. 8A, graphs illustrate the percent of reduction of Bcl2/18S and Mcl/18S mRNAs following cell treatment with compounds as described herein versus control (vehicle treatment). Results are shown as mean+SD (n=3), differences were statistically significant for all cell lines with P<0.005, t test. HuR protein plays a significant role in the stabilization of the mRNAs of the anti-apoptotic Bcl2-family, which contributes to the protection of genetically unstable glioma cells from apoptosis. Therefore, the Bcl2 family was evaluated in the established and PDGx cell lines after cell treatment with SRI-41664 or SRI-42127 compounds. A significant reduction in the expression of anti-apoptotic Bcl2 family molecules at the mRNA and protein levels after cell treatment with SRI-41664 or SRI-42127 compounds was observed. The average decreases of Bcl2/18S and Mcl1/18S mRNA ratios were 96±2% and 94±3%, 96±2% and 78±4%, 88±2% and 75±4%, 93±1% and 84±10% based on three experiments in the established U251, U87, LN229, and the PDGx XD456 cell lines, respectively, after cell treatment with SRI-41664, 10 uM for 24 hours compared to the control. The average decreases of Bcl2/18S and Mcl1/18S mRNA ratios were 96±2% and 95±3%, 95±2% and 86±7%, 95±2% and 87±8%, and 96±2% and 90±9% based on three experiments in the established U251, U87, LN229, and PDGx XD456 cell lines, respectively, after cell treatment with SRI-42127, 10 uM for 24 hours compared to the control. A significant reduction in the interaction of the HuR protein with Bcl2 and Mcl1 mRNAs after cell treatment with SRI-42127 compound compared to the control was confirmed in the HuR/mRNA co-immunoprecipitation assay, which was performed in U251 cell line. The protein levels of Bcl2 and Mcl1 were evaluated in the established U251 and PDGx XD456 glioma cell lines in the control (vehicle treatment) and after treatment with SRI-41664 or SRI-42127 compounds for 48 hours.

Figure 8B:
FIG. 8B is a western blot confirming reduction of Bcl2 and Mcl1 proteins in cytoplasmic fractions of U251 and XD456 cell lines after treatment.

In FIG. 8B, representative western blots confirm reduction of Bcl2 and Mcl1 proteins in cytoplasmic fractions of U251 and XD456 cell lines following treatment with compounds as described herein, 10 uM for 48 hours. SOX2 reduction in nuclear fractions indicates decrease of tumorigenicity of cell lines after treatment with compounds as described herein. Actin and Lamin A/C were utilized for data normalization in cytoplasmic and nuclear fractions, respectively. The representative western blots illustrate a dramatic reduction of Bcl2 and Mcl1 protein levels in the cytoplasmic fractions of both cell lines after treatment with SRI-41664 or SRI-42127 compounds compared to the control.

Figure 8C:
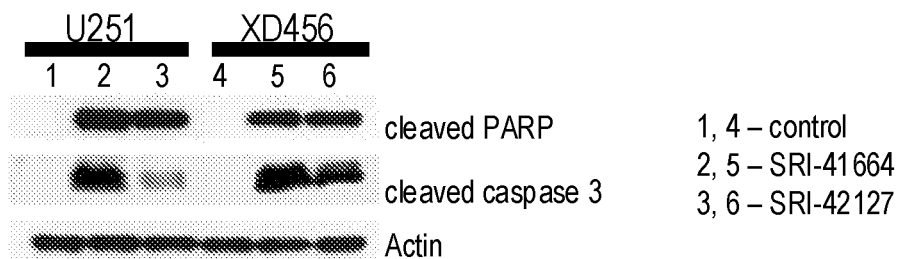
FIG. 8C is a western blot illustrating appearances of cleaved PARP and cleaved caspase 3 in glioma cell lines after treatment with compounds of this disclosure.

In FIG. 8C, representative western blots illustrate appearances of cleaved PARP and cleaved caspase 3 in glioma cell lines after treatment with compounds as described herein, 10 uM for 48 hours. A reduction in the expression of the anti-apoptotic Bcl2-family was accompanied by apoptosis: cleaved caspase 3 and cleaved PARP proteins. The representative western blots illustrate the appearances of cleaved caspase 3 and cleaved PARP in the established U251 and PDGx XD456 glioma cell lines after treatment with SRI-41664 or SRI-42127 for 48 hours.

Figure 8D:
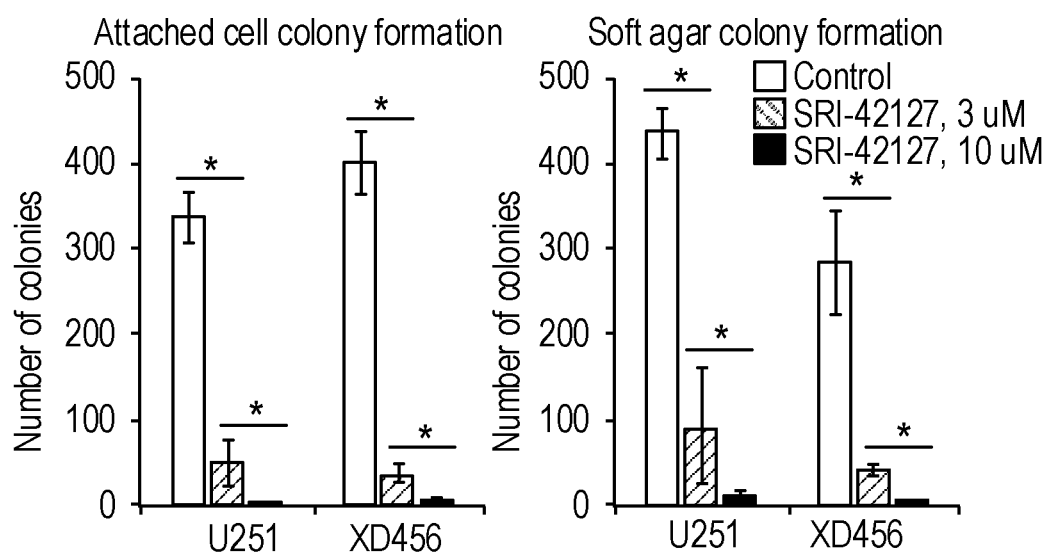
FIG. 8D contains bar graphs illustrating the significant reduction of colony formations in U251 and XD456 cell lines after treatment with compounds of this disclosure, and photographs of soft agar colony formation assays.
Figure 8D:
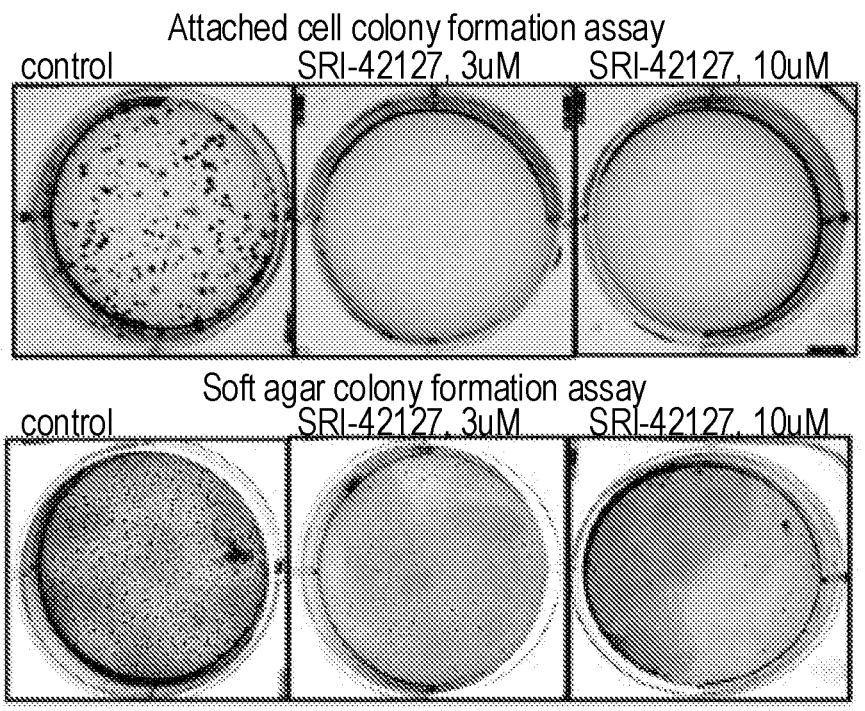

In FIG. 8D, graphs illustrate significant reduction of colony formations in U251 and XD456 cell lines after SRI-42127, 3 uM and 10 uM treatments versus control (vehicle treatment). Results are presented as mean+SD (n=4), P<0.005, t test. Examples of colony formations are shown in U251 cell line.

The colony formation assay was performed and confirmed significant reduction in the ability of glioma cells to form colonies after treatment with SRI-42127, 3 uM and 10 uM for two weeks compared to the control (vehicle treatment). Graphs in FIG. 8D illustrate the average numbers of colonies formed by established U251 and PDGx XD456 cell lines in the attached cell colony formation assay and in the soft agar colony formation assay, which represents anchorage independent cell growth. The number of colonies significantly decreased from 337+31 (n=3) to 49+28 (n=3) and from 402+38 to 34+12 (n=3) in U251 and XD456 cell lines, respectively, in the attached cell colony formation assay after treatment with SRI-42127, 3 uM. The number of colonies significantly decreased from 436+28 to 90+70 (n=4) and from 283+62 to 39+6 (n=4) in U251 and XD456 cell lines, respectively, in the soft agar colony formation assay after treatment with SRI-42127, 3 uM. No significant numbers of colonies were detected in the presence of SRI-42127, 10 uM in the U251 and XD456 cell lines in both assays.

The data confirmed the impairment of the in vitro growth and reduction of tumorigenicity of the established and patient derived glioma cell lines following cell treatment with the new class of inhibitors of HuR dimerization.

Example 6: Testing Compound SRI-42127 In Vivo

Figure 9A:
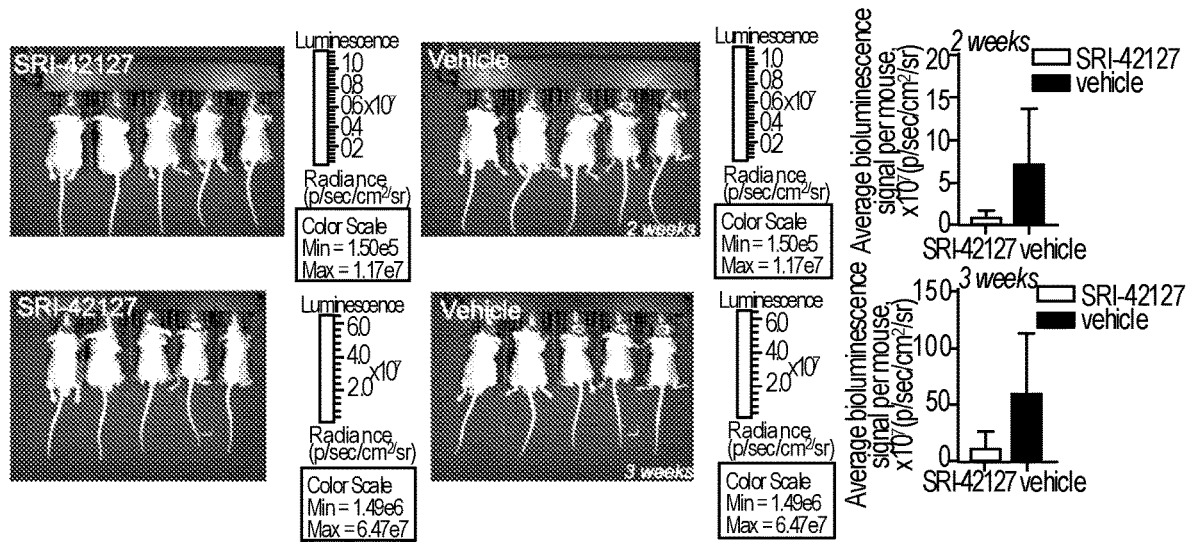
FIG. 9A is a photograph of luminescent imaging of glioma progression in mice with and without SRI-42127 treatment with bar graphs illustrating luminescence signals detected from intracranial tumors on the second (top) and third (bottom) weeks of mouse treatment.
Figure 9B:
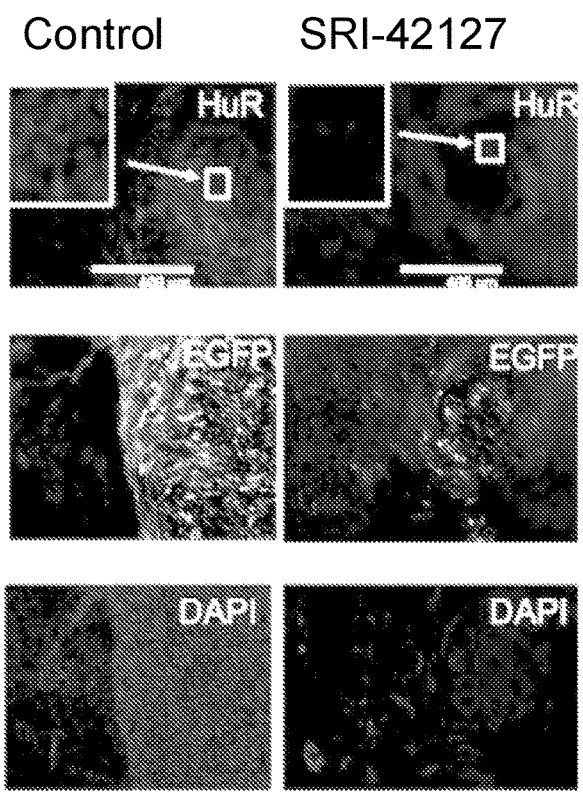
FIG. 9B illustrates immunostaining for HuR on tumor brain tissue for mouse groups with and without SRI-42127 treatment.
Figure 9C:
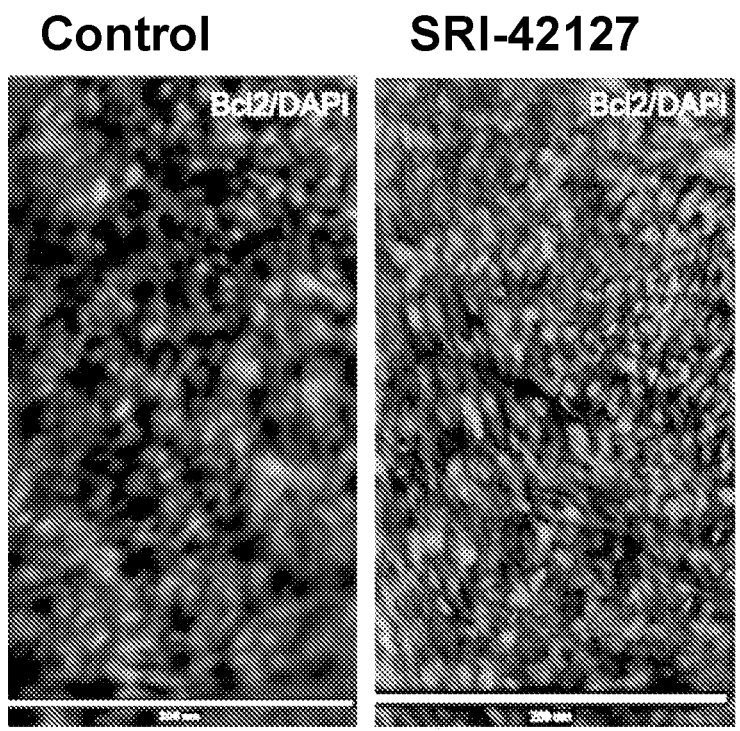
FIG. 9C illustrates immunostaining for Bcl2 on a tumor brain tissue for mouse groups with and without SRI-42127 treatment.
Figure 9D:
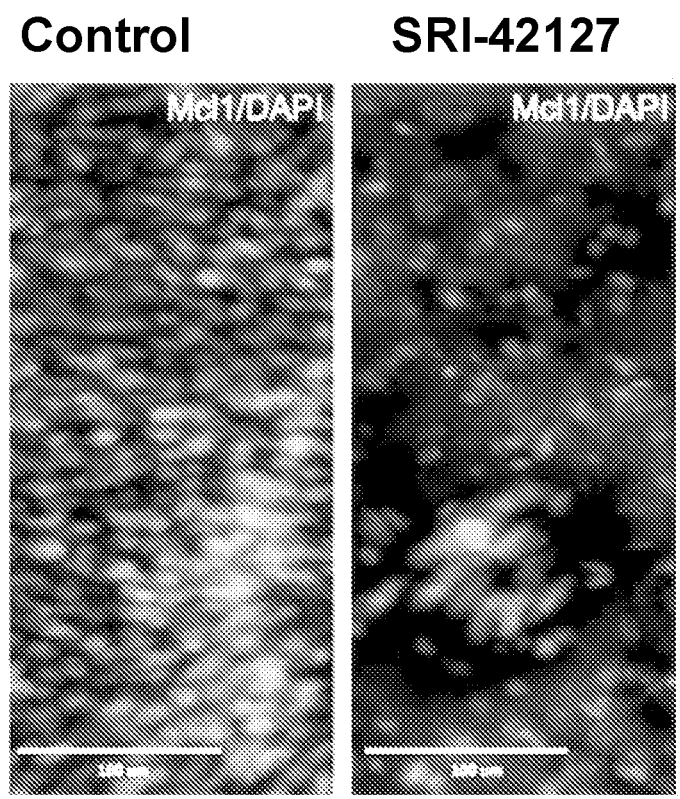
FIG. 9D illustrates immunostaining for MCl1 on a tumor brain tissue for mouse groups with and without SRI-42127 treatment.

The pharmacokinetic (PK) evaluation of SRI-42127 in a mouse model revealed a significant penetration into the CNS with a brain-to-plasma concentration ratio of 0.42±0.05, n=9, see Table 6. The half-life of compound SRI-42127 was short (0.16 hours) using a dose of 10 mg/kg by IP, see Table 7. Next, the impact of SRI-42127 on intracranial glioma growth in a mouse model was evaluated. In FIG. 9A, PDGx XD456 cells expressing firefly luciferase and EGFP constructs were utilized for intracranial tumor formation. Mice were randomly divided into two groups after four and a half days of the intracranial tumor establishment and were treated with vehicle (control group) or SRI-42127 compound (SRI-42127 group), 15 mg/kg, twice a day for three weeks via intraperitoneal injection. The graphs in FIG. 9A illustrate luminescence signals detected from intracranial tumors on the second (top) and third (bottom) weeks of mouse treatment; results are shown as mean+SD (radiance, p/sec/cm2/sr); the differences are not statistically significant, P=0.07 (n=5) for the second week, P=0.069 (n=5) for the third week, t test. There was a reduction of tumor progression in the mouse group treated with SRI-42127 compared to the control group (treated with vehicles) based on the detection of tumor reporter luminescence signal as illustrated in FIG. 9A. Also, a reduction in tumor mass was confirmed in brain slices from the mouse group treated with compound SRI-42127 compared to the control group based on the detection of tumor reporter EGFP signal. Immunostaining for HuR, Bcl2, and MCl1 confirmed a reduction of HuR, Bcl2, and Mcl1 expression in the tumors from the mouse group treated with SRI-42127 versus the control group as shown in FIGS. 9B, 9C, and 9D. Hence, the new class of inhibitors of HuR dimerization (particularly compound SRI-42127) exhibited encouraging, however not yet statistically significant, glioma-inhibitory potential in vivo.

Putative Binding Model of SRI-42127 at HuR

Figure 9E:
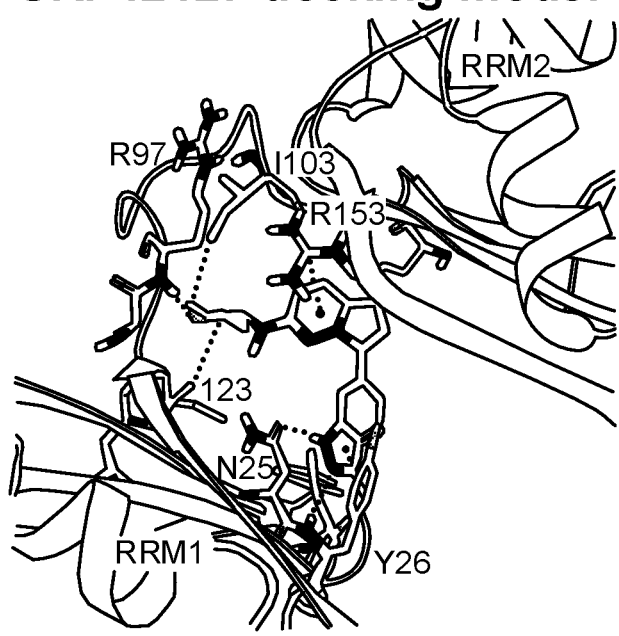
FIG. 9E illustrates the computational docking of SRI-42127 at HuR.

A computational docking study was performed to investigate the binding mode of the SRI-42127 compound at HuR. The apo structure of HuR was prepared from a crystal structure of RNA/HuR complex (PDB ID: 4ED5) using the Protein Preparation Wizard. FIG. 9E illustrates the docked pose of SRI-42127 at HuR. According to the putative binding mode, SRI-42127 can interact with four functionally important residues Y26, I103, R97, and R153 of HuR. MM-GBSA, an in silico binding free energy scoring approach, was used to estimate the binding affinity of SRI-42127 at HuR. Specifically, MM-GBSA scoring was performed on the fixed conformation of the docked pose of SRI-42127 at HuR using VSGB solvation model and OPLS3e force field. The same scoring was performed on the UMP (U8 from HuR co-crystal structure), which resides in the same region as SRI-42127 to obtain a reference value. SRI-42127 showed a stronger MM-GBSA binding free energy score than the UMP (−57.6 kcal/mol versus −22.7 kcal/mol), indicating that SRI-42127 is indeed capable of forming energetically favorable interactions at the RM1-RM2 putative binding site on HuR.

Not to be bound by theory, a mode of action includes the binding of SRI-42127 to RM1-RM2 induces a conformational change of HuR monomer that disrupts the optimal interface needed for HuR dimerization and mRNA binding.

Example 7: Effects of Compound SRI-42127 on Gene Sets and Cell Signaling Pathways RNA sequencing was performed on PDGx-derived glioma neurospheres representing the different molecular subtypes (classical, neuronal, and mesenchymal) after treatment with vehicle (control) or SRI-42127 (3 uM) for 12 hours. Analysis of direct HuR mRNA targets and their corresponding cell signaling pathways was performed. Table 9 illustrates the evaluated gene sets, representing direct HuR mRNA targets, and their corresponding cell signaling pathways. The gene set average values, which exhibited significant alterations following treatment with the SRI-42127 compound as compared to the control, are bolded. Note that the gene sets corresponding to cell cycle progression, MAPK signaling pathways, TP53-dependent transcriptional pathways, stress-response cell signaling pathways, RHO GTPase-dependent pathways, membrane trafficking pathways, cellular senescence and developmental pathways, cell signaling pathways associated with the Epstein-Barr virus infection are significantly down-regulated in at least four of five evaluated neurosphere cell lines.

TABLE 9

Signaling pathways and the corresponding HuR mRNA targets

| Pathways | JX22p | X14p | XD456 | X1524 | JX12p | Transcripts |
|---|---|---|---|---|---|---|
| Cell cycle_*Homo Sapiens*_hsa04110 | 0.37 ± 0.19 3E−06 | 0.99 ± 0.5 0.90 | 0.60 ± 0.3 1E−03 | 0.75 ± 0.17 1E−03 | 0.64 ± 0.18 1E−4 | GSK3B CDKN2B WEE1, CDC23, YWHAB, MYC, E2F3, BUB3, |

TABLE 9-continued

Signaling pathways and the corresponding HuR mRNA targets

| Pathways | JX22p | X14p | XD456 | X1524 | JX12p | Transcripts |
|---|---|---|---|---|---|---|
| Epstein-Barr virus Infection_Homo Sapiens_hsa05169 | 0.43 ± 0.14 3E−11 | 1.0 ± 0.58 0.98 | 0.49 ± 0.18 1E−08 | 0.79 ± 0.28 0.02 | 0.63 ± 0.20 9E−06 | TP53, YWHAG, SKP1 MAP2K3, GSK3B, PSMD11, YWHAB, MYC, EIF2AK2, RBPJ, TP53, PTMA, RAN, YWHAG |
| MAPK signaling Pathway_Homo Sapiens_hsa04010 | 0.31 ± 0.13 1E−14 | 1.0 ± 0.57 0.98 | 0.54 ± 0.17 7E−09 | 0.76 ± 0.24 0.003 | 0.63 ± 0.14 9E−09 | MAP2K3, CDC42, PPP3R1, PPM1B, MAP3K1, MYC, TAOK1, RAPGEF2 MKNK2, PDGFA, GNG12, TP53 |
| Cell Cycle Check points_Homo Sapiens_R-HSA-69620 | 0.35 ± 0.17 1E−10 | 0.77 ± 0.57 0.49 | 0.48 ± 0.21 1E−07 | 0.66 ± 0.20 2E−05 | 0.58 ± 0.18 3E−07 | WEE1, CDC23, PSMD11, SUM01 RMI1, YWHAB, RAD1, NBN, BUB3 YWHAG |
| Cell Cycle_Homo sapiens_R-HSA-1640170 | 0.36 ± 0.16 1E−19 | 0.74 ± 0.46 0.01 | 0.52 ± 0.28 4E−09 | 0.66 ± 0.26 9E−07 | 0.57 ± 0.23 2E−10 | LIN54, CDKN2B, PSMD11, RRM2, RMI1, YWHAB, CSNK1E, SKA2, WEE1, CDC23, SUM01, PPP2R5E, MYC, TAOK1, E2F3, RAD1, NBN, BUB3, TP53, YWHAG, SKP1, SPC25 |
| G2/M DNA damage Checkpoint_Homo sapiens_R-HSA-69473 | 0.39 ± 0.18 2E−07 | 0.82 ± 0.55 0.39 | 0.50 ± 0.22 2E−05 | 0.67 ± 0.21 8E−04 | 0.61 ± 0.19 5E−05 | WEE1, SUM01 RMI1, YWHAG, RAD1, NBN, TP53, YWHAG |
| Regulation of TP53 Activity through Phosphorylation_Homo sapiens_R-HSA-6804756 | 0.34 ± 0.14 3E−09 | 0.58 ± 0.26 5E−04 | 0.35 ± 0.13 2E−09 | 0.64 ± 0.28 3E−03 | 0.63 ± 0.19 1E−04 | PRKAA1, DYRK2, RMI1, TAF13, TAF4B, RAD1, NBN, TP53 |
| Cellular responses to Stress_Homo sapiens_R-HSA-2262752 | 0.27 ± 0.13 1E−18 | 0.74 ± 0.54 0.08 | 0.53 ± 0.31 2E−06 | 0.70 ± 0.21 1E−05 | 0.61 ± 0.24 1E−06 | MAP2K3, GSK3B, PRKAA1, CDKN2B, ST13, CITED2, TXNRD1, SIRT1, ETS1, RNF2, BAG4, CDC23, E2F3, NBN, TP53 |
| G2/M Check points_Homo sapiens_R-HSA-69481 | 0.39 ± 0.17 1E−08 | 0.82 ± 0.51 0.32 | 0.47 ± 0.22 2E−06 | 0.66 ± 0.20 1E−04 | 0.60 ± 0.18 6E−06 | WEE1, PSMD11 SUM01, RMI1, YWHAB, RAD1, NBN, TP53, YWHAG |
| RHO GTPases Activate Formins_Homo sapiens_R-HSA-5663220 | 0.26 ± 0.08 1E−12 | 0.62 ± 0.45 3E−02 | 0.48 ± 0.22 1E−05 | 0.65 ± 0.25 1E−03 | 0.48 ± 0.21 1E−05 | CDC42, ITGB1, DAAM1, PPP2R5E, TAOK1, BUB3, SKA2, SPC25 |
| RHO GTPases Effectors_Homo sapiens_R-HSA-195258 | 0.30 ± 0.14 1E−14 | 0.70 ± 0.47 0.04 | 0.50 ± 0.18 3E−09 | 0.69 ± 0.22 1E−04 | 0.50 ± 0.21 7E−08 | CDC42, ITGB1, DAAM1, DLG4, PPP2R5E, YWHAB, TAOK1, PKN2, BUB3, YWHAG, SKA2, SPC25 |
| Cell Cycle, Mitotic_Homo Sapiens_R-HSA-69278 | 0.32 ± 0.13 1E−17 | 0.80 ± 0.49 0.12 | 0.54 ± 0.30 1E−06 | 0.67 ± 0.25 1E−05 | 0.58 ± 0.25 3E−07 | LIN54, CDKN2B, PSMD11, RRM2, CSNK1E, SKA2, WEE1, CDC23, |

TABLE 9-continued

Signaling pathways and the corresponding HuR mRNA targets

| Pathways | JX22p | X14p | XD456 | X1524 | JX12p | Transcripts |
|---|---|---|---|---|---|---|
| | | | | | | PPP2R5E, MYC, TAOK1, E2F3, BUB3, TP53, YWHAG, SKP1 SPC25 |
| Membrane Trafficking_Homo sapiens_R-HAS-199991 | 0.28 ± 0.18 4E−16 | 0.86 ± 0.59 0.36 | 0.53 ± 0.23 2E−08 | 0.61 ± 0.22 1E−07 | 0.62 ± 0.32 6E−05 | TMED10, YWHAB, SNAP23, GOLIM4, TGFA, KIF11, CLINT1, RAB33B, RAB10, DAB2, TRAPPC6B, KDELR2, SEC22B, VPS36, VAMP2, YWHAG |
| Translocation of GLUT4 to the plasma membrane_Homo sapiens_R-HSA-1445148 | 0.40 ± 0.24 2E−03 | 0.92 ± 0.39 0.66 | 0.53 ± 0.15 1E−04 | 0.69 ± 0.13 7E−04 | 0.71 ± 0.20 1E−02 | RAB10, YWHAB, SNAP23, YWHAG, VAMP2 |
| Signaling by Rho GTPases_Homo sapiens_R-HSA-194315 | 0.30 ± 0.14 4E−16 | 0.65 ± 0.38 9E−03 | 0.45 ± 0.20 2E−10 | 0.72 ± 0.22 1E−04 | 0.49 ± 0.20 8E−10 | ARHGEF11, ITGB1, YWHAB, SKA2, CDC42, DAAM1, DLG4, PPP2R5E, TAOK1 PKN2, BUB3, SRGAP1, YWHAB, SPC25 |
| Developmental Biology_Homo sapiens_R-HSA-1266738 | 0.32 ± 0.16 5E−24 | 0.65 ± 0.38 5E−05 | 0.49 ± 0.19 1E−16 | 0.72 ± 0.22 3E−07 | 0.52 ± 0.16 5E−18 | ITGB1, ARHGEF11, VASP, GSK3B, YES1, PSMD11, YWHAB, NCOA3, RDX, TCF12, PDGFA, RBPJ, PBX1, ACVR2A, YY1, CDC42, ABLIM1, DLG4, PPP2R5E, RARA, RAPGEF2, CD24 CSK, SRGAP1 |
| Cellular Senescence_Homo sapiens_R-HSA-2559583 | 0.28 ± 0.13 8E−09 | 0.99 ± 0.70 0.18 | 0.64 ± 0.38 0.03 | 0.76 ± 0.23 0.02 | 0.74 ± 0.28 0.03 | MAP2K3, CDKN2B, CDC23, E2F3, NBN, TP53, ETS1, RNF2 |
| Gene Expression_Homo Sapiens_R-HSA-2559583 | 0.37 ± 0.18 4E−43 | 0.95 0.59 0.61 | 0.63 0.69 6E−07 | 0.87 0.35 0.01 | 0.78 0.40 3E−03 | GSK3B, SMG1, DYRK2, YWHAB, FCF1, PRDM1, THUMPD, RBPJ, SNRPD1, ZNF529, MYC, NBN, MYBL1, YWHAG, UPF2, UTP15, ZNF561, RMI1, EIF1AX, SSR3, CSNK1E, DICER1, PUS7, SIRT1, RRM2B, XRN1, RARA, PABPC1, TP53, DDX6; PRKAA1, NFIX, PSMD11, ZFP36L1, PMAIP1, IGF2BP3, SUDS3, EIF4E, ZNF286A, TSNAX, |

TABLE 9-continued

Signaling pathways and the corresponding HuR mRNA targets

| Pathways | JX22p | X14p | XD456 | X1524 | JX12p | Transcripts |
|---|---|---|---|---|---|---|
| Transcriptional Regulation by TP53_Homo sapiens_R-HSA-3700989 | 0.31 ± 0.16 1E−16 | 1.04 ± 0.82 0.84 | 0.64 ± 0.65 0.04 | 0.81 ± 0.36 0.05 | 0.93 ± 0.58 0.66 | CDKN2B, TAF13, TXNRD1, ELL2, EIF2S1, GATAD2B, NUDT21, CNOT7, NFIC, TAF4B, RAD1, RAN PRKAA1, DYRK2, RMI1, YWHAB, TAF13, TXNRD1, PRDM1, GATAD2B CNOT7, RRM2B, TAF4B, PMAIP1, RAD1, NBN, TP53, YWHAG |
| Deadenylation-dependent mRNA decay_Homo sapiens_R-HSA-429914 | 0.31 ± 0.12 1E−06 | 1.03 ± 0.34 0.84 | 0.58 ± 0.19 1E−03 | 0.84 ± 0.21 0.13 | 0.71 ± 0.11 5E−04 | DDX6, CNOT7, XRN1, PABPC1, EIF4E |
| Mitotic G1-G1/S phases_Homo sapiens_R-HSA-453279 | 0.36 ± 0.17 1E−07 | 1.00 ± 0.54 0.79 | 0.61 ± 0.40 0.99 | 0.63 ± 0.26 2E−03 | 0.58 ± 0.25 5E−04 | LIN54, CDKN2B, WEE1, PSMD11, RRM2, MYC, E2F3, SKP1 |
| RNA degradation_Homo Sapiens_hsa03018 | 0.35 ± 0.16 2E−05 | 1.97 ± 0.38 1.88 | 0.65 ± 0.16 1E−03 | 0.94 ± 0.19 0.53 | 0.78 ± 0.20 0.04 | ZCCHC7, DDX6, CNOT7, XRN1, PABPC1 |
| HTLV-1 infection_Homo Sapiens_hsa05186 | 0.47 ± 0.60 4E−03 | 0.89 ± 0.43 0.37 | 0.61 ± 0.3 1E−04 | 0.88 ± 0.28 0.16 | 0.67 ± 0.22 2E−05 | GSK3B, CDKN2B, MAP3K1, FZD6, PDGFA, ETS1, PPP3R1, CDC23, MYC, E2F3, BUB3, TP53, MYBL1, RAN |
| Intrinsic Pathway for Apoptosis_Homo sapiens_R-HSA-109606 | 0.42 ± 0.17 9E−05 | 1.03 ± 0.44 0.87 | 0.94 ± 1.04 0.91 | 0.75 ± 0.21 0.03 | 0.90 ± 0.41 0.61 | PPP3R1, YWHAB, PMAIP1, TP53, YWHAG |
| Regulation of TP53 Activity_Homo sapiens_R-HSA-109606 | 0.31 ± 0.15 2E−11 | 0.94 ± 0.87 0.85 | 0.44 ± 0.31 2E−5 | 0.77 ± 0.38 0.07 | 0.89 ± 0.59 0.54 | PPKAA1, DYRK2, RMI1, TAF13, TAF4B, RADI, PRDM1, NBN, TP53, GATAD2B |
| Activation of BH3-only proteins Homo sapiens_R-HSA-114452 | 0.42 ± 0.17 9E−05 | 1.03 ± 0.44 0.87 | 0.94 ± 1.04 0.91 | 0.75 ± 0.21 0.03 | 0.90 ± 0.41 0.61 | PPP3R1, YWHAB, PMAIP1, TP53, YWHAG |
| TP53 Regulates Metabolic Genes_Homo sapiens_R-HSA-5628897 | 0.30 ± 0.21 1E−05 | 1.03 ± 0.78 0.93 | 0.54 ± 0.35 9E−03 | 0.78 ± 0.35 0.17 | 0.87 ± 0.59 0.60 | PRKAA1, PRM2B, YWHAB, TXNRD1, TP53, YWHAG |
| P53 signaling pathway_Homo Sapiens_hsa04115 | 0.24 ± 0.06 3E−09 | 1.9 ± 1.6 0.24 | 1.19 ± 1.08 0.69 | 1.07 ± 071 0.81 | 1.21 ± 0.75 0.54 | RRM2, RRM2B, RFWD2, ZMAT3, PMAIP1, TP53 |

The analysis of direct HuR mRNA targets and their corresponding cell signaling pathways has been performed by using gene sets, which have been defined as the direct HuR targets following tumor neurosphere treatment with DHTS, an established modulator of HuR/mRNA interaction (Lal et al., Nucleic Acid Research, 2017). The gene set average values, which exhibited significant alterations following treatment with SRI-42127 compared to the control, are show in bold font, which represents a highly significant p value. Data are represented as average+standard deviation (Aver+SD). The significance was evaluated by using Student t-test.

Figure 10:
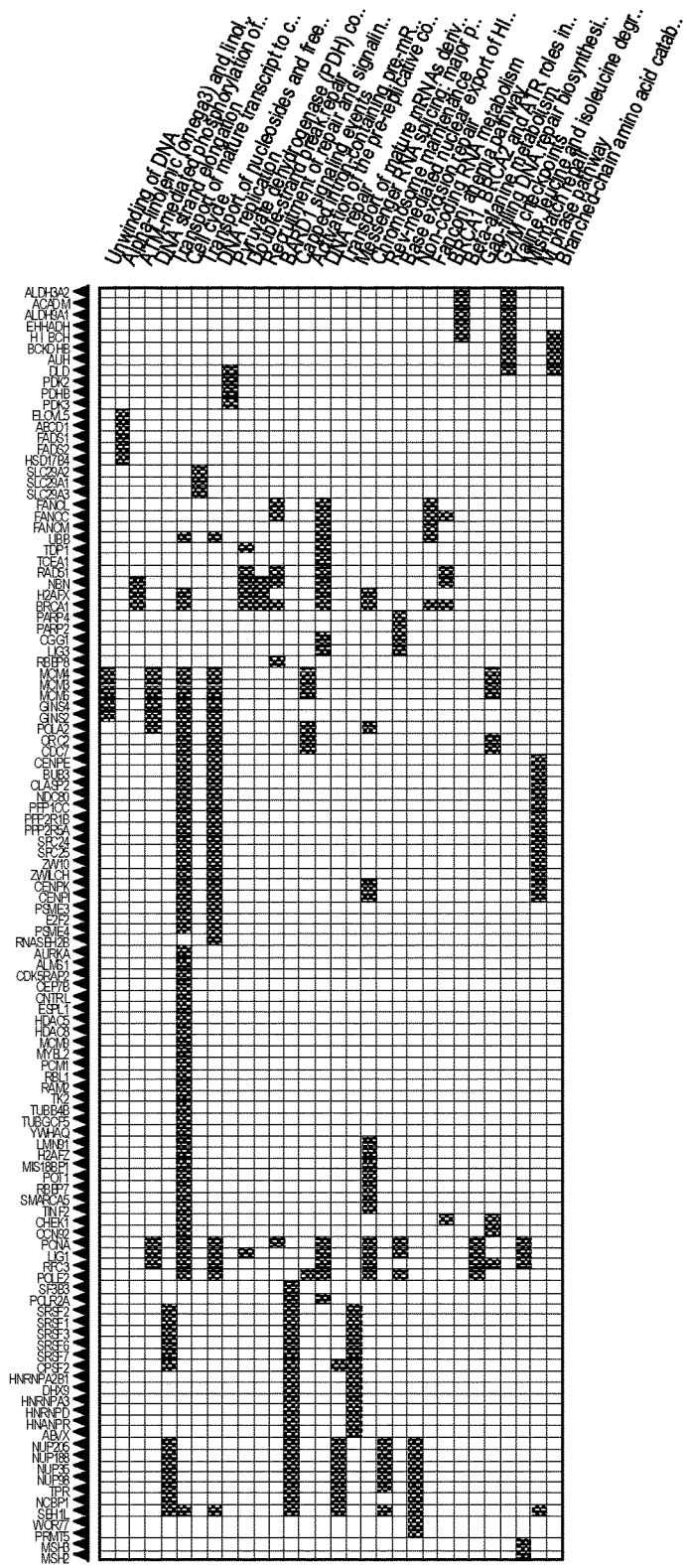
FIG. 10, Panel A contain cluster charts of enrichment of down-regulated genes and targeted sub-cellular structures.
Figure 10:
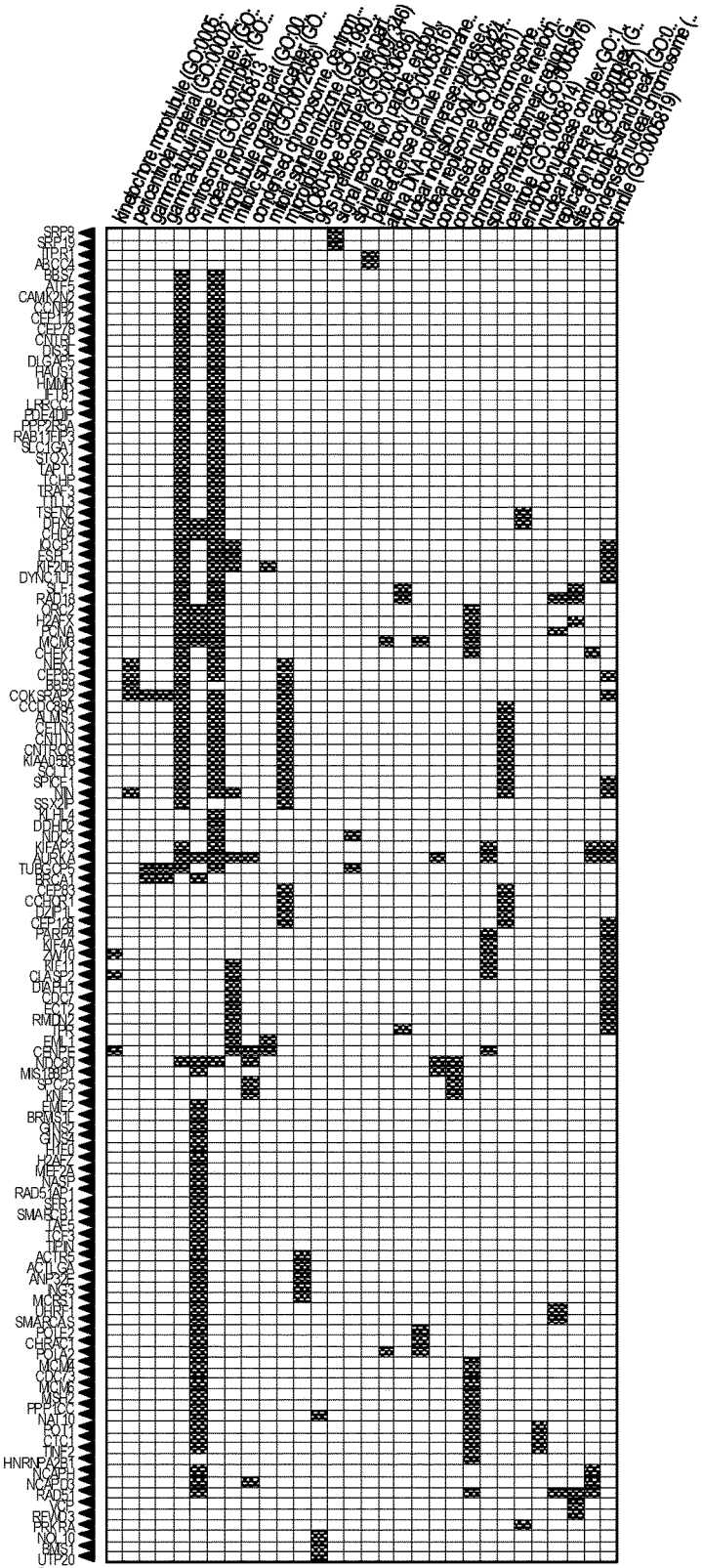
Figure 10:
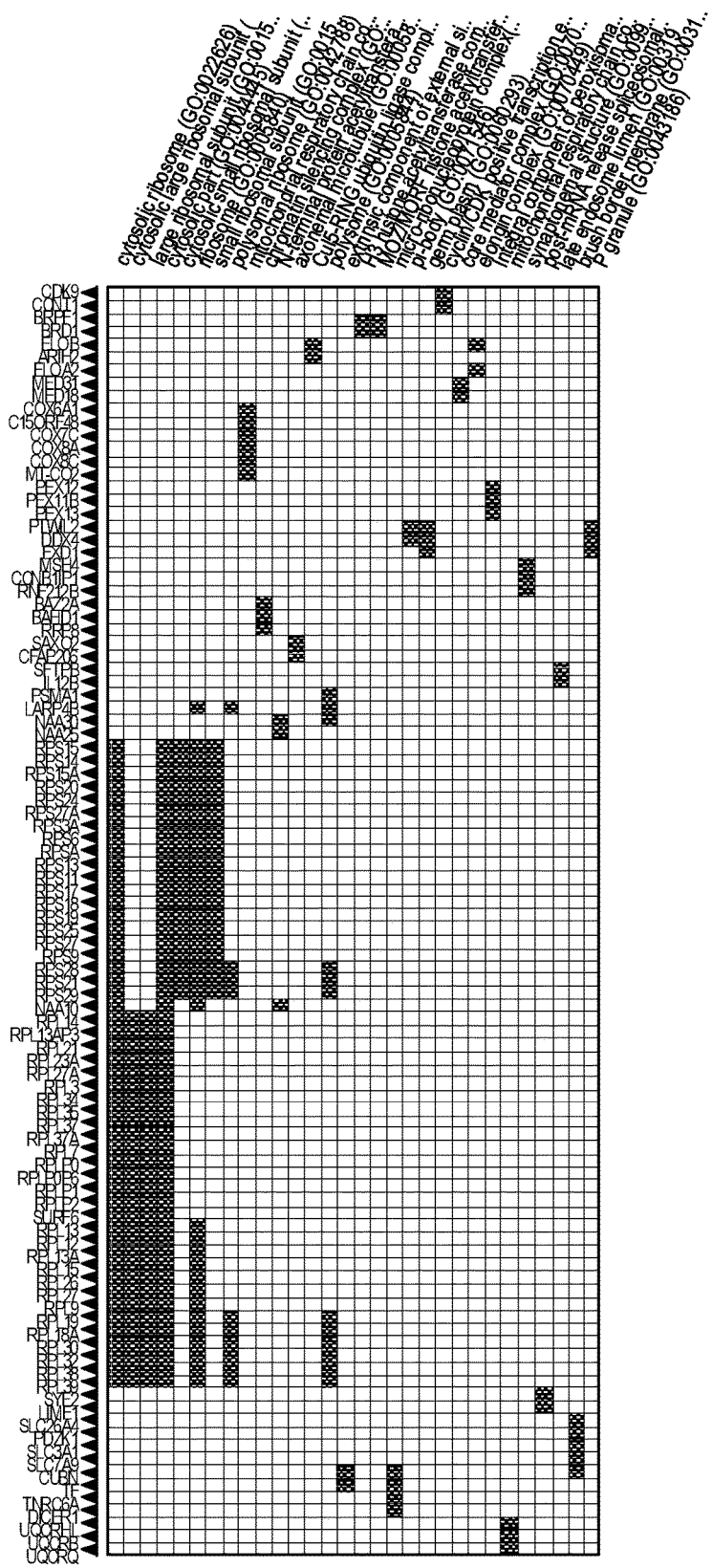

Enrichr Software (Icahn School of Medicine at Mount Sinai, Center for Bioinformatics) for overall gene ontology enrichment was utilized for gene sets significantly altered in PDGx neurospheres by SRI-42127 compound compared to the control as shown in FIG. 10, Panel A and Panel B. Gene sets that exhibited significant up-regulation or down-regulation of more than 50% across all the evaluated cell lines after treatment with SRI-42127 were selected for the enrichment analysis. FIG. 10 demonstrates gene ontology enrichment analysis for gene sets significantly altered in PDGx neurospheres by SRI-42127, 3 uM 12 hours of treatment compared to a control (vehicle treatment). FIG. 10, Panel A illustrates enrichment of the significantly down-regulated cell signaling pathways/processes (chart on the left) and targeted subcellular structures (chart on the right) for significantly down-regulated gene sets after SRI-42127 treatment compared to control (vehicle treatment). The RNA-Sequencing data was generated using glioma neurospheres representing the different molecular subtypes (classical, neuronal, and mesenchymal) in the control (treatment with vehicle) and after treatment with SRI-42127, 3 uM for 12 hours. First, analysis of direct HuR mRNA targets and their corresponding cell signaling pathways was performed by using gene sets, which have been defined as the direct HuR targets following tumor neurosphere treatment with DHTS compound, an established modulator of the HuR/mRNA interaction.

FIG. 10, Panel A illustrates the enrichment for the significantly down-regulated cell signaling pathways and targeted subcellular structures. The detailed cluster plots of the enriched down-regulated genes and corresponding cell signaling pathways and targeted subcellular structures are shown next to the corresponding charts. Significant down-regulation of the pathways responsible for i) cell cycle progression, ii) DNA replication, iii) transport mature transcript to cytoplasm, iv) DNA strand elongation, v) capped intron-containing pre-mRNA processing, vi) DNA repair, vii) unwinding of DNA, viii) alpha-linolenic (omega 3) and linoleic (omega 6) metabolism, ix) chromosome maintenance, x) messenger RNA splicing was observed. It is established that HuR can control the centrosome and microtubule organizing center in cancer cells. Therefore, the enrichment analysis confirmed that centrosome, mitotic spindle, pericentriolar materials, microtubule organizing center and telomeric region of chromosome are among the subcellular structures affected by SRI-42127 treatment.

In FIG. 10, Panel B, enrichment of the significantly up-regulated cell signaling pathways/processes (chart on the left) and targeted subcellular structures (chart on the right) for significantly up-regulated gene sets after SRI-42127 treatment are compared to a control (vehicle treatment). Genes that exhibited the significant up-regulation or down-regulation on more than 50% across all of the evaluated PDGx neurosphere cell lines (JX12p, X14P, XD456, X1524, and JX22p) after treatment with SRI-42127 compared to control were selected for the enrichment analysis; statistical significance was determined by t test. The analysis was generated based on RNA-Seq data. The cluster charts of FIG. 10, Panel A illustrate the enriched down-regulated genes and corresponding cell signaling pathways and targeted sub-cellular structures detailed in Table 10 and Table 11.

TABLE 10

Enriched down-regulated genes and corresponding cell signaling pathways

| Index | Name | P-value | Adjusted P-value | Odds Ratio |
|---|---|---|---|---|
| 1 | Cell cycle | 3.371e−9 | 0.000005090 | 2.29 |
| 2 | DNA replication | 5.409e−7 | 0.00004084 | 2.67 |
| 3 | Transport of mature transcript to cytoplasm | 0.000007973 | 0.004013 | 4.22 |

TABLE 10-continued

Enriched down-regulated genes and corresponding cell signaling pathways

| Index | Name | P-value | Adjusted P-value | Odds Ratio |
|---|---|---|---|---|
| 4 | DNS strand elongation | 0.00003447 | 0.01041 | 5.18 |
| 5 | Capped intron-containing pre-mRNA processing | 0.00002765 | 0.01044 | 2.72 |
| 6 | DNA repair | 0.00007107 | 1.2e−2 | 2.89 |
| 7 | Unwinding of DNA | 0.0001898 | 0.3185 | 8.12 |
| 8 | Alpha-linolenic acid (Omega3) and linoleic acid (Omega6) metabolism | 0.0001898 | 0.03583 | 8.12 |
| 9 | Chromosome maintenance | 0.0001891 | 0.04079 | 2.77 |
| 10 | Messenger RNA splicing: major pathway | 0.0003551 | 0.05362 | 3.15 |

TABLE 11

Targeted sub-cellular structures

| Index | Name | P-value | Adjusted P-value | Odds Ratio |
|---|---|---|---|---|
| 1 | centrosome (GO:0005813) | 2.502e−7 | 0.0001116 | 2.09 |
| 2 | microtubule organizing center (GO:0005815) | 0.000002199 | 2.9e−4 | 1.9 |
| 3 | nuclear chromosome part (GO:0044454) | 0.000001850 | 3.7e−4 | 2.1 |
| 4 | microtubule organizing center part (GO:0044450) | 0.0002533 | 2.4e−2 | 2.0 |
| 5 | mitotic spindle (GO:0072686) | 0.0002509 | 2.4e−2 | 2.9 |
| 6 | spindle | 0.001882 | 0.1049 | 2.01 |
| 7 | pericentriolar material (GO:0000242) | 0.001419 | 0.1054 | 5.58 |
| 8 | chromosome, telomeric region (GO:0000781) | 0.001662 | 0.1059 | 2.29 |
| 9 | centriole (GO:0005814) | 0.002653 | 0.1315 | 2.42 |
| 10 | Condensed chromosome, centromeric region (GO:0000779) | 0.003262 | 0.1455 | 3.97 |

FIG. 10, Panel B illustrates enrichment for significantly up-regulated cell signaling pathways and targeted subcellular structures. The detailed cluster plots of the enriched up-regulated genes and corresponding cell signaling pathways and targeted subcellular structures are shown. Note the significant up-regulation of the cellular pathways responsible for i) SRP-dependent co-translational protein targeting to the membrane and ER, ii) ribosomal biogenesis, iii) ncRNA processing, iv) nuclear-transcribed mRNA processing and decay. Cytosolic ribosome, cytosolic large and small ribosome subunits, polysomal ribosome were the main targeted sub-cellular structures by the up-regulated genes after tumor neurosphere treatment with SRI-42127 compound. As ribosomal reorganization is the common adaptive response to translational and environmental stress, therefore the ribosome reorganizing pathways are considered the cell's main signaling compensatory pathways, which were up-regulated in response to neurosphere treatment with the SRI-42127 compound. Also, importantly, the Illumina RNA-Sequencing data confirmed that SRI-42127 treatment induced up-regulation of Tubb2A transcript on more than 2 folds in four of five neurosphere cell lines, that supports low SRI-42127 cytotoxicity toward neurons and favors neuronal survival, see FIG. 6.

The cluster charts of FIG. 10, Panel B illustrate the enriched up-regulated genes and corresponding cell signaling pathways and targeted sub-cellular structures detailed in Table 12 and Table 13.

TABLE 12

Enriched up-regulated genes and corresponding cell signaling pathways

| Index | Name | P-value | Adjusted P-value | Odds Ratio |
|---|---|---|---|---|
| 1 | SRP-dependent cotranslational protein targeting to membrane (GO:0006614) | 1.2e−23 | 6.3e−20 | 5.1 |
| 2 | protein targeting to ER | 1.7e−22 | 2.9e−19 | 4.8 |
| 3 | cotranslational protein targeting to membrane (GO:0006613) | 1.5e−22 | 3.7e−19 | 4.9 |
| 4 | viral gene expression (GO:0019080) | 1.4e−19 | 1.8e−16 | 4.3 |
| 5 | nuclear-transcribed mRNA catabolic process, nonsense-mediated decay (GO:0000184) | 3.5e−19 | 3.5e−16 | 4.1 |
| 6 | viral transcription (GO:0019083) | 5.5e−19 | 4.7e−16 | 2.9 |
| 7 | nuclear-transcribed mRNA catabolic process (GO:0000956) | 7.262e−13 | 5.294e−16 | 2.89 |
| 8 | rRNA processing (GO:0006364) | 2.6e−11 | 1.7e−8 | 2.6 |
| 9 | rRNA metabolic process (GO:0016072) | 5.6e−11 | 3.2e−8 | 2.6 |
| 10 | peptide biosynthetic process (GO:0043043) | 9.9e−11 | 5.1e−8 | 2.7 |
| 11 | ribosome biogenesis (GO:0042254) | 2.7e−10 | 1.3e−7 | 2.4 |
| 12 | ncRNA processing (GO:0034470) | 3.2e−10 | 1.4e−7 | 2.4 |
| 13 | Viral process | 8.1e−10 | 3.2e−7 | 2.4 |
| 14 | Translation | 1.2e−7 | 4.2e−5 | 2.1 |

TABLE 13

Targeted sub-cellular structures

| Index | Name | P-value | Adjusted P-value | Odds Ratio |
|---|---|---|---|---|
| 1 | cytosolic ribosome (GO:0022626) | 2.263e−18 | 6.7e−16 | 3.9 |
| 2 | cytosolic large ribosomal subunit (GO:0022625) | 1.063e−11 | 1.0e−9 | 4.1 |
| 3 | large ribosomal subunit (GO:0015934) | 3.669e−11 | 2.7e−9 | 3.9 |
| 4 | cytosolic part (GO:0044445) | 2.359e−13 | 4.0e−11 | 3.1 |
| 5 | cytosolic small ribosomal subunit (GO:0022627) | 3.472e−8 | 1.7e−6 | 3.9 |
| 6 | ribosome (GO:0005840) | 2.131e−8 | 1.3e−6 | 3.3 |
| 7 | small ribosomal subunit (GO:0015935) | 1.580e−7 | 7.0e−6 | 3.7 |
| 8 | polysomal ribosome (GO:0042788) | 0.0004062 | 1.6e−2 | 3.5 |
| 9 | Mitochondrial respiratory chain complex IV (GO:0005751) | 0.005295 | 0.2624 | 3.44 |
| 10 | chromatin silencing complex (GO:0005677) | 0.04074 | 1.000 | 3.65 |

Quantitative proteomic data was generated using glioma neurospheres of different molecular subtypes (classical, neuronal, and mesenchymal) in the control (treatment with vehicle) and after treatment with SRI-42127, 3 uM for 18 hours. The enrichment of proteins, which exhibited a significant down-regulation on more than 50% after cell treatment with SRI-42127 compound compared to the control, and their corresponding molecular functions revealed that all neurosphere cell lines uniformly harbored down-regulation of RNA binding function. Additionally, a significant down-regulation of the following protein sets was found: i) the protein sets responsible for protein transporter activity, small protein activating enzyme activity, cadherin binding, double-stranded DNA binding, DNA dependent ATPase activity, nucleoside-triphosphatase activity, ADP binding in the neurospheres of the classical subtype; ii) the protein sets involved in transcriptional factor activity, transcription initiation factor activity, nuclear localization sequence binding in the neurospheres of the proneuronal subtype. The up-regulated protein sets exhibited several different patterns across cell lines at the evaluated time point; therefore, the significance of the up-regulated pathways on the protein level remains to be determined. Thus, the data analysis suggested that cell signaling pathways, which require HuR direct mRNA targets, were mostly down-regulated in neurospheres after treatment with SRI-42127 compound.

Example 8: In Vitro and In Vivo Testing of Inhibitors Targeting HuR Protein Multimerization for Inflammation Disease Treatment Neuroinflammation is a major driver of many central nervous system (CNS) diseases as well as secondary tissue injury related to trauma. The two major cell types responsible for neuroinflammatory responses are microglia and astroglia. These cells become activated in response to CNS injury in a broad range of diseases and trauma, and this activation leads to disease progression or secondary tissue injury. Indeed, a major hallmark of microglial and astroglial activation is their production of secreted factors into the CNS milieu, including cytokines, chemokines, metalloproteases and other inflammatory mediators as shown in Table 14. The secreted factors can produce toxic effects directly to neurons or indirectly by (a) increased vascular permeability of the blood-brain-barrier which leads to cerebral or spinal cord edema, (b) secondary ischemia due to small vessel occlusion or hemorrhage, (c) glial scar formation, (d) recruitment of other tissue-damaging immune cells through chemoattractive chemokines, (e) amplification of neuroinflammation through activation of recruited glial or peripheral immune cells which leads to further release of neurotoxic factors and substances.

TABLE 14

Secreted neuroinflammatory factors regulated by HuR in microglia and astroglia that drive disease progression

| Factor/substance | Disease/condition | Reference |
|---|---|---|
| IL-1β | A, AD, ALS, AP, CP, FTD, HAND, HD, MS, NP, PD, S, SCI, TBI | (1, 4, 8-11, 13-18, 20-33, 36, 38, 39, 51, 52) |
| TNF-α | A, AD, ALS, AP, CP, FTD, HAND, HD, MS, NP, PD, S, SCI, TBI | (1, 4, 8-11, 13-18, 20-32, 36, 38, 39, 51, 52) |
| IL-6 | A, AD, ALS, AP, CP, FTD, HAND, HD, MS, NP, PD, S, SCI, TBI | (1, 4, 8-11, 13-18, 20-32, 36, 38, 39, 51, 52) |
| iNOS | A, AD, ALS, AP, CP, FTD, HAND, MS, PD, S, SCI, TBI | (1, 2, 4, 8-11, 13-18, 20-31, 36, 38, 39, 51-53) |
| MMP-2, 9, 12, 13 | AD, ALS, HD, MS, PD, TBI, SCI | (14, 19, 36, 38, 39, 51) |
| LIF | SCI | (10, 36) |
| IFNγ | AD, PD | Exhibit A; (54) |

TABLE 14-continued

Secreted neuroinflammatory factors regulated by HuR in
microglia and astroglia that drive disease progression

| Factor/substance | Disease/condition | Reference |
|---|---|---|
| Chemokines (CCL1, CCL2, CCL3, CCL4, CCL5, CXCL1, CXCL2, CXCL3 CXCL10) | AD, ALS, CP, MS, NP, HAND, HD, PD, S, SCI, TBI | (1, 5, 32, 33, 38, 39, 55-63) |

Abbreviations: A, aging; AD, Alzheimer's diseases; ALS, amyotrophic lateral sclerosis; AP, acute pain from tissue injury; CP, chronic pain from peripheral or central nerve injury, from fibromyalgia or chronic back pain; FTD, frontotemporal dementia; HAND, HIV-associated neurocognitive disorders; HD, Huntington's disease; MS, multiple sclerosis; NP, Neuropsychiatric disease (including anxiety and depression); PD, Parkinson's disease; S, stroke or vascular injury; SCI, spinal cord injury; TBI, traumatic brain injury.

Given the importance of microglial and astroglial activation in the inflammatory pathway, the widely-accepted model lipopolysaccharide (LPS) was used to study small molecule effects on microglial and astroglial activation. Stimulation with LPS activates these cells to produce pro-inflammatory cytokines, mimics the neuroinflammatory profile associated with progression of neurological diseases and conditions described above, and is used for pharmacological screening. HuR is predominantly a nuclear protein. An essential component to proper HuR function is its ability to translocate to the cytoplasm. Cytoplasmic translocation of HuR in microglia and astroglia is a hallmark of activation. Blocking this translocation would impair HuR function and its ability to positively regulate disease-promoting secreted factors. Because HuR multimerization is a necessary process for cytoplasmic translocation, inhibiting its multimerization blocks translocation.

Experimental Details:
Cell LPS Activation and Analysis

Figure 11:
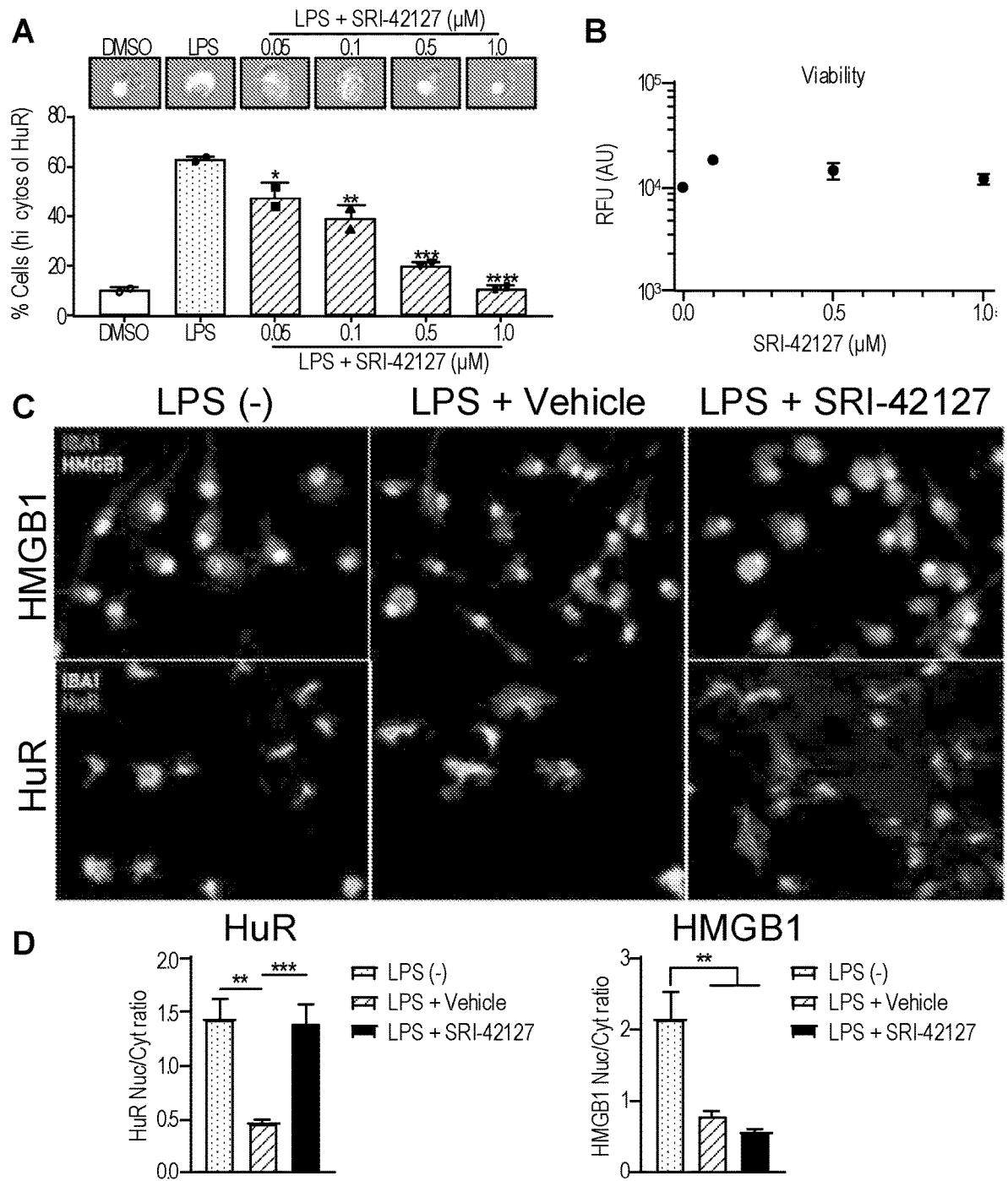
FIG. 11, Panel A contains a bar graph and images of HuR localization within microglial cells in unstimulated state (DMSO), stimulated state (LPS+), and in stimulated state (LPS+) with SRI-42127.

Cultured primary microglial cells isolated from neonatal mouse brain were treated with LPS to achieve activation. Cells were then treated with varying doses of SRI-42127 or vehicle. Imagestream single cell flow cytometry was used to track the location of HuR within microglial cells as depicted in FIG. 11, Panel A. DAPI was used as a flow marker for nuclear localization. For each cell, the percentage of HuR immunofluorescence that colocalized with the nuclear compartment versus the cytoplasmic compartment was quantified.

In the unstimulated state (DMSO), the characteristic nuclear predominance of HuR was observed as reflected by a low percentage of cells with high HuR in the cytoplasm. With LPS stimulation, there was an ~8-fold increase in the percent of cells with high levels of HuR in the cytoplasm (~60%). With SRI-42127 treatment, there was a significant dose-dependent decrease in cells with high cytoplasmic HuR. At 1 μM of SRI-42127, the percent of cells with high HuR was similar to resting (unactivated) microglia (~10%). This dose range did not cause toxicity to microglia as determined by the PrestoBlue cell viability assay as depicted in FIG. 11, Panel B.

Specificity Assessment of HuR Multimerization Inhibitor in Blocking HuR Cytoplasmic Translocation To assess the specificity of SRI-42127 for blocking HuR cytoplasmic translocation, the effect of SRI-42127 on cytoplasmic translocation of HMGB1 was assessed. Like HuR, HMGB1 is nuclear predominant and translocates with microglial activation. Primary microglia were treated with LPS and 0.5 μM of SRI-42127 for 24 hours. Cells were fixed and immunostained for HMGB1 and IBA1. Nuclear/cytoplasmic localization was assessed by confocal microscopy. Total HMGB1 immunofluorescence in each cell (boundaries defined by IBA1 staining), was quantified using Fiji software. The nuclear portion was determined by quantifying the amount of HMGB1 fluorescence that overlapped with DAPI fluorescence. HuR translocation was studied in parallel with the same methodology.

In unactivated microglia (LPS-), both HuR and HMGB1 were nuclear predominant with little to no merged signal with cytoplasmic IBA1 as depicted in FIG. 11, Panel C. The calculated nuclear/cytoplasmic (N/C) ratio was between 1.5 and 2 as shown in FIG. 11, Panel C and FIG. 11, Panel D. With LPS stimulation both HuR and HMGB1 translocated to the cytoplasm (merged IBA1 signal in FIG. 11, Panel C) with the N/C ratio being ~0.5. Treatment with the inhibitor reversed the N/C ratio back to the unstimulated state for HuR, but had no effect on HMGB1 ratio.

Figure 12:
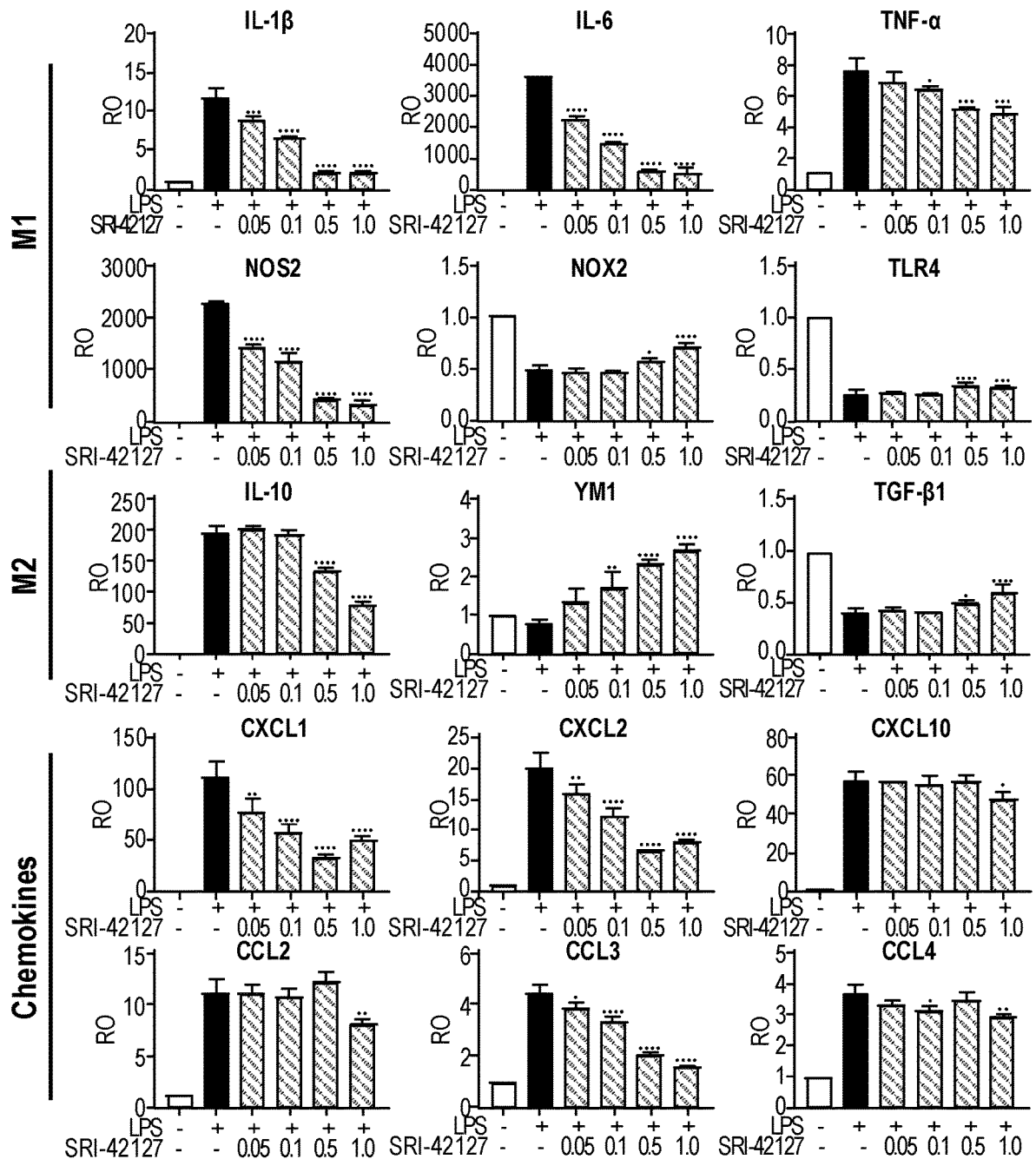
FIG. 12 contains bar graphs illustrating levels of inflammatory cytokines, chemokines, and other mediators quantified by qPCR of mRNAs harvested from cultured primary microglial cells isolated from neonatal mouse brains that were activated (LPS+) and then treated with varying doses of SRI-42127 or vehicle for a 24 hour period.

HuR Multimerization Inhibitor Effect on Pro-Inflammatory Mediator Expression in Activated Microglia Cultured primary microglial cells isolated from neonatal mouse brain were treated with LPS to achieve activation. Cells were then treated with varying doses of SRI-42127 or vehicle for 24 hours. Total RNA was harvested from the cells and various mRNAs were quantified by qPCR as depicted in FIG. 12. Consistent with microglial activation, there were large inductions of inflammatory cytokines, chemokines and other mediators including IL-1β, IL-6, TNF-α, iNOS, IL-10, CXCL1, CXCL2, CXCL10, CCL2, CCL3, and CCL4. These inductions were as high as ~3500-fold for IL-6.

Figure 13:
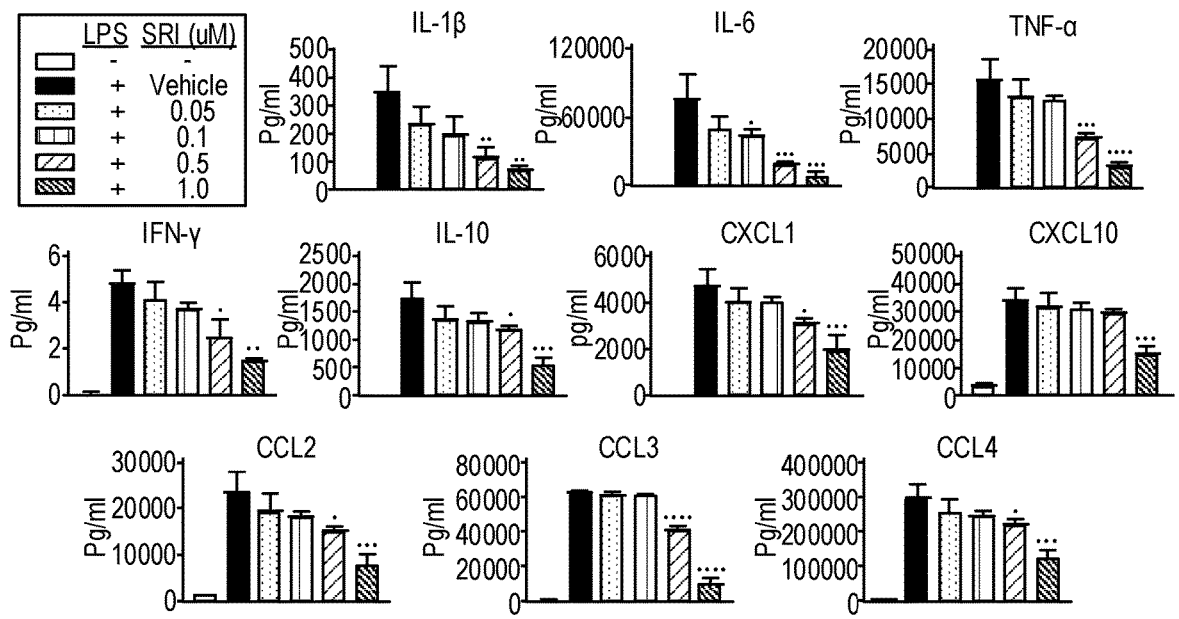
FIG. 13 contains bar graphs illustrating attenuation of secreted protein product by varying concentrations of SRI-42127. The left bar (or left-most position) in each grouping represents the absence of LPS and the absence of SRI-42147 or any vehicle. The second bar (or second position) in each grouping represents the presence of LPS and a vehicle. The third bar (or third position) in each grouping represents the presence of LPS and 0.05 µM SRI-42127. The fourth bar (or fourth position) in each grouping represents the presence of LPS and 0.1 µM SRI-42127. The fifth bar (or fifth position) in each grouping represents the presence of LPS and 0.5 µM SRI-42127. The sixth bar (or sixth position) in each grouping represents the presence of LPS and 1.0 µM SRI-42127.
Figure 14:
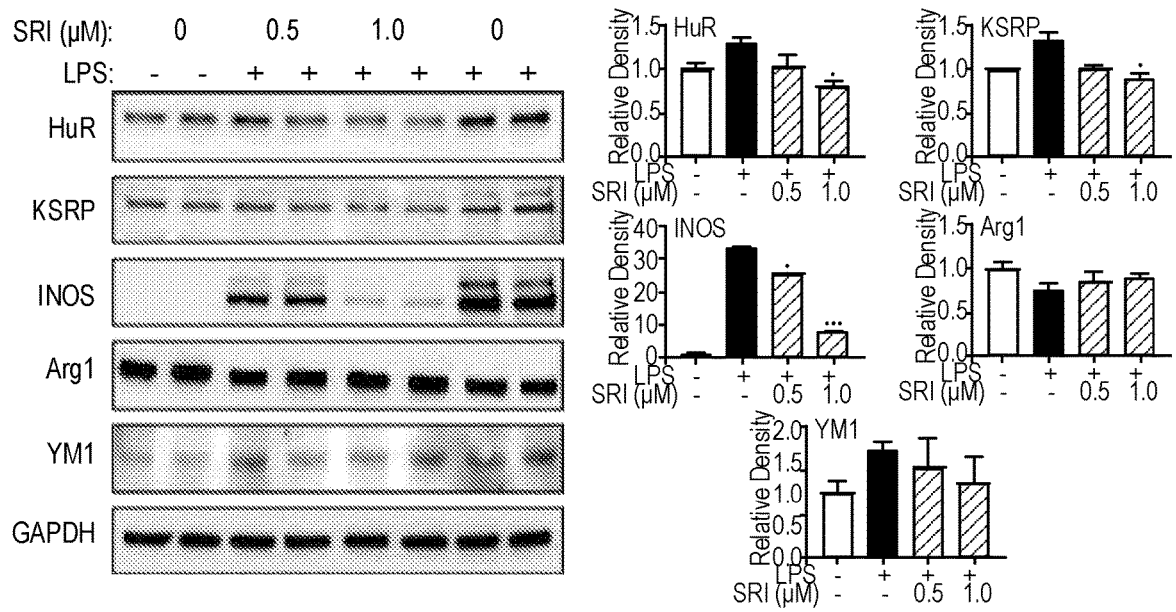
FIG. 14 is a western blot of microglial lysates showing attenuation of protein presence with modest but significant attenuation of HuR and another RNA binding protein, KSRP. The set of graphs are a quantitative depiction of the western blot data.

Treatment with SRI-42127 led to a significant and dose-dependent suppression of these inflammatory mediators with the most profound attenuation of iNOS (8-fold), IL-6 (6.8-fold), IL-1β (5.9-fold). Major chemokines CXCL1, CXCL2 and CCL3 were suppressed by more than 2-fold. There was a mixed effect on markers of M2-like markers, with TGF-β1 and YM1 increasing and IL-10 decreasing. As these inflammatory factors were secreted, they were quantified by ELISA in culture medium. A similar attenuation of the secreted protein product as shown in FIG. 13 was observed. The greatest effect was with IL-6 which was suppressed at a lower dose of SRI-42127 (1.7-fold at 0.1 μM) and nearly 10-fold at 1.0 μM. IL-1β and TNF-α were suppressed by 5-fold at 1.0 μM. Interestingly, mRNA levels for TNF-α were only modestly suppressed (1.6-fold) suggesting that the effect of HuR inhibition was mainly at the translational level. Western blot analysis of microglial lysates showed modest but significant attenuation of HuR and another RNA binding protein, KSRP as depicted in FIG. 14. iNOS showed marked dose dependent suppression (4.2-fold at 1.0 μM). Arginase 1 and YM1, two markers of M2-like activation, were not significantly affected.

HuR Multimerization Inhibitor Effect on Pro-Inflammatory Mediator Expression in Activated Astroglia Since LPS stimulation activates astroglia to produce inflammatory mediators after LPS stimulation, the effect of SRI-42127 on suppressing this response was assessed.

Figure 15:
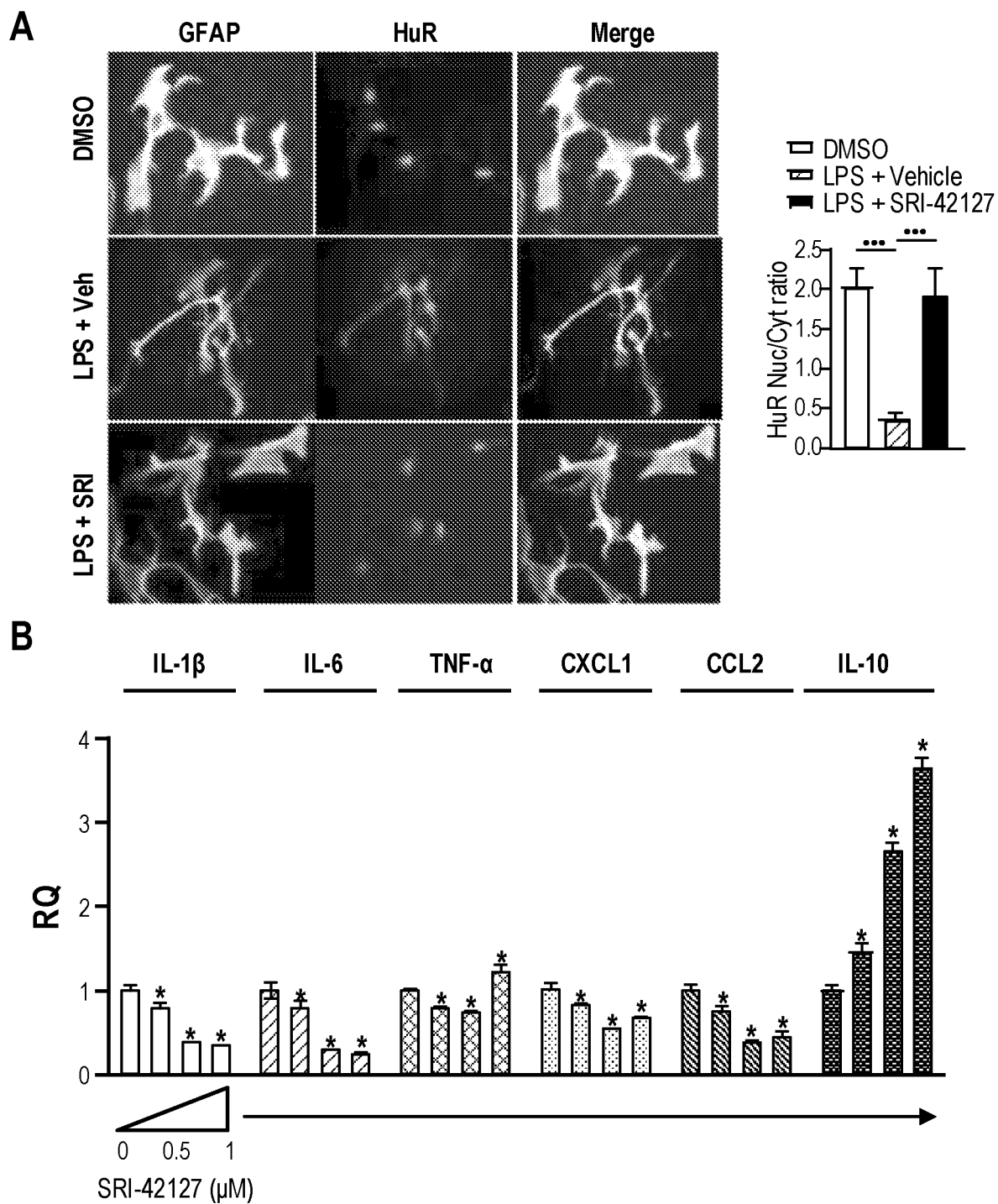
FIG. 15, Panel A is a set of images of cultured astrocytes that were activated (LPS+) in the presence of vehicle or SRI-42127 that were then fixed and immunostained with GFAP and HuR antibodies to analyze HuR localization. The bar graph on the right of Panel A quantitates the HuR N/C ratio for astrocytes in the presence of DMSO, activated with LPS in vehicle, and activated with LPS with SRI-42127.

First, the effect of SRI-42127 on HuR localization in astrocytes was studied. Cultured astrocytes were stimulated with LPS with or without SRI-42127 (at 0.5 μM) for 24 hours and then fixed and immunostained with GFAP and HuR antibodies as shown in FIG. 15, Panel A. Unstimulated cells (DMSO only) showed the typical nuclear predominance of HuR. Quantification of the N/C HuR ratio using methodology described with microglia was 2.0. With LPS stimulation, there was translocation of HuR to the cytoplasm consistent with astrocyte activation and the N/C ratio decreased to 0.4 (P<0.001). When cells were treated with SRI-42127, this ratio was reversed back to pre-stimulation value (1.9). These findings indicate that SRI-42127 blocks cytoplasmic translocation of HuR in activated astrocytes.

Figure 16:
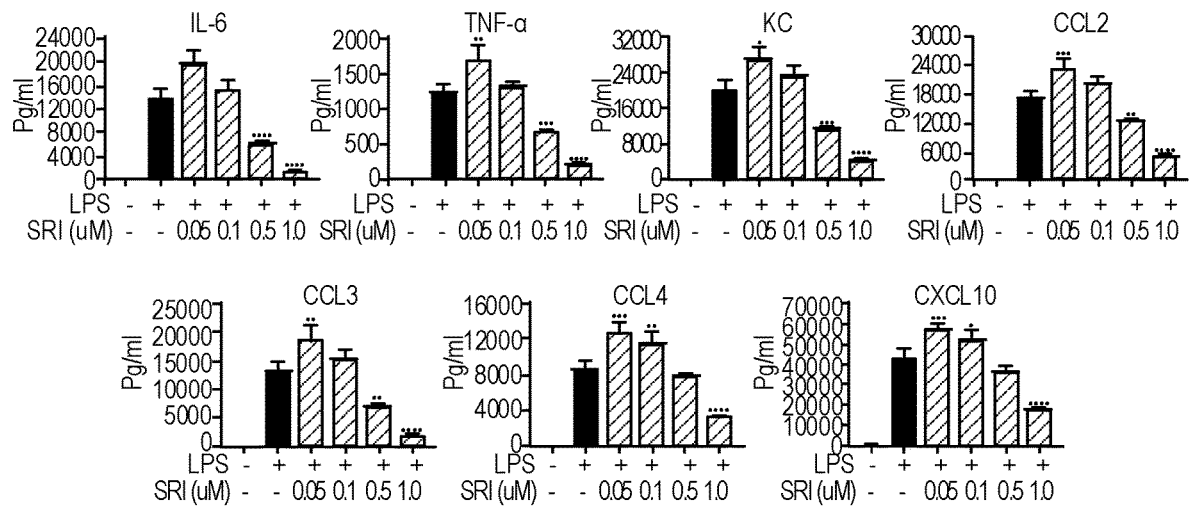
FIG. 16 contains bar graphs illustrating suppression of inflammatory cytokine, chemokine, and other mediators mRNA at varying doses of SRI-42127.

Next, the impact of SRI-42127 on induction of inflammatory cytokine mRNAs as depicted in FIG. 15, Panel B was assessed. A significant 3-4-fold suppression of mRNA for IL-1β, IL-6, CXCL1, and CCL2 was observed. IL-10 increased by ~3-fold at 1.0 µM and TNF-α decreased modestly at lower doses of SRI-42127 but was slightly induced at 1.0 µM. ELISA measurement of secreted proteins in the culture media showed marked suppression of IL-6 (8.8-fold) and TNF-α (5.7-fold) at 1.0 µM as shown in FIG. 16. The dissociation between TNF-α mRNA and protein suppression was similar to what was observed with microglia. All chemokines were likewise suppressed, including KC, CCL2, CCL3, CCL4, CXCL10, from 2.5 to 8.1-fold.

Dual Chamber Transmigration Assay

Since a striking suppression of chemokine secretion by SRI-42127 in activated microglia and astroglia was observed, the effect on chemoattraction of monocytes and neutrophils using a dual chamber transmigration assay was assessed next.

Figure 17:
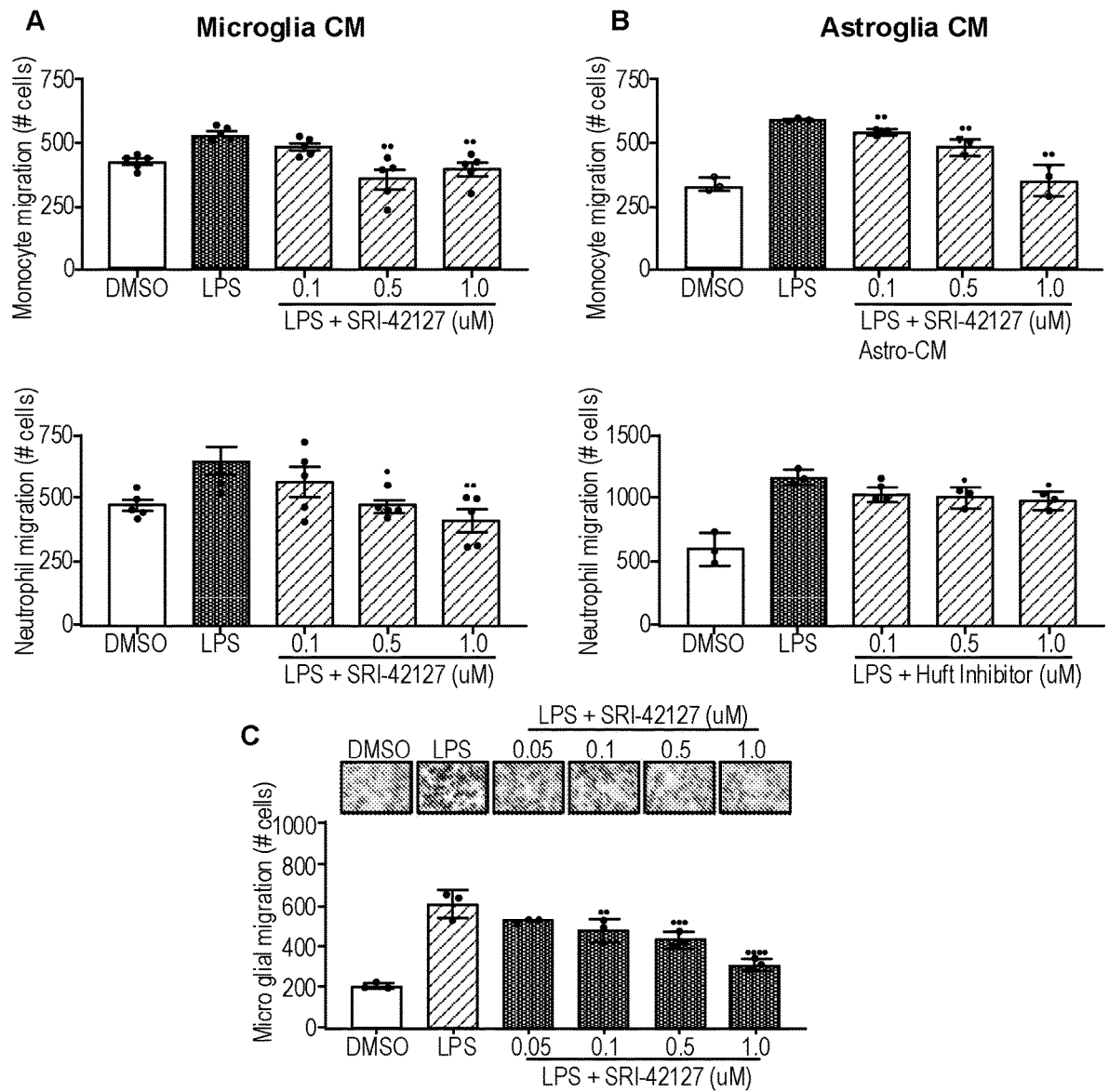
FIG. 17, Panel A contains two bar graphs illustrating attenuation of monocyte (top) and neutrophil (bottom) migration of cells harvested from murine bone marrow and placed in an upper chamber to conditioned media from LPS-activated microglia placed in a lower chamber, treated with varying doses of SRI-42127 where migration across the transwell was quantitated by staining the filter with hematoxylin.

Monocytes and neutrophils were harvested from murine bone marrow using flow cytometry. Cells were plated in the upper chamber, and conditioned media from LPS-activated microglia or astroglia, treated with SRI-42127, was added to the lower chamber. Migration across the transwell was quantitated by staining the filter with hematoxylin. Ten high-powered fields were assessed by brightfield microscopy for cell counting (in triplicate wells). The observer was blinded to the conditions of each well. A significant attenuation of monocyte and neutrophil migration for both microglial conditioned media as depicted in FIG. 17, Panel A and astroglial condition media as depicted in FIG. 17, Panel B, which was dose dependent, was observed. Migration of untreated microglia toward conditioned media from SRI-42127-treated microglia was also suppressed, as shown in FIG. 17, Panel C. Thus, SRI-42127 treatment of activated microglia and astroglia suppressed chemoattraction of monocytes, neutrophils and microglia.

In Vivo LPS Mouse Model

Administration of LPS intraperitoneally produces an acute neuroinflammatory response in the CNS including activation of microglia with production of inflammatory cytokines and chemokines. This model was used to test the effect of SRI-42127 on attenuating the neuroinflammatory response.

Figure 18:
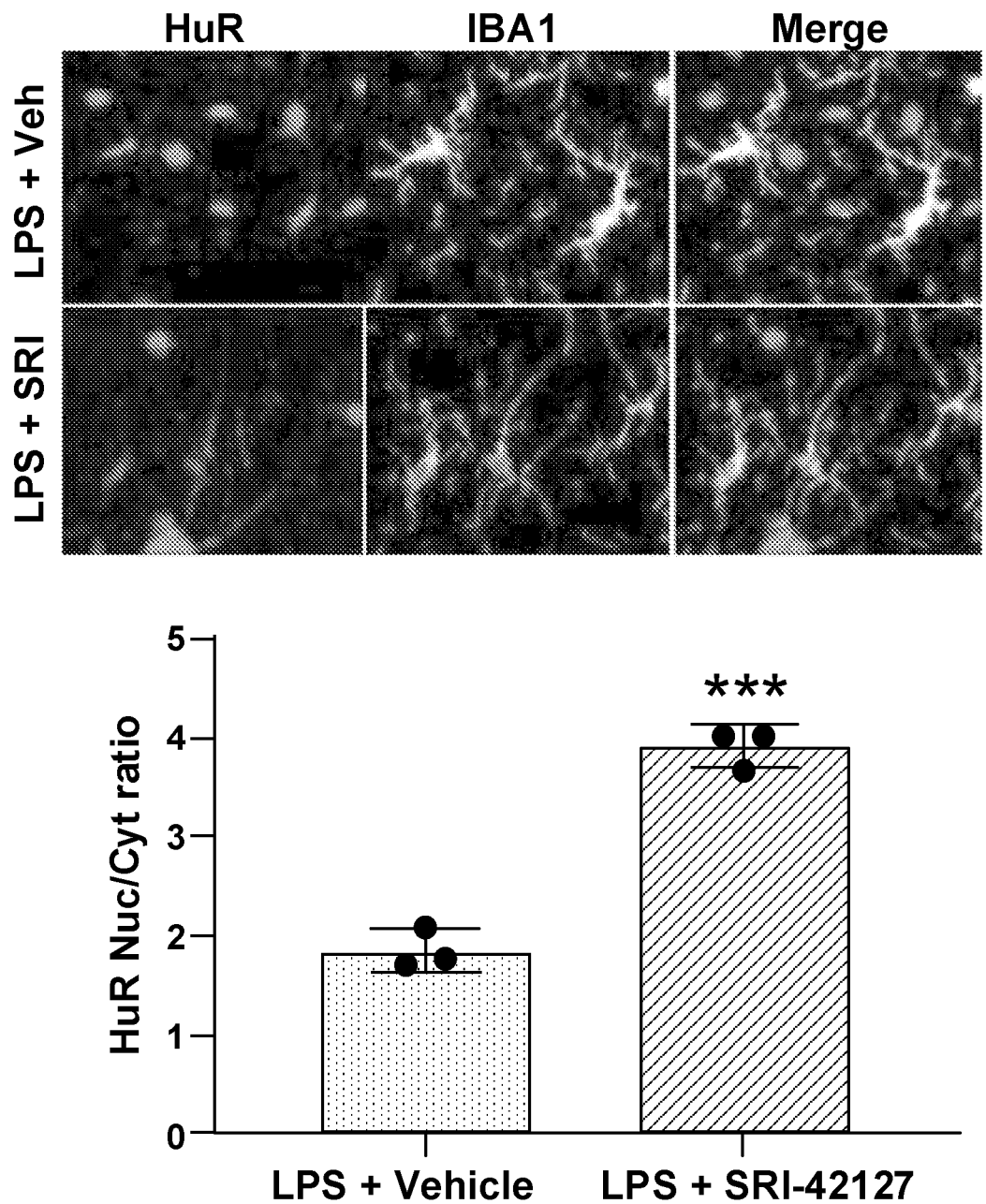
FIG. 18 contains photomicrographs following translocation of HuR in the microglial nucleus or cytoplasm and a bar graph showing the quantitation by way of N/C ratio for untreated and treated mice.

Mice were injected with LPS intraperitoneally (i.p.) and then given SRI-42127 at 15 mg/kg (or vehicle) i.p. starting at 30 min post LPS injection and then three subsequent doses at 6 hours, 12 hours, and 18 hours. Brains were harvested at 24 hours for analysis. To determine the impact of SRI-42127 on HuR localization in microglia in the brain, sections from the hippocampus from 3 vehicle control and 3 SRI-42127 treated mice were examined. Tissue sections were stained with IBA1 and HuR. Quantification methods for HuR localization were similar to immunocytochemistry. Briefly, IBA1+ cells were identified and the outline of the cell was traced with Fiji software. Nuclei were localized by DAPI staining. Nuclear and cytoplasmic HuR immunofluorescence was quantitated to calculate a N/C ratio. In vehicle-treated animals, there was translocation of HuR into the cytoplasm as indicated by a merged yellow signal whereas in SRI-42127 treated mice, there was little to no merged signal. Representative photomicrographs are shown in FIG. 18 (top). Next, 20-30 IBA1+ cells from sections in 3 control and 3 treated mice were assessed. A 2-fold increase in the N/C ratio of mice treated with SRI-42127 was observed, confirming the effect of the drug as shown in FIG. 18 (bottom).

Figure 19:
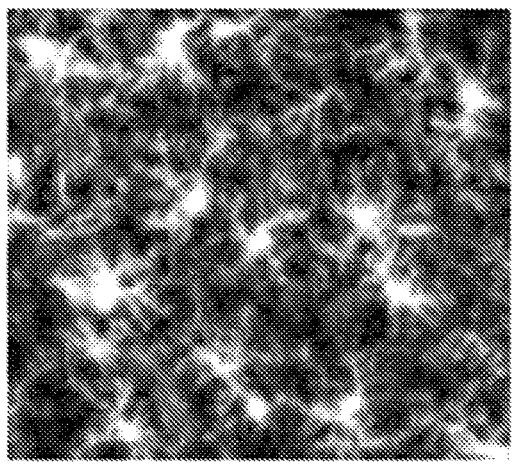
FIG. 19, Panel A is a set of images illustrating the activation state of microglia by measuring the fluorescent intensity of IBA1 stained microglia in the presence of vehicle and SRI-42127.
Figure 19:
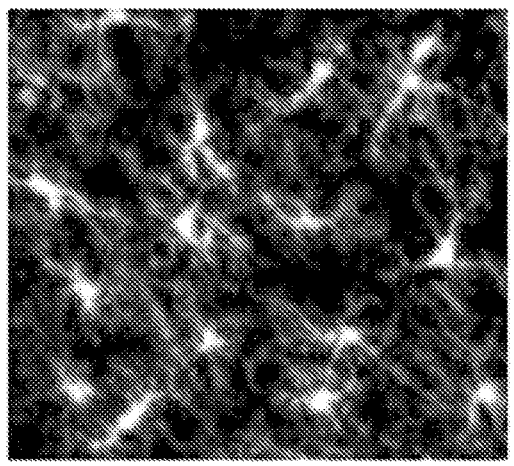
Figure 19:
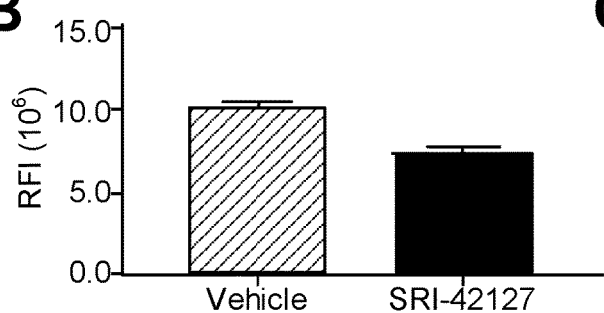
Figure 19:
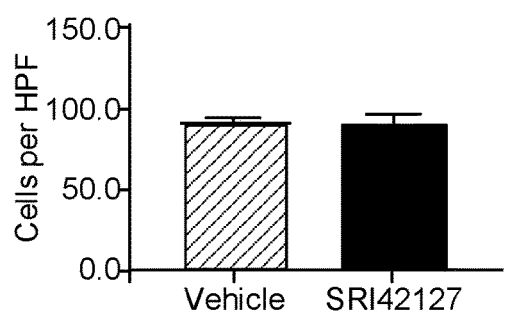

Next, the activation state of microglia was studied by measuring IBA1 intensity. Sections from the hippocampal region were stained with IBA1 and fluorescence intensity was measured using Fiji software from 5 sections of 3 mice per group. The reviewer was blinded to the identity of the samples. A significant attenuation of IBA1 intensity in SRI-42127 treated mice was observed as shown in FIG. 19, Panel A and Panel B. There were no differences in the number of microglia in the sections evaluated from control versus treated mice as shown in FIG. 19, Panel C.

Figure 20:
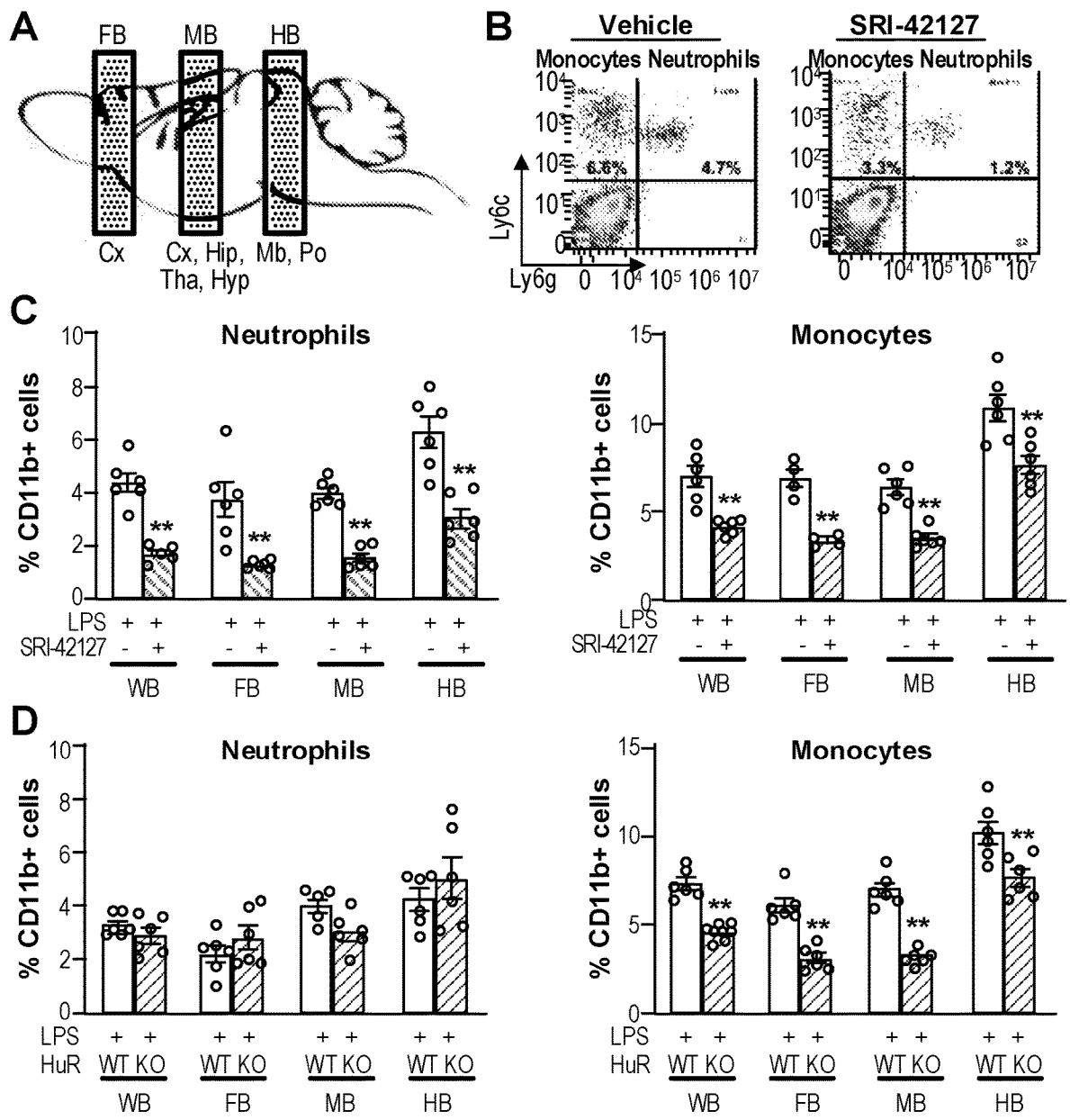
FIG. 20, Panel A is a cartoon illustrating the three brain sections of interest, frontal brain, middle brain, and hindbrain.

Finally, the impact of SRI-42127 on infiltration of neutrophils and monocytes into the brain after LPS administration i.p. was assessed. Microglial HuR knockout (KO) mice were also assessed. Mice were treated with i.p. LPS and SRI-42127 as above, and at 24 hours brains were harvested and divided into 3 sections using a brain slicer (frontal brain, middle brain and hindbrain) as illustrated in FIG. 20, Panel A. Single cell suspensions were prepared from these regions and assessed by flow cytometry for neutrophils and monocytes using Lytic and Ly6g markers on CD11b+ sorted cells. A representative result for vehicle and SRI-42127 is shown in FIG. 20, Panel B. Each region plus a sample from the whole brain were studied. For SRI-treated mice, a significant attenuation of infiltrating neutrophils (2 to 3-fold) and monocytes (1.3- to 2 fold) in all brain regions was observed as shown in FIG. 20, Panel C. For HuR KO mice, there was significant attenuation of monocytes but not neutrophils as showin in FIG. 20, Panel D.

In conclusion, systemic administration of SRI-42127 in an LPS model of neuroinflammation led to (1) significant nuclear retention of HuR, (2) attenuation of microglial activation, and (3) attenuation of infiltrating peripheral immune cells (neutrophils and monocytes).

The compounds and methods of the appended claims are not limited in scope by the specific compounds and methods described herein, which are intended as illustrations of a few aspects of the claims and any compounds and methods that are functionally equivalent are within the scope of this disclosure. Various modifications of the compounds and methods in addition to those shown and described herein are intended to fall within the scope of the appended claims. Further, while only certain representative compounds, methods, and aspects of these compounds and methods are specifically described, other compounds and methods are intended to fall within the scope of the appended claims. Thus, a combination of steps, elements, components, or constituents can be explicitly mentioned herein; however, all other combinations of steps, elements, components, and constituents are included, even though not explicitly stated.

Figure 21:
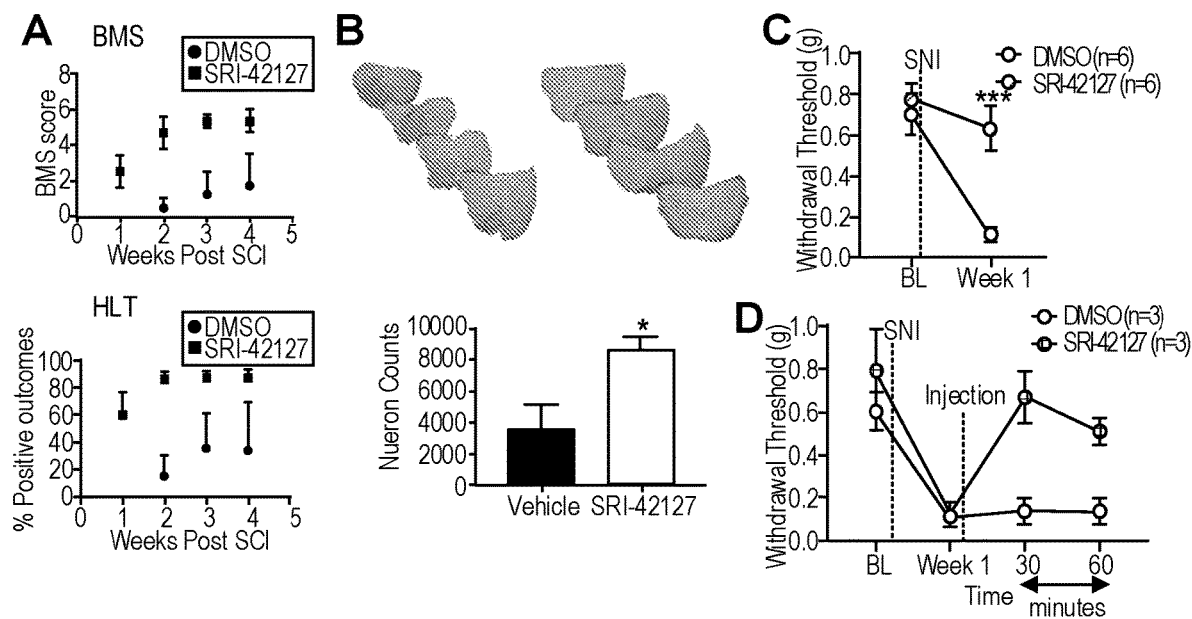
FIG. 21, Panel A represents a set of plots showing improved scores in SRI-42127-treated mice (n=3) versus vehicle (n=2) in a basso motor scale ("BMS") (top plot) and horizontal ladder test ("HLT") (bottom plot) for mice that underwent a mid-thoracic contusion SCI followed by treatment every 8 hours with SRI-42127.

Example 9: SRI-42127 Produces Neuroprotective Effects in a Study of Spinal Cord Injury and Attenuates Chronic Pain in a Peripheral Nerve Injury Model Wild-type male mice were subjected to a mid-thoracic contusion injury and then treated with SRI-42127 (15 mg/kg) every 8 hours for 4 days, starting 1 hour after injury. Assessment of recovery using the Basso motor scale (BMS) and horizontal ladder test (HLT), showed improvement in function with SRI-42127 as shown in FIG. 21, Panel A. This was supported by neuron counting in the epicenter of injury by stereology where there was more than a 2-fold increase in surviving neurons in SRI-42127-treated mice 2 weeks post injury, as shown in FIG. 21, Panel B. Next the spared nerve injury model was then used to assess the effect of SRI-42127 on prolonged increase in mechanical and thermal sensitivity (allodynia). Not to be bound by theory, similar to spinal cord injury, chronic pain signaling is triggered by activation of microglia and astroglia in the spinal cord and production of inflammatory mediators (e.g. TNF-α, IL-1β, IL-6, INOS, CCL2) that induce hyperexcitation of sensory neurons in the dorsal horn. Mice underwent sciatic nerve lesioning to produce a spared nerve injury and then received SRI-42127 (15 mg/kg) or vehicle every 6 hours for 4 days (starting 1 h after injury). Mechanical sensitivity was assessed at day 7 post-injury. The control (DMSO-treated) group showed typical allodynic responses, whereas the test group (SRI-42127-treated) showed preserved mechanical sensitivity (p<0.001, FIG. 21, Panel C). Following this test, a subset of mice in the DMSO-treated group was given an acute administration of SRI-42127 (or DMSO) and their mechanical sensitivity was tested at 30 minutes and 60 minutes post-administration. Acute treatment with SRI-42127 reversed allodynia in these mice for at least 60 minutes (p<0.01, FIG. 21, Panel D). Taken together, these data provide evidence that SRI-42127 exerts of a neuroprotective effect in spinal cord injury and an anti-neuropathic pain effect in chronic nerve injury.

What is claimed is:

1. A compound of the following formula:

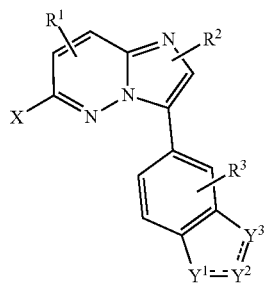

or a pharmaceutically acceptable salt or prodrug thereof, wherein:
=== is a single bond or a double bond;
$R^1$, $R^2$, and $R^3$ are each independently selected from the group consisting of hydrogen, halogen, cyano, trifluoromethyl, alkoxy, aryloxy, substituted or unsubstituted alkyl, substituted or unsubstituted alkenyl, substituted or unsubstituted alkynyl, substituted or unsubstituted heteroalkyl, substituted or unsubstituted heteroalkenyl, substituted or unsubstituted heteroalkynyl, substituted or unsubstituted aryl, substituted or unsubstituted heteroaryl, substituted or unsubstituted cycloalkyl, and substituted or unsubstituted heterocycloalkyl;
X is $NR^4R^5$ or $OR^4$, wherein $R^4$ and $R^5$ are each independently selected from the group consisting of hydrogen, substituted or unsubstituted alkyl, substituted or unsubstituted alkenyl, substituted or unsubstituted alkynyl, substituted or unsubstituted heteroalkyl, substituted or unsubstituted heteroalkenyl, substituted or unsubstituted heteroalkynyl, substituted or unsubstituted aryl, substituted or unsubstituted heteroaryl, substituted or unsubstituted cycloalkyl, and substituted or unsubstituted heterocycloalkyl;

$Y^1$, $Y^2$, and $Y^3$ are each independently selected from $NR^6$ and $CR^7$, wherein $R^6$ and $R^7$ are each independently hydrogen, substituted or unsubstituted alkyl, or substituted or unsubstituted carbonyl, wherein at least two of $Y^1$, $Y^2$, and $Y^3$ are N, and wherein the compound is not:

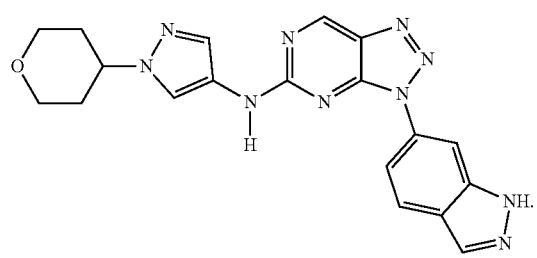 [SMILES: c1nn(C2CCOCC2)cc1Nc1ncc2nnn(-c3ccc4cn[nH]c4c3)c2n1]

2. The compound of claim 1, wherein the compound has the following formula:

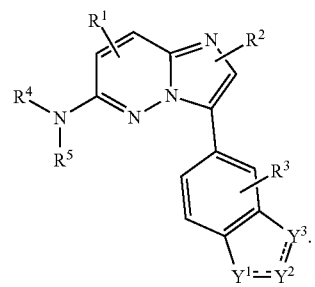

3. The compound of claim 2, wherein $R^4$ is hydrogen, or wherein $R^5$ is substituted or unsubstituted cycloalkyl, substituted or unsubstituted heterocycloalkyl, or substituted or unsubstituted alkyl, or wherein $R^6$ is hydrogen or $C_1$-$C_6$ alkyl, or wherein $R^7$ is hydrogen, $C_1$-$C_6$ alkyl, or acetyl.

4. The compound of claim 1, wherein the compound has the following formula:

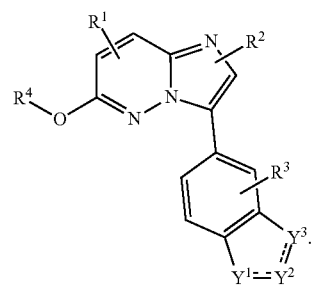

5. The compound of claim 4, wherein the compound is selected from the group consisting of:

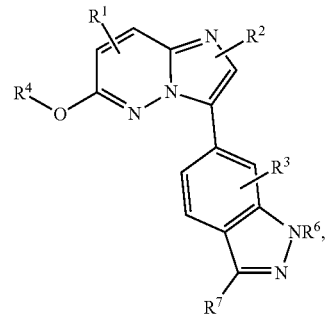

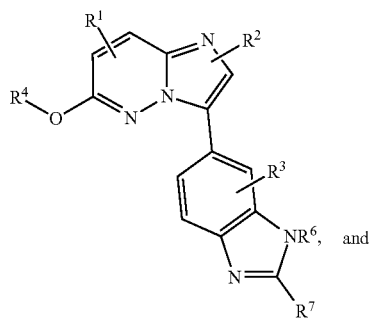

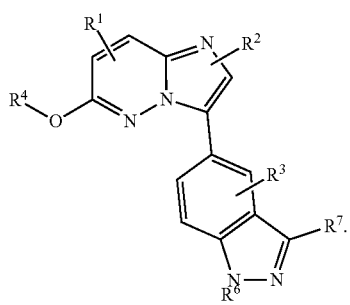

6. The compound of claim 4, wherein $R^4$ is substituted or unsubstituted cycloalkyl, substituted or unsubstituted heterocycloalkyl, or substituted or unsubstituted alkyl, or wherein $R^6$ is hydrogen or $C_1$-$C_6$ alkyl, or wherein $R^7$ is hydrogen, $C_1$-$C_6$ alkyl, or acetyl, or wherein $R^1$, $R^2$ and $R^3$ are H.

7. The compound of claim 1, wherein the compound is selected from the group consisting of:

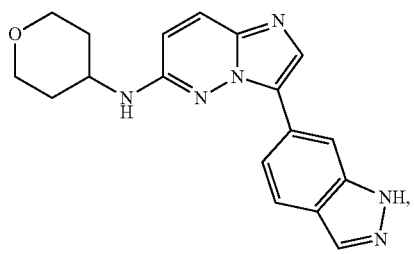

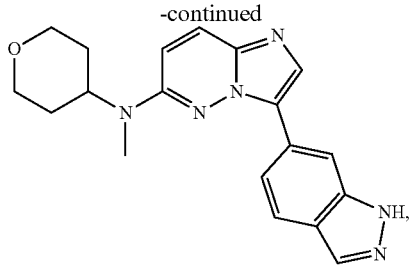

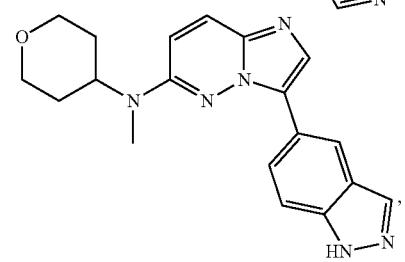

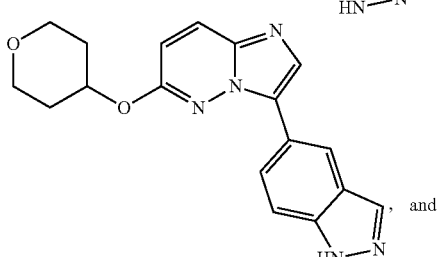

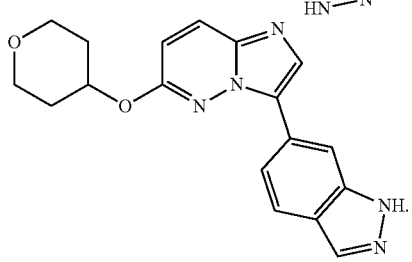

8. A pharmaceutical composition, comprising a compound of claim 1 and a pharmaceutically acceptable carrier.

9. A method of treating cancer in a subject, comprising: administering to a subject an effective amount of a compound of claim 1.

10. The method of claim 9, wherein the cancer is a brain cancer.

11. The method of claim 9, wherein the cancer is glioma.

12. The method of claim 9, further comprising administering to the subject a second therapeutic agent.

13. The method of claim 12, wherein the second therapeutic agent comprises a chemotherapeutic agent.

14. The method of claim 9, wherein the compound is selected from the group consisting of:

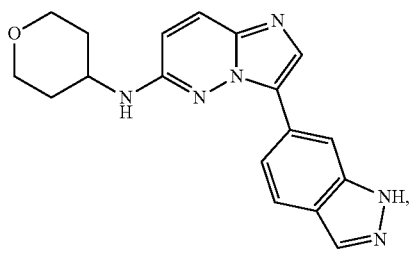

-continued

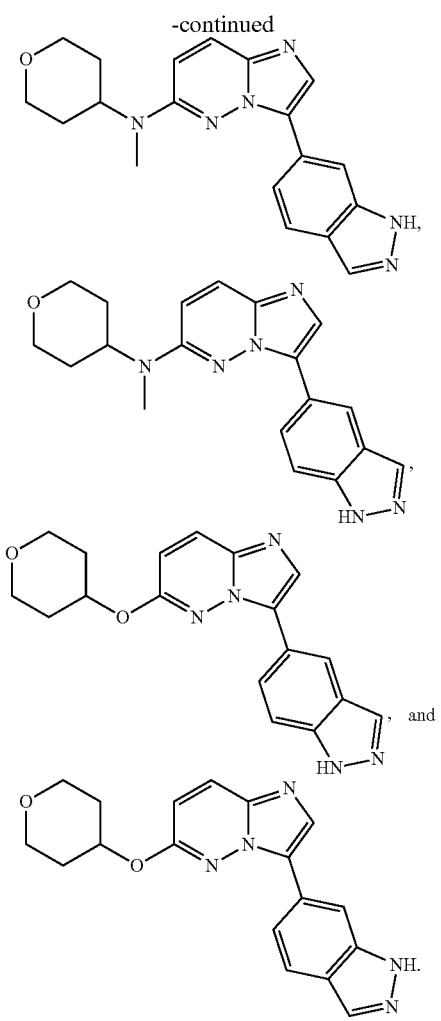

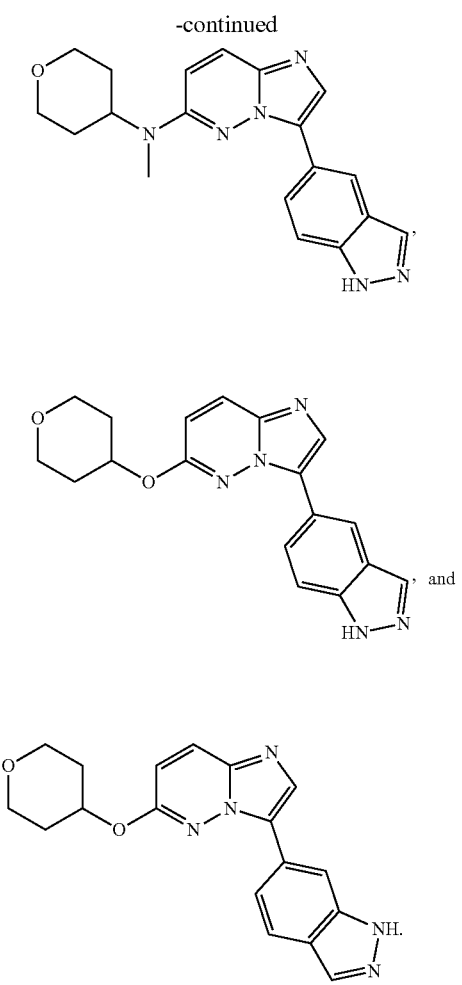

15. A method of treating inflammation in a subject, comprising:
   administering to a subject an effective amount of a compound of claim 1.

16. The method of claim 15, wherein the compound is selected from the group consisting of:

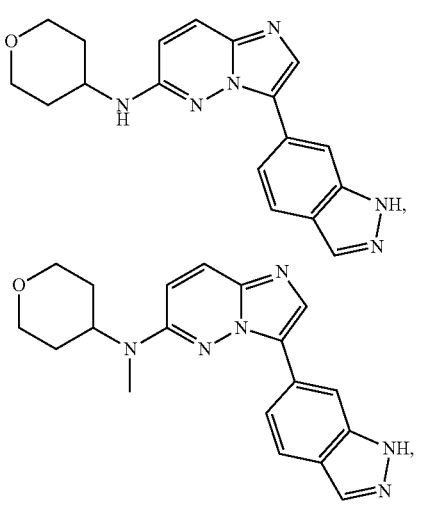

17. A method of treating neuropathic pain in a subject comprising:
   administering to a subject an effective amount of a compound of claim 1.

18. The method of claim 17, wherein the compound is selected from the group consisting of:

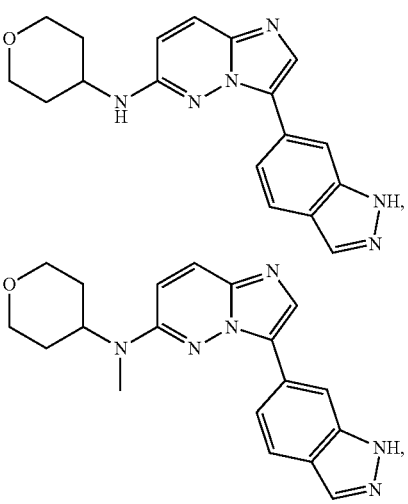

127
-continued

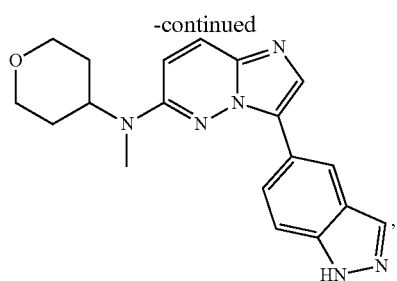

128
-continued

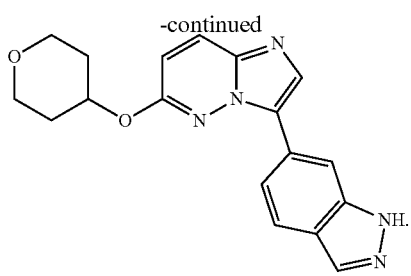

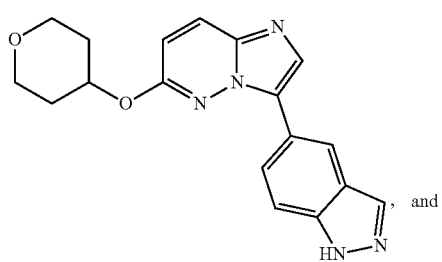, and

19. A method of inhibiting HuR multimerization in a cell, comprising:
contacting a cell with an effective amount of a compound of claim 1.
20. A method of treating a central nervous system (CNS) injury in a subject, comprising:
administering to a subject an effective amount of a compound of claim 1.
21. The method of claim 20, wherein the CNS injury is selected from the group consisting of stroke, traumatic brain injury and spinal cord injury.
22. The method of claim 21, wherein the stroke is an ischemic or hemorragic stroke.

* * * * *